(12) United States Patent
Kambayashi et al.

(10) Patent No.: US 6,477,649 B2
(45) Date of Patent: Nov. 5, 2002

(54) INFORMATION RECORDING APPARATUS, INFORMATION REPRODUCING APPARATUS, AND INFORMATION DISTRIBUTION SYSTEM

(75) Inventors: Toru Kambayashi, Chigasaki; Koichiro Akiyama, Kanagawa-ken; Shuichi Tsujimoto, Yokohama; Kazuo Sumita, Yokohama; Hideki Hirakawa, Yokohama; Toshihiro Sugaya, Ibaraki-ken, all of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/076,826

(22) Filed: May 13, 1998

(65) Prior Publication Data

US 2002/0002466 A1 Jan. 3, 2002

(30) Foreign Application Priority Data

May 13, 1997 (JP) .............................................. 9-122511
Jan. 29, 1998 (JP) .......................................... 10-016618

(51) Int. Cl.[7] .............................. H04L 9/32; H04L 9/00
(52) U.S. Cl. ......................... 713/200; 380/201; 705/51; 705/59; 705/55
(58) Field of Search .............................. 705/51, 59, 55; 713/200, 201, 193; 380/4, 23, 24, 25, 277, 281, 203; 709/229; 717/11

(56) References Cited

U.S. PATENT DOCUMENTS

| 4,757,534 | A | | 7/1988 | Matyas et al. |
| 5,138,712 | A | * | 8/1992 | Corbin ........................ 713/200 |
| 5,392,351 | A | | 2/1995 | Hasebe et al. |
| 5,555,304 | A | | 9/1996 | Hasebe et al. |
| 5,680,376 | A | * | 10/1997 | Katayama et al. ............. 369/32 |
| 5,745,879 | A | * | 4/1998 | Wyman .......................... 705/1 |
| 5,796,824 | A | | 8/1998 | Hasebe et al. |
| 5,867,579 | A | * | 2/1999 | Saito ............................ 380/25 |
| 5,917,910 | A | * | 6/1999 | Ishiguro et al. ................. 380/4 |
| 5,935,243 | A | * | 8/1999 | Hasebe et al. ............... 713/200 |
| 6,005,839 | A | * | 12/1999 | Sako et al. |
| 6,209,097 | B1 | * | 3/2001 | Nakayama et al. .......... 713/193 |
| 6,229,896 | B1 | * | 5/2001 | Gotoh et al. ................. 380/203 |

FOREIGN PATENT DOCUMENTS

JP 11136695 * 11/2000 ............ G06F/12/14

* cited by examiner

Primary Examiner—Cuong Nguyen
(74) Attorney, Agent, or Firm—Oblon, Spivak, McClelland, Maier & Neustadt, P.C.

(57) ABSTRACT

An information recording apparatus comprises an encryption section encrypting contents information and also a license condition referred to limit use of the contents information and a decoding key for decoding the encrypted contents information to generate license information, and a recording section recording the encrypted contents information and the generated license information on a recording medium. An information reproducing apparatus comprises a decoder unit decoding the license information recorded on the recording medium using a second decoding key for decoding the license information and deciding on the basis of the license condition contained in the decoded license information whether the contents information can be used. If it is decided that the contents information can be used, the encrypted contents information recorded on the recording medium is decoded using the first decoding key contained in the decoded license information.

35 Claims, 126 Drawing Sheets

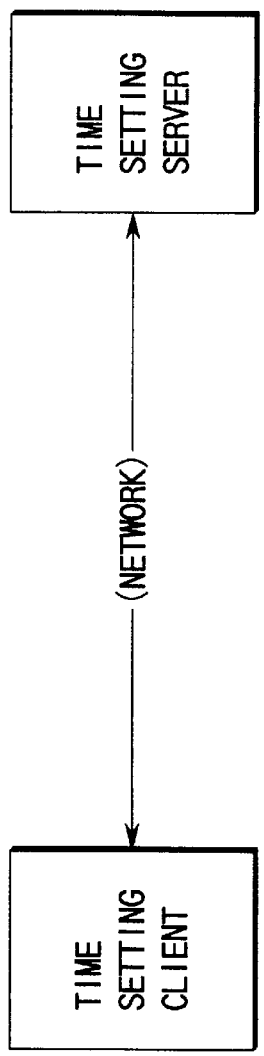
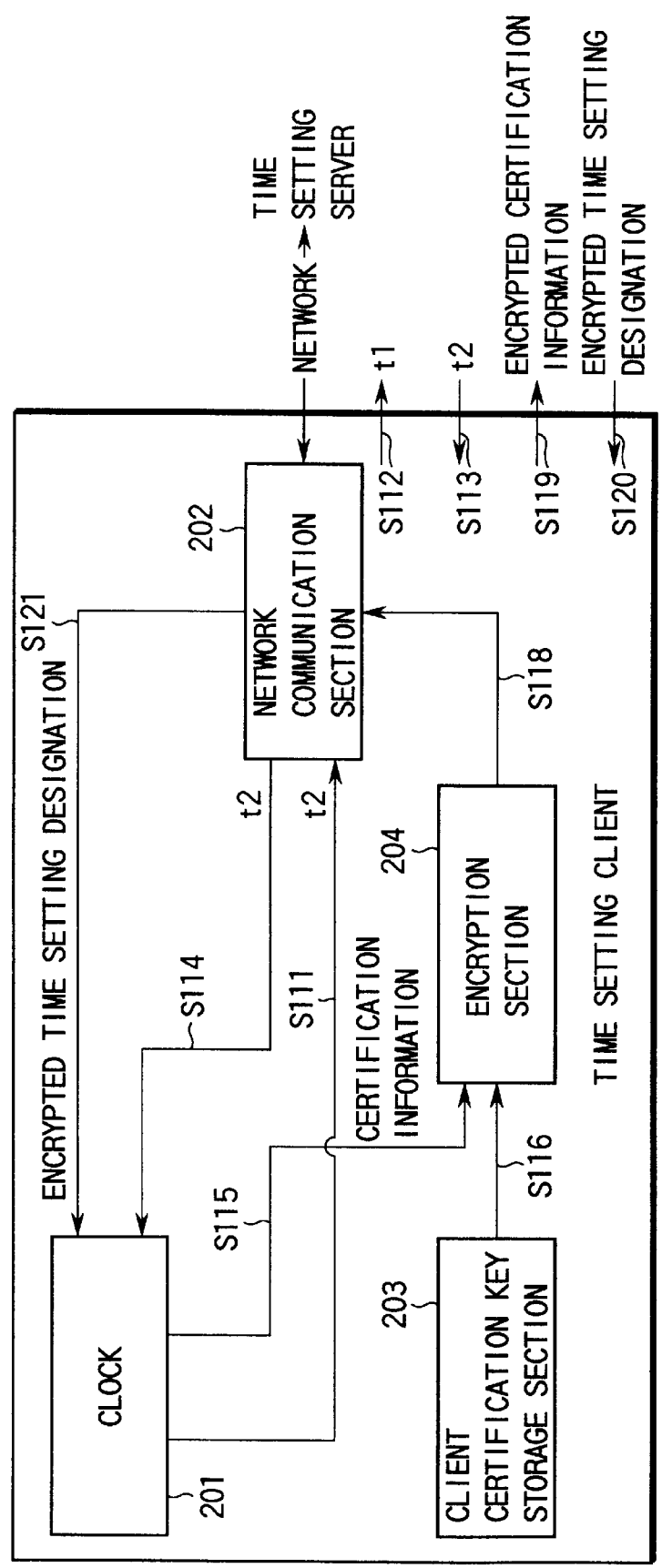
FIG. 17
FIG. 18

| DISK ID | DISK KEY |
|---------|----------|
| 000102  | 1768afdd5 |
| 000103  | 465effaab89 |

CONTENTS DB

INFORMATION RECORDING APPARATUS, INFORMATION REPRODUCING APPARATUS, AND INFORMATION DISTRIBUTION SYSTEM

BACKGROUND OF THE INVENTION

The present invention relates to an information recording apparatus for recording information on a recording medium such as a DVD, an information reproducing apparatus for reproducing information recorded on a recording medium such as a DVD, and an information distribution system including an information recording/reproducing apparatus for charging for use of information recorded on a recording medium or distributed through a network or by broadcasting.

In recent years, the advance of digital information processing technology and communication technology such as a broadband ISDN, and the development of an advanced information recording medium such as a DVD which realizes a large capacity and high-quality image and sound are progressing. Along with such development of a variety of advanced information transmission means, the circumstances are allowing users to make use of an enormous number of digitized works which are distributed to the users through a network, a recording medium, or the like. These circumstances increase opportunities for copies and alterations without permission of authors or distribution unintended by authors, so copyright holders are anxious about infringement on their benefits.

An important challenge for wiping out such anxiety of copyright holders is the development of a system which allows quick and easy distribution of digitized works and provides a fair digital information usage environment assuming protection by copyright.

A DVD is a large-capacity personal computer medium replacing a CD-ROM, and various applications to movie, music, game, karaoke, and the like can be expected. For popularization of DVDs, inexpensive DVD titles or spread of a rental DVD market is expected. From these viewpoints as well, it is essential to provide an information distribution system assuming protection by copyright of information, i.e., a system based on a concept of charging not for possession of a digitized work recorded on a recording medium such as a DVD but for use of the digitized work.

BRIEF SUMMARY OF THE INVENTION

It is an object of the present invention to provide an information recording apparatus, an information reproducing apparatus, and an accounting apparatus to constitute an information distribution system which allows quick and easy distribution of digitized works and provides a digital information usage environment assuming protection by copyright.

It is another object of the present invention to provide an information recording apparatus for quickly and easily distributing digitized works which are distributed through a network or a recording medium and constituting a digital information usage environment assuming protection by copyright by charging for use of digital information, an apparatus for reproducing the recorded information, and an accounting apparatus for charging for use of information.

According to an aspect of the present invention, there is provided an information recording apparatus comprising an encryption section for encrypting contents information, a license information generator for encrypting at least a license condition referred to limit use of the contents information and a decoding key for decoding the encrypted contents information to generate license information, and a recording section for recording the contents information encrypted by the encryption section and the license information generated by the license information generator on a recording medium.

According to another aspect of the present invention, there is provided an information reproducing apparatus comprising a storage section for storing second decoding key information for decoding license information, a first decoder section for decoding the license information recorded on the recording medium using the second decoding key stored in the storage section, a decision section for deciding, on the basis of a license condition contained in the license information decoded by the first decoder section, whether contents information can be used, a second decoder section for decoding the encrypted contents information recorded on the recording medium using the first decoding key contained in the license information decoded by the first decoder section when the decision section decides that the contents information can be used, and a reproduction section for reproducing the contents information decoded by the second decoder section.

According to the information recording apparatus of the present invention, the encrypted contents information and the license condition of the contents information are in separately recorded on the recording medium. only the information reproducing apparatus having an authentic decoding key for decoding the license information can reproduce the contents information recorded on the recording medium. In addition, since, before decoding, it is always decided on the basis of the license condition contained in the license information whether the contents information can be used, use of the contents information under an illicit use condition is disabled. Therefore, digital information assuming protection by copyright of the contents information can be quickly and easily distributed.

According to still another aspect of the present invention, there is provided an accounting apparatus for charging for use of contents information recorded on a recording medium, comprising an input section for inputting a desired condition for use of the contents information recorded on the recording medium, a fee claiming section for claiming a fee for use of the contents information on the basis of the condition input by the input section, and a recording section for, upon confirming fee payment in response to the claim, recording, on the recording medium, license information containing at least a license condition for limiting use of the contents information recorded on the recording medium on the basis of the condition input by the input section. With this arrangement, for the recording medium on which the contents information and the license information containing the license condition for limiting use of the contents information are recorded, appropriate charging for use of the contents information is enabled. In addition, digital information assuming protection by copyright of the contents information can be quickly and easily distributed.

According to still another aspect of the present invention, there is provided an accounting apparatus for charging for use of contents information through a recording medium on which contents information and encrypted license information containing at least a license condition referred to limit the use of the contents information are recorded, comprising a license information input section for inputting the encrypted license information recorded on the recording medium, a decoder section for decoding the encrypted license information input by the license information input section, a condition acceptance section for accepting a desired condition for use of the contents information, a fee claiming section for claiming a fee for use of the contents information on the basis of the condition accepted by the condition acceptance section, a license information update section for, upon confirming fee payment in response to the claim, updating the license information decoded by the decoder section, on the basis of the condition input by the condition input section, an encryption section for encrypting the license information updated by the license information update section, and an output section for outputting the license information encrypted by the encryption section. With this arrangement, for the recording medium on which the contents information and the license information containing the license condition for limiting use of the contents information are recorded, appropriat =e charging for use of the contents information is enabled. In addition, digital information assuming protection by copyright of the contents information can be quickly and easily distributed.

According to still another aspect of the present invention, there is provided a decision apparatus for deciding, on the basis of encrypted license information containing at least a license condition referred to to limit use of contents information and key information for decoding the contents information, whether the contents information can be used, comprising a key generator for generating a public key used to encrypt the license information and a secret key for decoding the license information at a predetermined timing, the secret key corresponding to the public key, a decoder section for decoding the input license information using the secret key generated by the key generator, a decision section for deciding, on the basis of the license condition contained in the license information decoded by the decoder section, whether the contents information can be decoded, and an output section for outputting key information contained in the license information decoded by the decoder section when the decision section decides that the contents information can be used.

According to the present invention, since the secret parameter for decoding the license information is generated in a decoder unit A at a predetermined timing and used only within a predetermined period, information security for the license information containing the license condition of the contents information and contents information decoding key can be improved.

According to an update apparatus of the present invention, which updates license information on the basis of a request for updating the license information upon receiving at least a newly designated license condition and second key generation information necessary for generating second key information from a decision device for deciding, on the basis of encrypted license information containing at least a license condition referred to to limit use of contents information, encrypted first key information for decoding the contents information, and first key generation information necessary for generating the second key information for decoding the encrypted first key information, whether the contents information can be used, the license condition and the first key generation information are updated, the second key information is updated on the basis of the updated first key generation information and the second key generation information, and the first key information is encrypted using the updated second key information to generate encrypted license information containing at least the updated license condition, the first key information encrypted using the updated second key information, and the updated first key generation information.

According to the present invention, when the license information is to be updated, the license information can be updated while ensuring the information security without supplying the contents decoding key.

According to an update apparatus of the present invention, which updates license information on the basis of a request for updating the license information upon receiving at least a newly designated license condition, second key generation information necessary for generating second key information, and an updated public key from a decision device for deciding, on the basis of the license information containing at least a license condition referred to to limit use of contents information, encrypted first key information for decoding the contents information, and first key generation information necessary for generating the second key information for decoding the encrypted first key information, whether the contents information can be used, the license information being encrypted using a public key, the license condition and the first key generation information are updated, the second key information is updated on the basis of the updated first key generation information and the second key generation information, and the first key information is encrypted using the updated second key information to generate license information containing at least the updated license condition, the first key information encrypted using the updated second key information, and the updated first key generation information, and the generated license information is encrypted using the supplied public key.

According to the present invention, when the license information is to be updated, the license information can be updated while ensuring the information security without supplying the contents decoding key.

According to the present invention, there is provided an information usage apparatus which receives encrypted first key information for decoding encrypted contents information and first key generation information necessary for generating second key information for decoding the first key information and decodes and uses the contents information, wherein second key generation information necessary for generating the second key information for decoding the first key information is held, the second key information is generated on the basis of the second key generation information and the input first key generation information, and the encrypted contents information is decoded using the generated second key information.

According to the present invention, since the decoding key (first key information) of the contents information is input to the information usage apparatus while being kept encrypted, the information security between the device for outputting the first key information and the information usage apparatus can be improved.

According to still another aspect of the present invention, there is provided an information reproducing apparatus for reproducing contents information from a recording medium on which encrypted contents information and license information containing at least a license condition referred to to limit use of the contents information and first key information for decoding the contents information are recorded, comprising an instrument section for measuring a date and time, a decision section for deciding, on the basis of the date and time measured by the instrument section and the license information recorded on the recording medium, whether the contents information can be used, and an information reproduction section for, when the decision section decides that the contents information can be used, decoding and reproducing the contents information recorded on the recording medium using the first key information output from the decision section, wherein information for notifying the decision section of the date and time from the instrument section and the first key information output from the decision section to the information reproduction section are encrypted.

According to the present invention, the security of information to be transferred among the functional units (the instrument section, the decision section, and the information reproduction section) in the information generation device can be improved.

According to still another aspect of the present invention, there is provided an information recording method of recording, on a recording medium on which at least encrypted contents information is recorded, encrypted license information containing at least a license condition referred to limit use of the contents information and a decoding key of the contents information, comprising transmitting information for designating second key information for encrypting first key information for encrypting the license information to a decision device for deciding whether the contents information can be used, receiving, from the portable recording medium, the first key information for encrypting the license information, which is encrypted using the designated second key information, and recording, on the recording medium, license information generated on the basis of a designated license condition and encrypted using the first key information.

According to the present invention, the contents information recorded on the recording medium cannot be normally decoded unless the decision device which has been used to record the license information in the recording medium is not used. Therefore, illicit use of the contents information can be prevented.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinbefore.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments give below, serve to explain the principles of the invention.

FIG. 17 is a view showing a system constituted by a client and a server to update time of the clock of the decoder unit through a network;

FIG. 18 is a block diagram showing an arrangement of a time setting client shown in FIG. 17;

FIG. 35 is a block diagram showing an arrangement of a license information update unit;

FIG. 119 is a block diagram showing another arrangement of the license decision unit shown in FIG. 107;

FIG. 120 is a flow chart for explaining the operation of the information reproducing apparatus shown in FIG. 118 until encrypted license information and decoding key seed information are separated from a received broadcasting wave to generate a decoding key;

FIG. 121 is a view showing an example of the data structure of a broadcasting wave;

FIG. 122 is a block diagram showing an arrangement of an information distribution system according to the fifth embodiment of the present invention;

FIG. 123 is a view showing an example of data recorded on a rental disk;

FIG. 124 is a view showing an example of storage of a disk key in a contents database prepared in a center;

FIG. 125 is a view schematically showing the disk key distribution scheme in the information distribution system shown in FIG. 122;

FIG. 126 is a block diagram showing an arrangement of a license creation device;

FIG. 127 is a block diagram showing an arrangement of a license issuing device;

FIG. 128 is a block diagram showing an arrangement of a card;

FIG. 129 is a block diagram showing an arrangement of a card adapter;

FIG. 130 is a block diagram showing an arrangement of a player;

Figure 122:
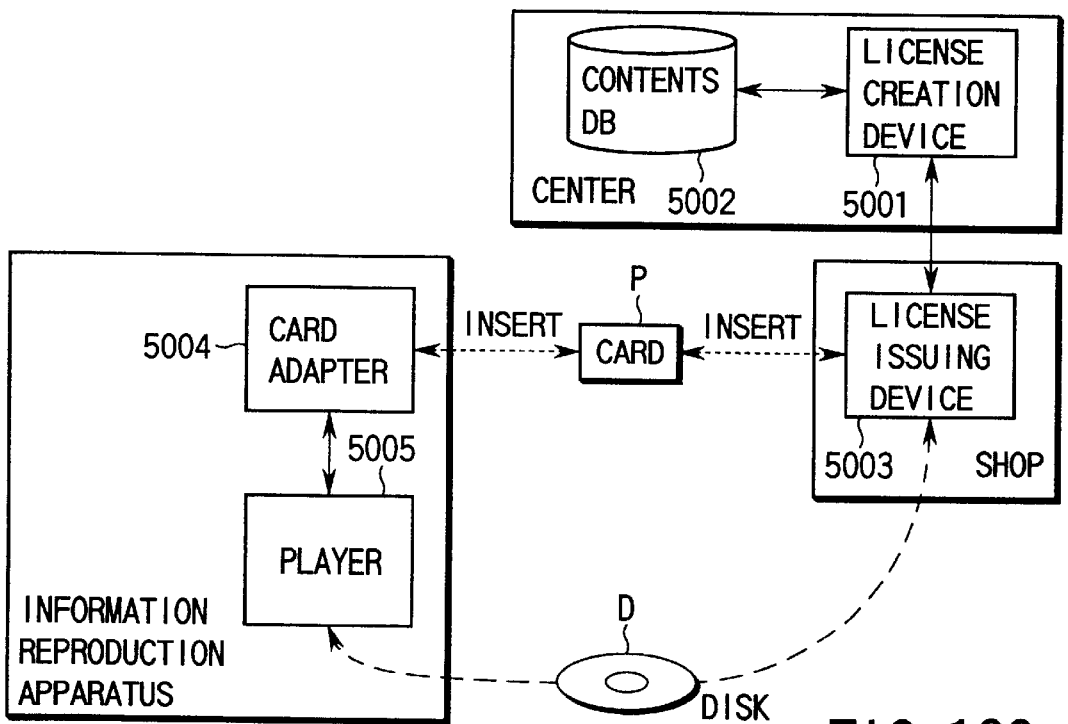
Figure 131:
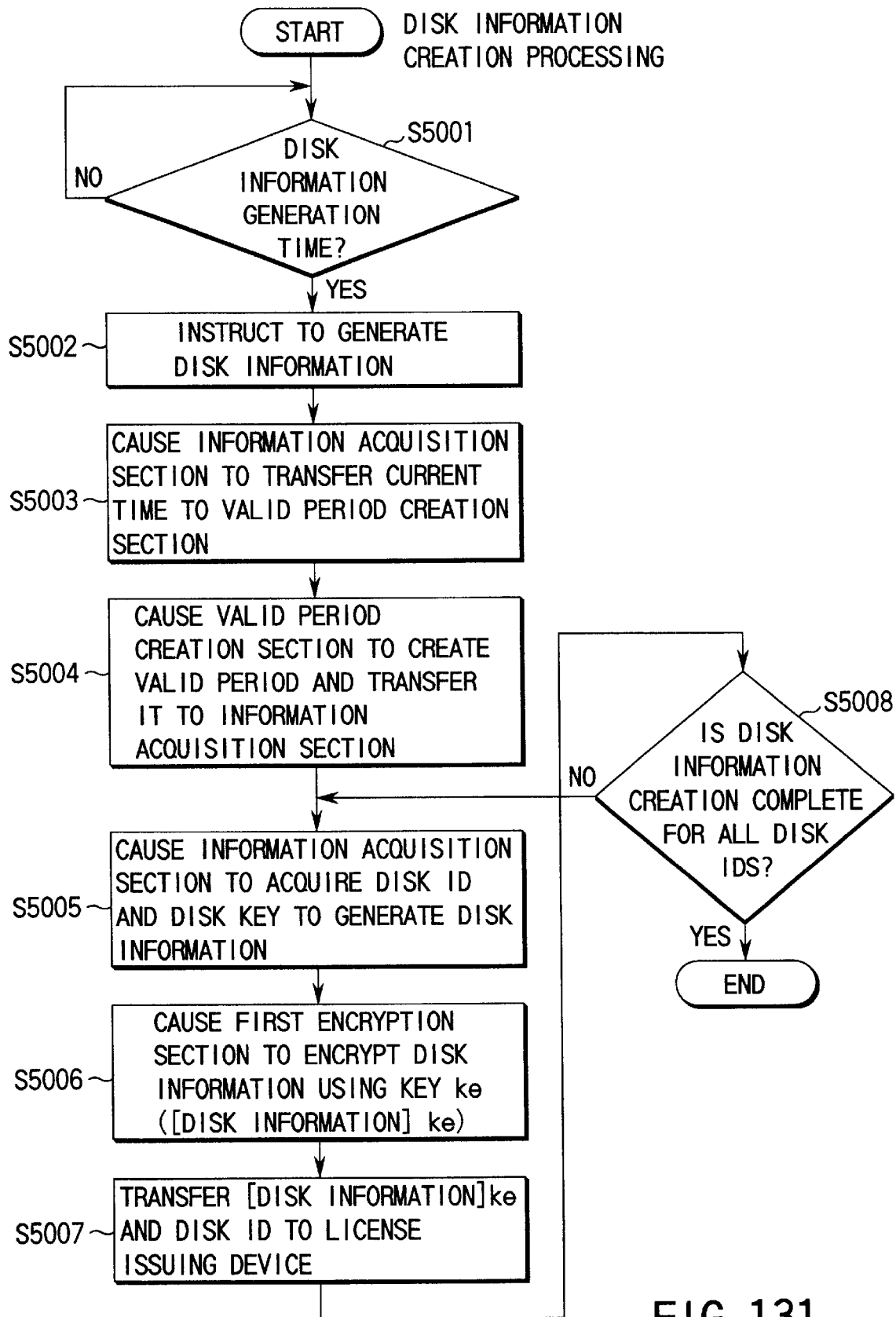
Figures 132, 133:
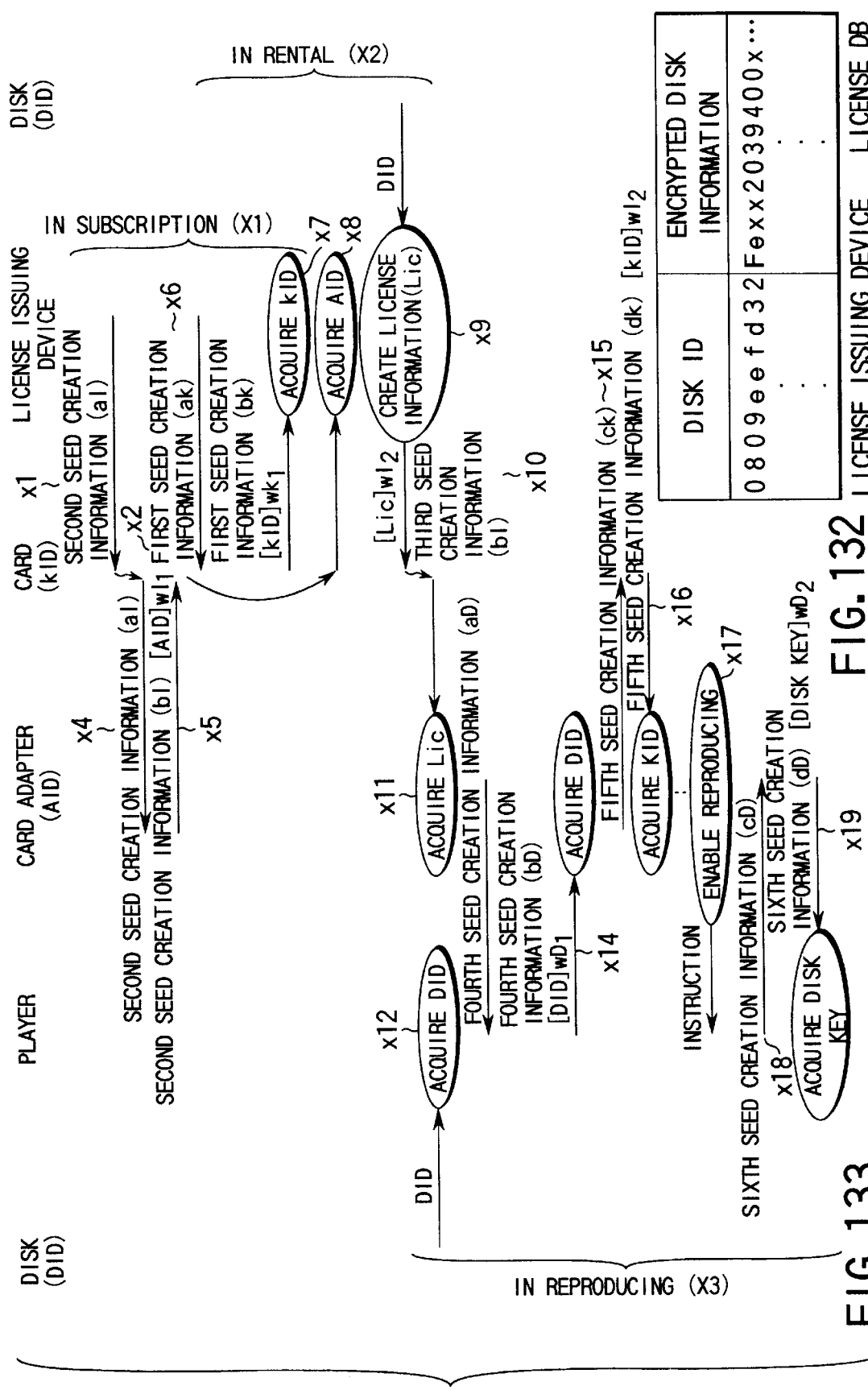
Figure 134:
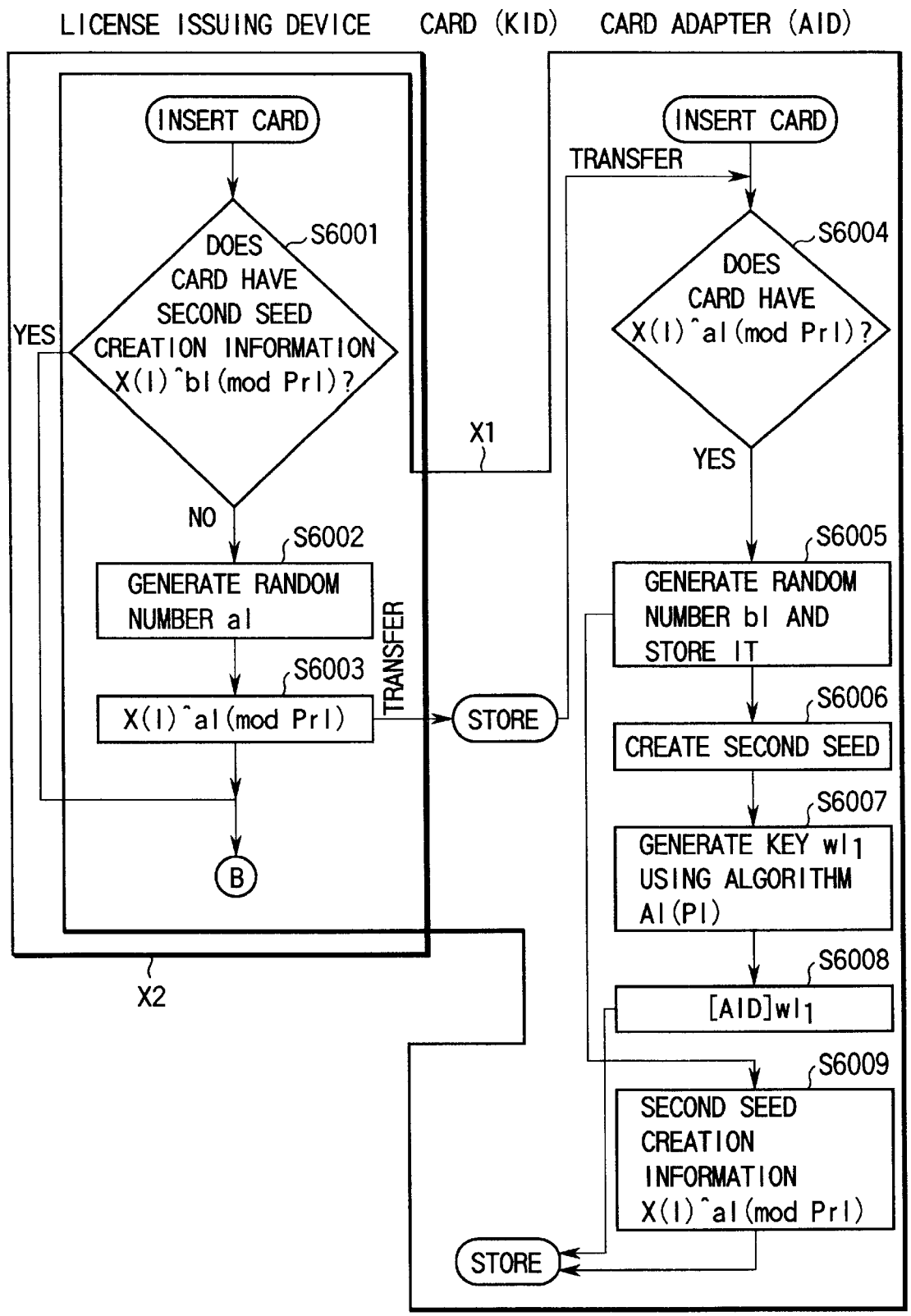
Figure 135:
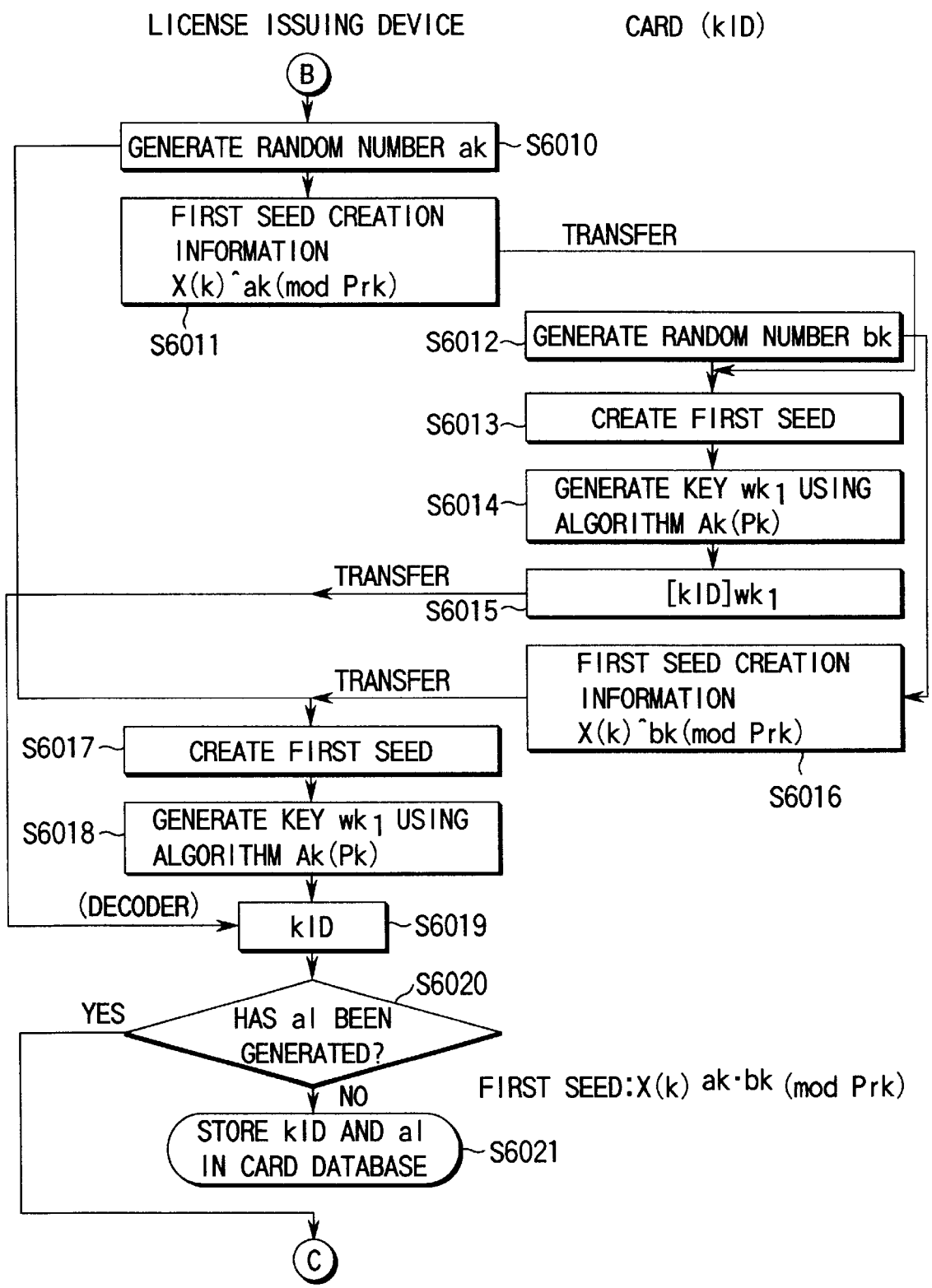
Figure 136:
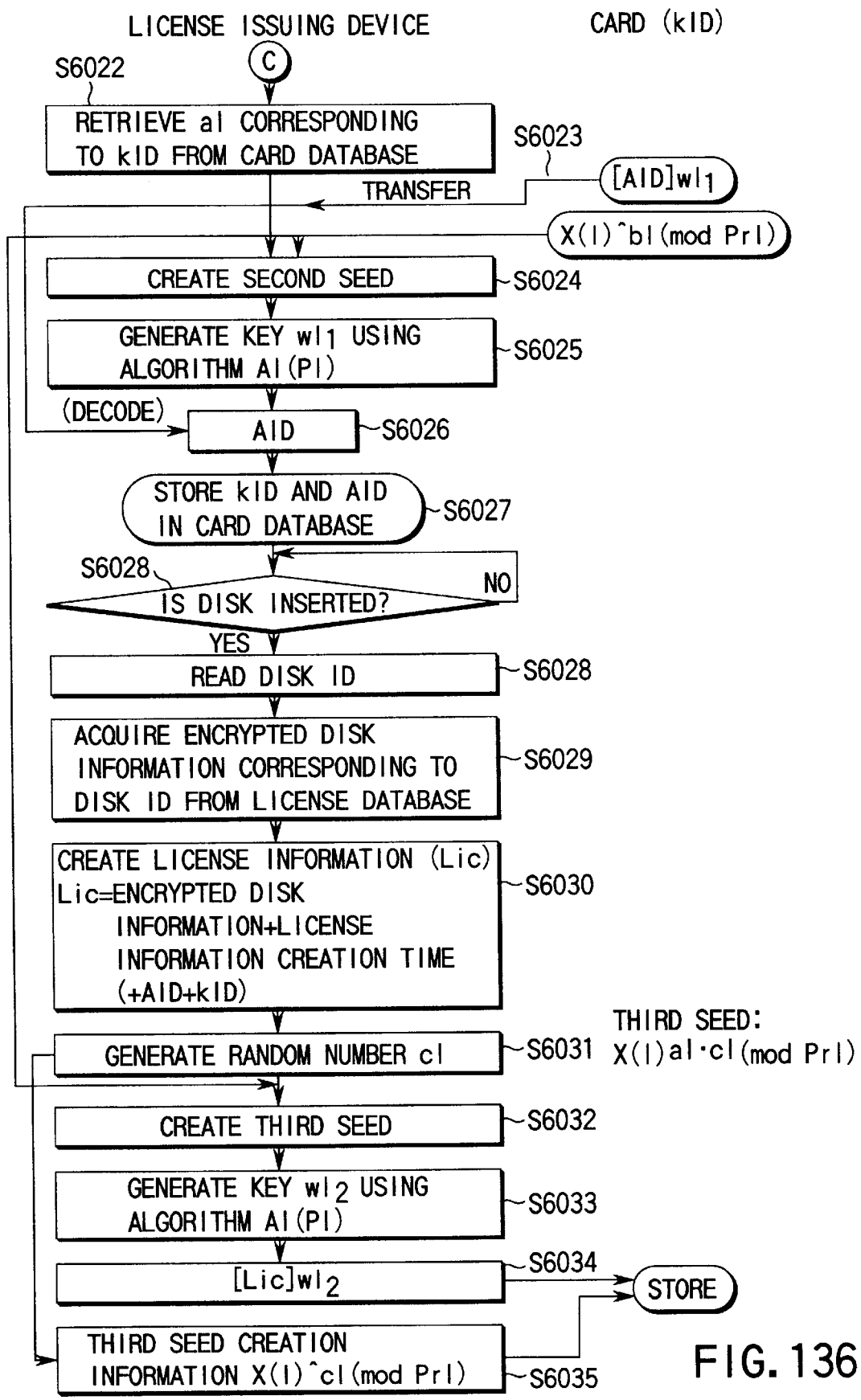
Figure 137:
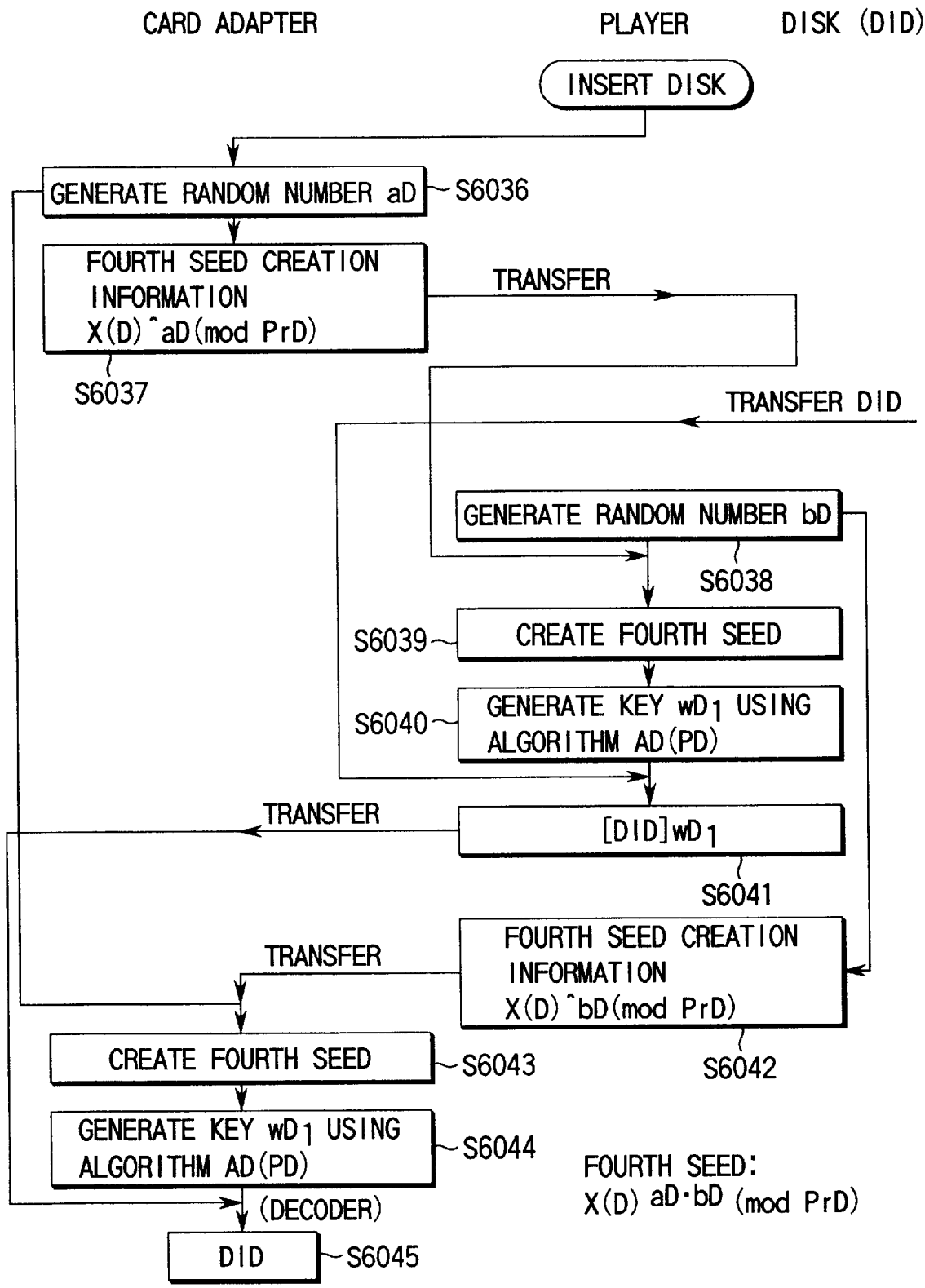
Figure 138:
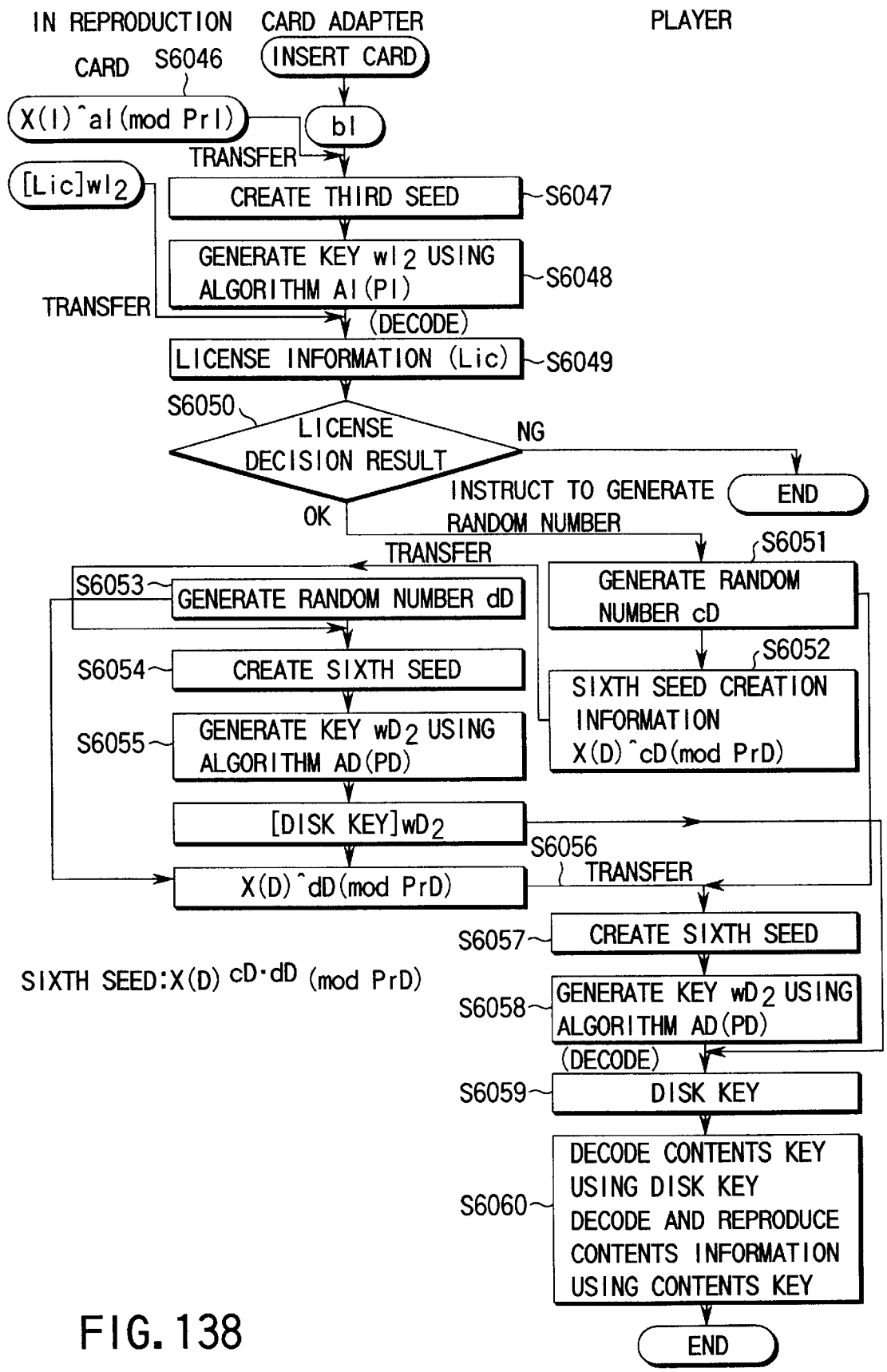
Figure 139:
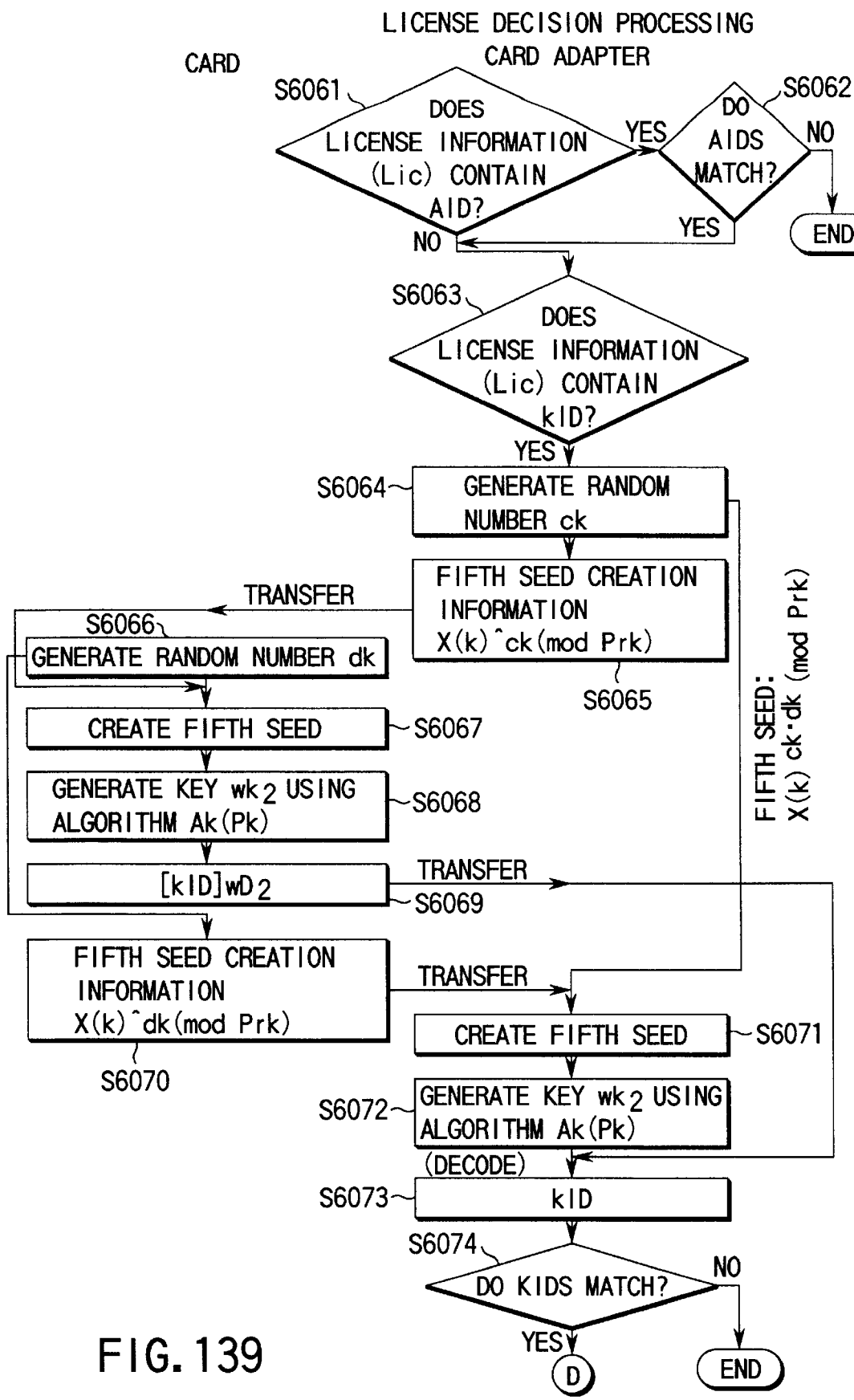
Figure 140:
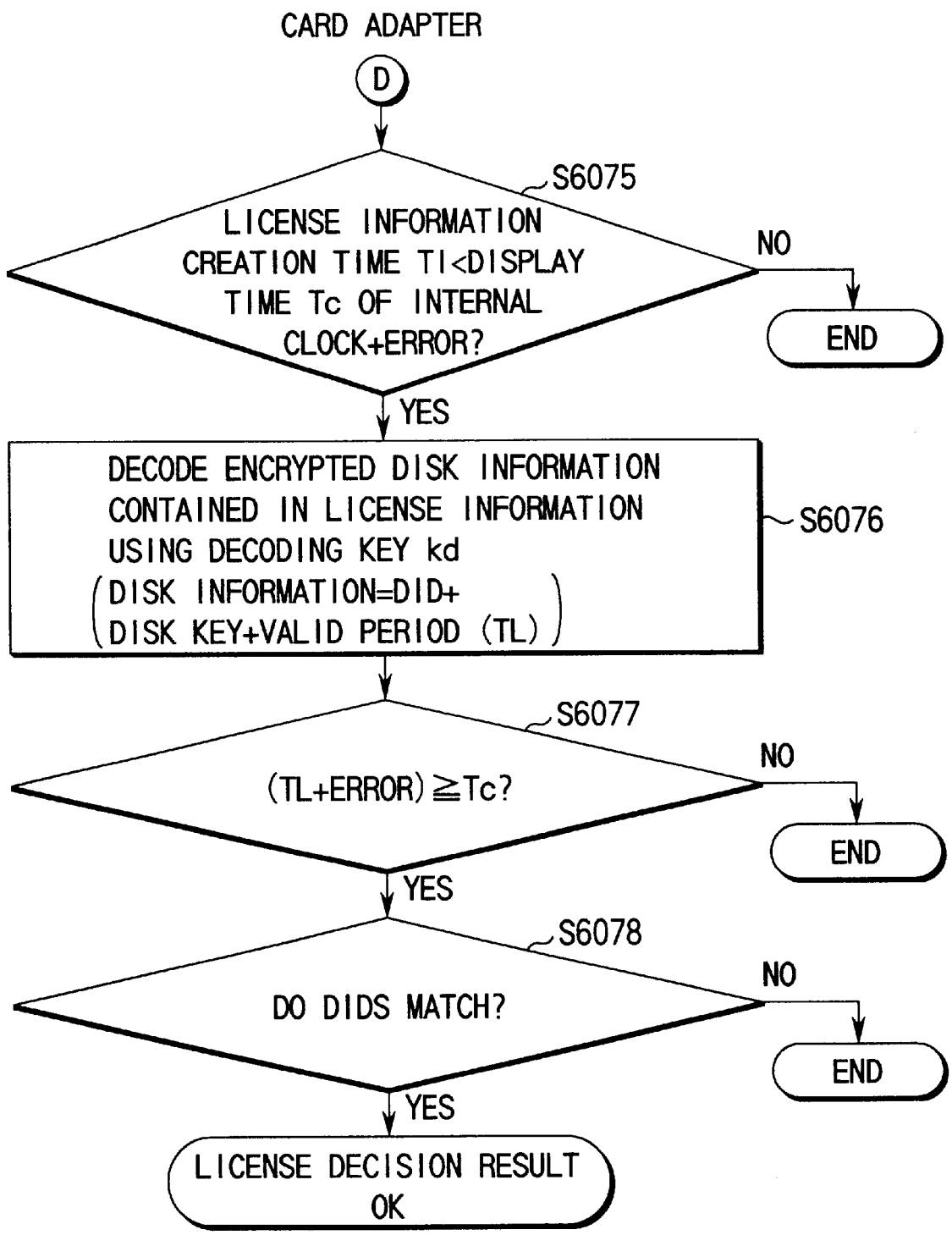
Figure 141:
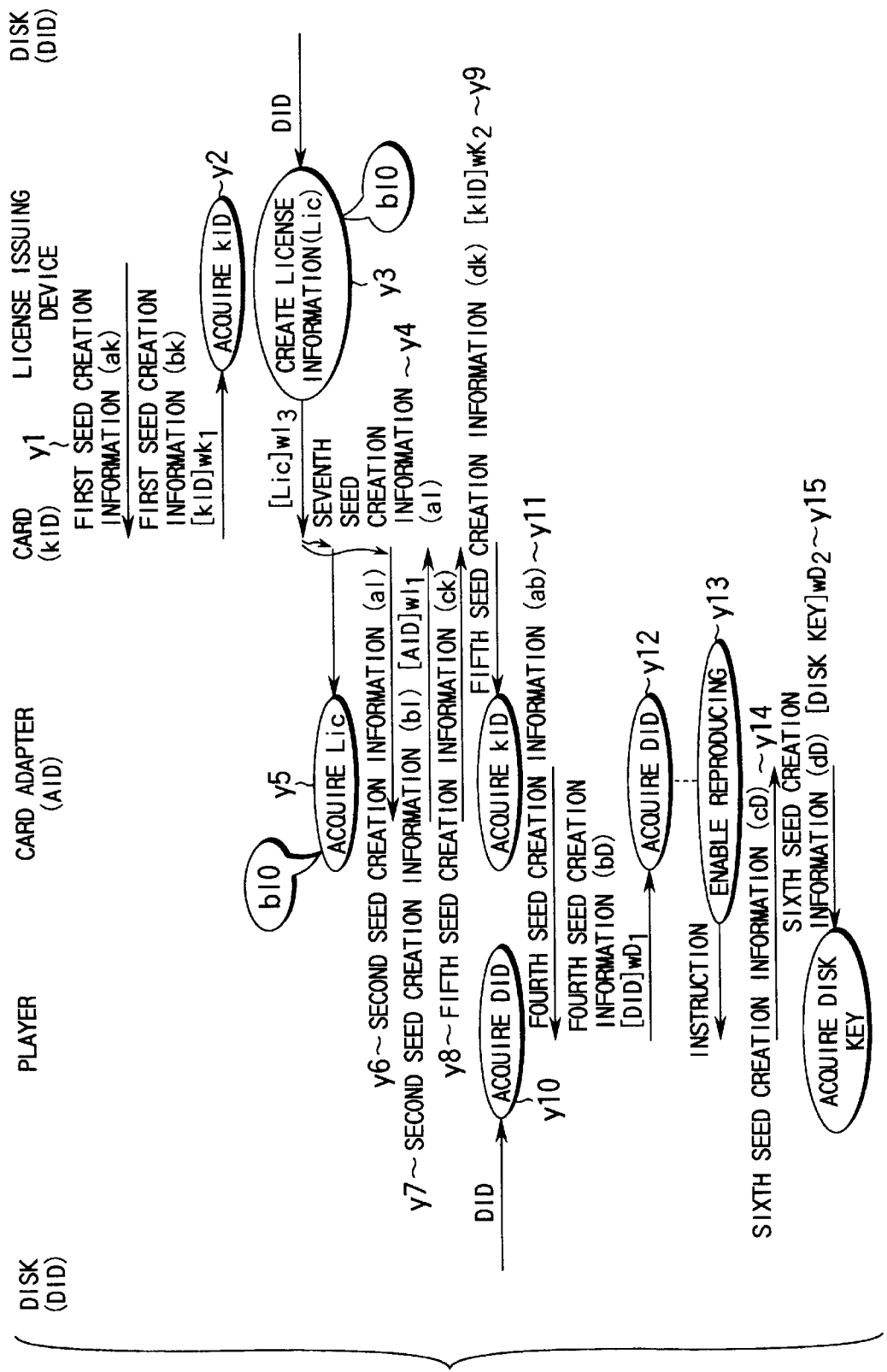
Figure 142:
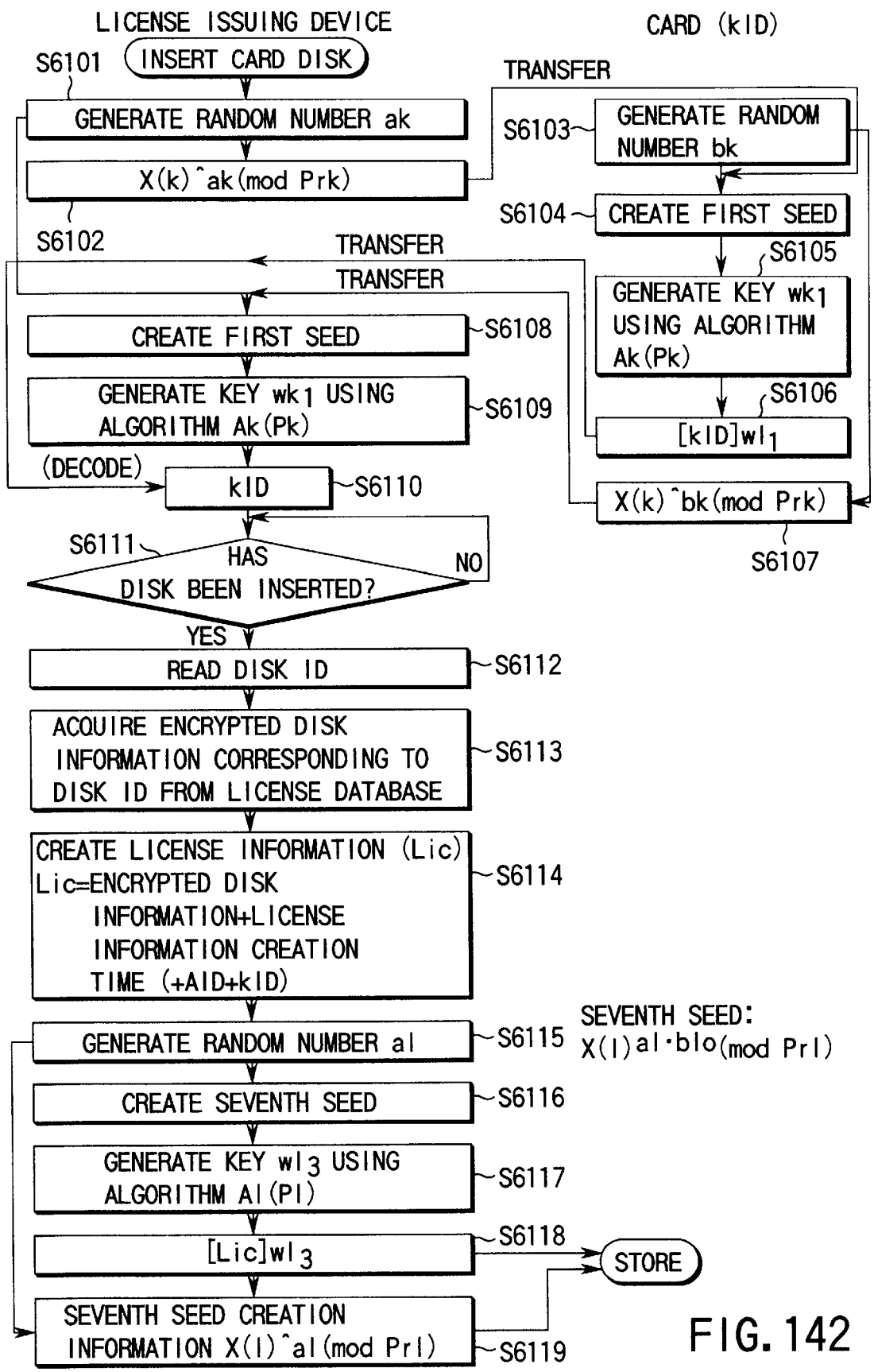
Figure 143:
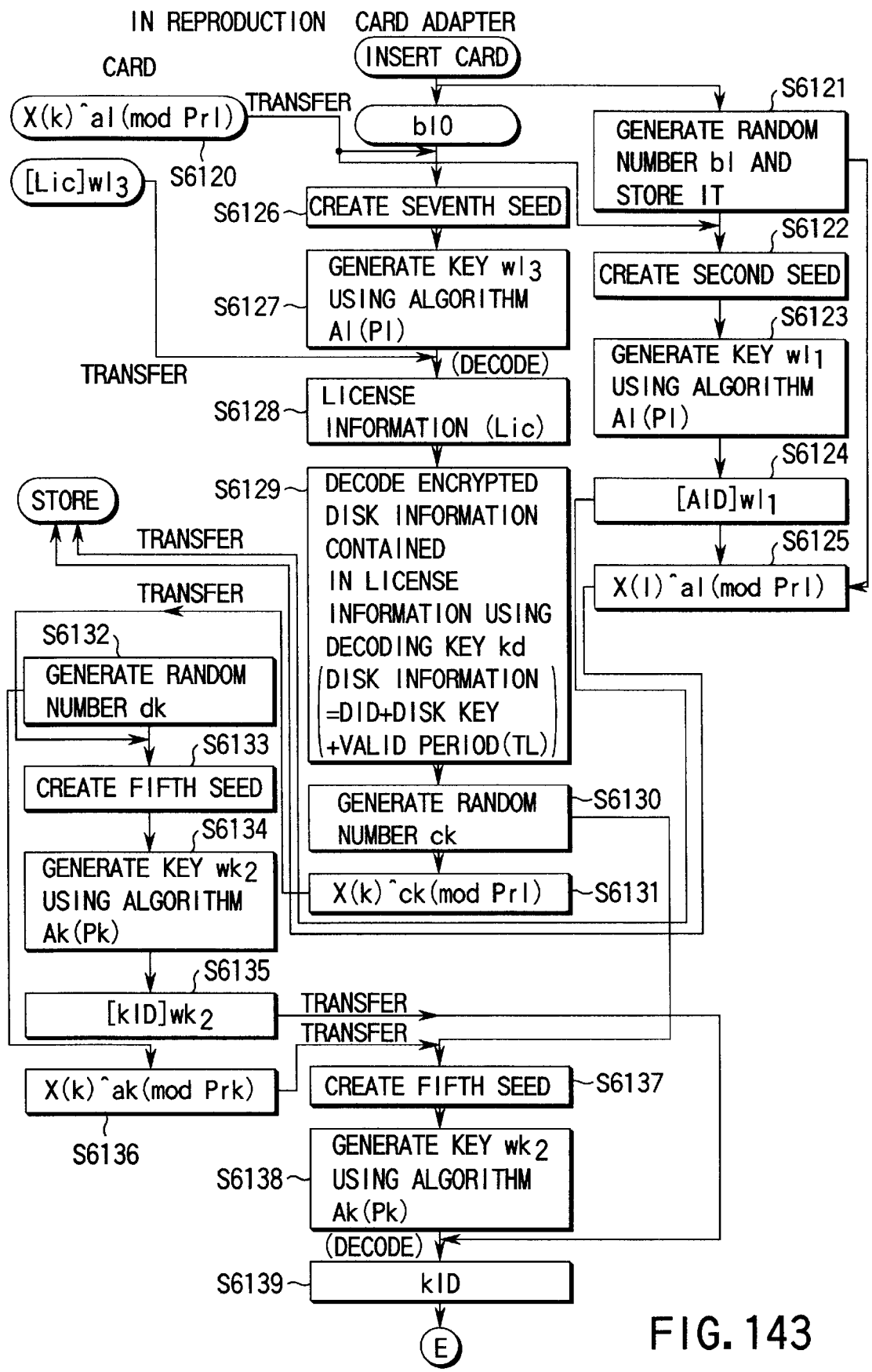
Figure 144:
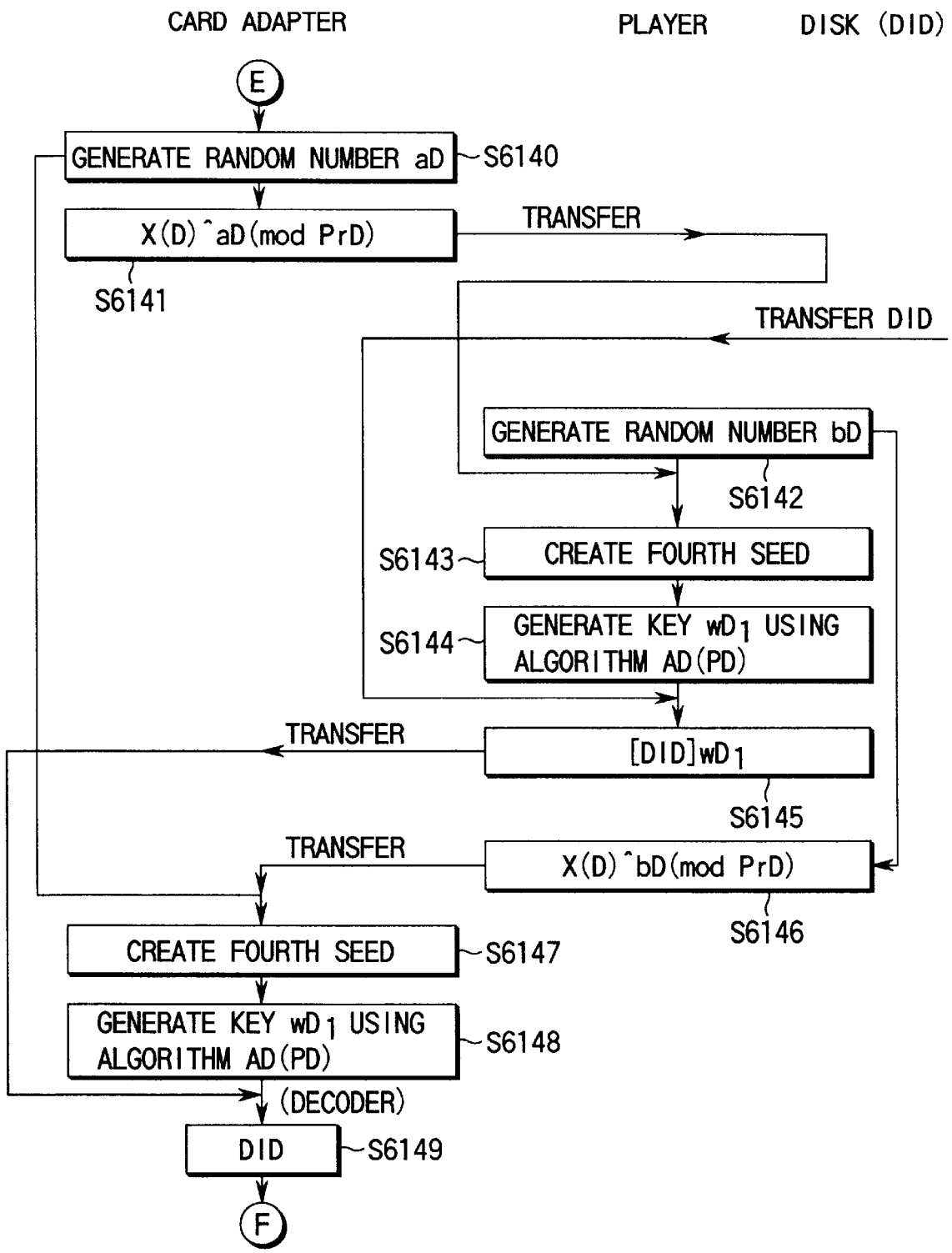
Figure 145:
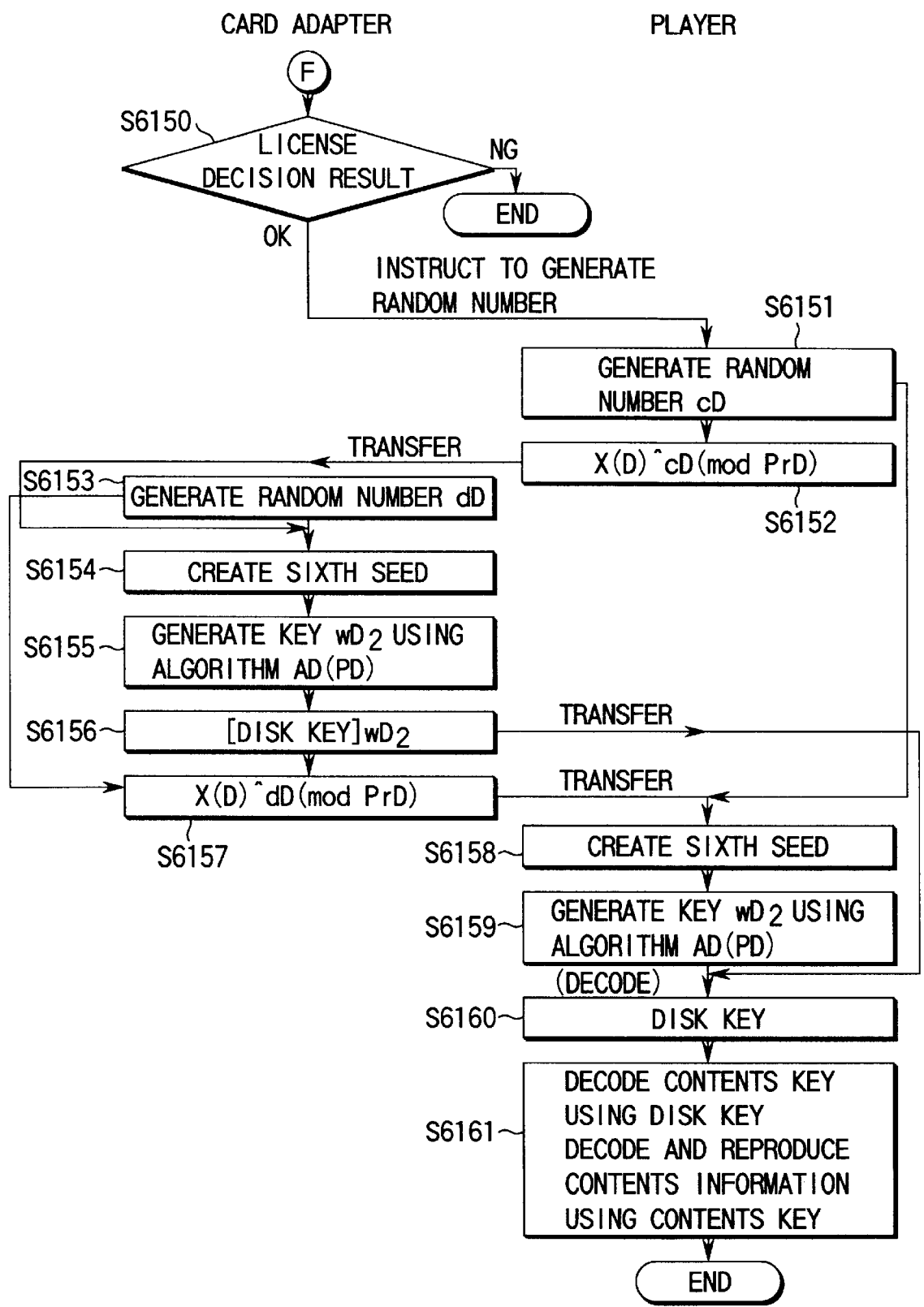
Figure 146:
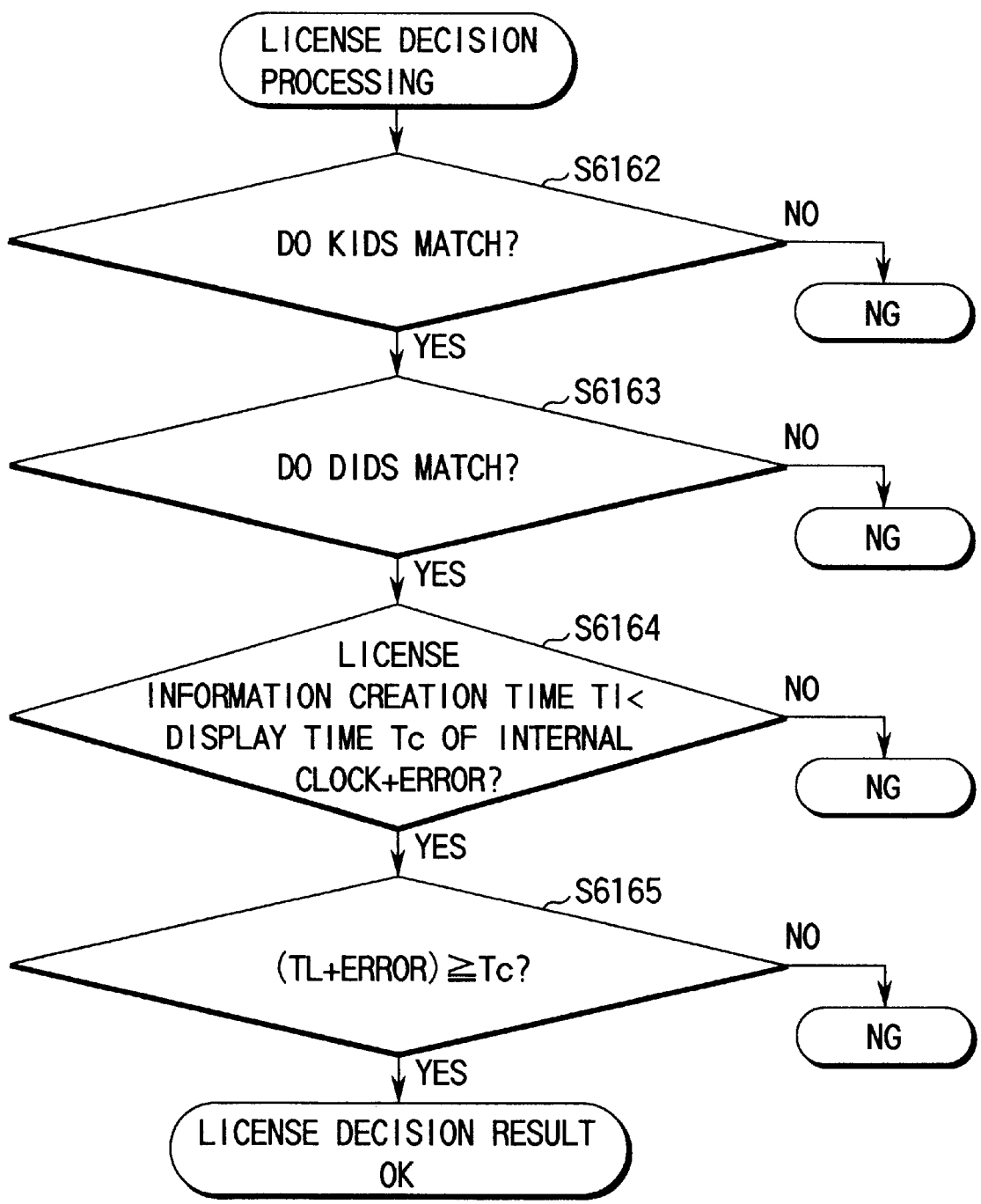
Figure 147:
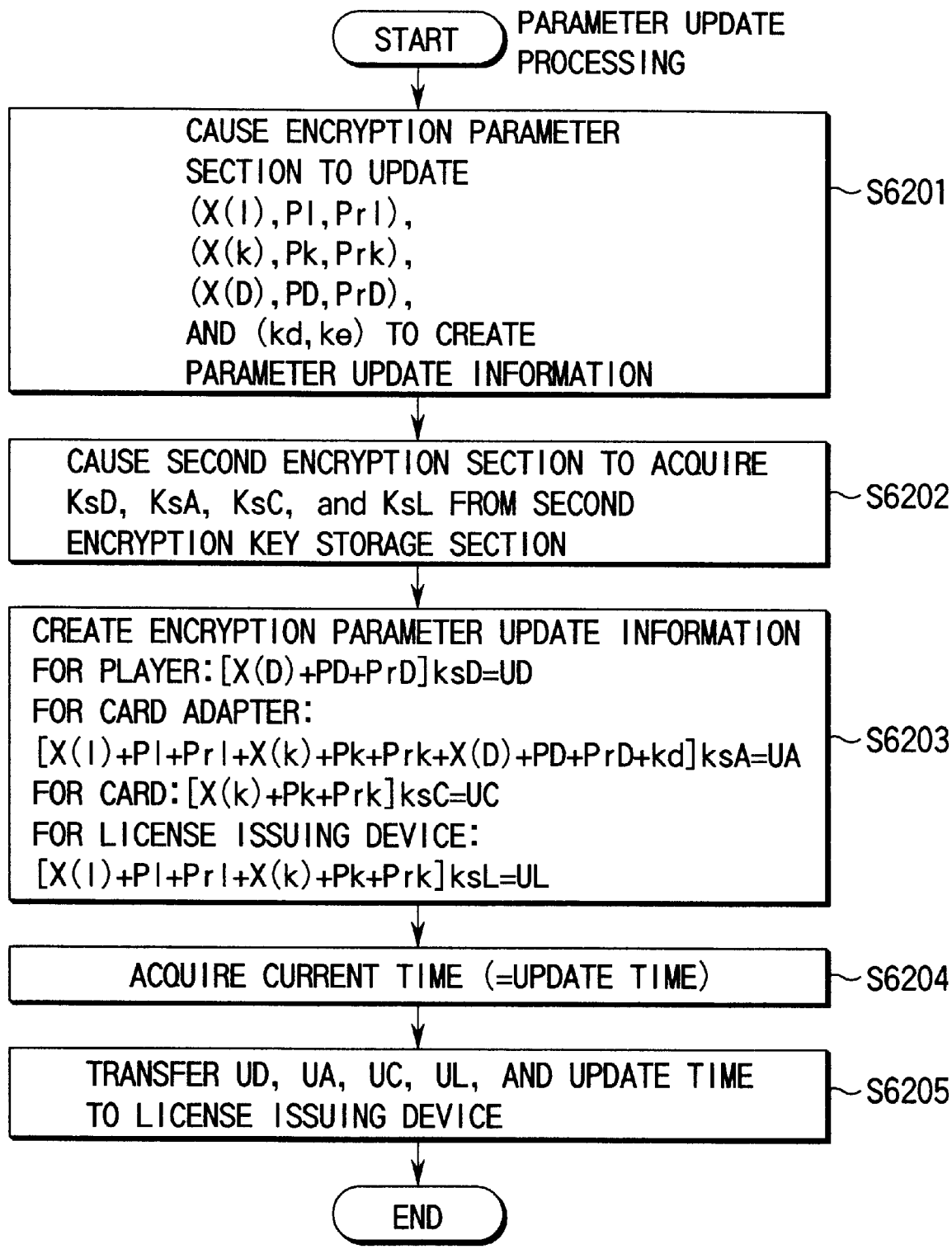
Figure 148:
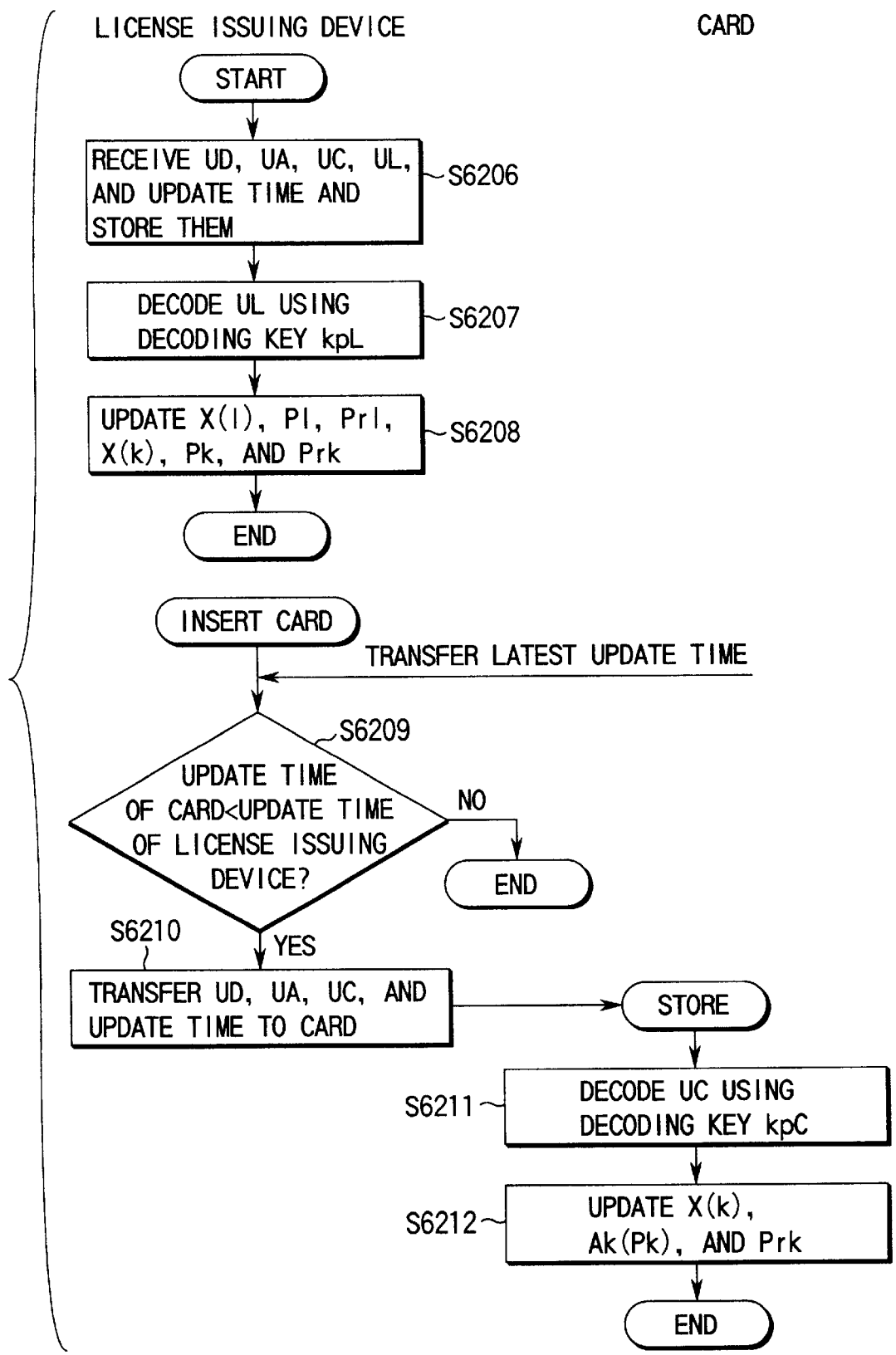
Figure 149:
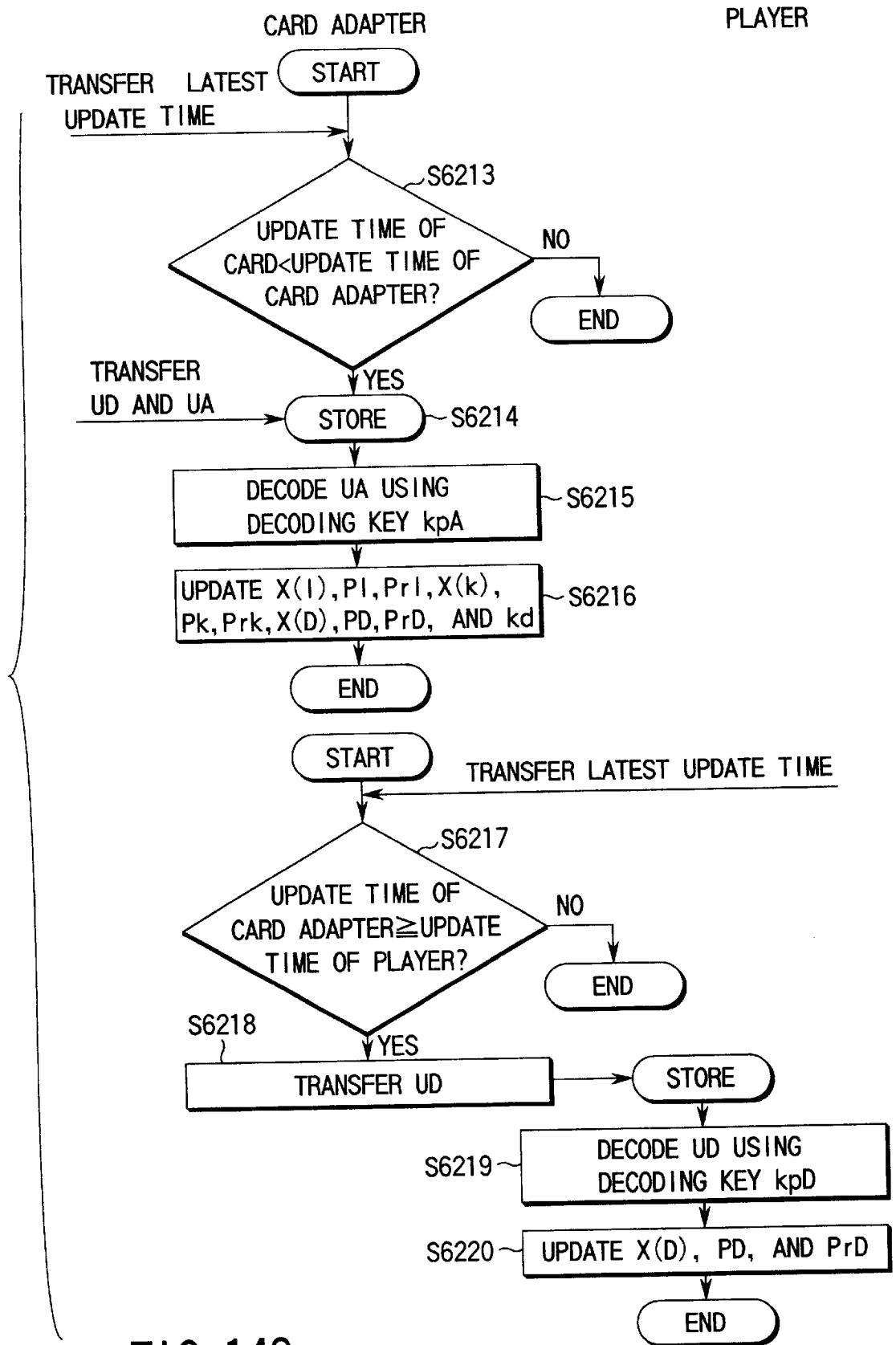

FIG. 131 is a flow chart for explaining the disk information creation processing of the license creation device;

FIG. 132 is a view showing an example of storage of disk information in a license database in the license issuing device;

FIG. 133 is a view showing the schematic sequence of a disk key distribution procedure in the information distribution system shown in FIG. 122 about subscription to a disk rental service, rental of a disk, and reproduction of contents;

FIG. 134 is a flow chart showing the disk key distribution procedure shown in FIG. 133 in more detail;

FIG. 135 is a flow chart showing the disk key distribution procedure shown in FIG. 133 in more detail;

FIG. 136 is a flow chart showing the disk key distribution procedure shown in FIG. 133 in more detail;

FIG. 137 is a flow chart showing the disk key distribution procedure shown in FIG. 133 in more detail;

FIG. 138 is a flow chart showing the disk key distribution procedure shown in FIG. 133 in more detail;

FIG. 139 is a flow chart showing the disk key distribution procedure shown in FIG. 133 in more detail;

FIG. 140 is a flow chart showing the disk key distribution procedure shown in FIG. 133 in more detail;

FIG. 141 is a view showing the schematic sequence of another disk key distribution procedure in the information distribution system shown in FIG. 122 about subscription to a disk rental service, rental of a disk, and reproduction of contents;

FIG. 142 is a flow chart showing the disk key distribution procedure shown in FIG. 141 in more detail;

FIG. 143 is a flow chart showing the disk key distribution procedure shown in FIG. 141 in more detail;

FIG. 144 is a flow chart showing the disk key distribution procedure shown in FIG. 141 in more detail;

FIG. 145 is a flow chart showing the disk key distribution procedure shown in FIG. 141 in more detail:

FIG. 146 is a flow chart showing the disk key distribution procedure shown in FIG. 141 in more detail;

FIG. 147 is a flow chart for explaining encryption parameter update processing;

FIG. 148 is a flow chart for explaining encryption parameter update processing; and FIG. 149 is a flow chart for explaining encryption parameter update processing.

DETAILED DESCRIPTION OF THE INVENTION

Embodiments of the present invention will be described below with reference to the accompanying drawing.

The entire configuration of an information distribution system using an information recording apparatus and information reproducing apparatus according to the first embodiment of the present invention will be briefly described first.

Figure 53:
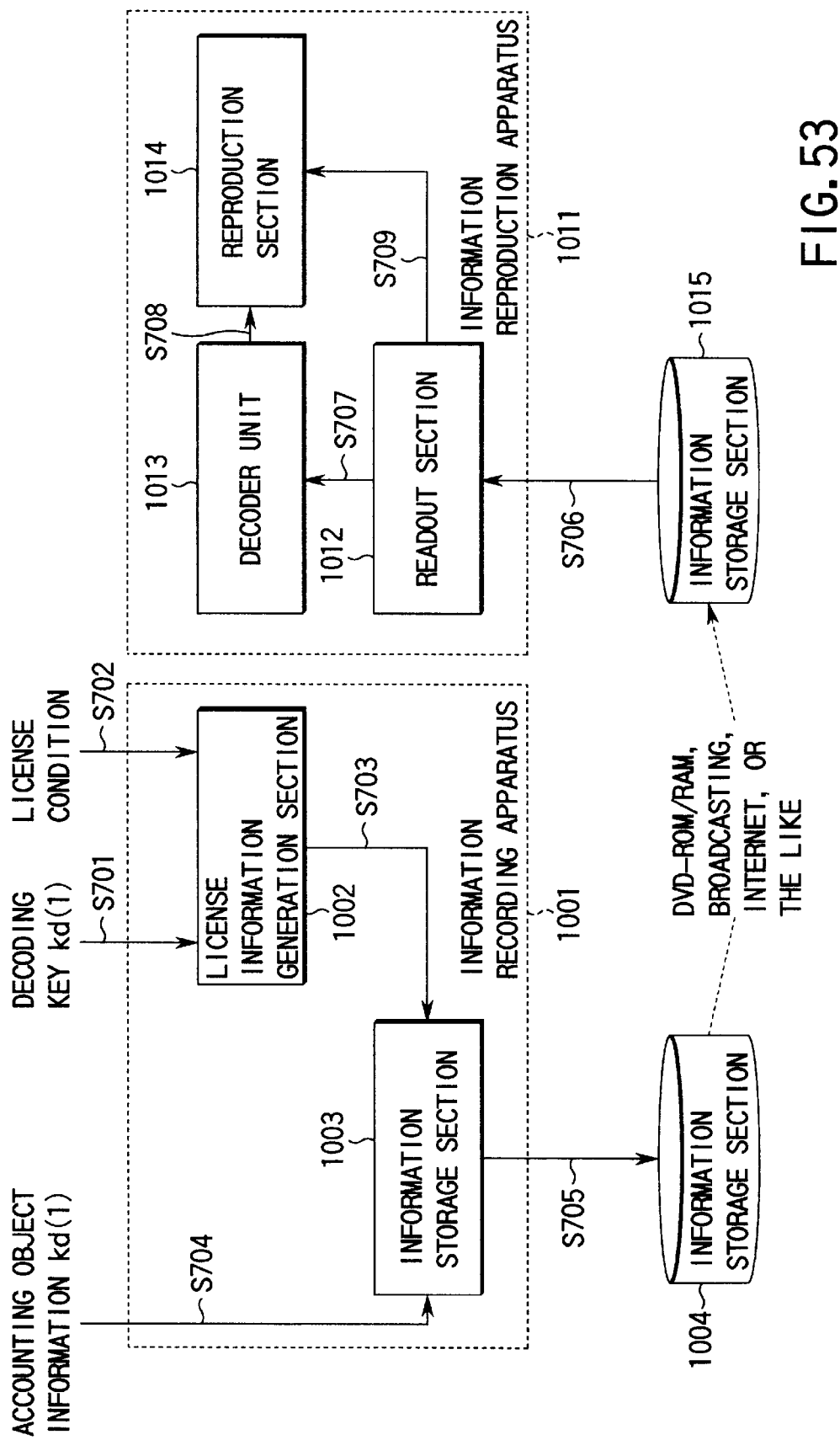
FIG. 53 is a block diagram showing an arrangement of an information distribution system using the information recording apparatus and information reproducing apparatus of the present invention.

FIG. 53 shows an arrangement of an information distribution system using the information recording apparatus and information reproducing apparatus of the present invention. Referring to FIG. 53, a license information generation section 1002 and an information storage section 1003 are equivalent to those shown in FIGS. 1, 3, 7, or the like, and a decoder unit 1013 is equivalent to that shown in FIG. 9, 12, 27, 39, 43, or the like. A reproduction section 1014 and a readout section 1012 are also equivalent to those in the information reproducing apparatus shown in FIG. 8 or the like.

The operation of the entire system shown in FIG. 53 will be briefly described below. Accounting object information is encrypted by an encryption key ke(1) (accounting object information ke(1)). First, a decoding key kd(1) of the accounting object information and a license condition such as an expiration date are input to the license information generation section 1002 (steps S701 and S702).

The license information generation section 1002 merges the decoding key kd(1) with the license condition and then performs encryption using the encryption key ke to generate license information and sends it to the information storage section 1003 (step S703). The encrypted accounting object information is also input to the information storage section 1003 (step S704) a nd recorded on an information storage section 1004 together with the license information (step 705).

The information storage section 1004 comprises a medium such as a DVD-ROM, a DVD-RAM, or a hard disk. Information recorded on this medium is transferred to another medium (i.e., an information storage section 1015) directly or through broadcasting or the Internet and read out by the readout section 1012 in an information reproducing apparatus 1011 (step S706). The readout license information is sent to the decoder unit 1013 (step S707). The de coder unit 1013 holding the decoding key kd corresponding to the encryption key ke decodes the license information and extracts the decoding key kd(1) and license condition of the accounting object information. The decoder unit 1013 checks the license condition to decide whether the accounting object information can be used. If the accounting object information is usable, the decoder unit outputs the decoding key kd(1) to the reproduction section 1014 (step S708). The reproduction section 1014 extracts the [accounting object information] ke(1) from the readout section 1012 (step S709) and decodes it using the decoding key kd(1) to reproduce the accounting object information.

The decoder unit 1013 holds the decoding key kd and an algorithm for decoding license information. To avoid attack on security, the decoder unit 1013 is preferably mounted not as software but as, e.g., an IC chip. In this case, the decoder unit 1013 comprises an IC chip having a license information input section and an output section for outputting the decoding key of accounting object information (upon deciding that the accounting object information is usable). Decoding and decision of the use enable/disable condition are performed in the chip.

As one gist of the present invention, the license information generation section 1002 merges the decoding key kd(1) of accounting object information with the license condition and then performs encryption. Generally, encryption is performed by scrambling information bits to be encrypted. Therefore, once encryption is performed, two pieces of information which have simultaneously been encrypted cannot be separated (without using decoding). It is important to disable separation of accounting object information from the license condition using the nature of encryption.

In the above-described example, the accounting object information is encrypted by the encryption key ke(1). Therefore, 1. To use the accounting object information, the decoding key kd(1) is required. However, the decoding key kd(1) is encrypted into license information such that the decoding key and the license condition are inseparable. Although the license information and the accounting object information can be separated from each other, invalid license information does not contain the decoding key for properly decoding the accounting object information, so "substitution" of license information is meaningless.

2. To obtain the correct decoding key kd(1), valid license information must be decoded. However, 3. Only a proper decoder unit having the decoding key kd can perform this decoding.

4. The proper decoder unit always refers to the license condition contained in the license information to decide the use enable/disable condition. Therefore, 5. In the apparatus including the license information generation section and decoder unit of the present invention, the accounting object information cannot be used under an invalid license condition in principle.

If the decoder unit 1013 decides that the accounting object information cannot be used and does not output the decoding key kd(1), the license information must be updated or valid license information must be added to use the accounting object information. At this timing, accounting for the user of the information is generated. The user must update the license information or acquire new license information somehow by a shop or vending machine or through the Internet. An apparatus or vending machine set in a shop or a network server holds the decoding key kd and the encryption key ke and therefore can decode the license information and rewrite and reencrypt the information so as to update the license information.

If the user wants to update the license information (or obtain new license information), (one of) the license information added to the accounting object information must be sent to an apparatus having a license information update function.

1'. Only a proper apparatus having the decoding key kd and the encryption key ke can decode/separate the decoding key kd(1) and the license condition of the accounting object information.

2'. Only a proper apparatus having the decoding key kd and the encryption key ke can reencrypt the license information after the rewrite of the license condition.

The updated license information is output from the license information update apparatus (a license information update client section 403 shown in FIG. 26, a license information update unit 603 shown in FIG. 38, a license information update unit 702 shown in FIG. 41, or a license information update unit 804 shown in FIG. 47) and returned to the user's medium. The license information is kept encrypted outside the license information update apparatus.

3'. Since the license information has undergone encryption as a characteristic feature of the present invention, the license condition cannot be inadequately changed.

Generally, to transmit a decoding key through a network, the decoding key is often reencrypted using another key. However, as the characteristic feature of the present invention, the decoding key kd(1) for decoding the encrypted accounting object information is merged with the license condition and then encrypted. This provides a significant effect in protection and charge for accounting object information such as a work, as described above.

The arrangements and operations of the information recording apparatus, the information reproducing apparatus, and the accounting apparatus of the present invention will be described below in detail.

Figure 1:
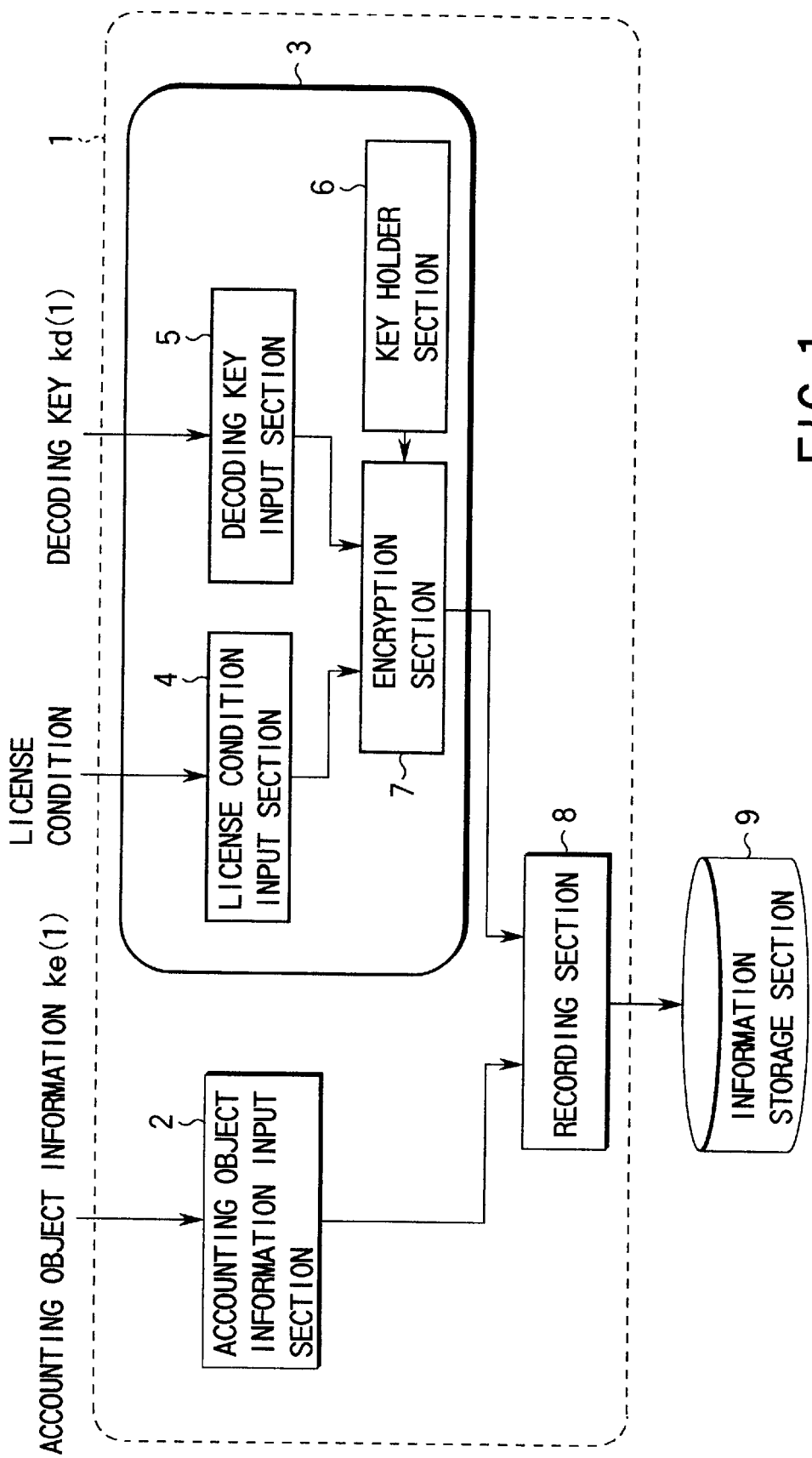
FIG. 1 is a block diagram showing the first arrangement of an information recording apparatus according to the first embodiment of the present invention.

(1) Information Recording Apparatus (1-1) First Example of Information Recording Apparatus FIG. 1 shows the first arrangement of an information recording apparatus according to the present invention. More specifically, FIG. 1 shows an arrangement of an information recording apparatus which encrypts contents information (to be referred to as accounting object information hereinafter) as an accounting object such as a digitized work, encrypts the license condition of the accounting object information and a decoding key for decoding the encrypted accounting object information to generate license information, and records the encrypted accounting object information and license information on a predetermined recording medium.

The information recording apparatus roughly comprises an accounting object information input section 2, a license information generation section 3, and a recording section 8.

Accounting object information is encrypted in advance using the encryption key ke(1) and input to the accounting object information input section 2. A decoding key corresponding to the encryption key ke(1) is the decoding key kd(1). Encryption of information X using an encryption key K will often be expressed as [X] k hereinafter, as needed.

The license information generation section 3 is constituted by a license condition input section 4, a decoding key input section 5, a key holder section 6, and an encryption section 7.

The encryption key ke is stored in the key holder section 6 in advance. This encryption key ke does not always agree with the encryption key ke(1).

A license condition is input to the license condition input section 4. The license condition includes at least one of the expiration date of the accounting object information, the license information write time, the contents ID, the medium ID, and the decoder unit ID.

The decoding key kd(1) corresponding to the encryption key ke(1), which is used to decode the encrypted accounting object information, is input to the decoding key input section 5.

The license condition and the decoding key kd(1) are input to the encryption section 7 respectively through the license condition input section 4 and the decoding key input section 5. The license condition and the decoding key kd(1) are merged.

After this, the merged license condition and decoding key kd(1) are encrypted using the encryption key ke stored in the key holder section 6. Generally, encryption schema are roughly classified into a public key scheme and a secret key scheme, and either can be employed. The encrypted data is called license information. As the characteristic feature of the encryption section 7, the license condition and the encryption key ke(1) are inseparably combined by merging and encryption. Therefore, an apparatus capable of decoding data encrypted using the encryption key ke, i.e., an apparatus having the decoding key kd corresponding to the encryption key ke can exclusively separate the license condition from the encryption key ke(1). The decoding key kd(1) is a key for decoding the encrypted accounting object information, so the accounting object information and the license condition are inseparably combined. The accounting object information and the license information as data can be always separated. However, without valid license information, the accounting object information cannot be decoded to use the contents.

The recording section 8 writes the license information in an information storage section 9 and then writes the encrypted accounting object information subsequent to the license condition.

The information storage section 9 may be a recording medium such as a DVD-ROM, a DVD-RAM, or a hard disk. Such a recording medium having information is set in a predetermined reproducing apparatus to reproduce the information. Alternatively, the information may be transferred from the information storage section 9 to another recording medium through a network such as the Internet or by broadcasting and reproduced by a predetermined reproducing apparatus.

Figure 2:
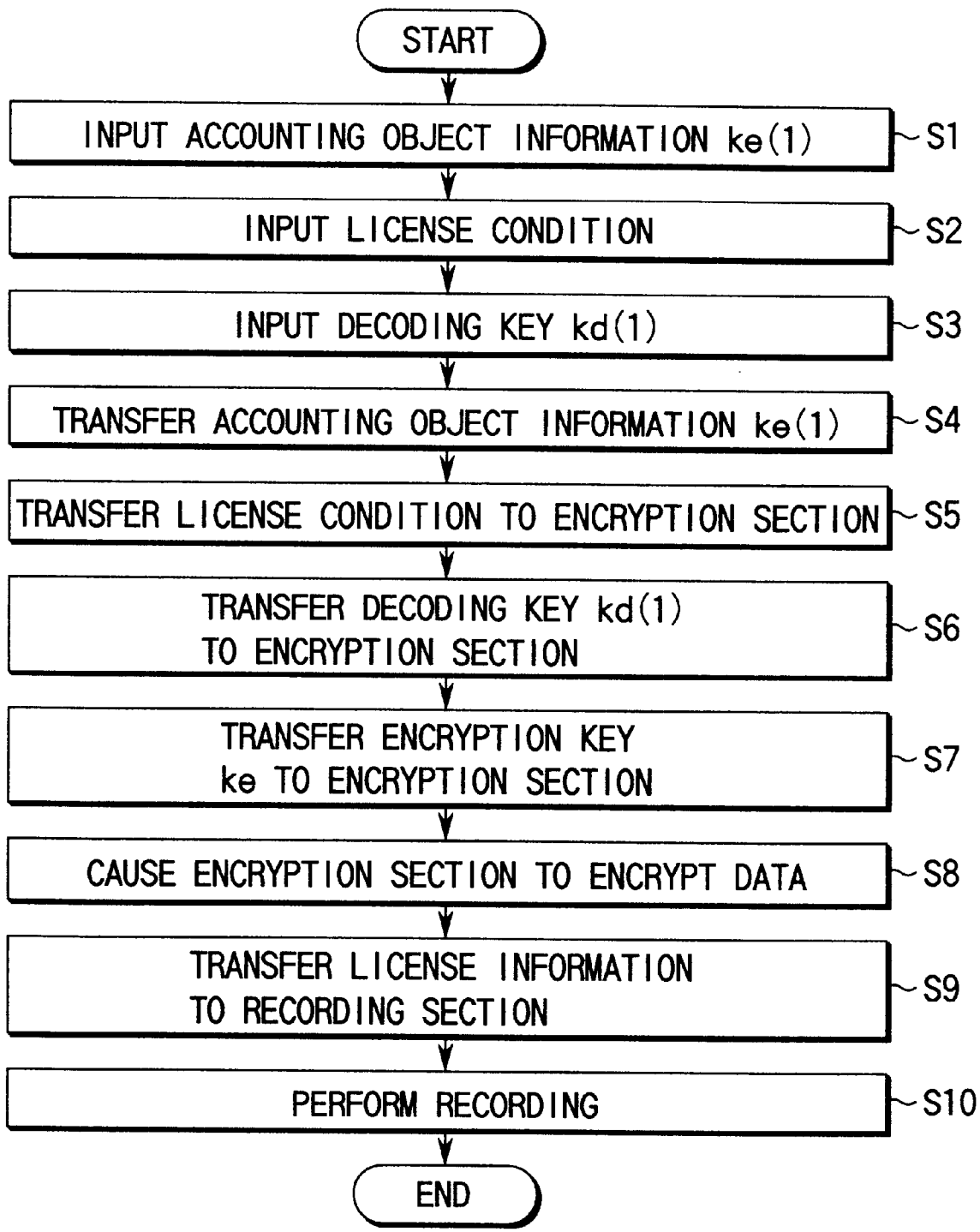
FIG. 2 is a flow chart for explaining the operation of the first information recording apparatus shown in FIG. 1.

FIG. 2 is a flow chart for explaining the operation of an information recording apparatus 1 shown in FIG. 1. First, the encrypted accounting object information ke(1) is input to the accounting object information input section 2 (step S1), the license condition is input to the license condition input section 4 (step S2), and the decoding key kd(1) is input to the decoding key input section 5 (step S3). The encrypted accounting object information is transferred from the accounting object information input section 2 to the recording section 8 (step S4), the license condition is transferred from the license condition input section 4 to the encryption section 7 (step S5), and the decoding key kd(1) is transferred from the decoding key input section 5 to the encryption section 7 (step S6). The encryption key ke held in the key holder section 6 in advance is transferred to the encryption section 7 (step S7). The encryption section 7 merges the license condition and the decoding key kd(1) and then performs encryption using the encryption key ke to generate license information (step S8). The generated license information is transferred to the recording section 8 (step S9). The recording section 8 merges the encrypted accounting object information and license information and records them on the information storage section 9 (step S10).

(1-2) Second Example of Information Recording Apparatus

Figure 3:
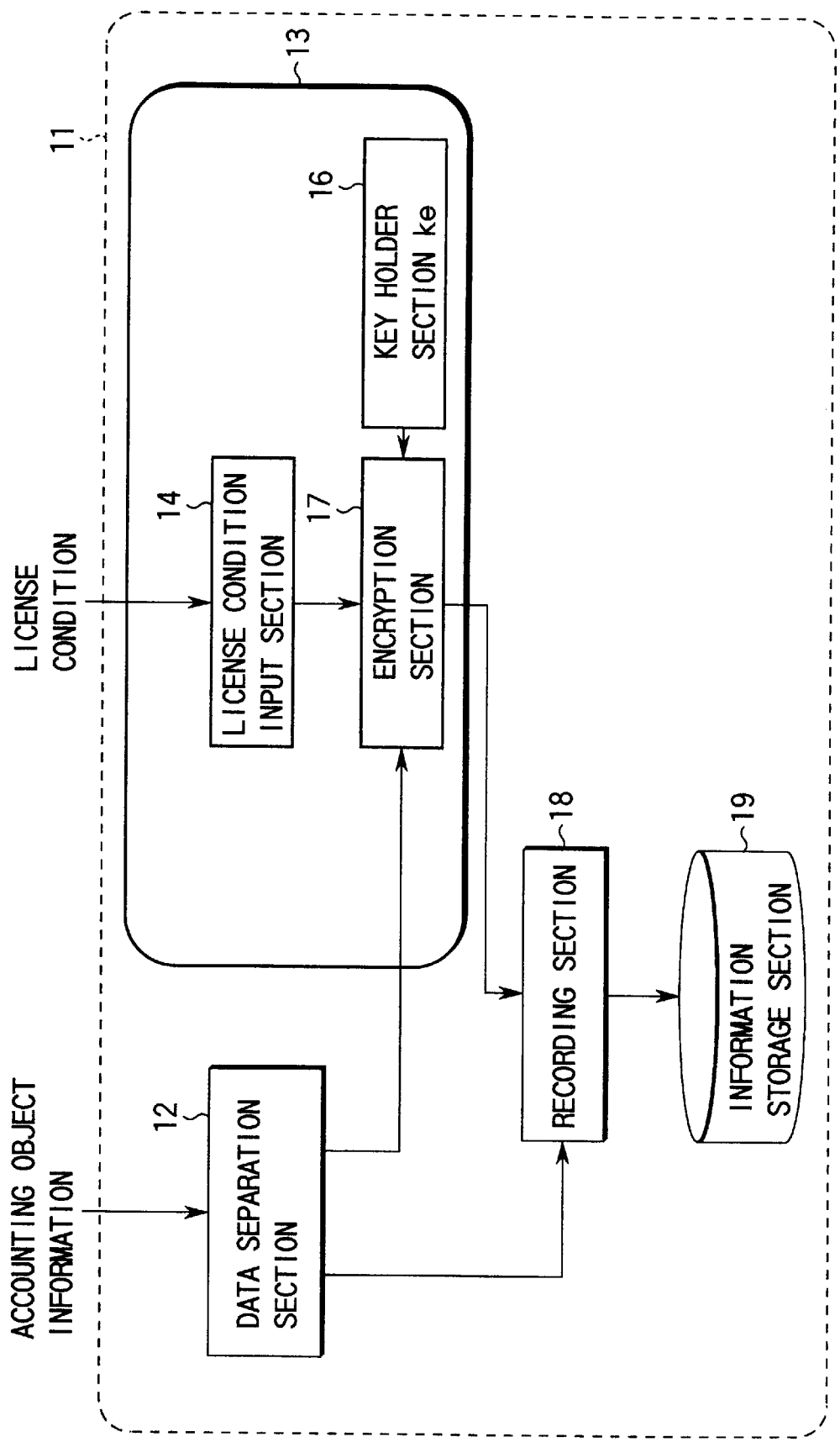
FIG. 3 is a block diagram showing the second arrangement of the information recording apparatus according to the first embodiment of the present invention.

FIG. 3 shows the second arrangement of an information recording apparatus according to the present invention. More specifically, FIG. 3 shows an arrangement of an information recording apparatus which encrypts part of accounting object information as an accounting object such as a digitized work together with a license condition to generate license information and records the remaining portion of the accounting object information and license information in a predetermined recording medium. As in the first arrangement shown in FIG. 1, part of accounting object information is encrypted together with a license condition to in separately combine the accounting object information with the license condition.

The information recording apparatus roughly comprises a data separation section 12, a license information generation section 13, and a recording section 18.

The data separation section 12 divides accounting object information into two parts. FIGS. 5A, 5B, 6A, and 6B show examples of data separation by the data separation section. For the descriptive convenience, a still picture will be exemplified, though this method can be used for a motion picture and the like.

Figure 5A:
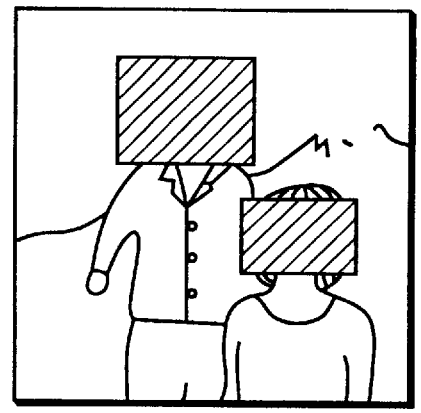
FIGS. 5 and 5B are views for explaining a method of separating accounting object information.
Figure 5B:
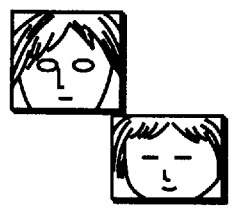
Figure 6A:
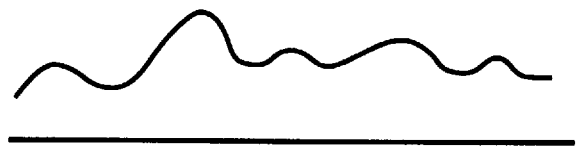
FIGS. 6A and 6B are views for explaining another method of separating accounting object information.
Figure 6B:
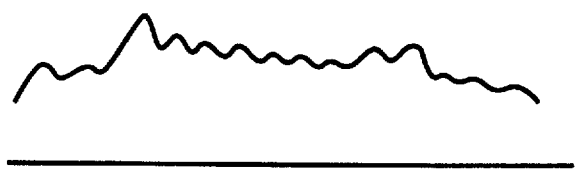

As shown in FIG. 5A, part (face regions in FIG. 5A) of a still picture may be extracted, and the face regions as shown in FIG. 5B may be encrypted as part of license information. In this case, the image can be seen without decoding the license information (i.e., without paying the fee) although the image is partially omitted. As shown in FIG. 6A, an image is subjected to Fourier transformation to extract a frequency component. A high-frequency component as shown in FIG. 6B may be encrypted as part of license information. In this case, unless the license information cannot be decoded (i.e., unless the fee is paid), no clear image can be obtained by reproducing the image with the frequency component shown in FIG. 6A.

The license information generation section 13 is constituted by a license condition input section 14, an encryption section 17, and a key holder section 16.

The key holder section 16 stores the encryption key ke in advance. The license condition input section 14 receives a license condition. The license condition includes at least one of the expiration date of the accounting object information, the license information write time, the contents ID, the medium ID, and the decoder unit ID. The license condition is input to the encryption section 17 through the license condition input section 14. Part of accounting object information, which is obtained by dividing the accounting object information into two parts, is also input from the data separation section 12 to the encryption section 17. The license condition and part of the accounting object information are merged and then encrypted using the encryption key ke stored in the key holder section 16 to generate license information.

The recording section 18 writes the license information in an information storage section 19 and then writes the remaining part of the accounting object information, which is obtained by dividing the accounting object information into two parts by the data separation section 12, subsequent to the license information.

The information storage section 19 may be a recording medium such as a DVD-ROM, a DVD-RAM, or a hard disk. Such a recording medium having information is set in a predetermined reproducing apparatus to reproduce the information. Alternatively, the information may be transferred from the information storage section 19 to another recording medium through a network such as the Internet or by broadcasting and reproduced by a predetermined reproducing apparatus.

Figure 4:
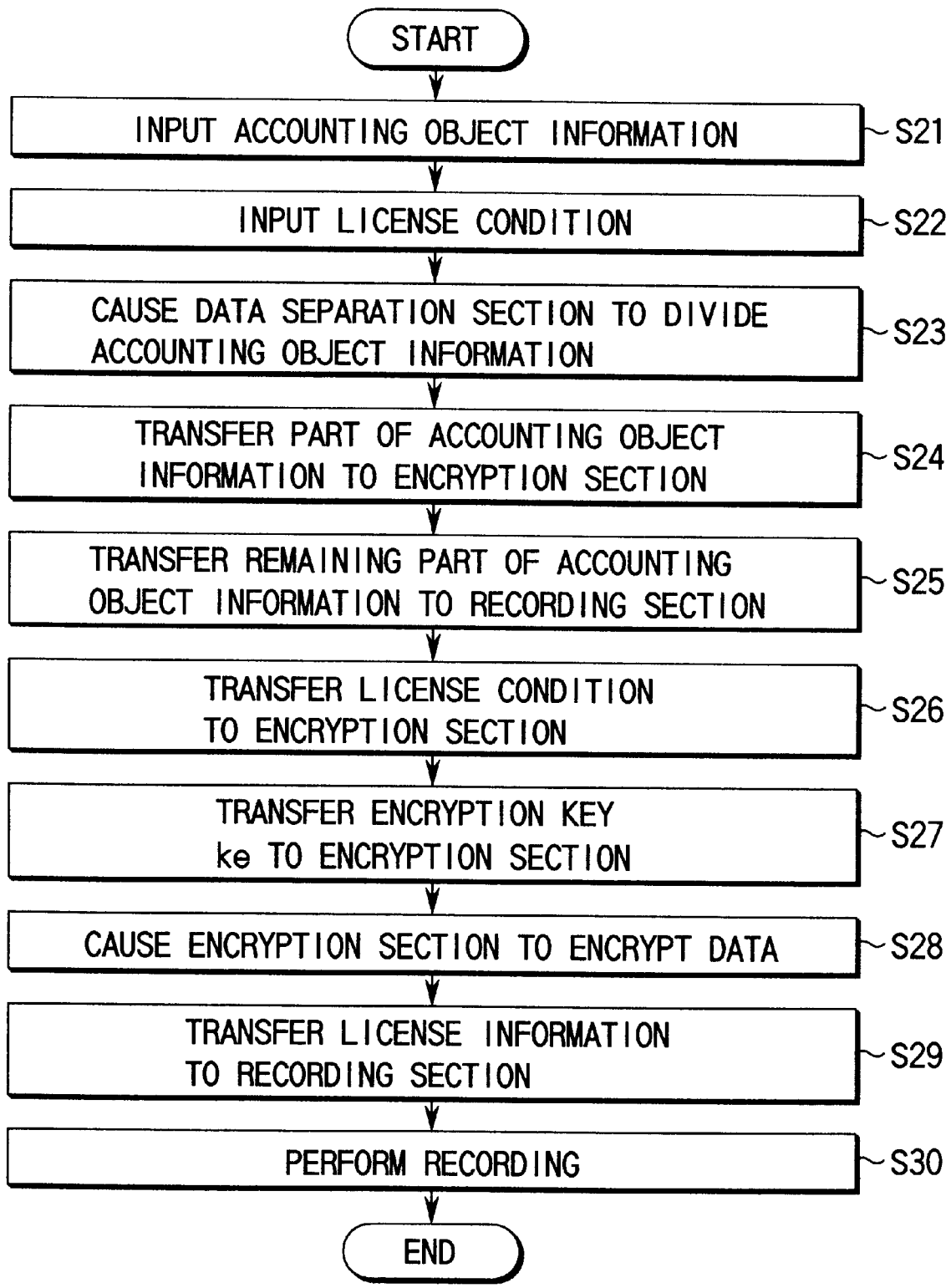
FIG. 4 is a flow chart for explaining the operation of the second information recording apparatus shown in FIG. 3.

FIG. 4 is a flow chart for explaining the operation of an information recording apparatus 11 shown in FIG. 3. Accounting object information is input to the data separation section 12 (step S21), and the license condition is input to the license condition input section 14 (step S22). The data separation section 12 divides the input accounting object information into two parts (step S23), transfers one part of the accounting object information to the encryption section 17 (step S24), and transfers the remaining part of the accounting object information to the recording section 18 (step S25). The license condition is transferred from the license condition input section 14 to the encryption section 17 (step S26). The encryption key ke is transferred from the key holder section 16 to the encryption section 17 (step S27). The encryption section 17 merges the license condition and the part of the accounting object information transferred from the data separation section 12 and then encrypts them to generate license information (step S28). The generated license information is transferred to the recording section 18 (step S29). The recording section 18 merges the part of the accounting object information transferred from the data separation section 12 and the license information and records them on the information storage section 19 (step S30).

(1-3) Third Example of Information Recording Apparatus

As still another example, the entire accounting object information may be encrypted together with a license condition to inseparately combine the accounting object information with the license condition.

Figure 7:
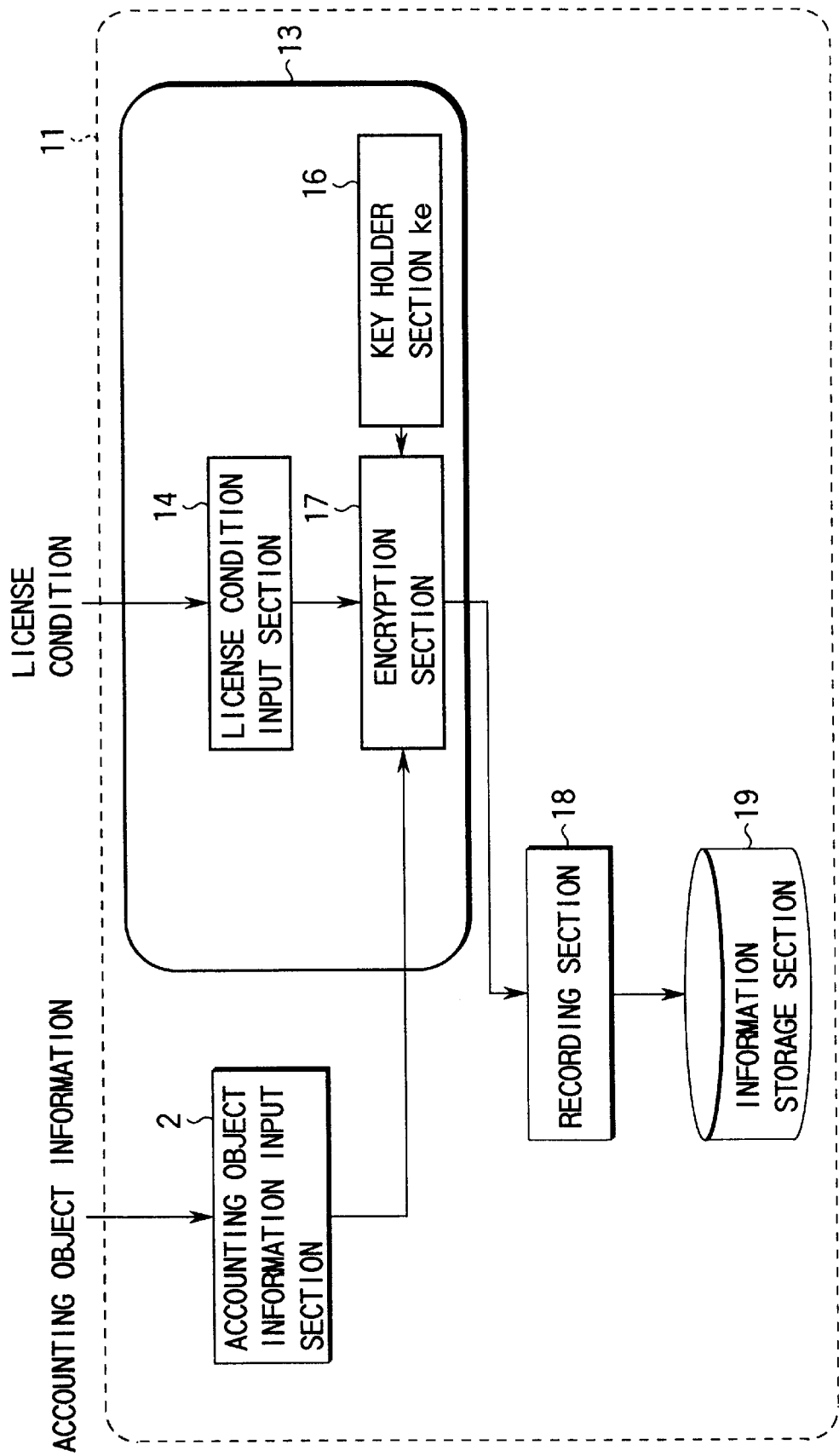
FIG. 7 is a block diagram showing the third arrangement of the information recording apparatus according to the first embodiment of the present invention.

FIG. 7 shows the third arrangement of the information recording apparatus according to the first embodiment of the present invention. The same reference numerals as in FIG. 3 denote the same parts in FIG. 7, and only different parts will be described below. In FIG. 7, the data separation section 12 in FIG. 3 is replaced with the accounting object information input section 2 so that the accounting object information input to the accounting object information input section 2 is directly transferred to the encryption section 17. The encryption section 17 merges the entire accounting object information with the license condition and then encrypts them using the encryption key ke.

As described above, in the first example of the information recording apparatus, the decoding key kd(1) for decoding the encrypted accounting object information and the license condition are merged and encrypted using the encryption key ke to generate license information. In addition, the encrypted accounting object information and the license information are merged and recorded on the information storage section 9, so the accounting object information and the license condition can be inseparately combined. In this case, only an information reproducing apparatus having the encryption key ke corresponding to the encryption key ke can separate the license condition and the decoding key kd(1) from each other so the encrypted accounting object information can be decoded using the separated decoding key kd(1) and reproduced.

In the second example of the information recording apparatus, part of the accounting object information and the license condition are merged and encrypted using the encryption key ke to generate license information. The remaining part of the accounting object information and the license information are merged and stored in the information storage section 19. With this processing, the accounting object information and the license condition can be inseparately combined. In this case, only an information reproducing apparatus having the decoding key kd corresponding to the encryption key ke can decode the part of the accounting object information and the license condition and separate them from each other so the accounting object information can be reproduced from the decoded and separated part of the accounting object information and the remaining part.

In the third example of the information recording apparatus, the entire accounting object information and the license condition are merged, encrypted using the encryption key ke, and recorded on the information storage section 19, thereby inseparately combining the accounting object information with the license condition. In this case, only an information reproducing apparatus having the decoding key kd corresponding to the encryption key ke can decode, separate, and reproduce the accounting object information and the license condition.

All of these arrangements disable to separate the accounting object information from the license condition without decoding.

The information storage section 9 or 19 may be a recording medium such as a DVD-ROM, a DVD-RAM, or a hard disk. Such a recording medium having information is set in a predetermined reproducing apparatus to reproduce the information. Alternatively, the information may be transferred from the information storage section 9 or 19 to another recording medium through a network such as the Internet or by broadcasting and reproduced by a predetermined reproducing apparatus.

Figure 8:
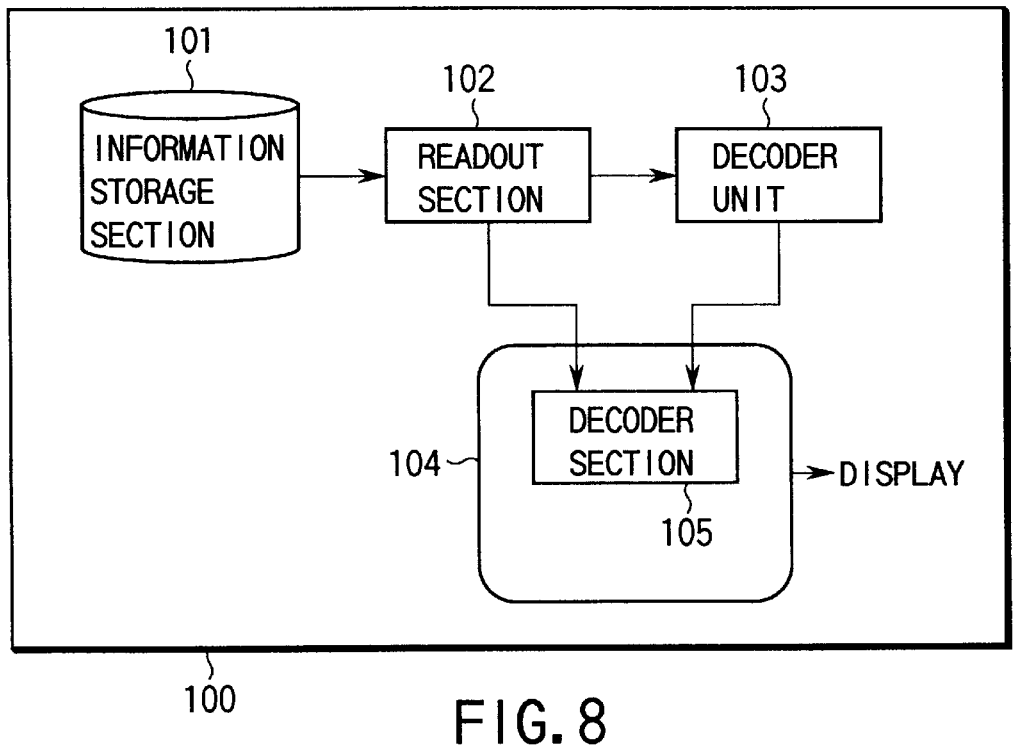
FIG. 8 is a block diagram showing the first arrangement of an information reproducing apparatus according to the first embodiment of the present invention.

(2) Information Reproducing Apparatus (2-1) First Example of Information Reproducing Apparatus FIG. 8 shows the first arrangement of an information reproducing apparatus according to the present invention. More specifically, FIG. 8 shows an arrangement of an information reproducing apparatus for reproducing information recorded on the information storage section 9 or 19 in the first information recording apparatus shown in FIG. 1, the second information recording apparatus shown in FIG. 3, or the third information recording apparatus shown in FIG. 7 and distributed to a user by a recording medium or through a network or broadcasting.

The unit information recorded on, e.g., the information storage section 9 in the first information recording apparatus includes accounting object information encrypted and merged with license information generated by encrypting the decoding key kd(1) for decoding the accounting object information together with the license condition using the encryption key ke.

The license condition includes, e.g., the expiration date. The expiration date means an expiration date of accounting object information corresponding to a predetermined fee paid by the user. The license condition may also include the license information recording time. The license information recording time is a time when the license information has been recorded on, e.g., the information storage section 9 in the first information recording apparatus shown in FIG. 1 and, more specifically, time information read from, e.g., a clock incorporated in the license condition input section 4 in generating the license information by the license information generation section 3.

Referring to FIG. 8, the information reproducing apparatus roughly comprises an information storage section 101, a readout section 102, a decoder unit 103, and a reproduction section 104.

The information storage section 101 may be a recording medium such as a DVD-ROM, a DVD-RAM, or a hard disk. Alternatively, information recorded on the information storage section 101 may be transferred from the information storage section 9 or 19 shown in FIG. 1, 3, or 7 through a network such as the Internet or by broadcasting.

The readout section 102 reads out one unit of information from the information storage section 101, transfers the license information to the decoder unit 103, and transfers the encrypted accounting object information to the reproduction section 104.

The decoder unit 103 decodes the license information using the decoding key kd stored in advance and decides on the basis of the obtained license condition whether the decoding key kd(1) for decoding the encrypted accounting object information is to be output to the reproduction section 104, thereby realizing protection by copyright.

Since the accounting object information is encrypted using the encryption key ke(1), the accounting object information cannot be reproduced unless the reproduction section 104 obtains the decoding key kd(1) corresponding to the encryption key ke(1). The decoding key kd(1) is transferred from the decoder unit 103 to the reproduction section 104. When the decoding key kd(1) is to be transferred from the decoder unit 103 to the reproduction section 104, the decoding key kd(1) is normally protected. This is because if the decoding key kd(1) is acquired/stored during transfer, reproduction is enabled without intervening the decoder unit 103, and protection by copyright such as license condition check by the decoder unit 103 becomes meaningless. A specific example of transfer protection is described in, e.g., "News Report, Nikkei Electronics", Nov. 18, 1996 (No. 676), pp. 13–14.

The reproduction section 104 has a decoder section 105. The decoder section 105 decodes the encrypted accounting object information transferred from the readout section 102 using the decoding key kd(1) transferred from the decoder unit 103. The reproduction section 104 performs predetermined decoding for displaying the accounting object information obtained upon decoding by the decoder section 105 and displays the accounting object information on a predetermined display device.

Figure 9:
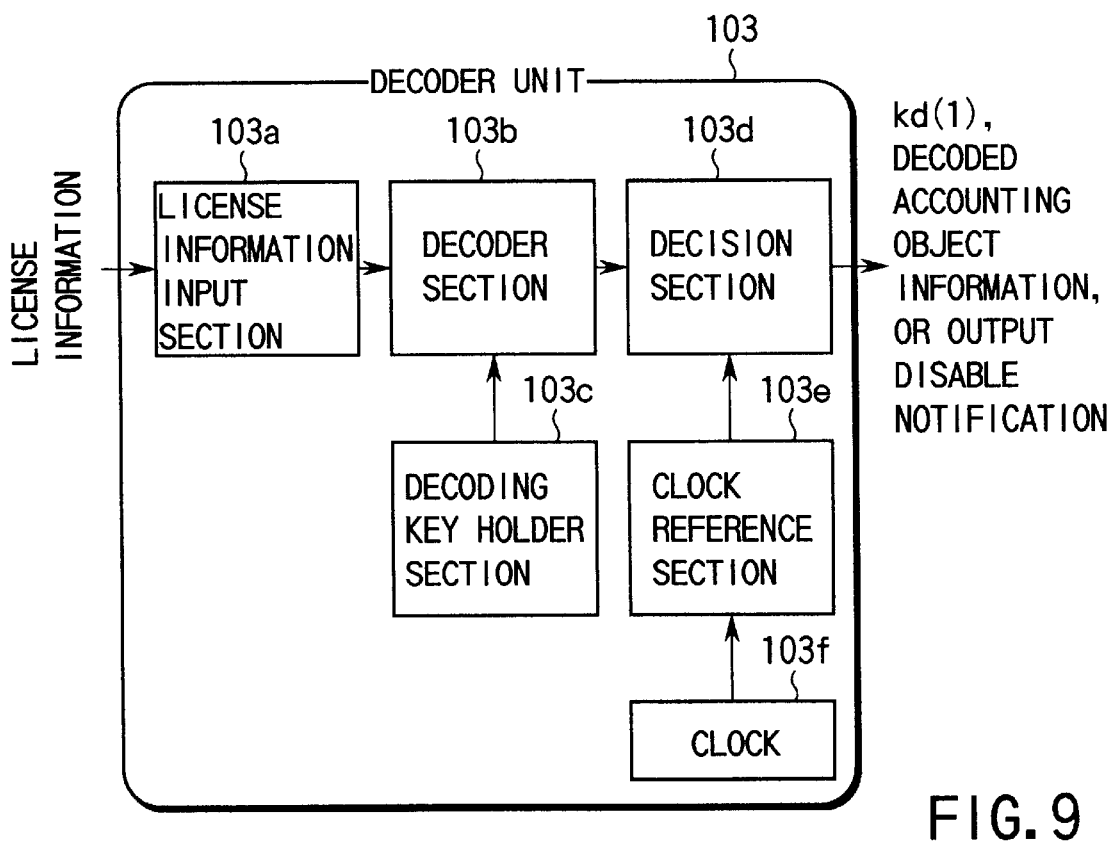
FIG. 9 is a block diagram showing an arrangement of a decoder unit shown in FIG. 8.

FIG. 9 shows an arrangement of the decoder unit 103. The decoder unit 103 comprises a license information input section 103a, a decoder section 103b, a decoding key holder section 103c, a decision section 103d, a clock reference section 103e, and a clock 103f.

The license information input section 103a receives license information transferred from the readout section 102 and outputs the license information to the decoder section 103b.

The decoder section 103b decodes the license information using the decoding key kd stored in the decoding key holder section 103c in advance and outputs the obtained license condition, i.e., the expiration date and the decoding key kd(1) to the decision section 103d.

The clock reference section 103e reads time (clock time) indicated by the clock 103f.

The decision section 103d compares the clock time (indicating the current time) acquired from the clock reference section 103e with the expiration date. If clock time £ expiration date, the decision section 103d decides that the accounting object information can be used (i.e., the decoding key kd(1) can be output) and outputs the decoding key kd(1) to the reproduction section 104.

When the license condition also includes license information recording time, check of the expiration date and the license information recording time is also performed. More specifically, when the expiration date is valid, the decision section 103d compares the clock time with the license information recording time. If clock time 3 license information recording time holds, the decision section 103d outputs the decoding key kd(1) to the reproduction section 104. This check is performed to only confirm the fact that "the license information has been recorded in the past", though it has great significance. The clock 103f to be referred to by the clock reference section 103e is not always correct. Especially, excessive time delay in the clock is not preferable from the viewpoint of observance of the expiration date. Check of the license information recording time is meaningful in preventing time delay to some extent. Assume that the clock indicates time one month ago. Also, assume that the license information recording time is 12:00 in a certain day, and the expiration date is set at 12:00 one week after the license information recording time. If the license information recording time is not checked, the user can use the accounting object information for one week +one month. By checking the license information recording time, use of the accounting object information can be inhibited even when the clock time is largely delayed.

Figure 10:
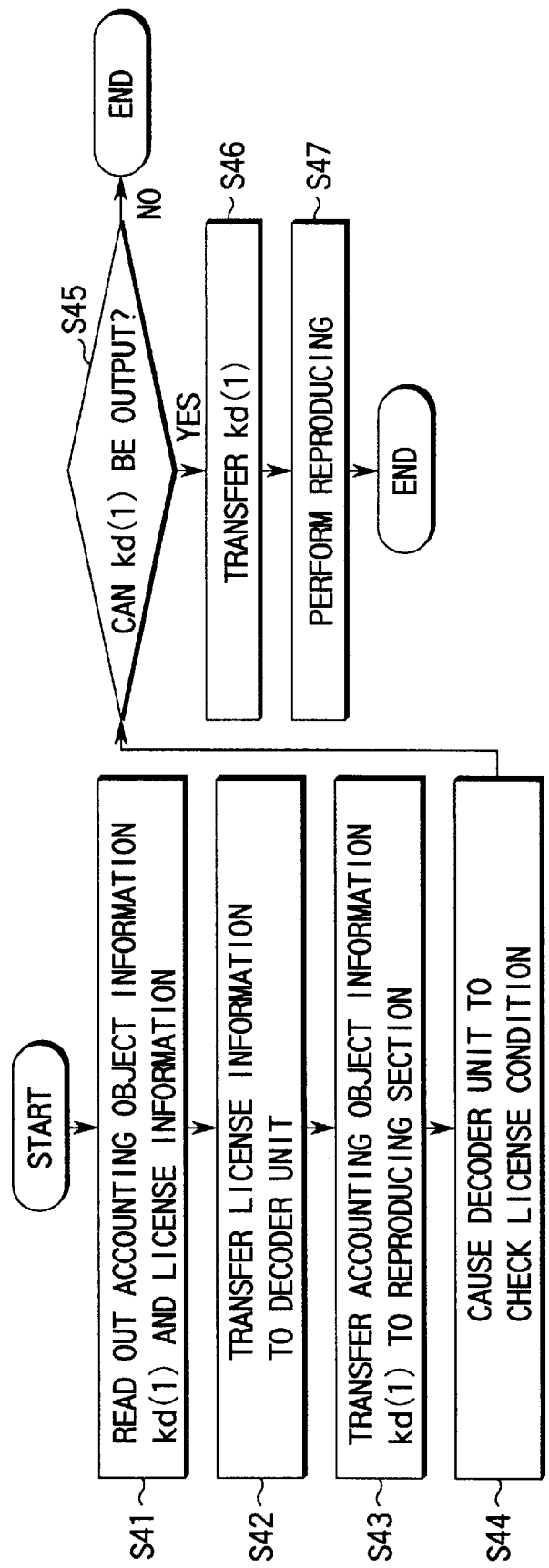
FIG. 10 is a flow chart for explaining the operation of the first information reproducing apparatus shown in FIG. 8.

FIG. 10 is a flow chart for explaining the processing operation of the information reproducing apparatus shown in FIG. 8. The readout section 102 reads out the unit information, i.e., the encrypted accounting object information and license information recorded on the information storage section 101 (step S41), transfers the license information to the decoder unit 103 (step S42), and transfers the encrypted accounting object information to the reproduction section 104 (step S43). The decoder unit 103 decodes the license information using the decoding key kd stored in advance to obtain the license condition (expiration date) and the decoding key kd(1). It is decided on the basis of the license condition (expiration date) whether the accounting object information can be used (step S44). If the expiration date is valid, and it is decided that the accounting object information can be used (YES in step S45), the decoder unit 103 transfers the decoding key kd(1) to the reproduction section 104 (step S46). If it is decided that use of the accounting object information is disabled, notification representing that the decoding key kd(1) cannot be output is output to the reproduction section 104, and processing is ended. The reproduction section 104 decodes the encrypted accounting object information using the decoding key kd(1) and further performs decoding to reproduce the accounting object information (step S47).

Figure 11:
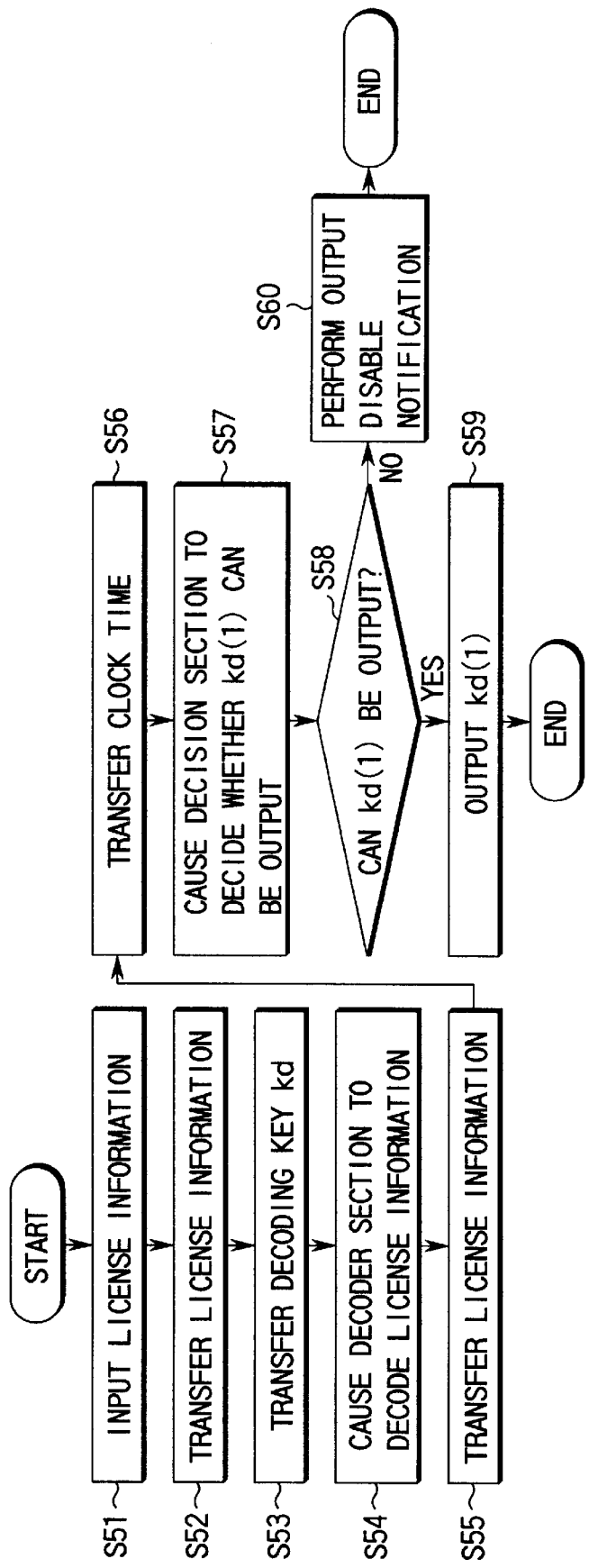
FIG. 11 is a flow chart for explaining the operation of the decoder unit shown in FIG. 9.

The flow of processing operation of the decoder unit 103 in steps S44 to S46 in FIG. 10 will be described in more detail with reference to FIGS. 8 and 9 and the flow chart shown in FIG. 11. The license information input section 103a of the decoder unit 103 receives license information transferred from the readout section 102 (step S51) and transfers the license information to the decoder section 103b (step S52). When the decoding key kd is transferred from the decoding key holder section 103c (step S53), the decoder section 103b decodes the license information using the decoding key kd (step S54). Data obtained by decoding the license information is transferred to the decision section 103d (step S55). When the clock time is transferred from the clock reference section 103e (step S56), the decision section 103d compares the license condition (expiration date) with the clock time to decide whether the accounting object information can be used (i.e., whether the decoding key kd(1) is to be output to the reproduction section 104) (step S57). If it is decided that the accounting object information can be used, the decoding key kd(1) is output to the reproduction section 104 (steps S58 and S59). If it is decided that the accounting object information cannot be used, notification representing that the decoding key kd(1) cannot be output is output to the reproduction section 104 (steps S58 and S60).

(2-2) Arrangement of Decoder Unit and Clock Incorporated in Decoder Unit

Figure 12:
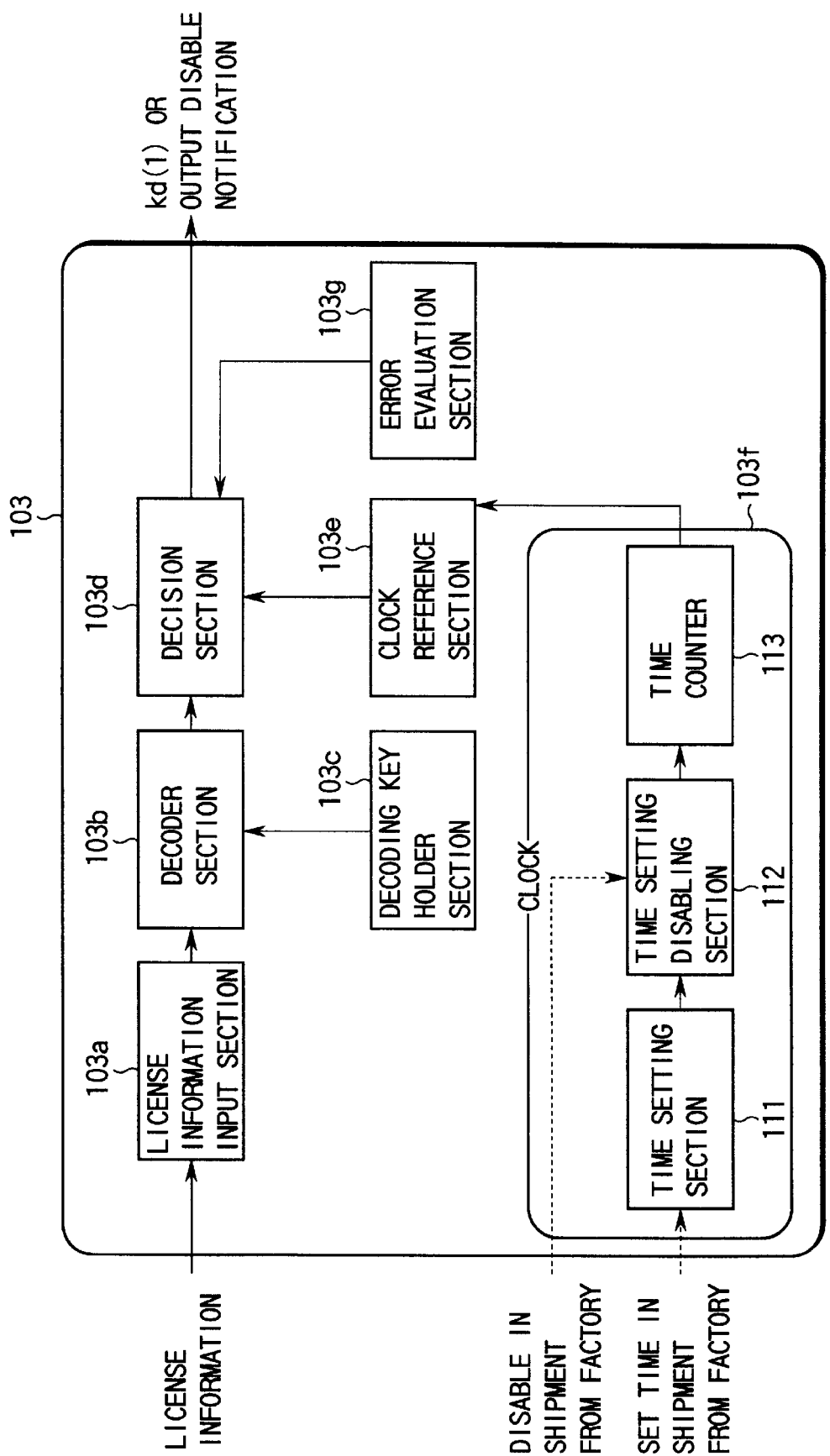
FIG. 12 is a block diagram showing another arrangement of the decoder unit having a clock for disabling time update.

When the expiration date for accounting object information is to be used as a license condition, and the expiration date is to be set for the accounting object information, the accuracy of the clock 103f incorporated in the decoder unit 103 shown in FIG. 9 is important. In that sense, a mechanism for disabling the user from arbitrary setting time is necessary. FIG. 12 shows a decoder unit with such a mechanism. The same reference numerals as in FIG. 9 denote the same parts in FIG. 12.

Figure 13:
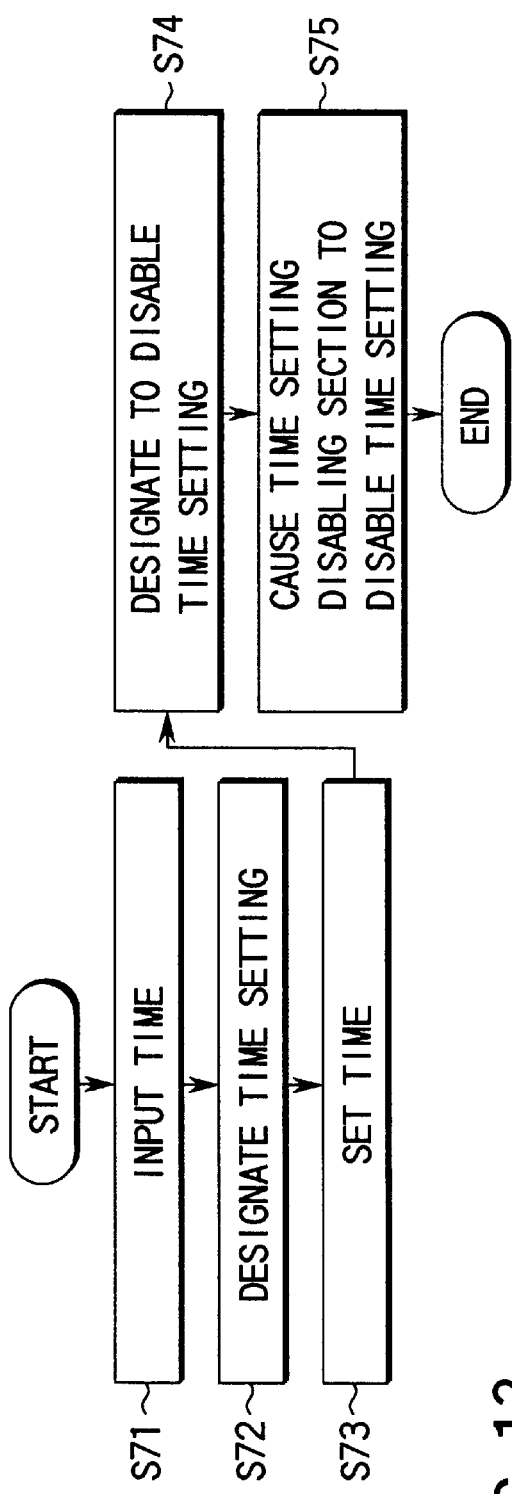
FIG. 13 is a flow chart for explaining the operation of the clock of the decoder unit, which disables time update.

As shown in FIG. 12, the clock 103f has a time setting section 111, a time setting disabling section 112, and a time counter 113. The operation of the clock 103f shown in FIG. 12 will be described with reference to the flow chart shown in FIG. 13. When time setting designation information containing set time information is input through the time setting section 111 in shipment from a factory (step S71), the designated set time is set in the time counter 113 (steps S72 and S73). After this, the time setting disabling section 112 takes a measure to disable time setting through the time setting section 111 (steps S74 and S75). For example, the time setting disabling section 112 flows an overcurrent to a circuit for connecting the time setting section 111 and the time counter 113 to physically disconnect the time setting section 111 and the time counter 113. Upon taking the time setting disabling measure, any time setting becomes impossible.

An error evaluation section 103g determines the maximum cumulative error by, e.g., the following method. The error evaluation section holds the "maximum time delay" and "maximum time advance" of the clock 103f. The error evaluation section 103g also has a time counter for error evaluation. This time counter adds the maximum delay or maximum advance per hour and transfers the cumulative maximum delay or cumulative maximum advance (these are inclusively called a cumulative error) as a sum value to the decision section 103d.

The cumulative maximum advance or cumulative maximum delay means the cumulative time of errors generated due to, e.g., the abnormal operation of the clock 103f itself. Therefore, when the clock time indicated by the clock 103f is to be compared with the expiration date or license information recording time, this cumulative error must be taken into consideration.

In this case, the decision section 103d of the decoder unit 103 checks whether the following relationships hold.

Clock time £ expiration date+cumulative maximum advance

Clock time 3 license information recording (update) time−cumulative maximum delay If the two relations simultaneously hold, it is decided that the accounting object information can be used. When information recorded on the information storage section 9 by the first information recording apparatus is to be reproduced, it is decided that the decoding key kd(1) can be output. When information recorded on the information storage section 19 by the second information recording apparatus is to be reproduced, it is decided that part of the accounting object information can be output.

Figure 14:
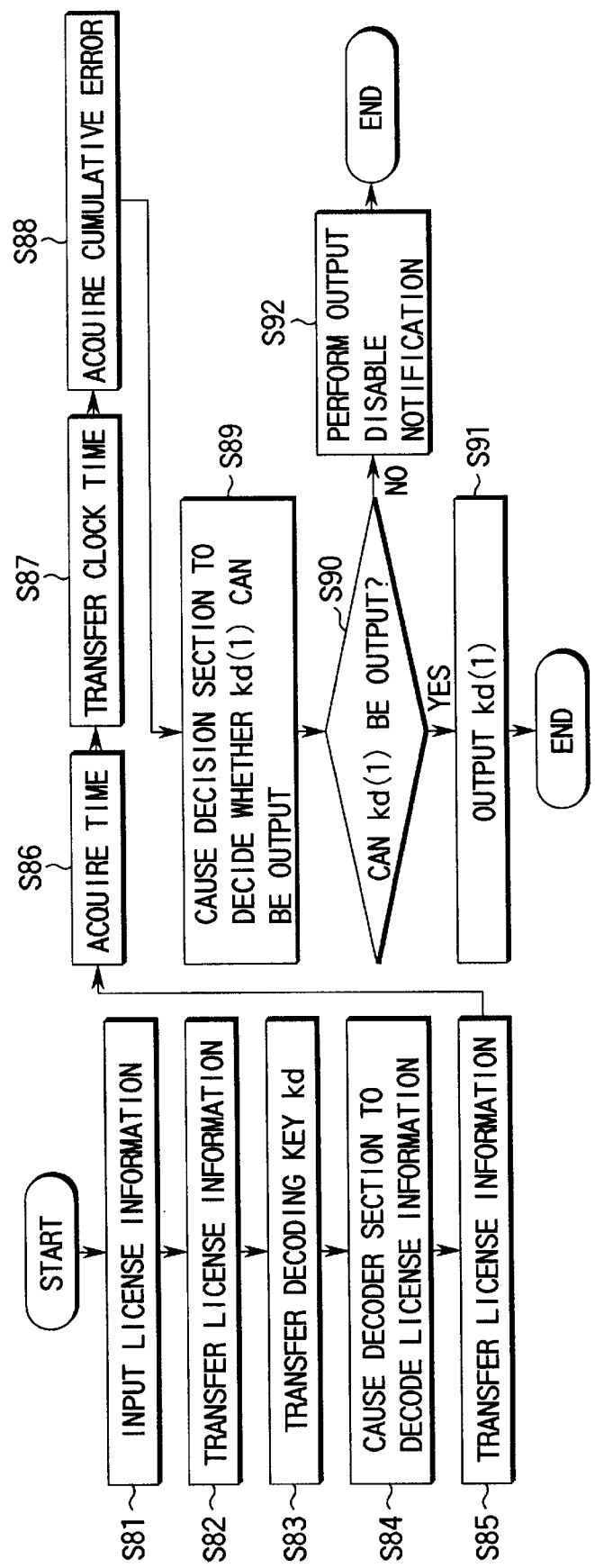
FIG. 14 is a flow chart for explaining the operation of the decoder unit shown in FIG. 12.

The processing operation of the decoder unit shown in FIG. 12 will be described next with reference to the flow chart in FIG. 14. The license information input section 103a of the decoder unit 103 receives license information transferred from the readout section 102 (step S81) and transfers the license information to the decoder section 103b (step S82). When the decoding key kd is transferred from the decoding key holder section 103c (step S83), the decoder section 103b decodes the license information using the decoding key kd (step S84). Data obtained upon decoding the license information is transferred to the decision section 103d (step S85). The clock reference section 103e acquires clock time from the clock 103f (step S86) and transfers the acquired clock time to the decision section 103d (step S87). The decision section 103d acquired the cumulative error from the error evaluation section 103g (step S88) and compares the license condition (expiration date) with the clock time in consideration of the cumulative error of the clock 103f to decide whether the accounting object information can be used (i.e., whether the decoding key kd(1) is to be output to the reproduction section 104) (step S89). If it is decided that the accounting object information can be used, the decoding key kd(1) is output to the reproduction section 104 (steps S90 and S91). If it is decided that the accounting object information cannot be used, notification representing that the decoding key kd(1) cannot be output is output to the reproduction section 104 (steps S90 and S92).

(2-3) Time Setting No. 1 for Clock Incorporated in Decoder Unit

Figure 15:
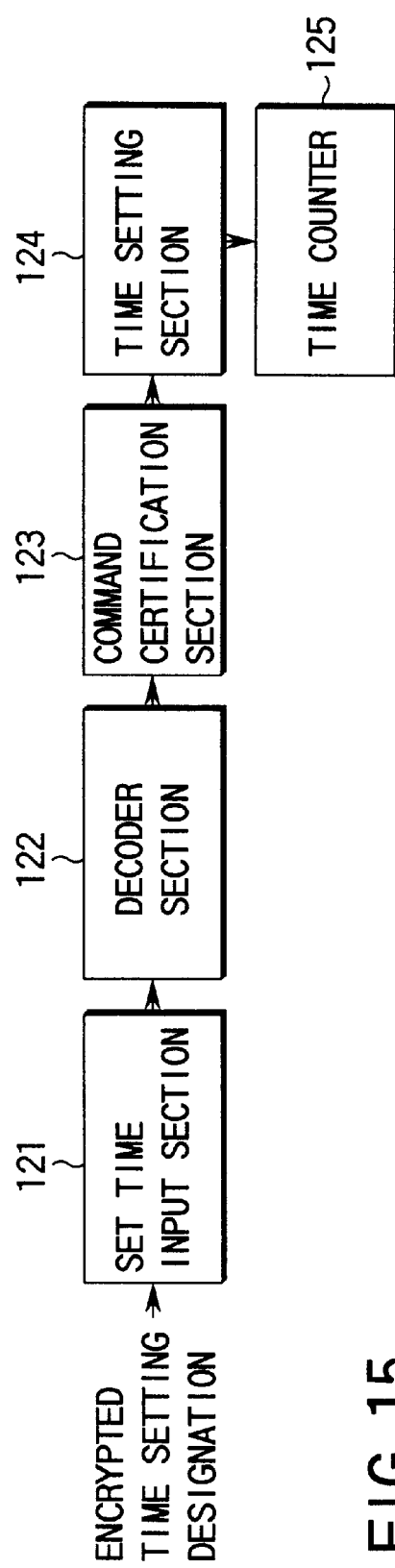
FIG. 15 is a block diagram showing an arrangement of the clock of the decoder unit capable of updating time.

FIG. 15 shows another arrangement of the clock 103f incorporated in the decoder unit 103 and, more specifically, an arrangement of the clock 103f for setting time on the basis of encrypted time setting designation information.

As shown in FIG. 15, the clock 103f comprises a set time input section 121, a decoder section 122, a command certification section 123, a time setting section 124, and a time counter 125.

Figure 16:
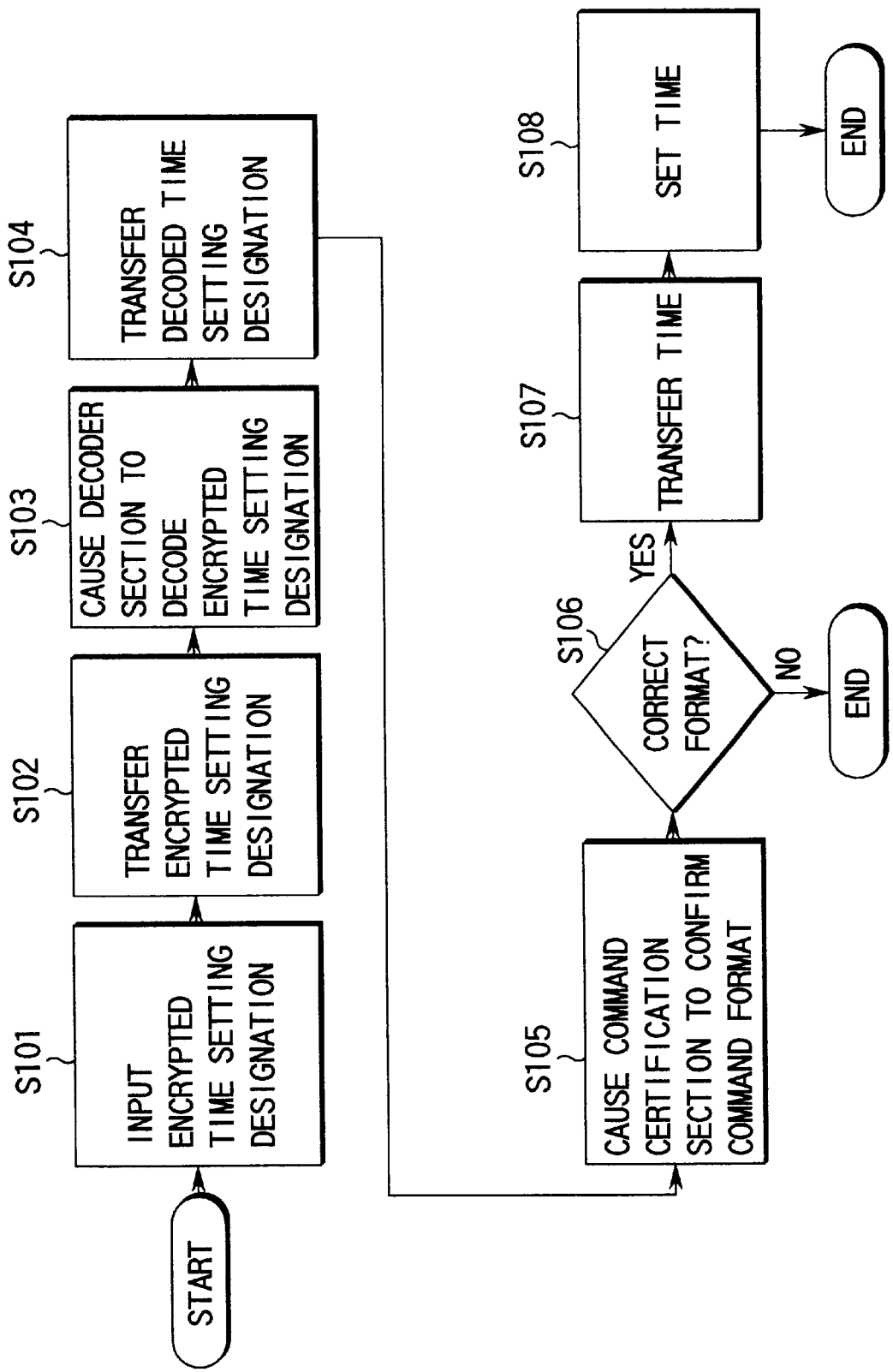
FIG. 16 is a flow chart for explaining the time update operation of the clock shown in FIG. 15.

The operation of the clock 103f with this arrangement will be described with reference to the flow chart shown in FIG. 16. Time setting designation information containing set time information is encrypted in advance. When the encrypted time setting designation information is input to the set time input section 121 (step S101), the set time input section 121 transfers the encrypted time setting designation information to the decoder section 122 (step S102). The decoder section 122 decodes the encrypted time setting designation information (step S103) and transfers the decoded time setting designation information to the command certification section 123 (step S104). The command certification section 123 confirms the command format of the time setting designation information (step S105). If the format is correct (YES in step S106), set time information contained in the time setting designation information is transferred to the time setting section 124 (step S107). The time setting section 124 sets time of the time counter 125 in accordance with the set time information (step S108).

When the clock 103f has the arrangement shown in FIG. 15, the time setting designation information to be input to the clock 103f must always be encrypted using a predetermined encryption key. For this reason, an apparatus which cannot perform encryption (i.e., an apparatus having no encryption key) cannot be used to set time. Therefore, the user cannot easily set time of the clock 103f, either.

(2-4) Time Setting No. 2 for Clock Incorporated in Decoder Unit

Time setting for the clock 103f incorporated in the decoder unit 103 through a network will be described next.

FIG. 17 is a view showing the concept of network time setting. A time setting client includes a clock to be subjected to time setting, i.e., the clock 103f incorporated in the decoder unit 103 of the first information reproducing apparatus as shown in FIG. 8. The time indicated by this clock will be called a client time. A time setting server also incorporates a clock, and the time indicated by this clock will be called a server time. In this form, the time setting server sets time for the clock incorporated in the time setting client through a network.

Relatively complex processing is required to set time for the clock incorporated in the decoder unit. The reason for this is as follows. The advance in a clock 201 of the client must be checked. An operation of confirming that one minute of client time is almost equivalent to one minute of server time must be performed. This confirmation is made by i) designating certification information transmission time from the server, and ii) designating certification information arrival time (setting time out). The certification information is transmitted from the client to the server to prevent false declaration. This is because the server measures the advance in client time using the certification information arrival time. In addition, it must be guaranteed that the time setting command transmitted from the server is input to the clock 201 immediately after it has arrived at the client. To guarantee such quick input, time-out (time setting designation receiving time) is set for the clock 201 of the client.

FIG. 18 shows an arrangement of the time setting client. As shown in FIG. 18, the time setting client is constituted by a network communication section 202, a client certification key storage section 203, and an encryption section 204.

Figure 19:
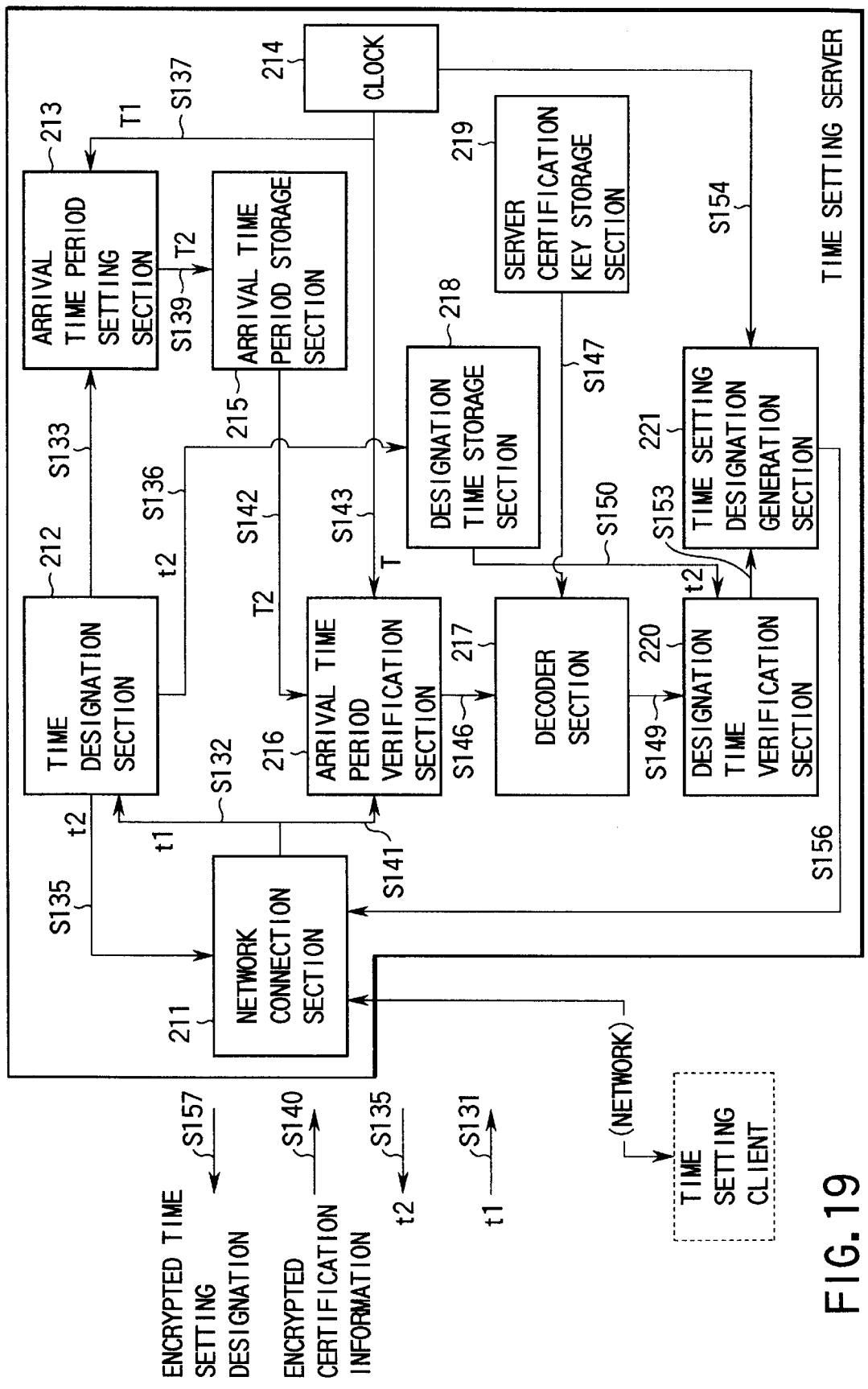
FIG. 19 is a block diagram showing an arrangement of a time setting server shown in FIG. 17.

FIG. 19 shows an arrangement of the time setting server.

Figure 20:
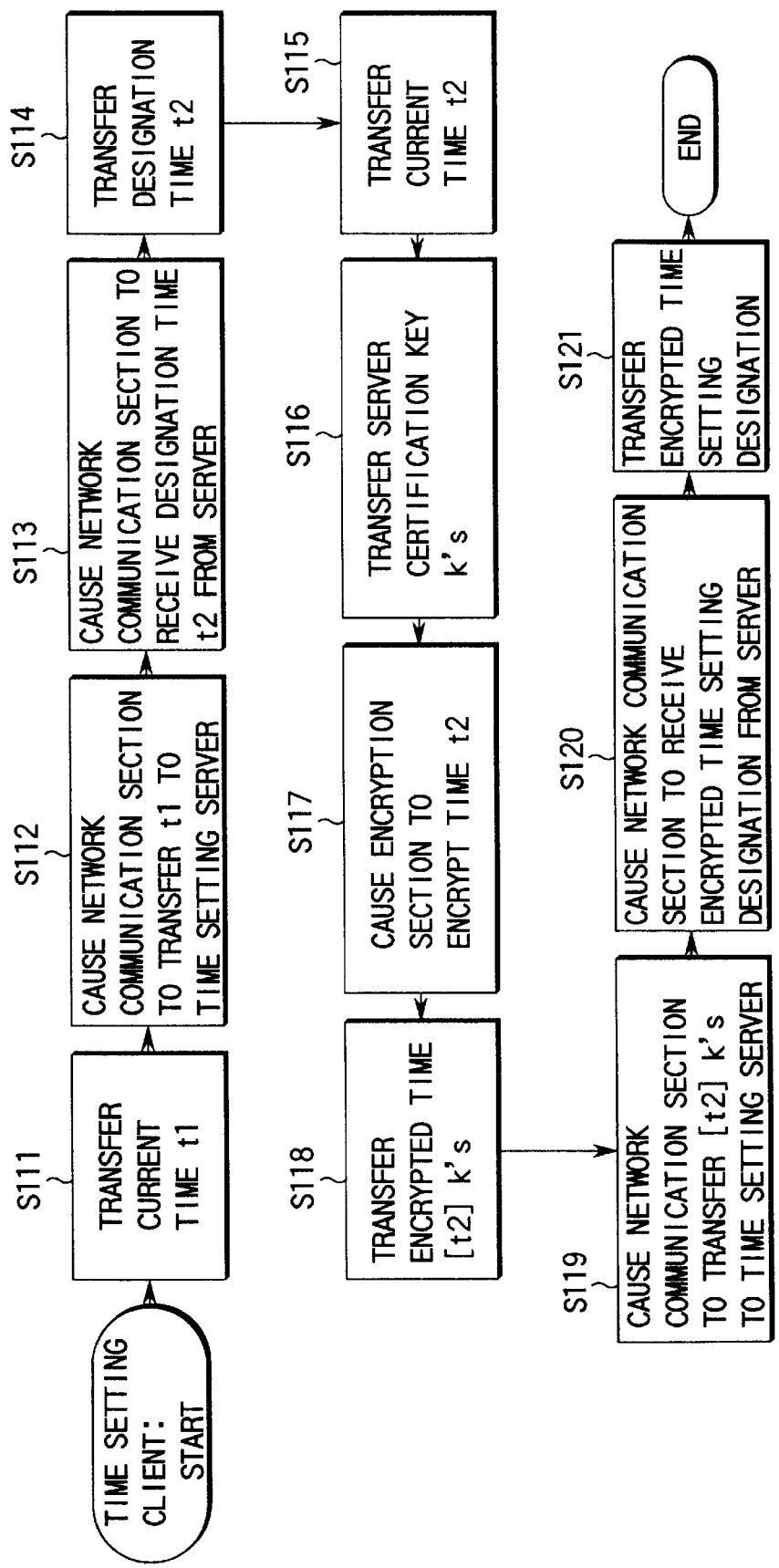
FIG. 20 is a flow chart for explaining the operation of the time setting client shown in FIG. 18.
Figure 21:
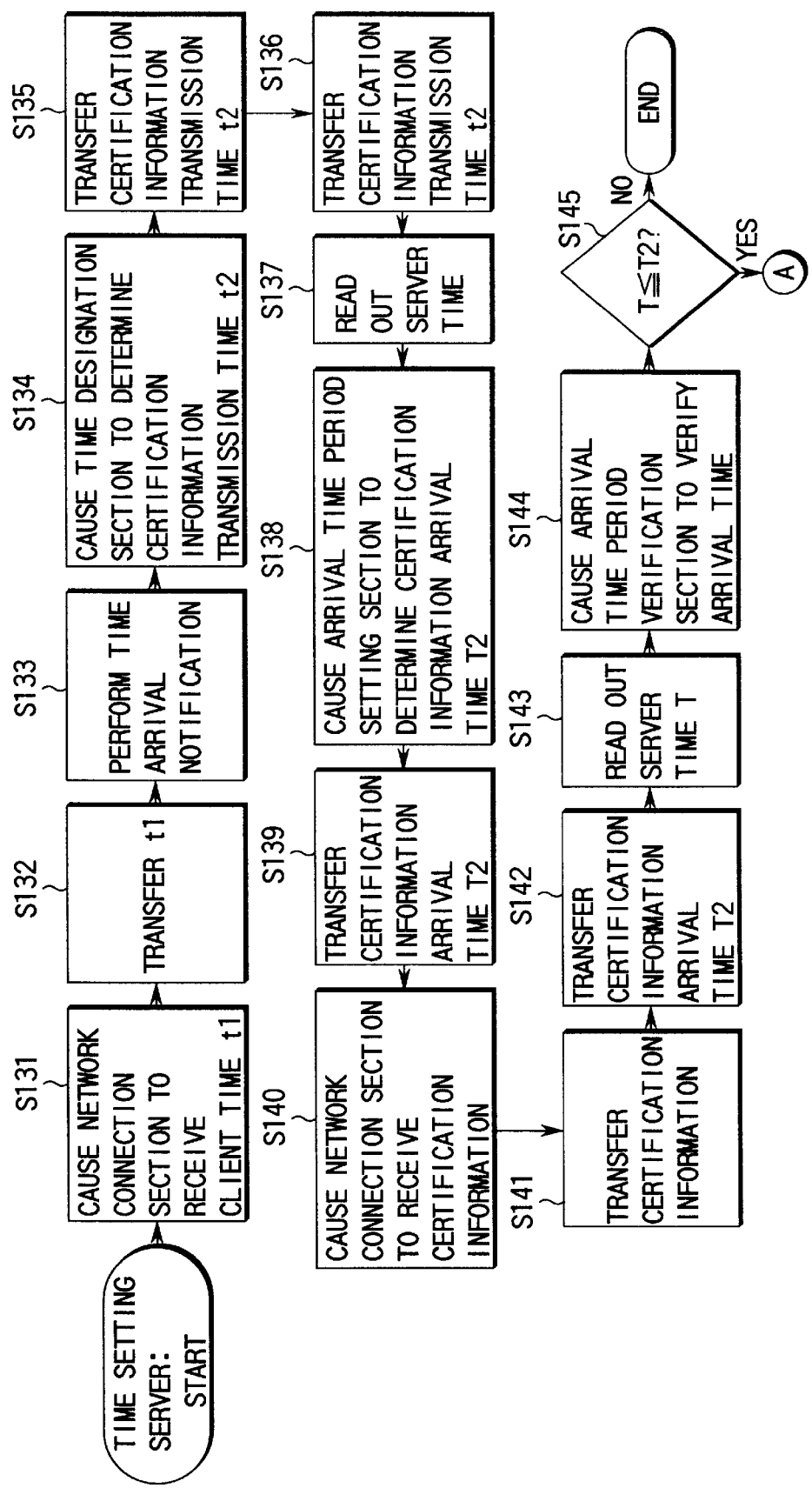
FIG. 21 is a flow chart for explaining the operation of the time setting server shown in FIG. 19.
Figure 22:
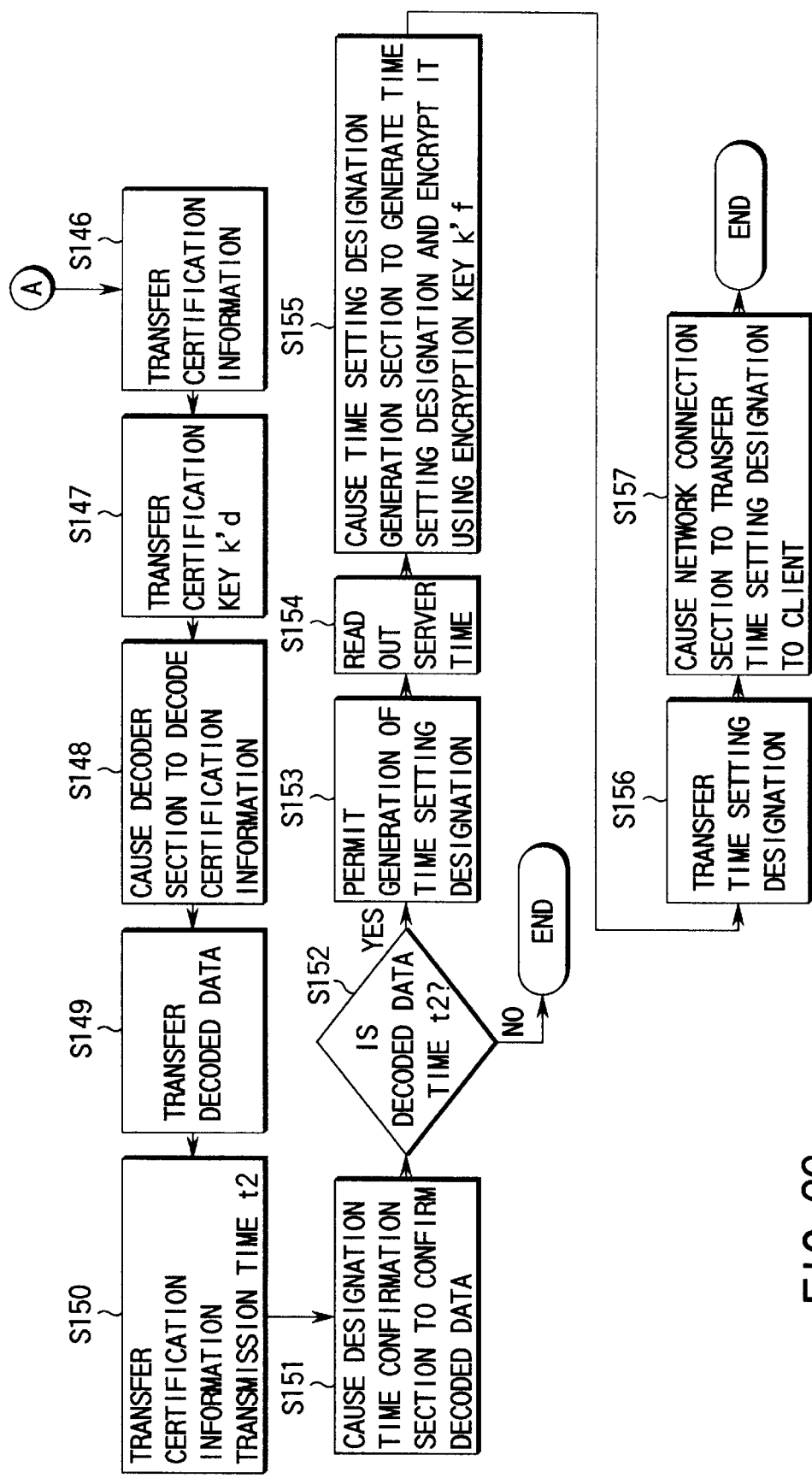
FIG. 22 is a flow chart for explaining the operation of the time setting server shown in FIG. 19.
Figure 23:
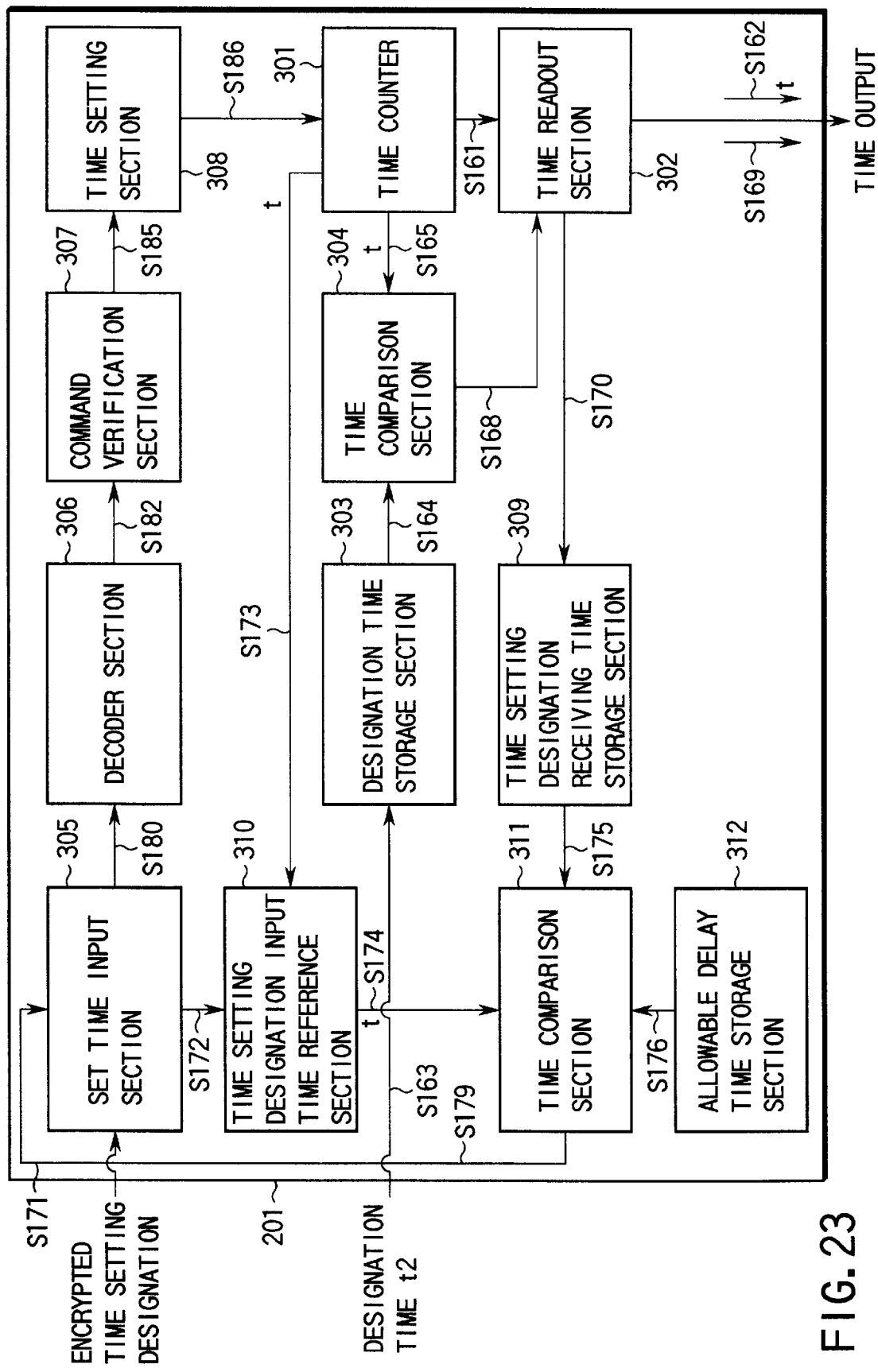
FIG. 23 is a block diagram showing an arrangement of a clock incorporated in the time setting client shown in FIG. 18.
Figure 24:
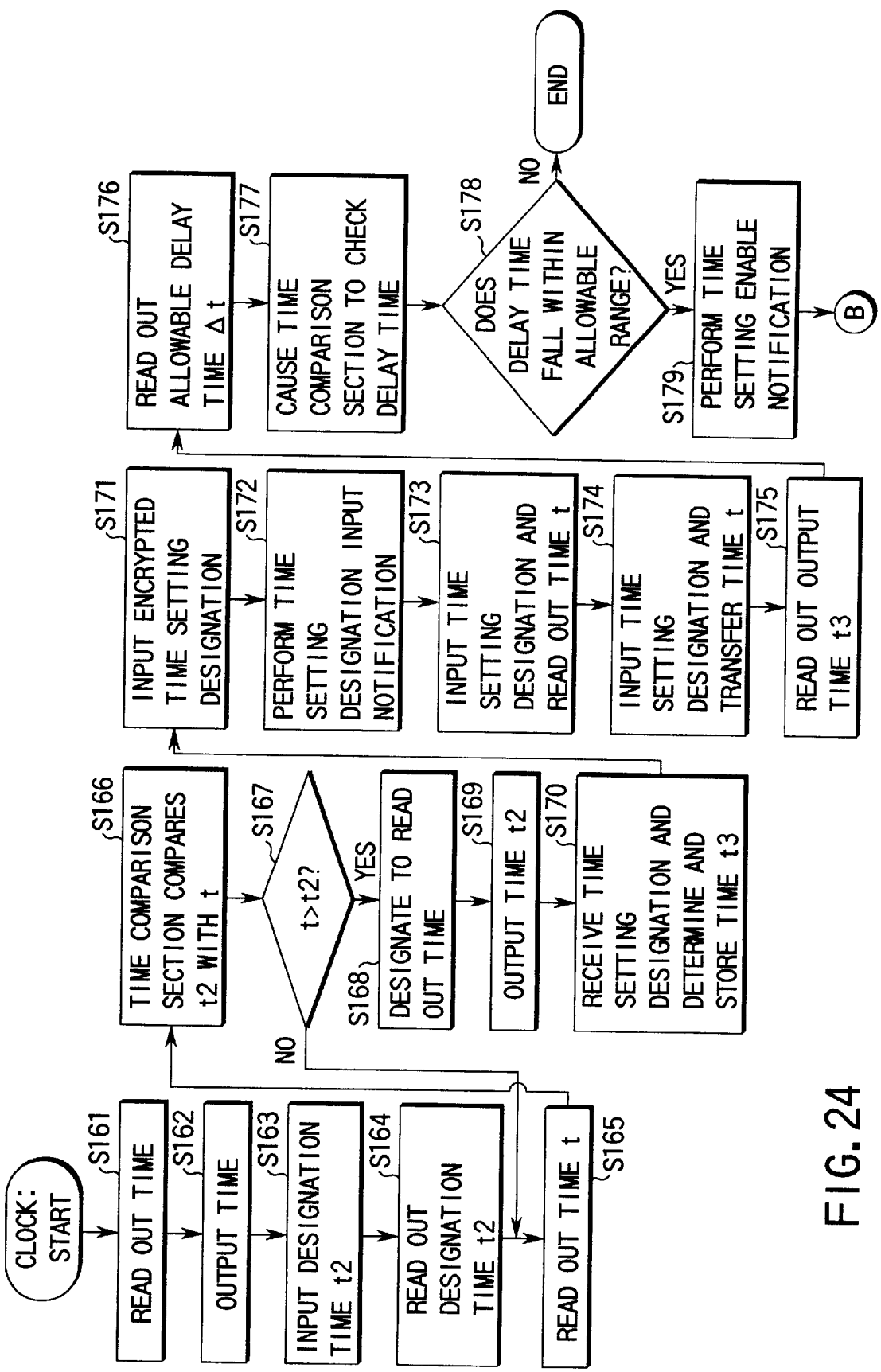
FIG. 24 is a flow chart for explaining the operation of the clock shown in FIG. 23.
Figure 25:
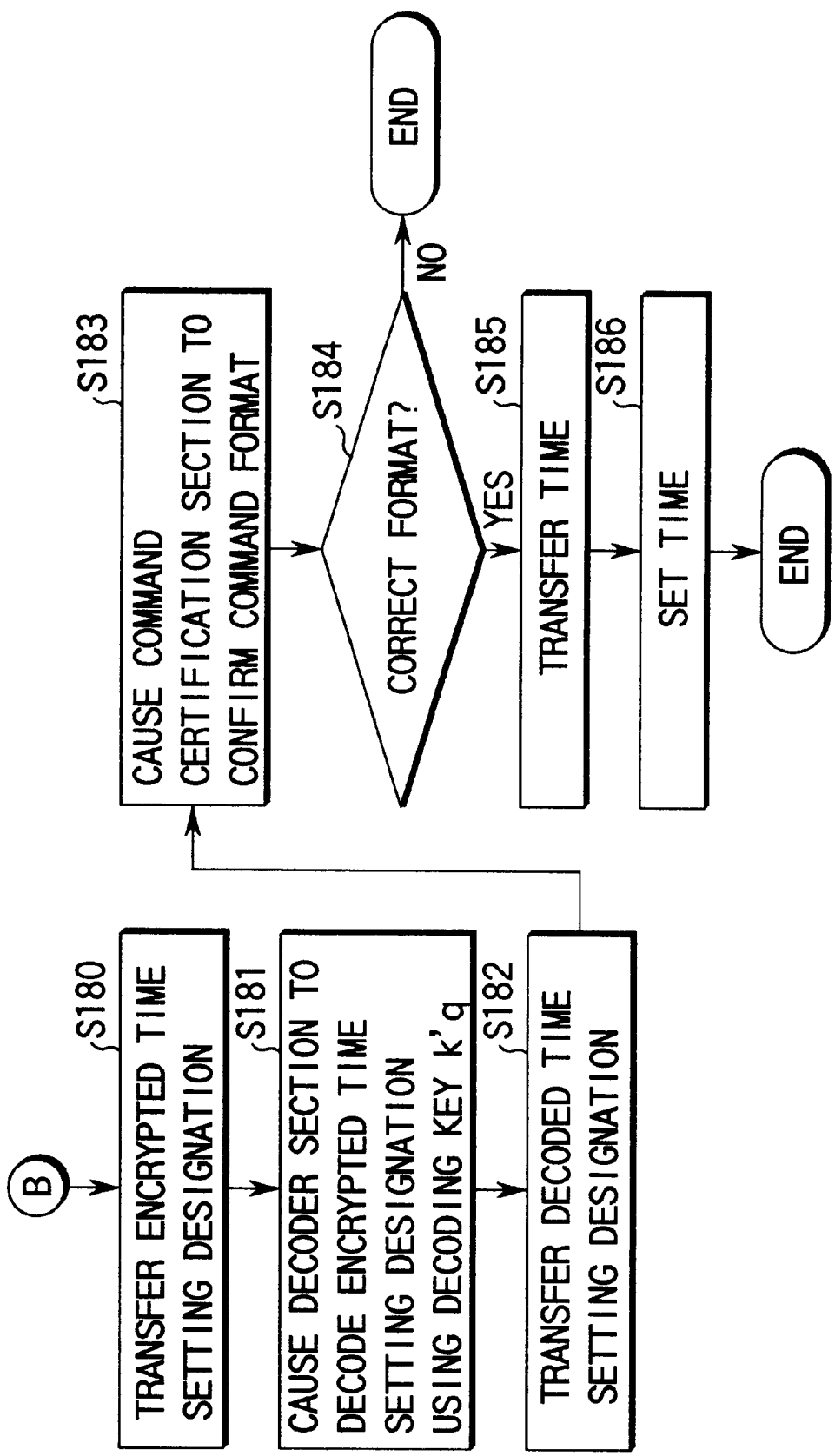
FIG. 25 is a flow chart for explaining the operation of the clock shown in FIG. 23.

An operation of setting time for the clock 201 of the time setting client from the time setting server through a network will be described next with reference to FIGS. 20 to 22 showing flow charts of the operations of the time setting client and time setting server, FIG. 23 showing a block diagram of an arrangement of the clock 201 of the time setting client, and FIGS. 24 and 25 showing flow charts of the operation of the clock 201.

First, the time setting client sends current client time t1 indicated by the clock 201 to the time setting server through the network communication section 202 (steps S111 and S112 in FIG. 20). More specifically, as shown in FIG. 23, a time readout section 302 reads out the current client time t1 from a time counter 301 (S161 in FIG. 24) and outputs the current client time t1 to the network communication section 202 shown in FIG. 18 (step S162 in FIG. 24).

The time setting server receives the client time t1 through a network connection section 211 (step S131 in FIG. 21) and transfers the client time t1 to a time designation section 212 (step S132). The time designation section 212 notifies an arrival time period setting section 213 of arrival of the time t1 from the client (step S133), adds a predetermined numerical value to the client time t1 to determine certification information transmission time (client time) t2 (step S134), and transfers the certification information transmission time t2 to the time setting client through the network connection section 211 (step S135). The certification information transmission time t2 is stored in a designation time storage section 218 (step S136). Upon receiving the time arrival notification, the arrival time period setting section 213 acquires arrival time (server time) T1 of the time t1 from the client (step S137), adds a predetermined numerical value to the arrival time T1 to determine certification information arrival time (server time) T2 (step S138), and stores the time T2 in an arrival time period storage section 215 (step S139).

Upon receiving the certification information transmission time t2 through the network communication section 202 (step S113 in FIG. 20), the time setting client transfers it to the clock 201 (step S114) and waits until the client time t2. At the client time t2, the clock 201 reads out the certification information and outputs it to the encryption section 204. At this time, the certification information may be time "t2" (step S115). More specifically, as shown in FIG. 23, the clock 201 receives the certification information transmission time t2 and stores it in a designation time storage section 303 (step S163 in FIG. 24). A time comparison section 304 reads out the certification information transmission time t2 stored in the designation time storage section 303 and compares the certification information transmission time t2 with a client time t indicated by the time counter 301 while occasionally referring to the client time t. When the certification information transmission time t2 coincides with the client time t, the time readout section 302 is designated to read out the client time (steps S164 to S168 in FIG. 24). Upon receiving this designation, the time readout section 302 reads out the client time (in this case, the time t2) indicated by the time counter 301 and outputs the readout time to the encryption section 204 shown in FIG. 18 (step S169 in FIG. 24). The clock 201 of the time setting client adds a predetermined numerical value to the time t2 to determine time setting designation receiving time (client time) t3 and stores the time t3 in a time setting designation receiving time storage section 309 (step S170 in FIG. 24).

When an encryption key k's is transferred from the client certification key storage section 203 (step S116), the encryption section 204 of the time setting client encrypts the time "t2" as certification information using the encryption key k's (step S117) and transfers the encrypted certification information ([t2] k's) to the time setting server through the network communication section 202 (steps S118 and S119). In the time setting server, a decoding key k'p corresponding to the encryption key k's is held in a server certification key storage section 219.

Upon receiving the encrypted certification information from the time setting client through the network connection section 211 (step S140), the time setting server transfers the certification information to an arrival time period verification section 216 (step S141). The arrival time period verification section 216 extracts the certification information arrival time T2 which has been stored in the arrival time period storage section 215 and reads out, from a clock 214, time T (server time) at which the encrypted certification information is received (steps S142 to S144). The certification information receiving time T is compared with the certification information arrival time T2. If T>T2, it is decided that the delay time is too long, and processing is ended (step S145). If T £ T2, the encrypted certification information is transferred to a decoder section 217 (step S146 in FIG. 22) and decoded using the decoding key k'p stored in the server certification key storage section 219 (steps S147 and S148). The decoded certification information is transferred to a designation time confirmation section 220 (step S149). The certification information transmission time t2 which has been stored in the designation time storage section 218 is also transferred to the designation time confirmation section 220. By comparing these times, the clock of the time setting client is certified (steps S150 to S152). In this case, the time "t2" is confirmed. If certification of the clock of the time setting client fails, processing is ended. If certification of the clock of the time setting client is successful, the designation time confirmation section 220 transmits a time setting designation to a time setting designation generation section 221 (step S153). Upon receiving this designation, the time setting designation generation section 221 reads out the server time at that time point from the clock 214 and generates a time setting command containing the server time. The time setting command is encrypted using an encryption key k't. The clock of the time setting client holds a decoding key k'q corresponding to the encryption key k't (steps S154 and S155). The encrypted time setting command is transmitted to the time setting client through the network connection section 211 (steps S156 and S157).

Upon receiving the encrypted license server through the network communication section 202, the time setting client inputs the time setting command to the clock 201 (steps S120 and S121 in FIG. 20).

As shown in FIG. 23, when the encrypted time setting command is received by a set time input section 305, the clock 201 notifies a time setting designation input time reference section 310 of it (steps S171 and S172 in FIG. 24). Upon receiving this notification, the time setting designation input time reference section 310 acquires the client time t from the time counter 301 and outputs the client time t to a time comparison section 311 (steps S173 and S174 in FIG. 24). The time comparison section 311 reads out the time setting designation receiving time t3 which has been stored in the time setting designation receiving time storage section 309 and compares the time t3 with the client time t. At this time, the time comparison section 311 may do comparison/decision using allowable delay time At stored in an allowable delay time storage section 312 in advance (steps S175 to S177 in FIG. 24). If t>t3+Δt, it is decided that the delay time is too long, and processing is ended (step S178 in FIG. 24). If t £ t3, the time comparison section 311 notifies the set time input section 305 of a time setting allowance (steps S178 and S179 in FIG. 24). In response to this notification, the clock 201 of the time setting client performs the time setting operation on the basis of the time setting designation (command) transmitted from the time setting server.

As shown in FIG. 23, upon receiving the time setting allowance notification, the set time input section 305 of the clock 201 of the time setting client transfers the encrypted time setting designation to a decoder section 306 (step S180 in FIG. 25). The decoder section 306 decodes the encrypted time setting designation using the decoding key k'q and transfers the decoded time setting designation to a command verification section 307 (steps S181 and S182 in FIG. 25). The command verification section 307 confirms the command format of the time setting designation. If the command format is correct, the server time in the time setting designation is transferred to a time setting section 308 (step S183 to S185 in FIG. 25). The time setting section 308 sets the client time indicated by the time counter in accordance with the server time received from the command verification section 307 (step S186 in FIG. 25).

(2-5) Second Example of Information Reproducing Apparatus (the License Condition Includes an Accounting Object Information ID)

Accounting object information has an accounting object information ID for identifying the accounting object information. The license condition includes at least the expiration date and the accounting object information ID. A case wherein license information which has been stored in the information storage section of an information reproducing apparatus is updated through a network under this condition will be described.

Figure 26:
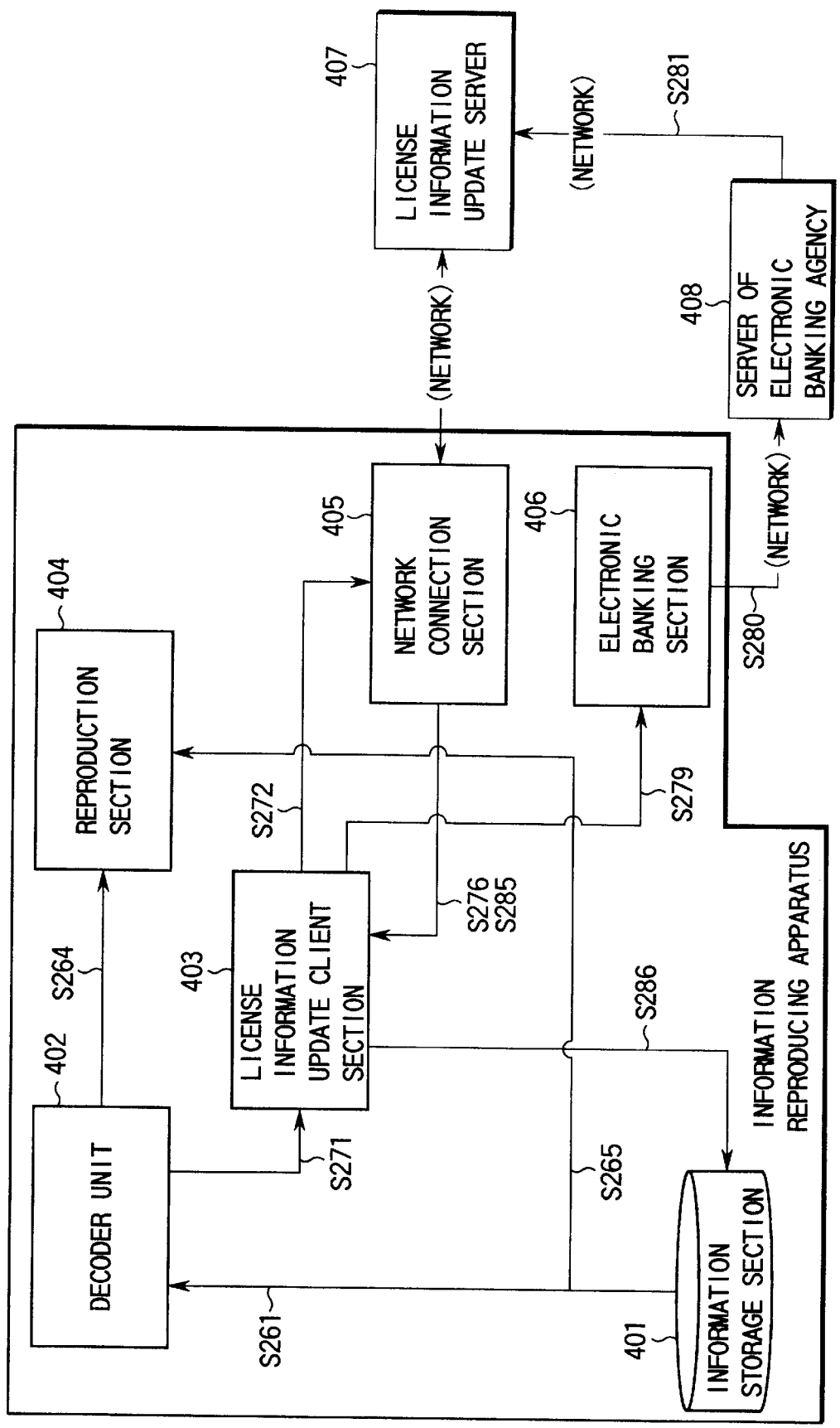
FIG. 26 is a block diagram showing an arrangement of an information reproducing apparatus (second information reproducing apparatus) having a function of updating license information and performing charging.

FIG. 26 shows the arrangement of the second information reproducing apparatus and the entire arrangement of a system for updating license information. The second information reproducing apparatus comprises an information storage section 401, a decoder unit 402, a license information update client section 403, a reproduction section 404, a network connection section 405, and an electronic banking section 406.

The information storage section 401 in the information reproducing apparatus is the same as the information storage section 101 in the first information reproducing appara thus shown in FIG. 8. Of the unit information read out by an information readout section (not shown in FIG. 26), license information is sent to the decoder unit 402.

Figure 27:
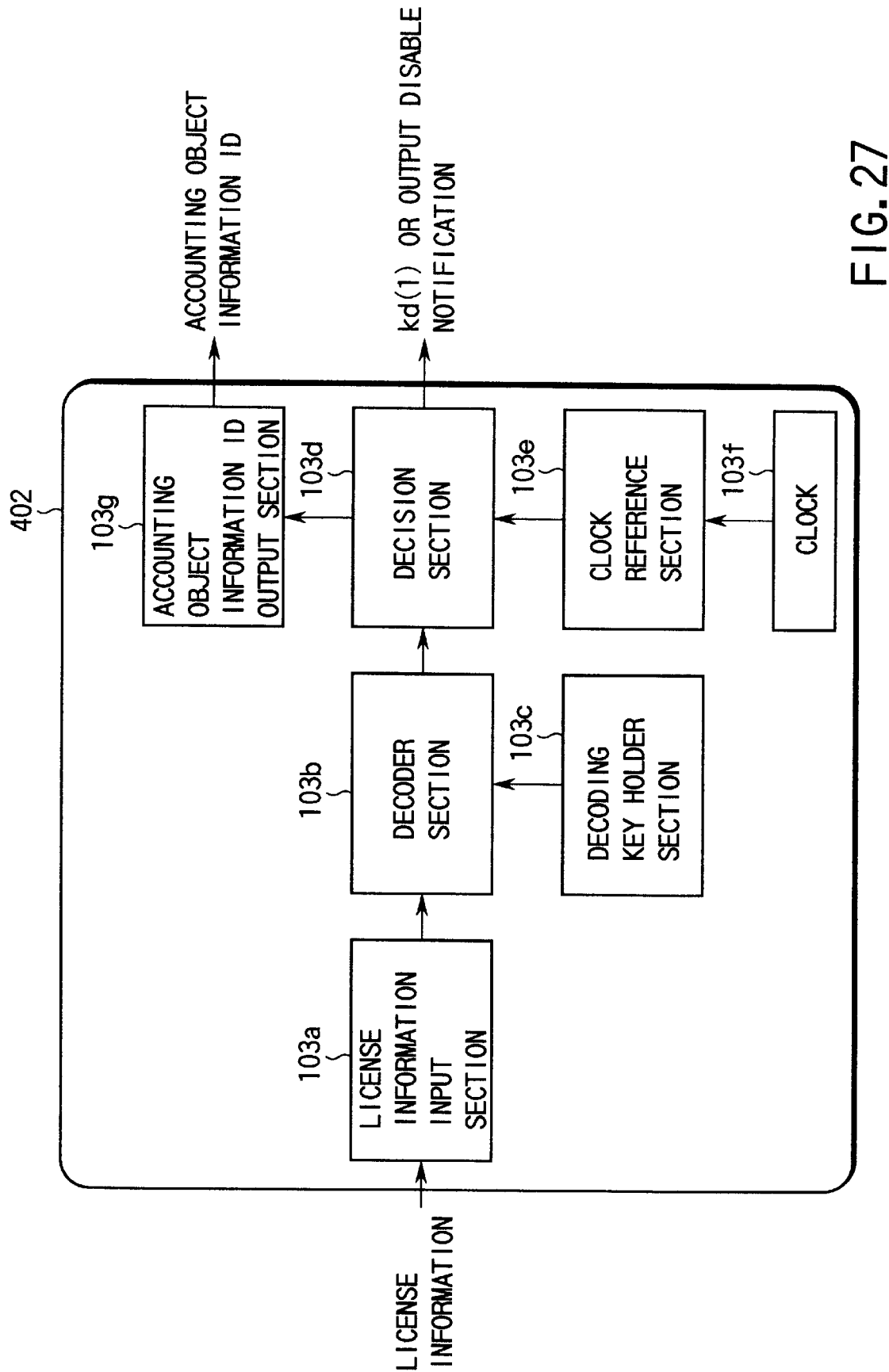
FIG. 27 is a block diagram showing an arrangement of a decoder unit shown in FIG. 26.

FIG. 27 shows an arrangement of the decoder unit 402 shown in FIG. 26. The same reference numerals as in FIG. 9 denote the same parts in FIG. 27. The arrangement shown in FIG. 27 is different from that shown in FIG. 9 in that an accounting object information ID output section 103g for outputting the accounting object information ID included in the license condition is added.

Figure 28:
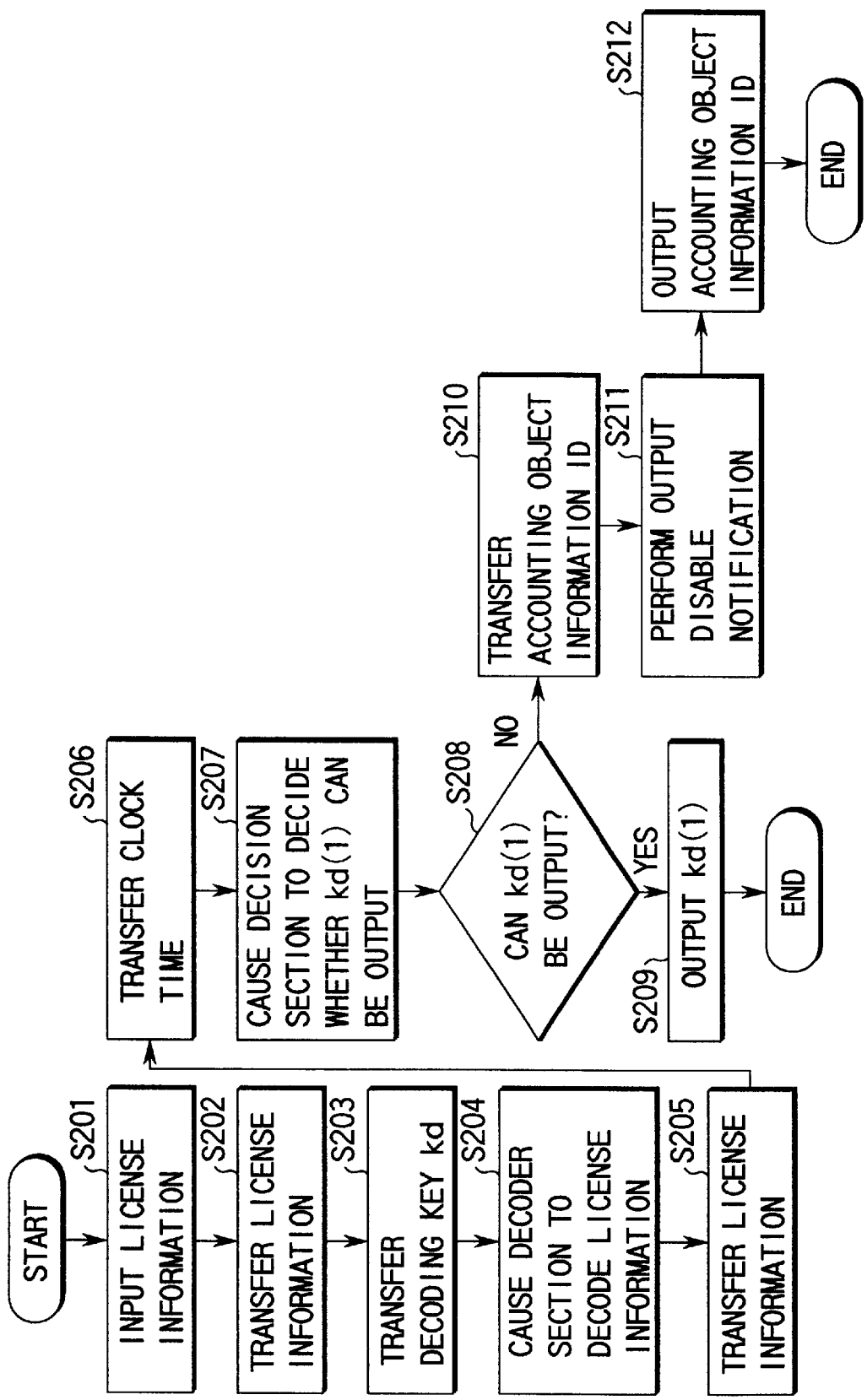
FIG. 28 is a flow chart for explaining the operation of the decoder unit shown in FIG. 27.

The operation of the decoder unit shown in FIG. 27 will be described next with reference to the flow chart shown in FIG. 28. The license information is input to the license information input section 103a of the decoder unit 402 and sent to the decoder section 103b (steps S201 and S202). The decoder section 103b decodes the license information using the decoding key kd held in the decoding key holder section 103c and transfers the decoded license information to the decision section 103d (steps S203 to S205). When clock time is transferred from the clock reference section 103e (step S206), the decision section 103d compares the license condition (expiration date) with the clock time to decide whether the accounting object information can be used (i.e., whether the decoding key kd(1) is to be output to the reproduction section 404). If it is decided that the accounting object information can be used, the decoding key kd(1) is output to the reproduction section 404 (steps S206 to S209). The above operation is the same as that of the decoder unit shown in FIG. 9. On the other hand, if the decision section 103d decides that the accounting object information cannot be used, the accounting object information ID contained in the license condition is transferred to the accounting object information ID output section 103g, and simultaneously, notification representing that the decoding key kd(1) cannot be output is output to the reproduction section 404 (steps S210 and S211). The accounting object information ID output section 103g outputs the accounting object information ID to the license information update client section 403 (step S212).

Figure 29:
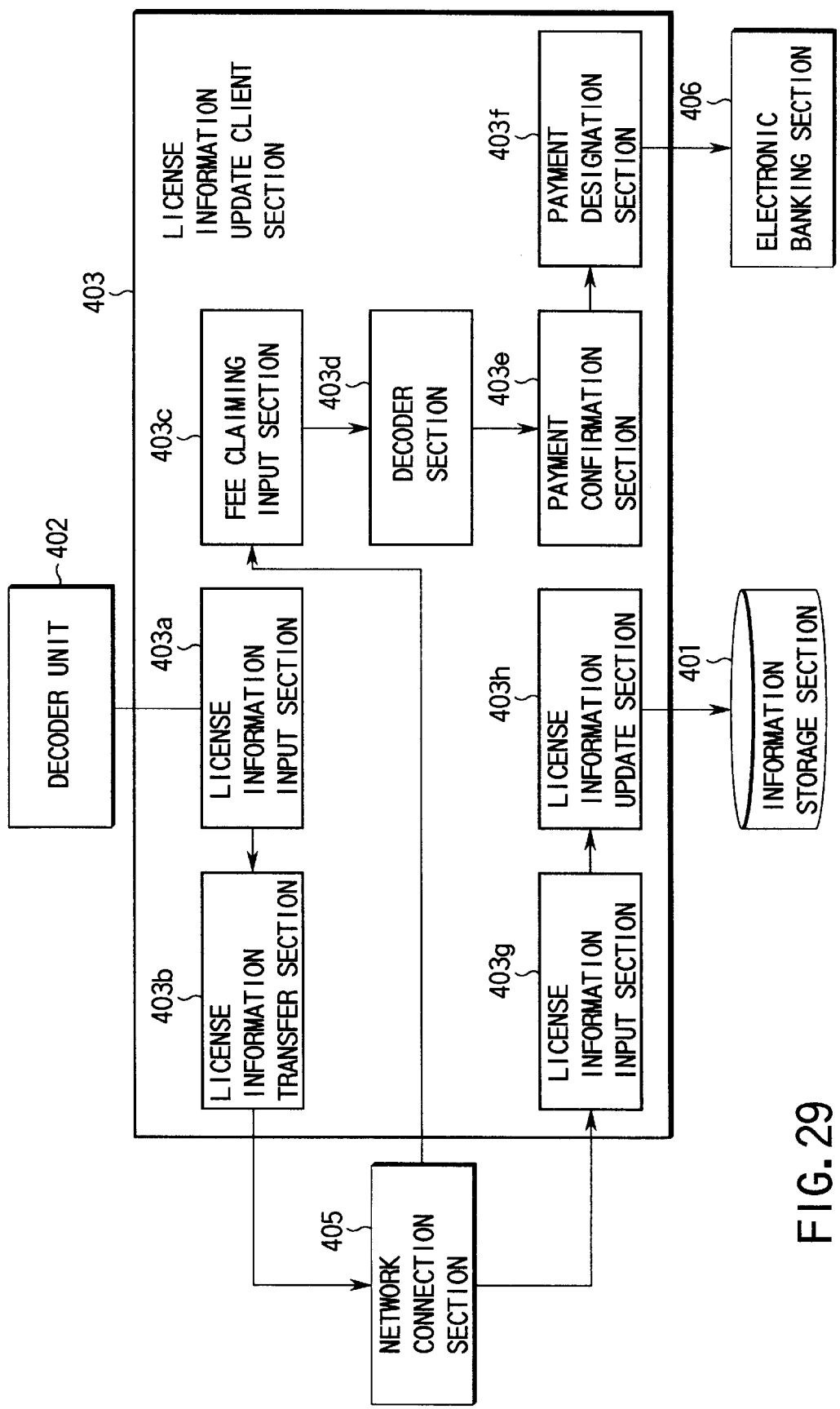
FIG. 29 is a block diagram showing an arrangement of a license information update client section shown in FIG. 26.

The arrangement and operation of the license information update client section 403 will be described next mainly with reference to FIGS. 29 and 30. The accounting object information ID sent from the decoder unit 402 is input to a license information input section 403a (step S221). At this time, license information other than the accounting object information ID may be input to the license information input section 403a. License information containing at least the accounting object information ID is input to the license information input section 403a. The license information input to the license information input section 403a is output to the network connection section 405 through a license information transfer section 403b and then transmitted to a license information update server 407 shown in FIG. 26 (steps S222 and S223). The license information transfer section 403b may encrypt the license information and output it to the network connection section 405.

When an encrypted fee claim (including a field ID) is transmitted from the license information update server 407 shown in FIG. 26 in correspondence with the accounting object information ID, the second information reproducing apparatus receives the encrypted fee claim through the network connection section 405 and transfers the fee claim to a fee claiming input section 403c of the license information update client section 403 (step S224). The encrypted fee claim is also transferred to a decoder section 403d (step S225). The decoder section 403d decodes the encrypted fee claim and transfers it to a payment confirmation section 403e (steps S226 and S227). The payment confirmation section 403e displays the contents of the fee claim on, e.g., a predetermined display device and confirms the user's will about fee payment for use of the accounting object information (step S228).

If the user designates to pay the fee through a predetermined input device, a payment designation section 403f is requested to issue a payment designa5 tion (steps S229 and S230). The payment designation generated by the payment designation section 403f is transmitted to a server 408 of an electronic banking agency through the electronic banking section 406 and then a predetermined network (step S231).

When account payment is confirmed by the server 408 of the electronic banking agency, the license information update server 407 is notified of it. Upon receiving this notification, the license information update server 407 generates new license information by postponing the expiration date, encrypts the new license information, and transmits it to the second information reproducing apparatus. Upon receiving the updated license information through the network connection section 405 of the second information reproducing apparatus, the license information is input to a license information input section 403g in the license information update client section 403 and then transferred to a license information update section 403h (steps S232 and S233). The license information update section 403h overwrites the received license information on the license information of the accounting object information, which has already been recorded on the information storage section 401, thereby updating the license information (step S234).

Figure 31:
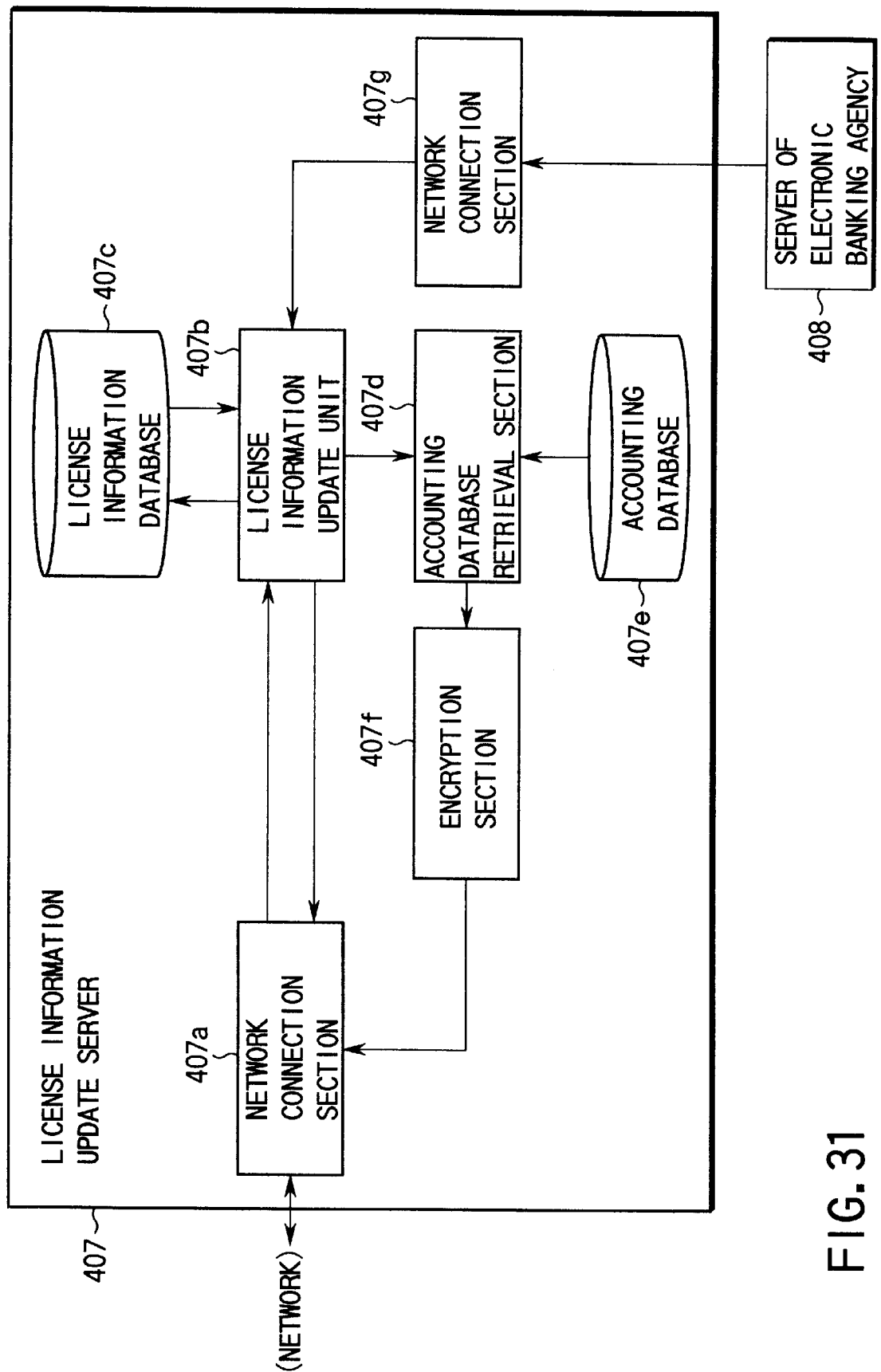
FIG. 31 is a block diagram showing an arrangement of a license information update server shown in FIG. 26.
Figure 32:
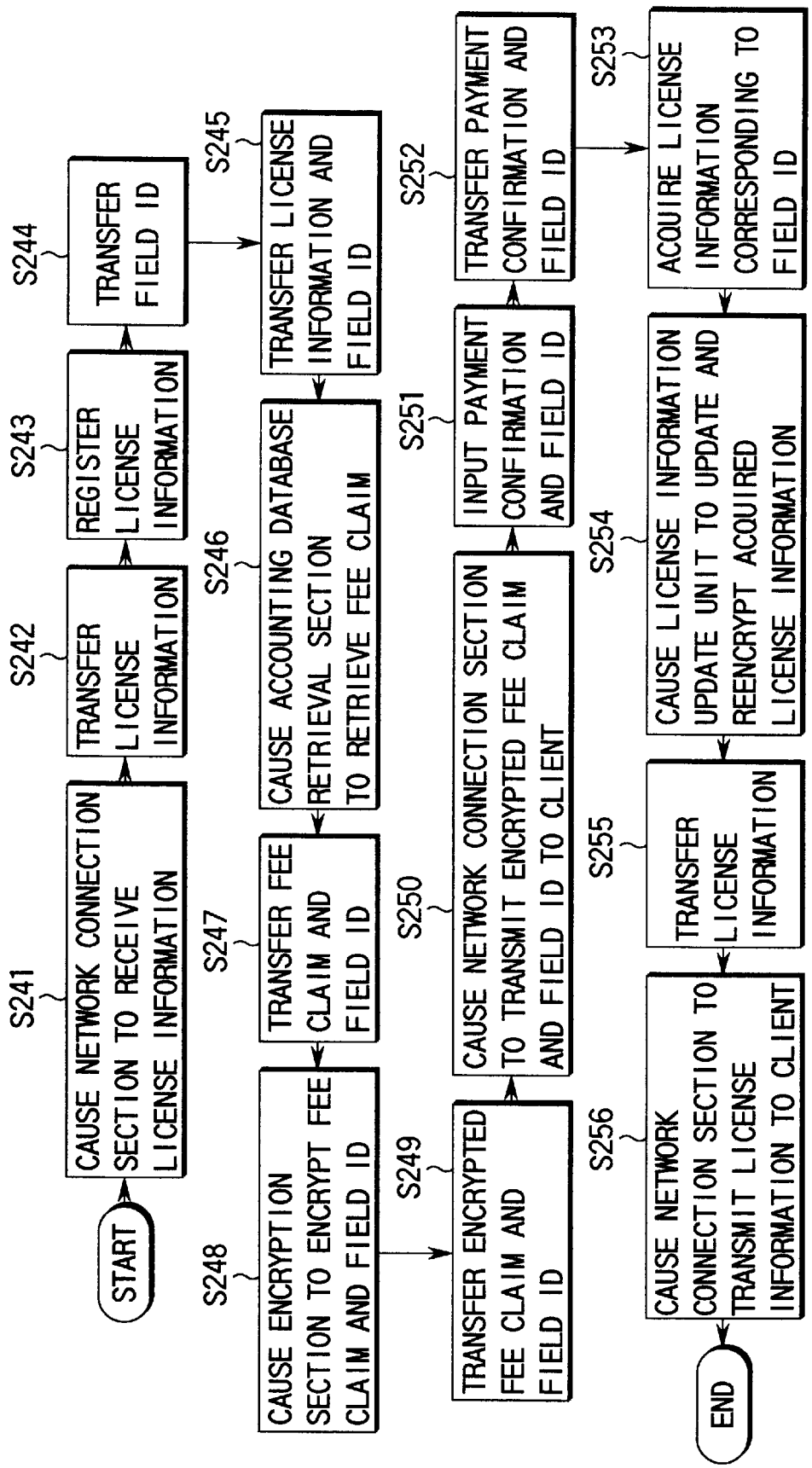
FIG. 32 is a flow chart for explaining the operation of the license information update server shown in FIG. 31.

The arrangement and operation of the license information update server 407 will be described next with reference to FIGS. 31 and 32. The license information transmitted from the second information reproducing apparatus in step S223 in FIG. 30 is received by a network connection section 407a in the license information update server 407 and transferred to a license information update unit 407b (steps S241 and S242 in FIG. 32). The license information is decoded, as needed, and the decoded license information is registered in a license information database 407c (step S243). At this time, the license information database 407c adds a field ID to the license information to manage the license information update history. The license information update unit 407b is also notified of this field ID. An accounting database retrieval section 407d searches an accounting database 407e on the basis of the accounting object information ID contained in the license information to generate a fee claim (steps S244 to S246).

Figure 33:
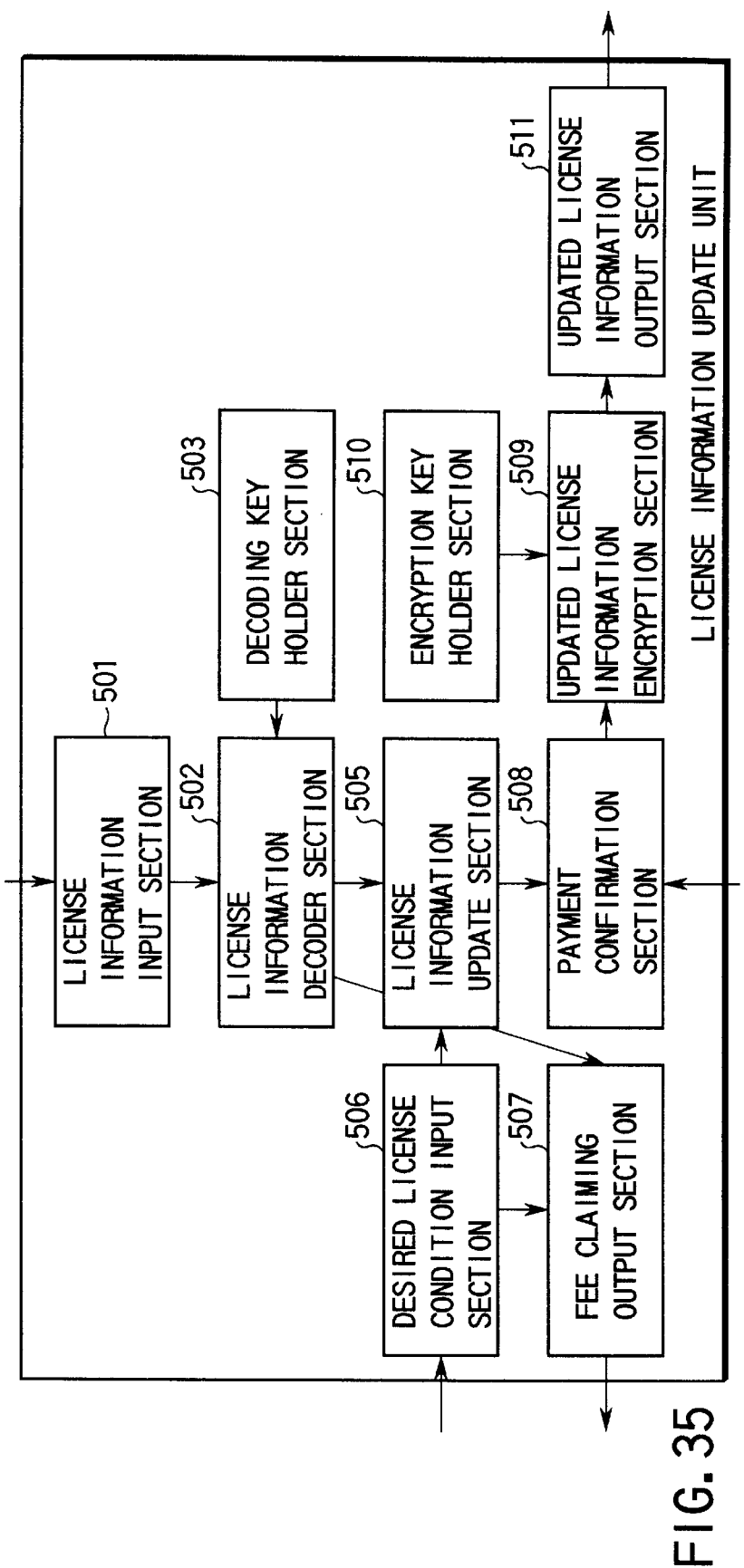
FIG. 33 is a view showing an example of contents of fee claiming for use of accounting object information output from the license information update server.

As the contents of the fee claim, the accounting object information ID, the fee to be paid for use of the accounting object information (fee corresponding to the expiration date), a fee payment destination, and the like are described, as shown in FIG. 33.

The generated fee claim is transferred to an encryption section 407f together with the field ID, encrypted, transferred to the network connection section 407a, and then transmitted to the second information reproducing apparatus through the network (steps S247 to S250). The encrypted fee claim and field ID are received by the second information reproducing apparatus and subjected to processing from step S224 in FIG. 30.

Figure 30:
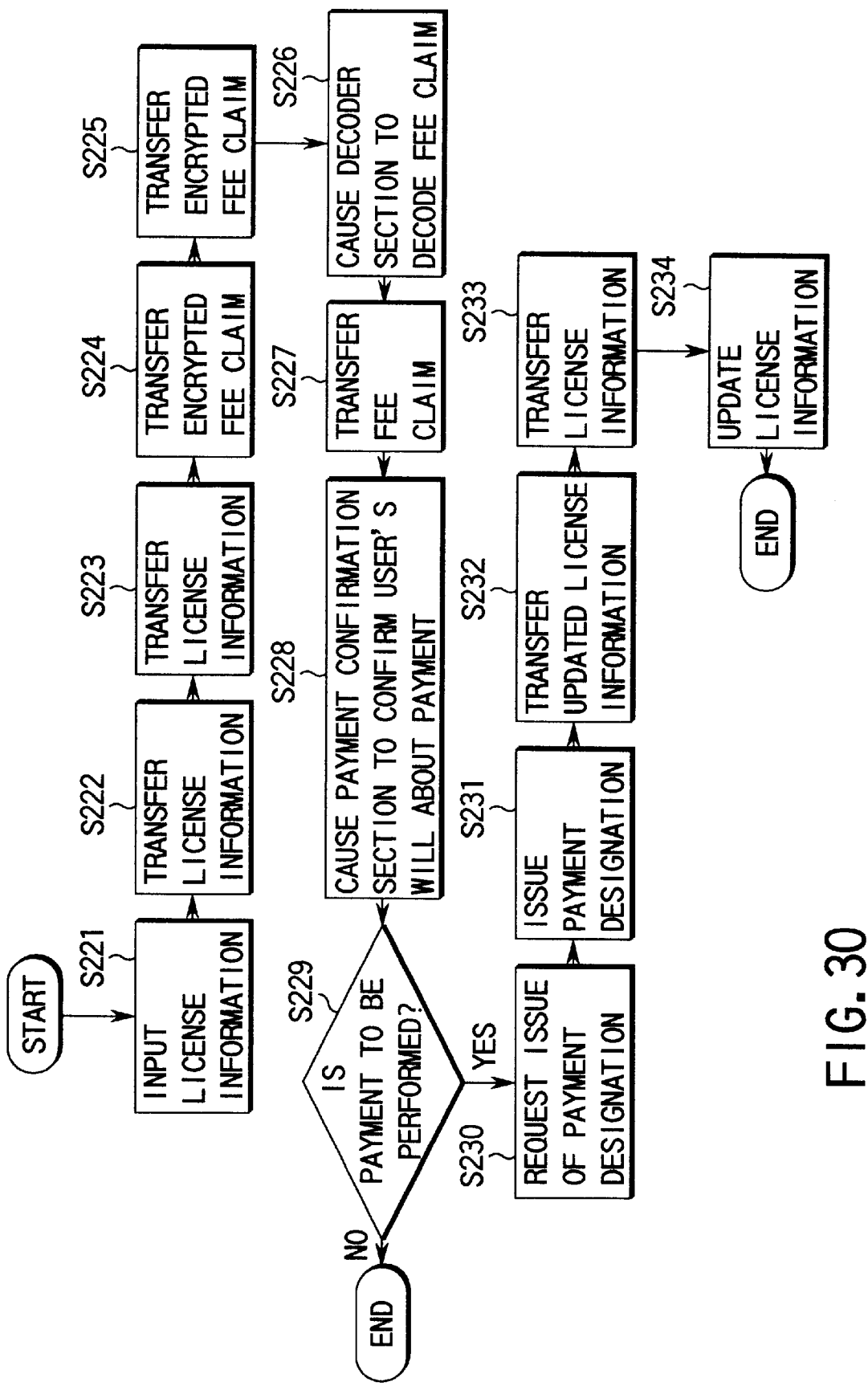
FIG. 30 is a flow chart for explaining the operation of the license information update client section shown in FIG. 29.

In the second information reproducing apparatus, payment for use of the accounting object information is performed by issuing a payment designation in step S231 in FIG. 30. When the fee claim presented for the user has contents as shown in FIG. 33, the contents of the payment designation are described as, e.g., "10 yen/week for "ABCD" to abc, reference number: field ID", and payment is performed through the electronic banking section 406. The reference number is the field ID added to the license information. The server 408 of the electronic banking agency which has received the payment designation performs payment processing and then sends a payment confirmation to the license information update server 407 together with a specification "10 yen/week for "ABCD" from A to abc, reference number: field ID". In this case, A is the user ID.

When the license information update server 407 receives the payment confirmation through a network connection section 407g, the license information update unit 407b searches the license information database 407c for license information to be updated, on the basis of the reference number, i.e., the field ID (steps S251 to S253). The license information update unit 407b updates the license condition in the license information with reference to the payment confirmation, encrypts the license information (step S254), and transmits the encrypted license information to the second information reproducing apparatus through the network connection section 407a (steps S255 and S256).

The fee claim to be transmitted from the license information update server to the second information reproducing apparatus is encrypted due to the following reason. The communication path used to transmit the fee claim is a public line such as the Internet, and generally, security therefor is not guaranteed. For this reason, the fee claim may be changed, and the user may pay the fee for a wrong destination. The fee claim is encrypted to prevent this.

Figure 34:
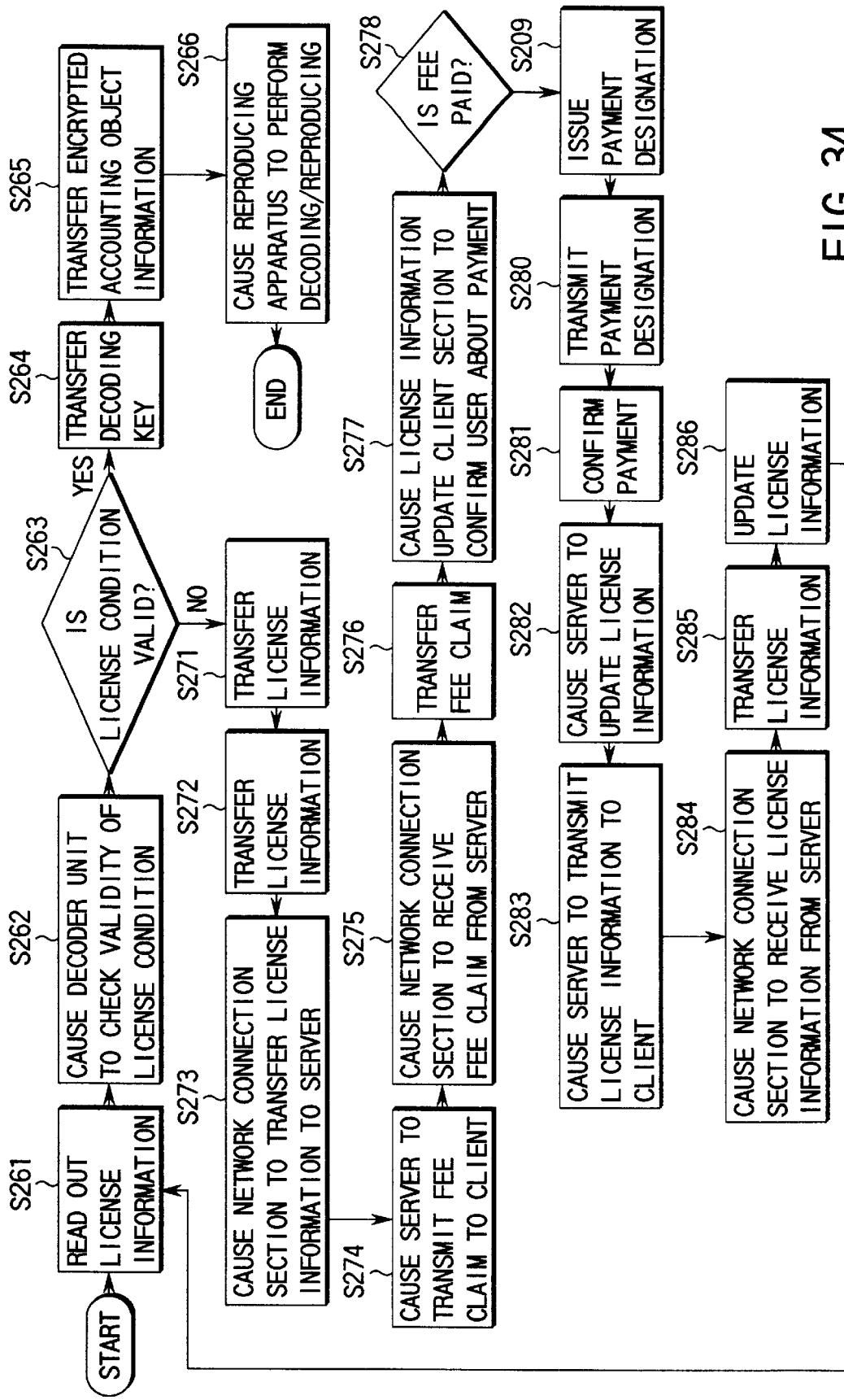
FIG. 34 is a flow chart for explaining the operation of the entire system (the server and the client communicating with each other through the network) shown n FIG. 26.

FIG. 34 is a flow chart for explaining the operation of the entire system including the second information reproducing apparatus shown in FIG. 26. The reference numerals (steps S261 to S286) in FIG. 34 correspond to those in FIG. 26, and a detailed description thereof will be omitted.

(3) License Information Update Unit

A license information update unit will be described next. The license information update unit mainly updates the license condition in license information. For example, the license information update unit can be used as an independent unit to update license information recorded on the information storage section by the first information recording apparatus together with accounting object information. To update the license information, the license information update unit must cancel (decode) encryption of the license information, input a desired license condition which has been newly input, confirm whether payment for the license condition has been done, and then, encrypt the license information, and output it as updated license information.

FIG. 35 shows an arrangement of the license information update unit. The arrangement and operation of the license information update unit shown in FIG. 35 will be described below with reference to the flow charts shown in FIGS. 36 and 37.

Figure 37:
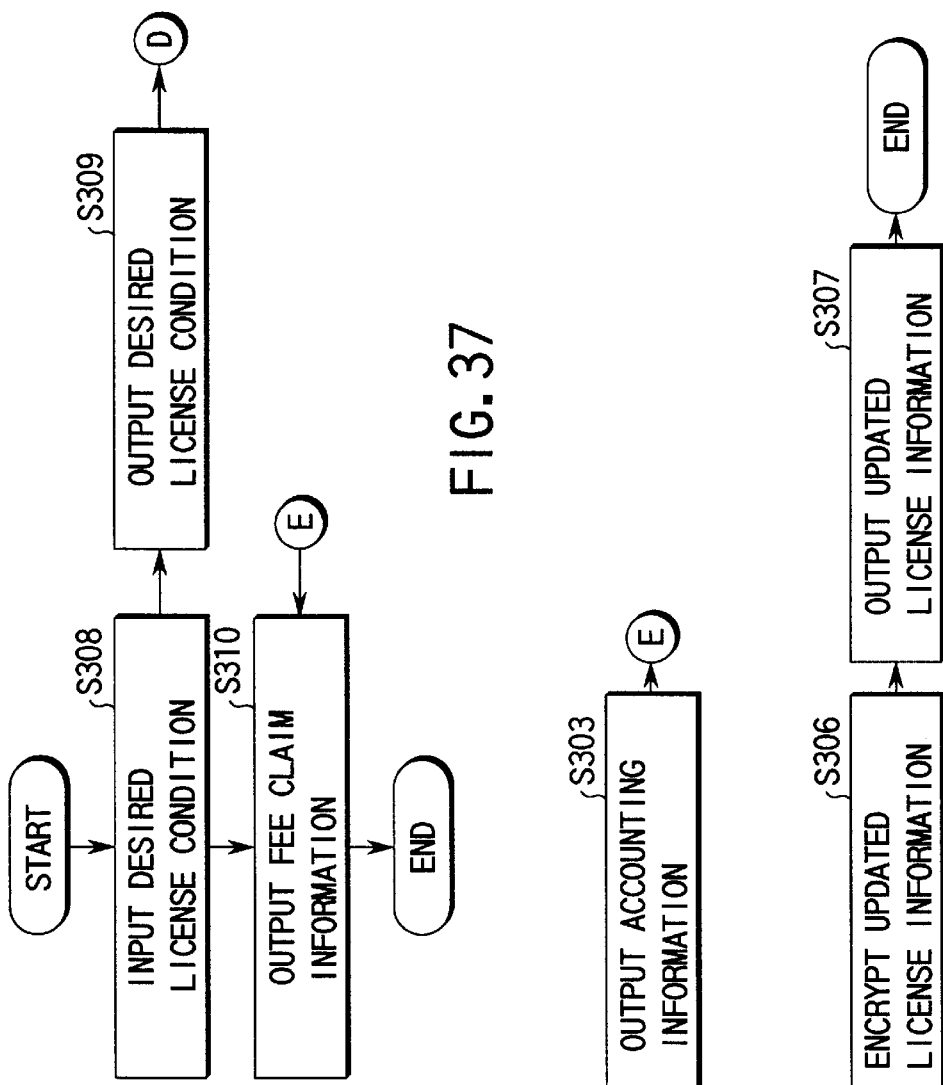
FIG. 37 is a flow chart for explaining the operation of the license information update unit shown in FIG. 35.
Figure 36:
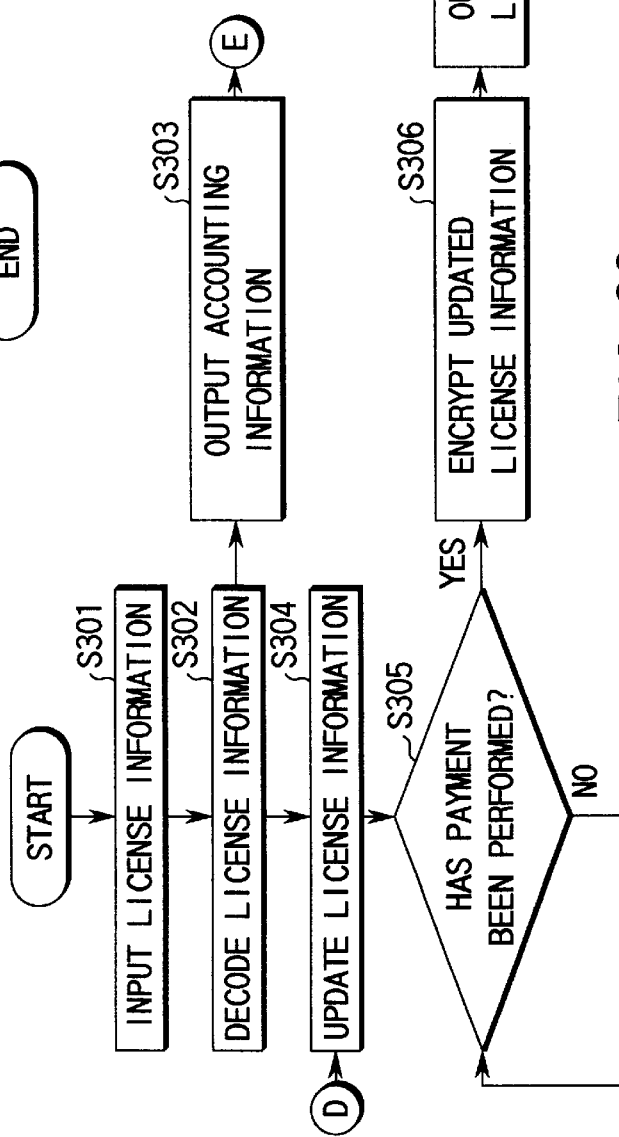
FIG. 36 is a flow chart for explaining the operation of the license information update unit shown in FIG. 35.

In license information update processing, first, license information is input to a license information input section 501, and a desired license condition is input to a desired license condition input section 506 (step S301 in FIG. 36 and step S308 in FIG. 37). In this case, the license information is constituted by the license condition and the decoding key kd(1) of the encrypted accounting object information, which have been described with reference to the first information recording apparatus. The desired license condition means the license condition of a user's choice and is input from the user side through an appropriate interface.

The license information input to the license information input section 501 is decoded by a license information decoder section 502 using the decoding key held in a decoding key holder section 503 (step S302 in FIG. 36) to separate the license condition and the accounting information decoding key from each other such that the license information (especially the license condition) can be updated, and simultaneously, information necessary for charging, such as an accounting object information ID, is sent to a fee claiming output section 507 (step S303 in FIG. 36 and step S310 in FIG. 37). The license information which can be updated is rewritten by a license information update section 505 to the license condition input by the desired license condition input section 506 (step S304 in FIG. 36). To charge for the desired license condition, the desired license condition input section 506 outputs the desired license condition to the fee claiming output section 507 to prompt to charge for the input desired license condition. The fee claiming output section 507 outputs, outside the apparatus, the desired license condition input from the desired license condition input section 506 and the information necessary for accounting, such as the accounting object information ID, input from the license information decoder section 502 on the basis of a predetermined protocol (step S310 in FIG. 37). In response to this output, the external apparatus starts the accounting procedure. The fee claiming information to be output is determined by the usage environment of the information distribution system (i.e., the information distribution system constituted by the information recording apparatus and the information reproducing apparatus of the present invention) for protection by copyright and accounting, which incorporates the license information update unit. If the copyright holder of the accounting object information has been specified, the accounting object information ID need not be output. If the license condition has been set for all accounting object information in advance, the desired license condition input section 506 can be omitted, and the license condition need not be output from the fee claiming output section 507. As described above, the license information update unit of this embodiment takes some self-explanatory variations depending on its usage environment.

Upon completing fee payment for the fee claiming information, a payment confirmation signal is sent from the external apparatus to a payment confirmation section 508. When this signal is sent, the updated license information input from the license information update section 505 is sent to an updated license information encryption section 509 so the license information is encrypted using a predetermined encryption key held in an encryption key holder section 510 (steps S305 and S306 in FIG. 36). At this time, the updated license information is not sent to the updated license information encryption section 509 unless the signal is received. With this function, the license information update unit of this embodiment prevents the updated license information from being output when payment has not been performed yet.

The updated license information encrypted by the updated license information encryption section 509 is sent to an updated license information output section 511 and output to the external apparatus (step S307). In this case, the accounting object information ID means the ID of the accounting object information, which represents the copyright holder of the information and is necessary for specifying to the accounting amount or the accounting target.

The license information update unit shown in FIG. 35 can be applied not only to update the license information recorded on a recording medium or the like by the above-mentioned first information recording apparatus but also to update license information recorded on a recording medium or the like by the second or third information recording apparatus as a modification of the first information recording apparatus.

The license information update unit shown in FIG. 35 can be used as an independent unit, combined with the information reproducing apparatus of the present invention, or incorporated in the information reproducing apparatus. Alternatively, the license information update unit can be used as the license information update unit 407b in the license information update server shown in FIG. 31.

(4) Accounting Apparatus for Protection by Copyright

Figure 38:
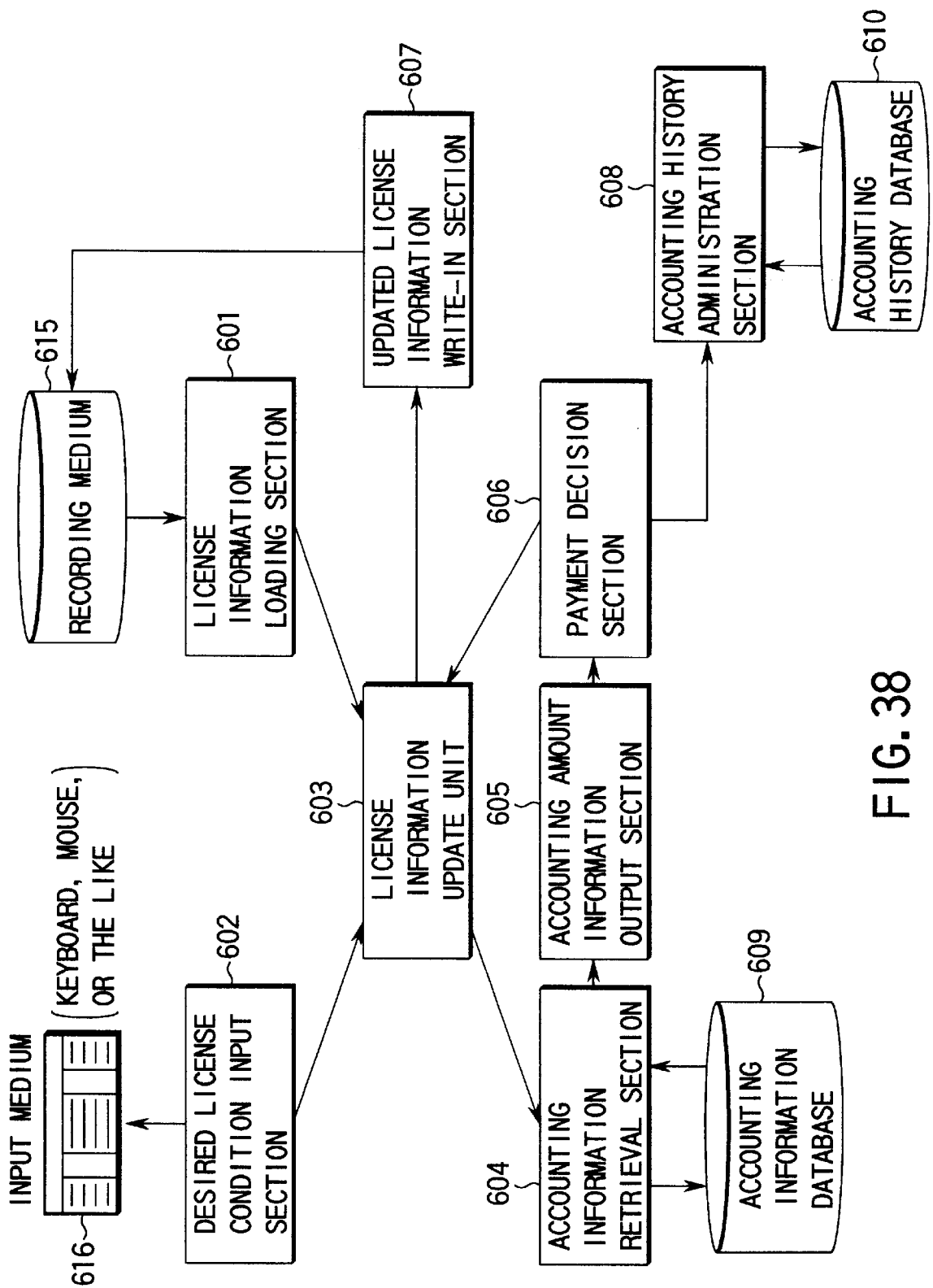
FIG. 38 is a block diagram showing an arrangement of an accounting apparatus for charging for use of accounting object information.

FIG. 38 shows an arrangement of the main part of an accounting apparatus for performing accounting for protection by copyright on the basis of license information recorded on a recording medium or the like by the above-described information recording apparatus.

Referring to FIG. 38, license information is loaded from a recording medium 615 such as a magnetic disk, a DVD, or a CD by a license information loading section 601. Simultaneously, a desired license condition is input from a desired license condition input section 602 through an input medium 616 such as a keyboard or a mouse. The license information and the desired license condition are input to a license information update unit 603 and subjected to the same license information update processing as in the above-described license information update unit so that accounting information as a fee claim is sent to an accounting information retrieval section 604. The accounting information is necessary for specifying the desired license condition and accounting target. The accounting information retrieval section 604 searches an accounting information database 609 for accounting amount information on the basis of the accounting information. If the accounting amount has been determined in advance, the desired license condition need not be output from the license information update unit 603, and the accounting amount itself can be output. In this case, accounting information retrieval need not be performed. If the copyright holder of the accounting object information has been specified, the accounting information such as an accounting object information ID need not be output from the license information update unit 603. In this case, an accounting history administration section 608 need to administer only the accounting amount information and not the accounting object information ID. As described above, the accounting information to be output from the license information update unit 603 takes self-explanatory variations depending on the situation of application of the accounting apparatus.

The accounting information and accounting amount information are sent to an accounting amount information output section 605, so the accounting amount is presented to the user. When the user pays the presented account by some method, a payment decision section 606 confirms the payment and sends a signal confirming the payment to the payment confirmation section 508 in the license information update unit. If the user is to pay the fee in cash, a note/coin insertion section and a decision section are arranged, and a signal is sent to the payment decision section 606 in accordance with decision by the decision section. The payment is done by various methods using an electronic money, a credit card, or a prepaid card, so the decision is also made by various methods.

If the payment decision section 606 decides that payment is complete, the payment decision section 606 sends the accounting information to the accounting history administration section 608 such that the accounting information is stored and administered.

It is assumed that the accounting apparatus of this embodiment is not connected to an external apparatus through a network or the like, so banking is not complete at that point. For this reason, in this embodiment, the method of distributing such payment must be administered, so the accounting history administration section 608 is required. The history information stored in the accounting history administration section 608 is periodically read by a predetermined administrator, so the banking is performed by an appropriate section.

Finally, the license information update unit 603 which has received the signal representing completion of payment from the payment decision section 606 outputs the updated license information to an updated license information write-in section 607 through the same procedure as that in the above-described license information update unit. The write-in section 607 writes the updated license information at an appropriate portion of the input recording medium 615.

When the accounting apparatus of this embodiment is combined with the information reproducing apparatus of the present invention, a vending machine for information with a copyright, which has a so-called license information update function, can be realized. As a characteristic feature, the characteristic function of the present invention is realized in one machine. With this arrangement, when accounting object information with a copyright is to be rented or sold, and it is assumed that the (encrypted) accounting object information has already been input to a portable recording medium such as a DVD or CD, appropriate accounting processing can be performed by inserting the recording medium in the accounting apparatus of this embodiment, so anyone is allowed anytime to conveniently buy the license for the contents.

(4-1) License Information Update Unit Taking Measure for Preventing Illicit Copy of Accounting Object Information and Decoder Unit in Information Reproducing Apparatus Corresponding to the License Information Update Unit As can be easily understood, when permanent use of accounting object information with a copyright or a very late expiration date is permitted, the storage medium itself may be copied. If copies are distributed in a large volume, the copyright cannot be protected. To solve this problem, when permanent use or a long-term expiration date is to be permitted as a license condition, the decoder unit and license information update unit of this embodiment exclusively allow one incorporated decoder unit to reproduce the accounting object information. In the following description, a "definite license" or "permanent license" includes permission of permanent use or a long-term expiration date (this also applies to a description of (4-2) and the like). With this arrangement, even when a different decoder unit is used, the use is refused. Copies of information yield no benefit, and accordingly, the copyright is protected. In this case, however, the permanent license of accounting object information cannot be purchased without knowing the decoder unit ID (ID which specifies a decoder unit). For this reason, as the characteristic feature of the license information update unit of this embodiment, the decoder unit ID is added to the license condition at the first use of permanent license purchase contents. The decoder unit ID is identification information for identifying a decoder unit and can be, e.g., the manufacturing number of the decoder unit.

Figure 39:
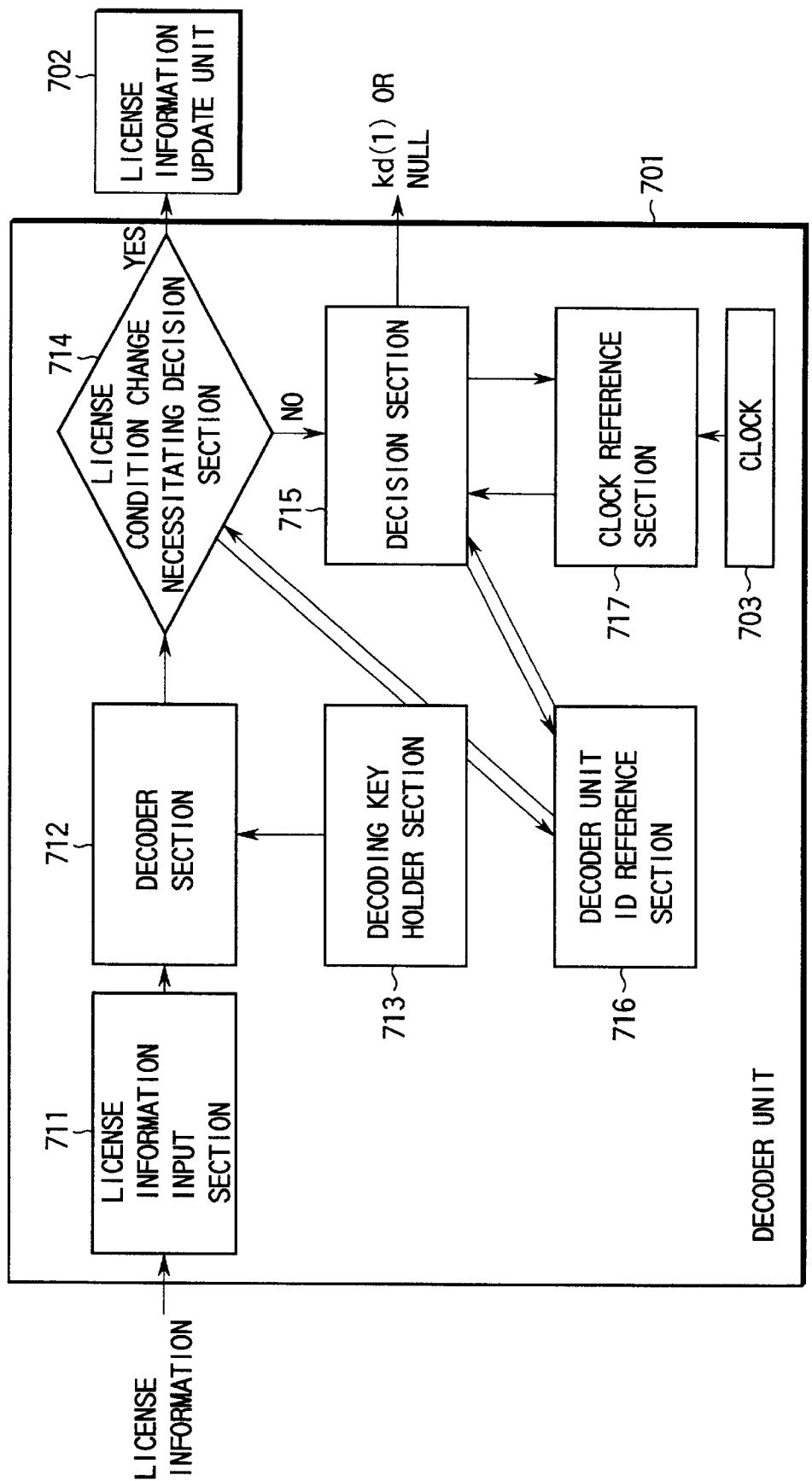
FIG. 39 is a block diagram showing an arrangement of a decoder unit in an information reproducing apparatus with a measure for an illicit copy of accounting object information (decision is made on the basis of a decoder unit ID)
Figure 40:
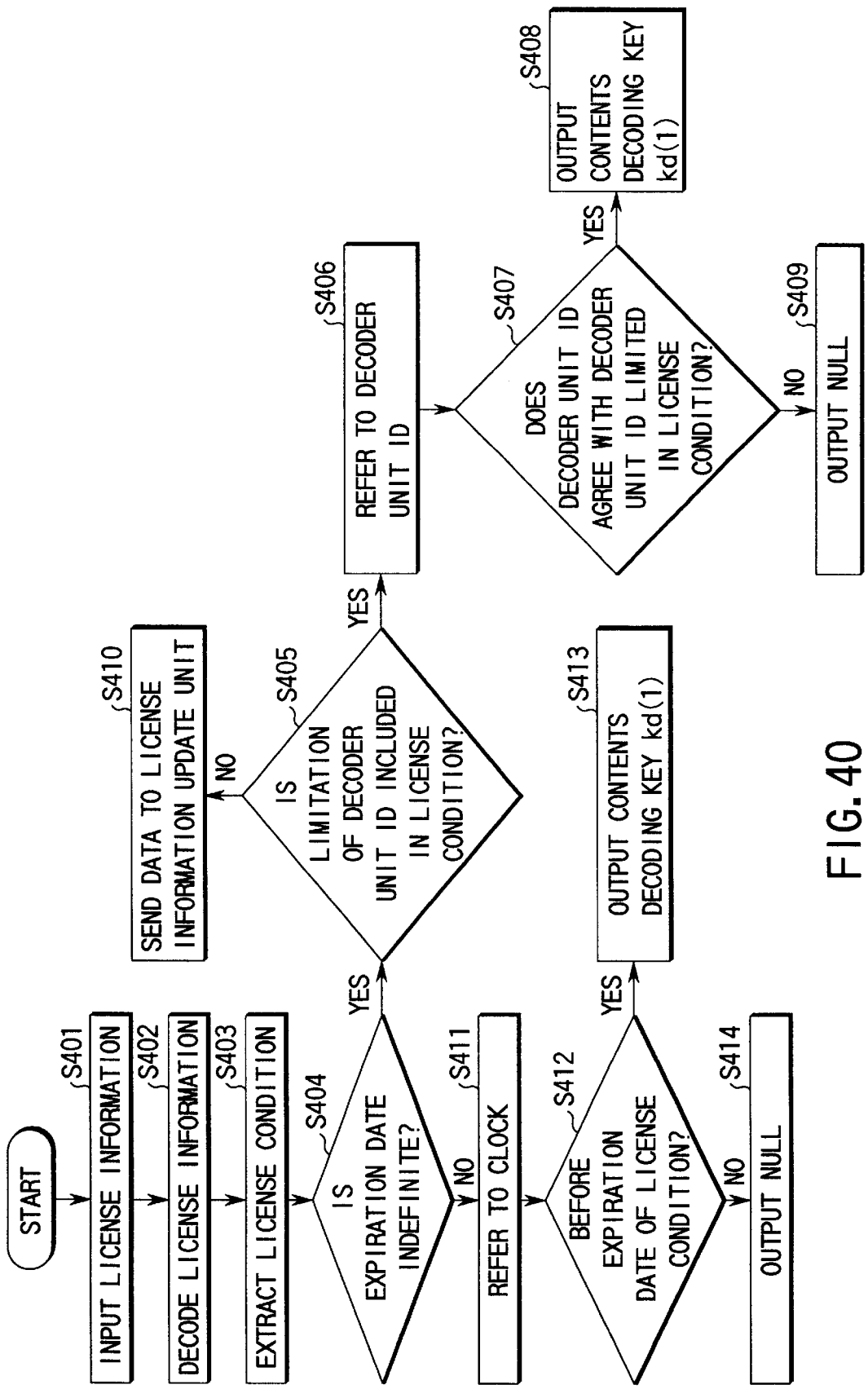
FIG. 40 is a flow chart for explaining the operation of the decoder unit shown in FIG. 39.

FIG. 39 shows an arrangement of the decoder unit of this embodiment. The arrangement and operation of a decoder unit 701 will be described below with reference to the flow chart shown in FIG. 40.

When license information is input from a license information input section 711 (step S401), the license information is sent to a decoder section 712. The decoder section decodes the license information using a decoding key held in a decoding key holder section 713 (step S402). The decoded license information is sent to a license condition change necessitating decision section 714 (step S403). When the expiration date in the license condition is indefinite, the decision section 714 decides whether the expiration date is limited to a specific decoder unit ID. If the expiration date is not limited to a specific decoder unit ID, the decision section 714 decides that the license condition need be changed and causes a license information update unit 702 to update the license condition. More specifically, the decision section 714 receives the decoded license information, loads the license condition from the license information, and decides whether the expiration date is indefinite (step S404). If YES in step S404, it is decided whether the license condition is limited to a decoder unit ID (step S405). If YES in step S405, the license condition is sent to a decision section 715. The decision section 715 sends a designation for presenting the decoder unit ID to a decoder unit ID reference section 716 (step S406). The decoder unit ID presented by the reference section 716 is compared with the decoder unit ID described in the license condition (step S407). If the decoder unit IDs agree with each other, the decoding key kd(1) of the encrypted accounting object information (contents) is output, and processing is ended (step S408). If the decoder unit IDs do not agree with each other, e.g., a NULL code (the NULL code is normally set at "0") is output to indicate that decoding is disabled, and processing is ended (step S409). If the expiration date is indefinite, and no decoder unit ID is described in the license condition, the license condition change necessitating decision section 714 decides that the decoder unit ID need be described in the license condition, acquires the decoder unit ID from the decoder unit ID reference section 716, and sends the acquired decoder unit ID and the encrypted license information to the license information update unit 702 (step S410).

If the license condition is not indefinite (NO in step S404), the license condition is sent to the decision section 715. The decision section 715 receives the current time from a clock reference section 717 (step S411) and decides on the basis of the time whether the accounting object information can be used. If use of the accounting object information is enabled, the decoding key kd(1) of the encrypted accounting object information (contents) is output, and processing is ended (steps S412 and S413); otherwise, the NULL code is output, as described above, and processing is ended (step S414).

Figure 41:
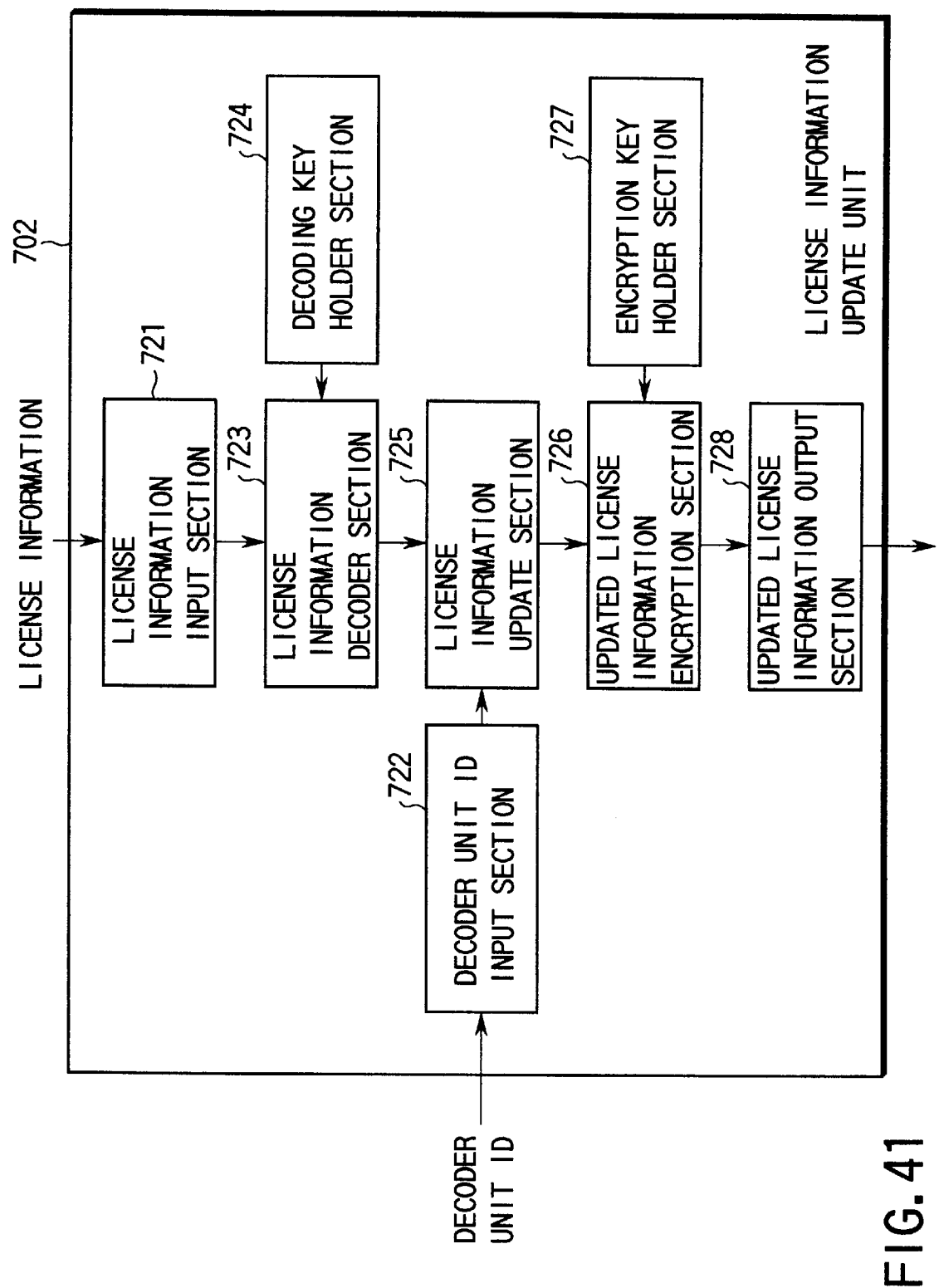
FIG. 41 is a block diagram showing an arrangement of a license information update unit with a measure for an illicit copy of accounting object information.
Figure 42:
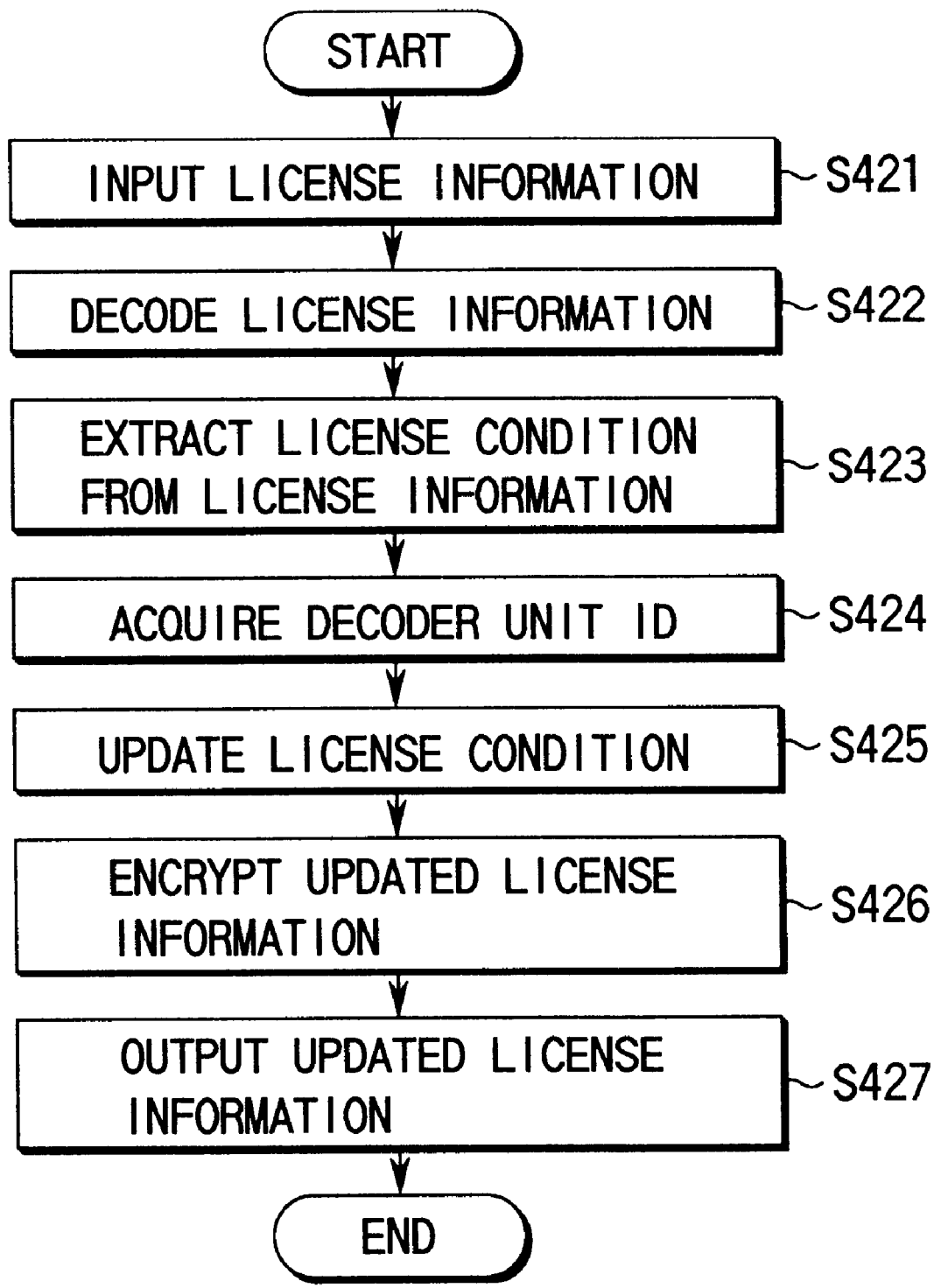
FIG. 42 is a flow chart for explaining the operation of the license information update unit shown in FIG. 41.

FIG. 41 shows an arrangement of the license information update unit 702. The arrangement and operation of the license information update unit 702 shown in FIG. 41 will be described below with reference to the flow chart shown in FIG. 42.

The license information update unit 702 sends license information input to a license information input section 721 to a license information decoder section 723. The license information decoder section 723 decodes the information on the basis of the decoding key from a decoding key holder section 724 (steps S421 and S422). The decoded license information is sent to a license information update section 725 to extract the license condition (step S423). On the other hand, the decoder unit ID input to a decoder unit ID input section 722 is sent to the license information update section 725 (step S424). The license information update section 725 adds a limitation of the decoder unit ID to the extracted license condition, thereby updating the license condition (step S425). New license information is generated on the basis of the updated license condition and sent to an updated license information encryption section 726. The updated license information encryption section 726 encrypts the updated license information on the basis of the encryption key presented by an encryption key holder section 727 (step S426) and then sends the license information to an updated license information output section 728, so the license information is sent outside the license information update unit 702 (step S427).

The license information update unit 702 and the decoder unit 701 may be integrated into one unit and replaced with, e.g., the license information update unit 603 in the information distribution system shown in FIG. 38.

(4-2) Another Example of Decoder Unit Taking Measure for Preventing Illicit Copy of Accounting Object Information As described above in (4-1), when permanent license or a long-term expiration date (these two cases will be included in the category of permanent license hereinafter) is permitted, the accounting object information may be copied, and protection by copyright cannot be ensured. This problem is substantially solved by using the license information update unit described in (4-1) and the decoder unit corresponding to the license information update unit. That is, use of accounting object information for which permanent license is permitted is limited to one decoder unit ID. As a problem in this case, the decoder unit ID of the purchaser may be unknown in purchasing the permanent license. In the second decoder unit to be described below, when accounting object information with permanent license is used for the first time, the decoder unit ID to be used is written in the portion where the permanent license is described to prevent use of other decoder unit IDs.

In this scheme, however, the accounting object information may be copied before the first use. If an enormous volume of the copied accounting object information with the permanent license is distributed, the copyright cannot be protected. For this reason, in the second decoder unit, a media ID is added to the permanent license and referred to before use. The media ID means the manufacturing number of a DVD or CD. It is generally assumed that the media ID is written in a ROM area to prevent the ID from being changed. Since this license condition is limited to a specific media ID, a copy on another medium cannot be used because the media ID on the copy side does not match the original media ID.

Figure 43:
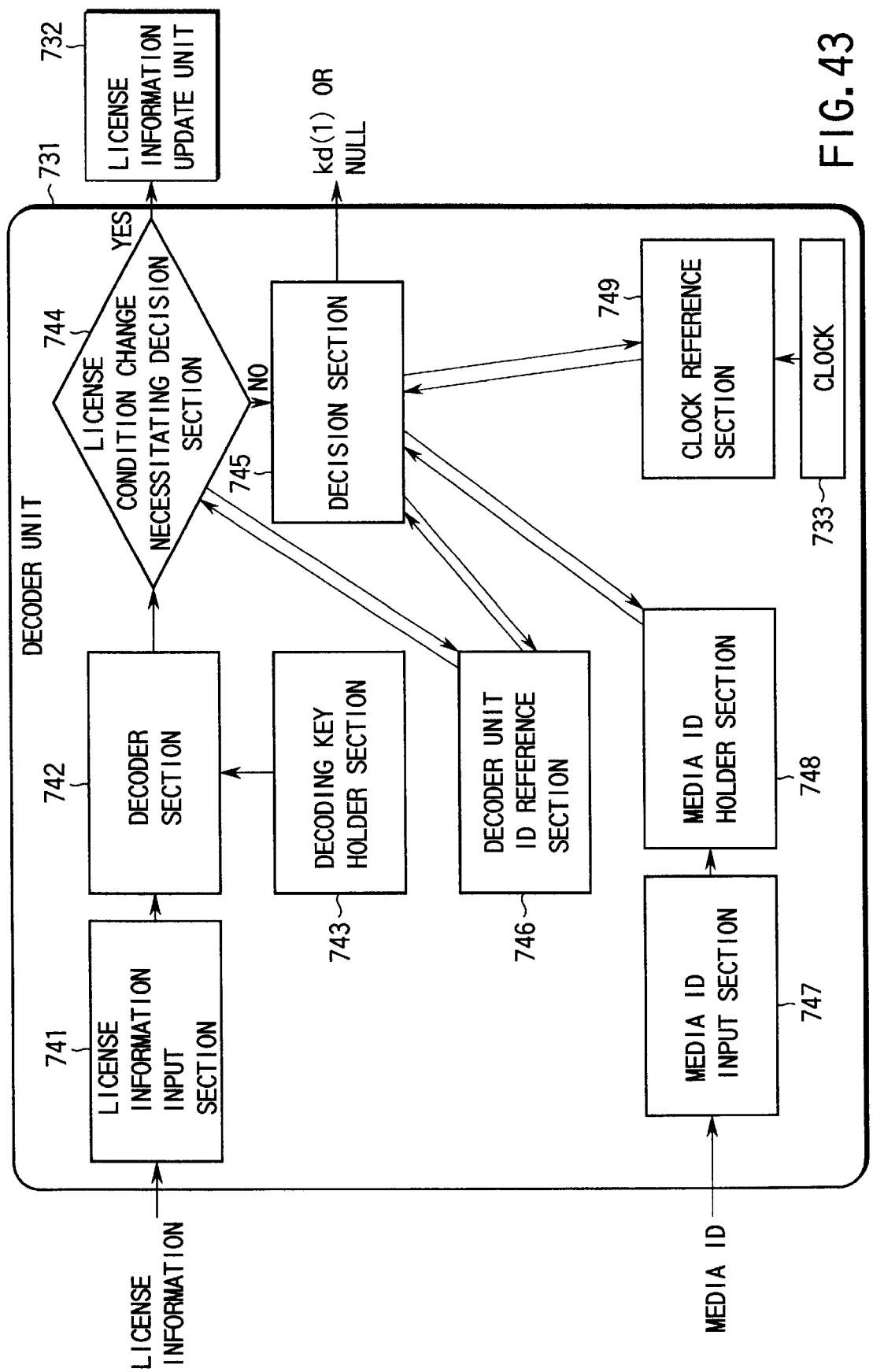
FIG. 43 is a block diagram showing another arrangement of the decoder unit with a measure for an illicit copy of accounting object information (decision is made on the basis of a decoder unit ID and medium ID)
Figure 44:
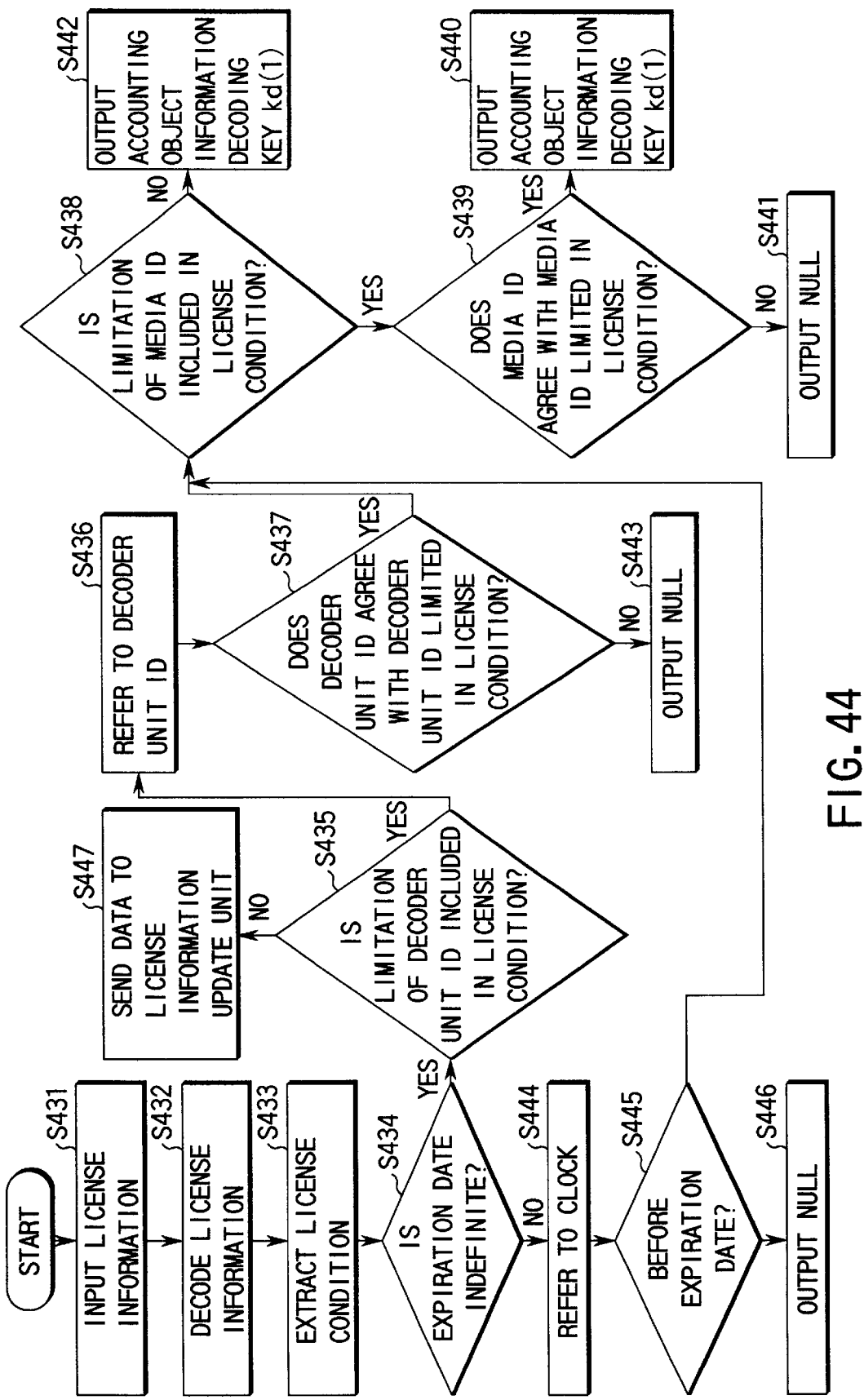
FIG. 44 is a flow chart for explaining the operation of the decoder unit shown in FIG. 43.

FIG. 43 shows an arrangement of the second decoder unit. The arrangement and operation of the second decoder unit shown in FIG. 43 will be described below with reference to the flow chart shown in FIG. 44.

License information is input to a license information input section 741 and sent to a decoder section 742 (step S431).

The decoder section 742 decodes the license information using a decoding key held in a decoding key holder section 743 to separate the license condition from the remaining information (step S432). The separated license condition is sent to a license condition change necessitating decision section 744 to decide whether the limitation of the decoder unit ID is to be added to the license condition. More specifically, as described in (4-1), if the expiration date is indefinite, and the decoder unit ID is not limited to a specific decoder unit, the limitation of the decoder unit ID must be added to the license condition. Only in such a case, it is decided that the license condition need be changed. The decoder unit ID is acquired from a decoder unit ID reference section 746 and sent to a license information update unit 732 together with the extracted license information (steps S434, S435, and S447). Otherwise, the license condition information is sent to a decision section 745 to decide the license condition.

The decision section 745 performs the following processing to decide whether the license condition is valid. If the license condition contains an indefinite expiration date, and the decoder unit ID is limited to a specific decoder unit, it is decided whether the license condition contains a limitation of the media ID. If the license condition contains the limitation of the media ID, the media ID of the medium having the accounting object information, which is held in a media ID holder section 748, is referred to and compared with the media ID as the limitation in the license condition. If both the media IDs coincide with each other, the decoding key kd(1) is output, and processing is ended (steps S434 to S440). If the media IDs do not coincide with each other, a signal representing that the use is refused, e.g., a NULL code is output, and processing is ended (step S441). If the limitation of the media ID is absent (NO in step S438), the decoding key kd(1) is output, and processing is ended (step S442). The media ID to be referred to at this time is input from a media ID input section 747 and held in the media ID holder section 748.

If the license condition has a definite expiration date (NO in step S434), the current time is referred to through a clock reference section 749 (step S444) to decide whether the time is within the period (step S445). If NO in step S445, a signal representing that the use is refused, e.g., a NULL code is output, and processing is ended (step S446). If YES in step S445, the flow advances to step S438 to decide whether the license condition contains the limitation of the media ID. The validity of the license condition is decided using the same algorithm as in case wherein the expiration date is indefinite, an appropriate signal is output in accordance with the decision result, and processing is ended.

It seems that when the expiration date is definite, the limitation of the media ID need not be added to the license condition because of the gist of the media ID. However, the definite period may be long. In this case, the copyright cannot be sufficiently protected in that period. Even before the expiration date, certain accounting object information is disadvantageous if it is copied without any limitation. In this case as well, the second decoder unit can be effectively used.

This also applies to the decoder unit ID. Even when the expiration date is definite, the limitation of the decoder unit ID in the license condition is effective and can be realized as in the limitation of the media ID. This also applies to the above-described (4-1).

(5) Copy Apparatus

Figure 45:
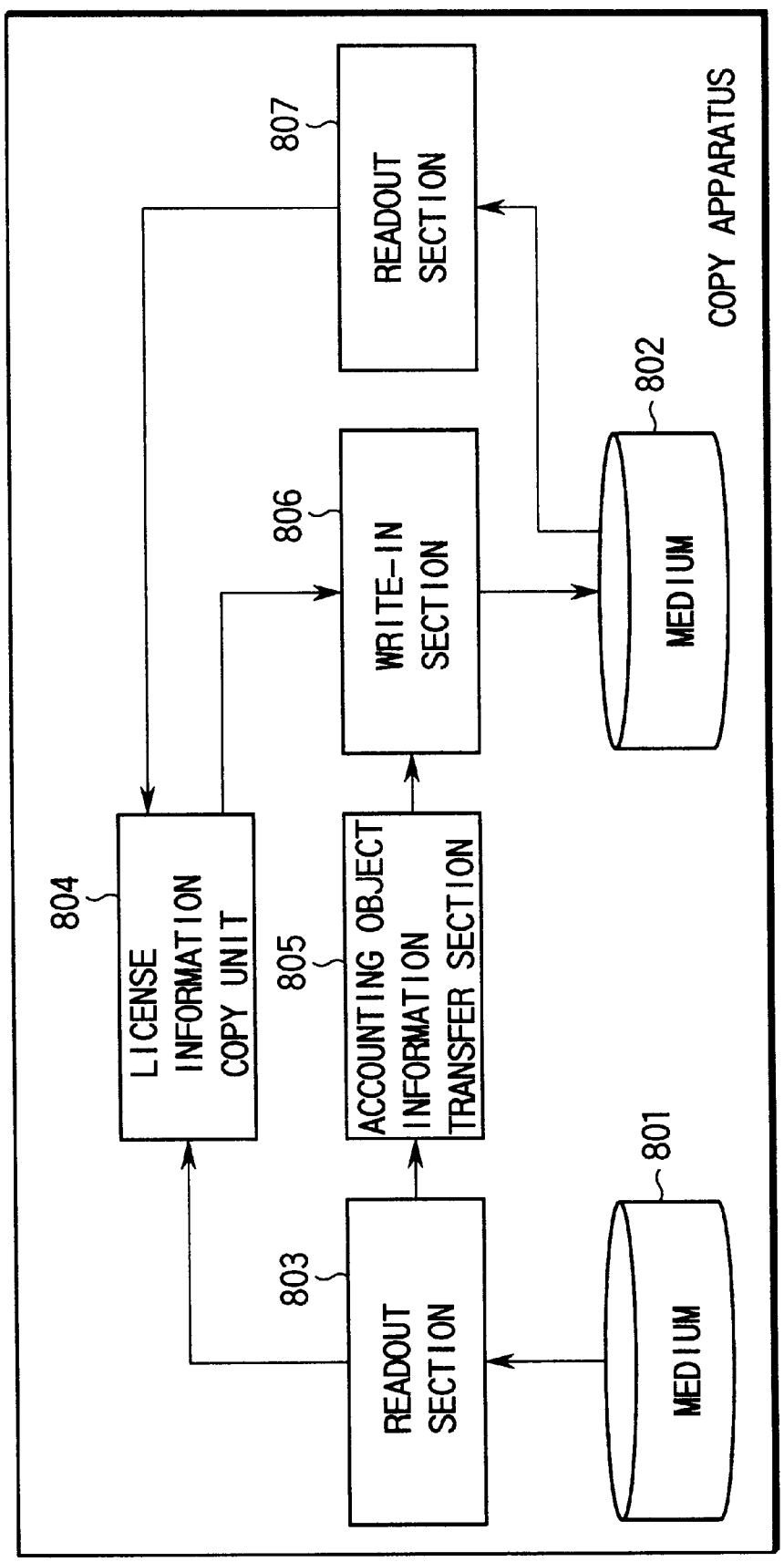
FIG. 45 is a block diagram showing an arrangement of a copying apparatus.

FIG. 45 shows an arrangement of a copy apparatus for copying information recorded on a recording medium or the like by, e.g., the first information recording apparatus shown in FIG. 1. The arrangement and operation of the copy apparatus shown in FIG. 45 will be described below with reference to the flow chart shown in FIG. 46.

The basic concept of copy is to default the license condition in copying information. More specifically, the license information of accounting object information recorded on a certain medium (medium 801 in FIG. 45) may include an effective license condition. However, the copy apparatus shown in FIG. 45 erases the license condition and records the accounting object information on another medium (medium 802 in FIG. 45).

First, the unit information (e.g., encrypted accounting object information and license information thereof) recorded on the medium 801 as the copy source is read by a readout section 803 (step S501), and only the license information is transferred to a license information copy unit 804 (step S502). A readout section 807 reads the media ID of the medium 802 as the copy destination and transfers the media ID to the license information copy unit 804 (steps S503 and S504). The license information copy unit 804 defaults the license information read from the medium 801 as the copy source and writes the media ID of the medium 802 as the copy destination in the license condition, thereby updating the license information (step S505). The updated license information is output to a write-in section 806 (step S506).

Figure 47:
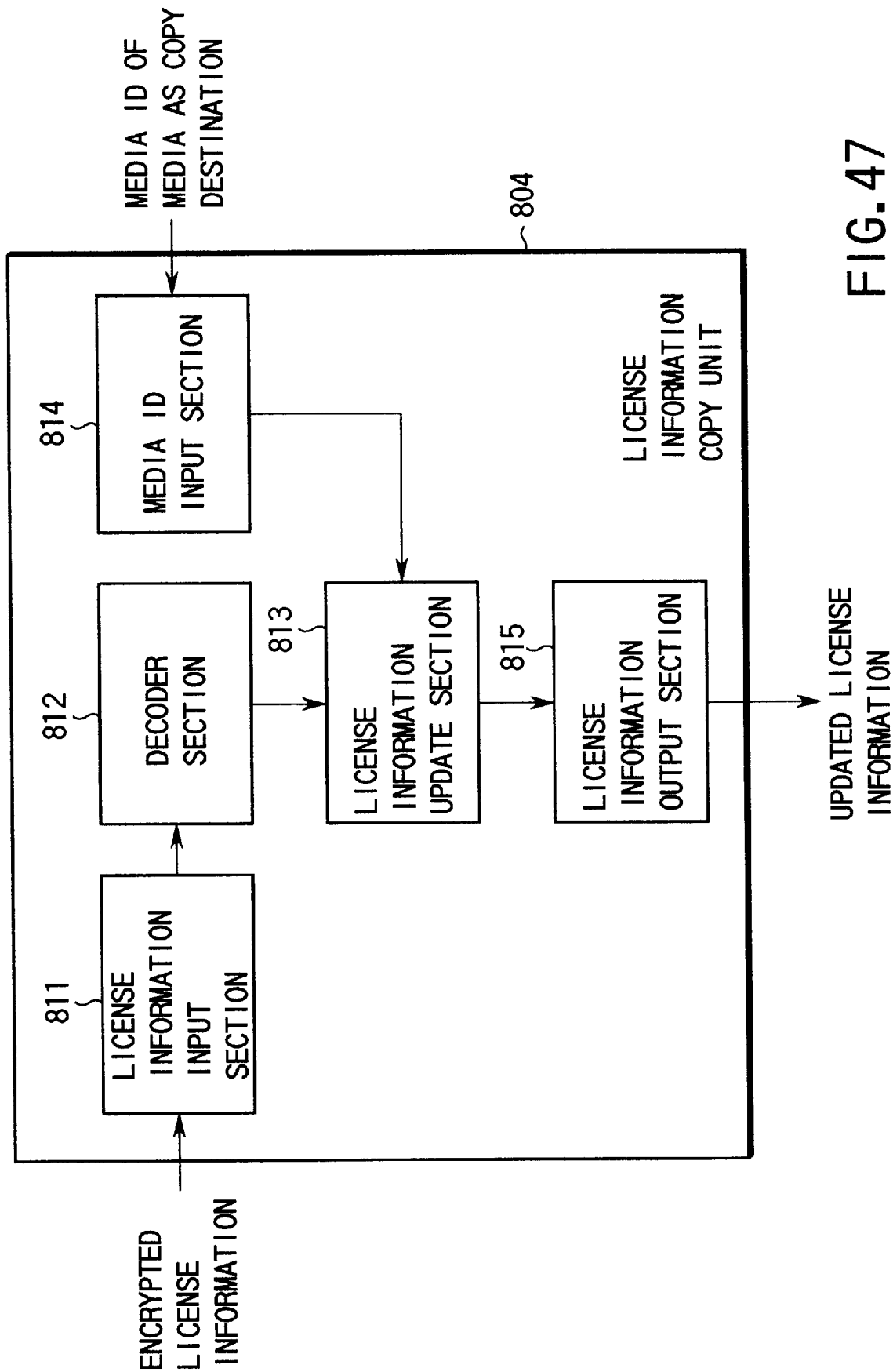
FIG. 47 is a block diagram showing an arrangement of a license information copy unit shown in FIG. 45.
Figure 48:
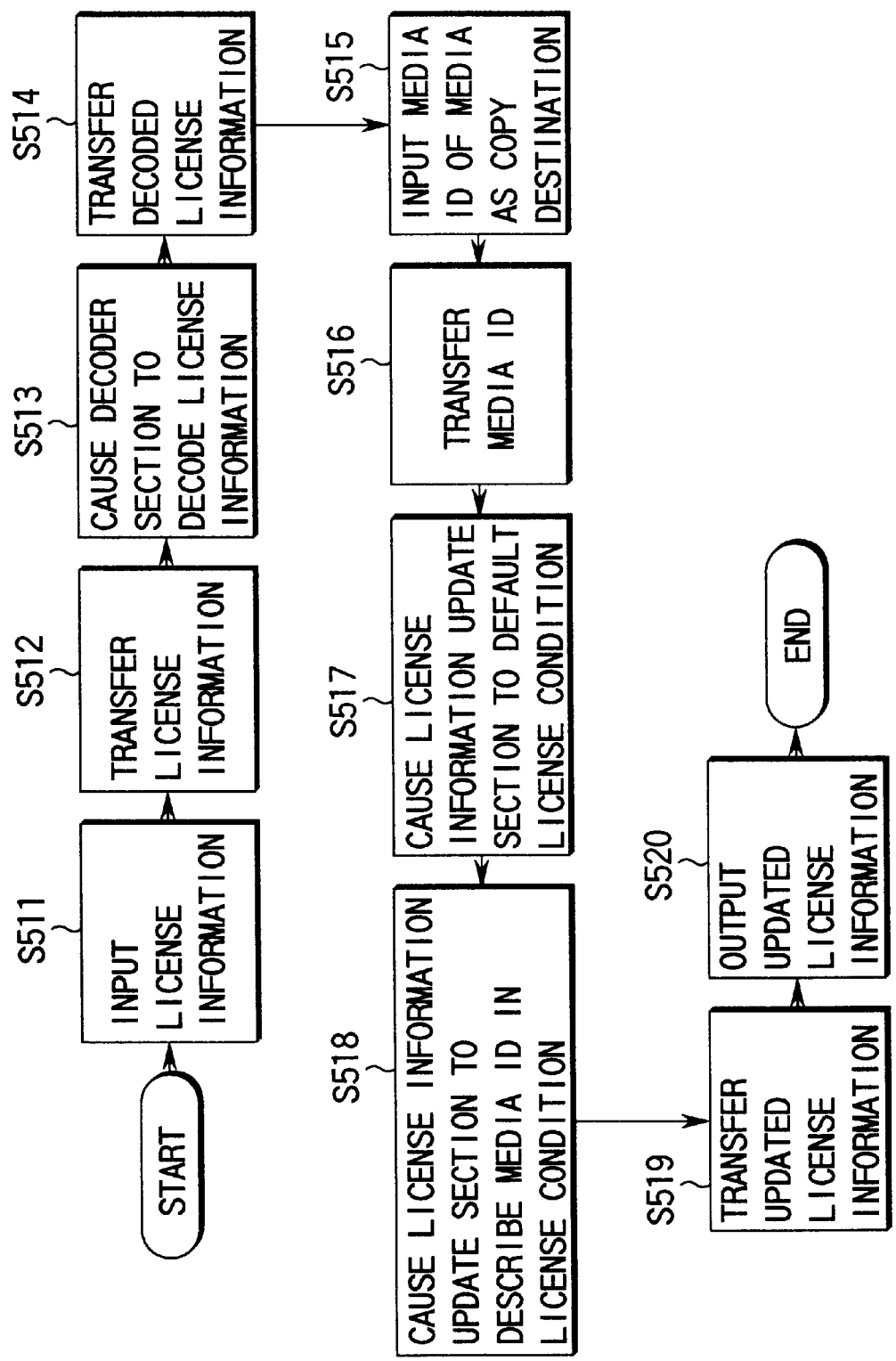
FIG. 48 is a flow chart for explaining the operation of the license information copy unit shown in FIG. 47.

The license information copy unit 804 has an arrangement as shown in, e.g., FIG. 47. The arrangement and operation of the license information copy unit 804 will be described below with reference to the flow chart shown in FIG. 48.

The license information is input to a license information input section 811 of the license information copy unit 804 (step S511 in FIG. 48), transferred to a decoder section 812 (step S512), and decoded by the decoder section 812 (step S513). The decoded license information is transferred to a license information update section 813 (step S514). The media ID of the medium 802 as the copy destination is input to a media ID input section 814 (step S515) and transferred to the license information update section 813 (step S516). The license information update section 813 defaults the license condition of the license information read from the medium 801 as the copy source and writes the media ID of the medium 802 as the copy destination in the license condition, thereby updating the license information (steps S517 and S518). The updated license information is transferred to a license information output section 815 (step S519) and output to the write-in section 806 shown in FIG. 45 (step S520).

Figure 46:
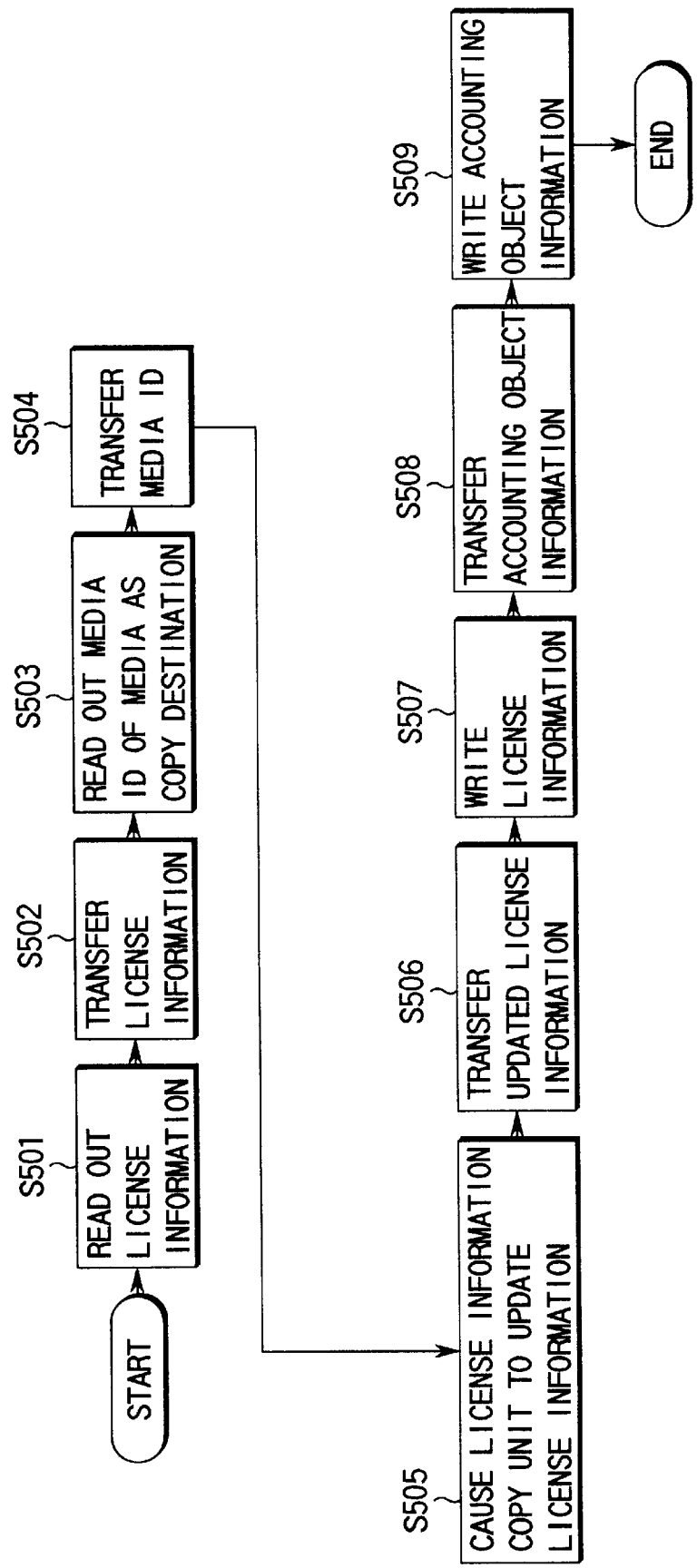
FIG. 46 is a flow chart for explaining the operation of the copying apparatus shown in FIG. 45.

Referring back to FIG. 45, the write-in section 806 writes the updated license information in the medium 802 as the copy destination and simultaneously writes the accounting object information transferred from the readout section 803 in the medium 802, and processing is ended (steps S507 to S509 in FIG. 46).

As described above, in the copy apparatus shown in FIG. 45, since the license condition of the license information read from the medium 801 as the copy source by the license information copy unit 804 is erased, the license information has no valid license condition although the accounting object information recorded on the medium 802 as the copy destination is the same as that on the medium 801. Therefore, even when the information recorded on the medium 802 is to be reproduced by an information reproducing apparatus having a decoder unit as shown in FIG. 43, use of the information is refused. More specifically, only a decoder unit having a decoding key can decode the license information. To decode the encrypted accounting object information, a decoding key corresponding to the accounting object information included in the license information is required, so the accounting object information cannot be used in this state. To use the accounting object information copied in the medium 802, a valid license condition must be added to the license information by some proper accounting procedure.

Defaulting the license condition is not limited to erase of the effective license condition. For example, a license condition which enables use of the copy until only one day after copying may be described. For example, assuming that the current time is "13:00, April 16", a license condition with an expiration date at "23:59, April 17" is described.

The copy apparatus in FIG. 45 defaults the license condition and simultaneously writes the media ID of the medium 802 as the copy destination. The media ID is a character string for specifying the medium having the accounting object information, such as a manufacturing number described in the ROM area of, e.g., a DVD-RAM. Alternatively, the media ID may be the manufacturing number of the hard disk device.

In this embodiment, the media ID is contained in the license information. The decoder unit which is to use the media ID confirms the media ID in decoding the license information. If the media ID of the DVD-RAM having the information to be reproduced does not agree with that contained in the license information, the decoding key for decoding the accounting object information is not output, as described above. This operation of the decoder unit makes the accounting object information itself designate the "medium".

The accounting object information whose license information contains the media ID can be copied only by a proper copy apparatus (i.e., an apparatus having a decoding key) as described in this embodiment. To reproduce the accounting object information in the medium 802 as the copy destination using an information reproducing apparatus having a decoder unit which confirms the media ID, the media ID of the medium 802 must be buried in the license condition of the license information. The copy apparatus shown in FIG. 45 performs processing therefor.

(6) Third Example of Information Reproducing Apparatus: Information Reproducing Apparatus Using Decoder Unit to Watch Subsidiary Information (Warning Associated with Advertisement or Use of Copyright)

Figure 49:
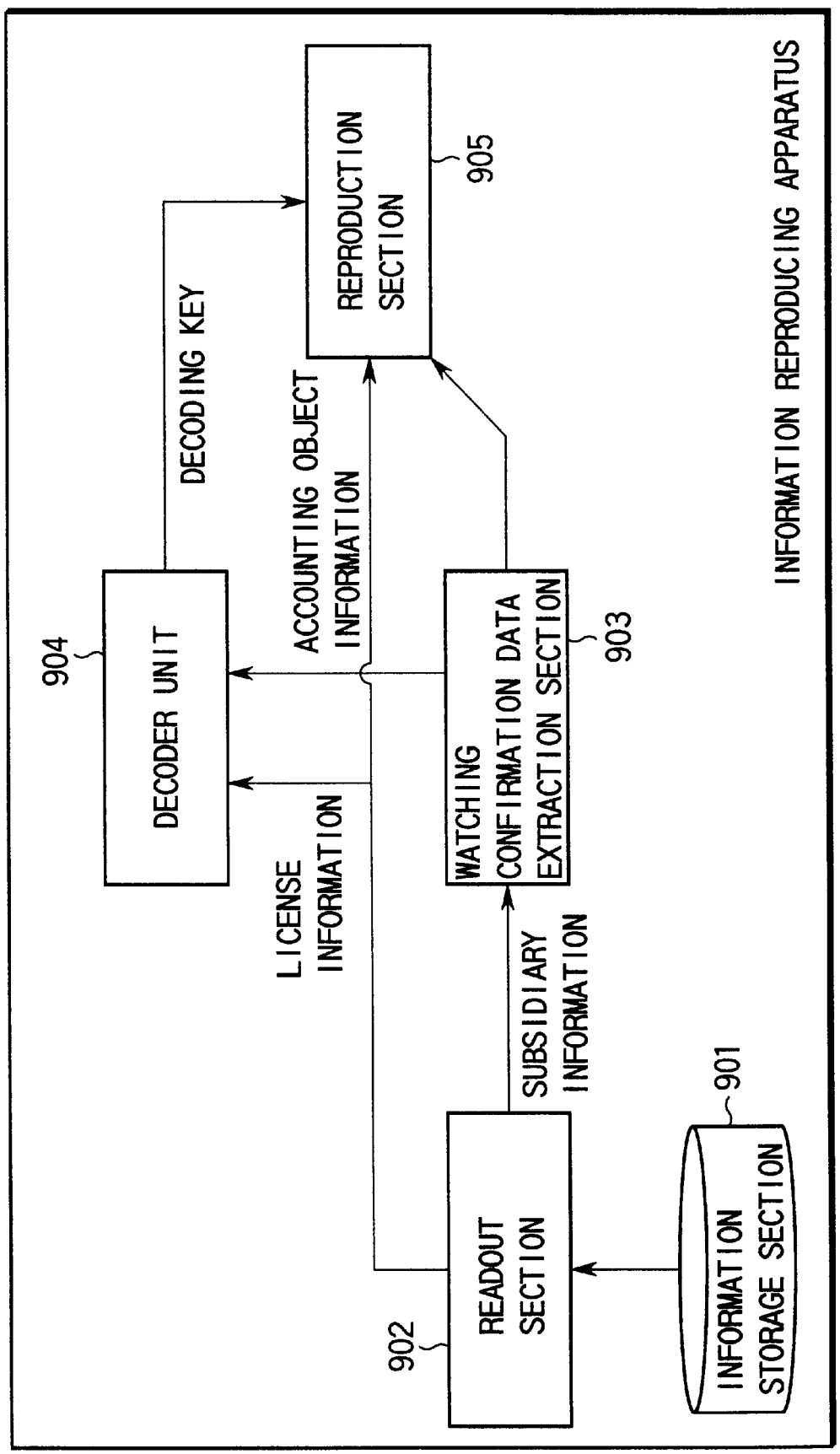
FIG. 49 is a block diagram showing an arrangement of an information reproducing apparatus (third information reproducing apparatus) according to the first embodiment of the present invention, which reproduces subsidiary information.

FIG. 49 shows an arrangement of the third information reproducing apparatus. To ensure proper watching of subsidiary information contained in information recorded on a recording medium or the like by the information recording apparatus of the present invention, watching confirmation data is inserted into the subsidiary information. For example, watching confirmation data is inserted into subsidiary information at two or more positions. An example of subsidiary information will be shown.

"In 0Th0 beginning did exist Logs. 0is0 Logos 00with the God. Lo0isgos was 0th0 God. In the beginning he was 0ec0 with the God. All0erti0 was created by him0fi0. Of things0cat0 created, nothing0ta. 0was00 not 0da0created by 0 ion0 him."

A watching confirmation data extraction section 903 shown in FIG. 49 sends input subsidiary information to a reproduction section 905 to reproduce the subsidiary information. At the same time, the watching confirmation data extraction section 903 sequentially checks the subsidiary information and extracts characters sandwiched by two "0"s. If nothing is inserted between two "0"s, the extracted character string is stored. In the above example, a character string "this is the certification data." is extracted as watching confirmation data and stored in a predetermined memory incorporated in the watching confirmation data extraction section 903. It is important to insert the watching confirmation data into the subsidiary information at two or more positions. When the watching confirmation data is inserted into the subsidiary information, the watching confirmation data cannot be reproduced unless the entire subsidiary information is reproduced. Therefore, watching can be confirmed upon reproducing the watching confirmation data.

Figure 50:
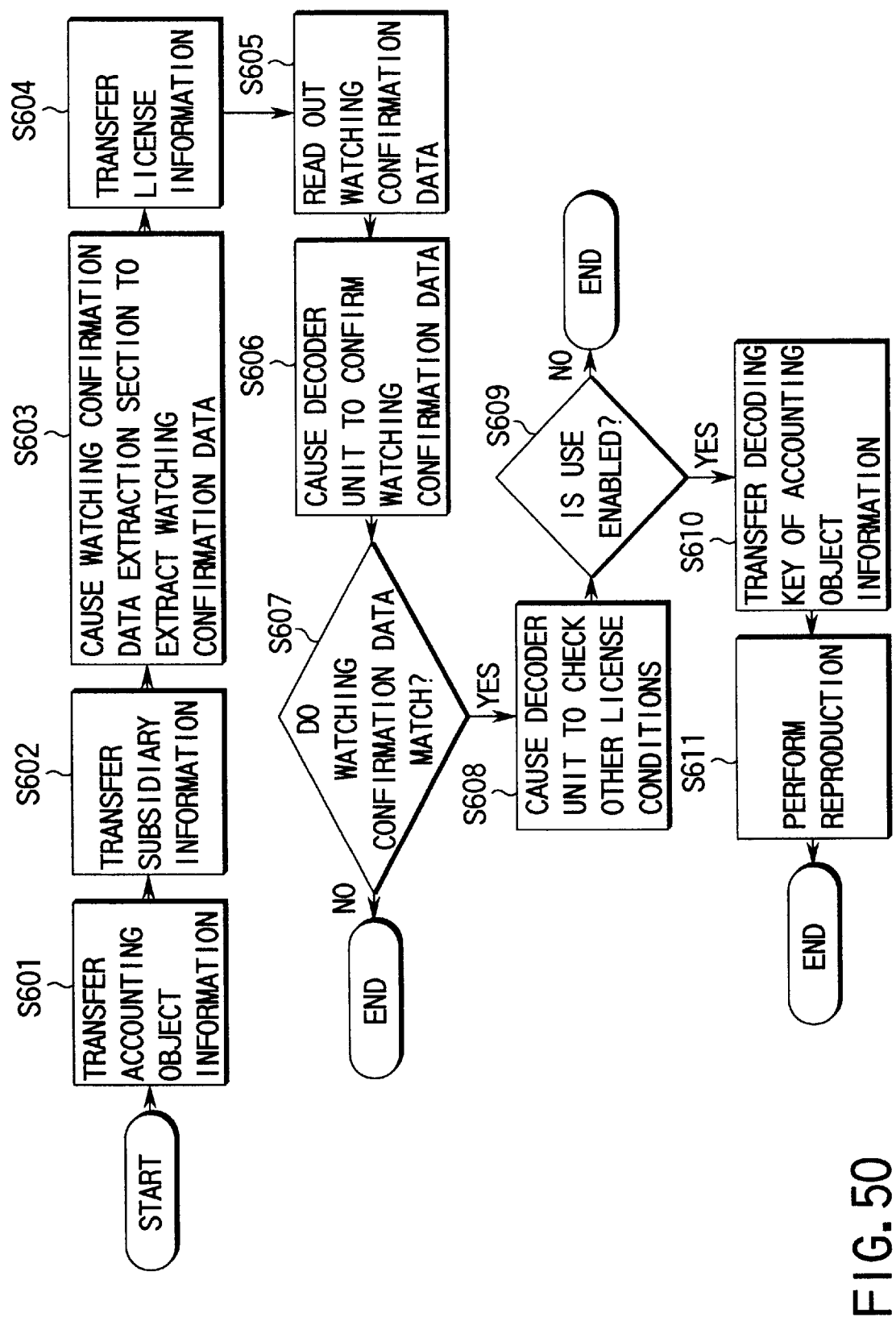
FIG. 50 is a block diagram showing an arrangement of the third information reproducing apparatus shown in FIG. 49.

The arrangement and operation of the third information reproducing apparatus shown in FIG. 49 will be described below with reference to the flow chart shown in FIG. 50.

An information storage section 901 has the same arrangement as that of the information storage section 101 in the first information reproducing apparatus shown in FIG. 8. The unit information read from the information storage section 901 by an information readout section 902 contains encrypted accounting object information, license information, and subsidiary information. Of these pieces of information, the encrypted accounting object information is transferred to the reproduction section 905 (step S601), and the subsidiary information is transferred to the watching confirmation data extraction section 903 (step S602). The watching confirmation data extraction section 903 scans the subsidiary information to extract watching confirmation data (step S603). The readout section 902 transfers the license information to a decoder unit 904 (step S604).

The license condition of the license information contains watching confirmation data as a reproduction condition for the accounting object information. The decoder unit 904 reads out the watching confirmation data which has been confirmed by the watching confirmation data extraction section 903 and collates the two watching confirmation data (steps S605 and S606). If the watching confirmation data agree with each other, processing is continued (step S607). More specifically, after the license condition such as the expiration date is confirmed, the key for decoding the accounting object information is output to the reproduction section 905 to reproduce the accounting object information (steps S608 to S611).

Figure 51:
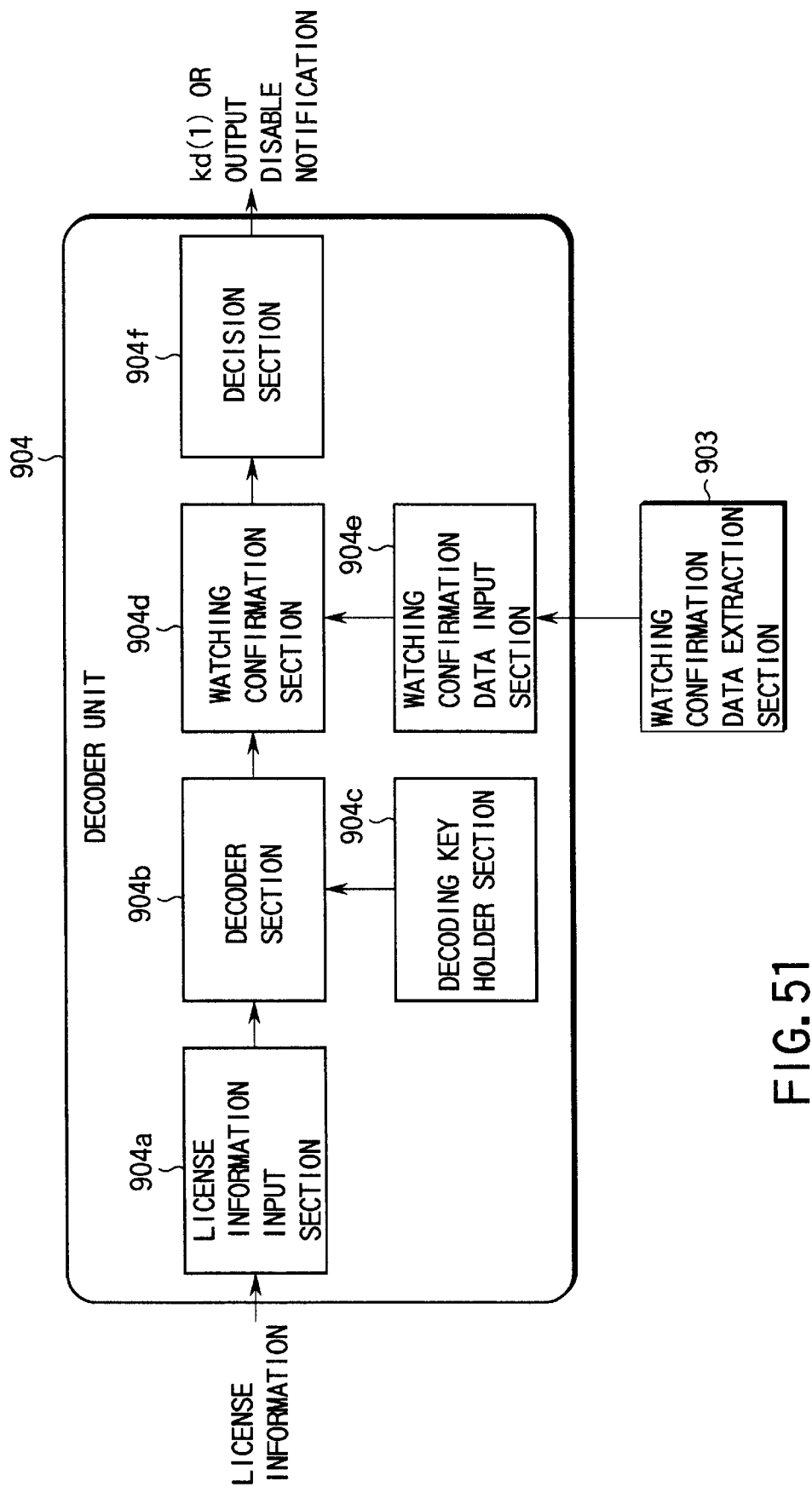
FIG. 51 is a block diagram showing an arrangement of a decoder unit shown in FIG. 49.
Figure 52:
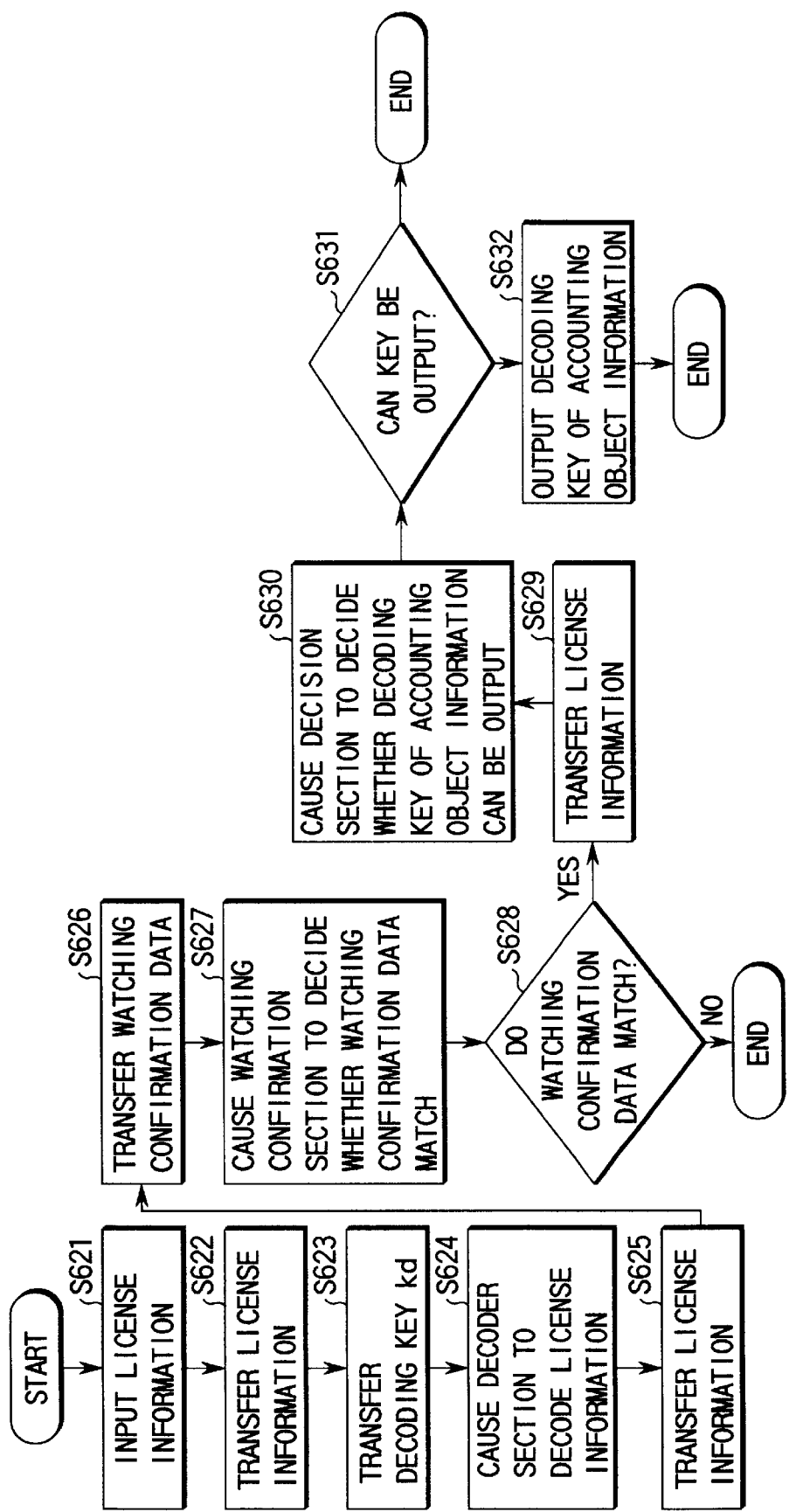
FIG. 52 is a flow chart for explaining the operation of the decoder unit shown in FIG. 51.

FIG. 51 shows an arrangement of the decoder unit 904. The arrangement and operation of the decoder unit 904 will be described below with reference to the flow chart shown in FIG. 52.

The license information transferred to the decoder unit 904 is input to a license information input section 904a (step S621) and transferred to a decoder section 904b (step S622). The decoder section 904b decodes the license information using the decoding key kd held in a decoding key holder section 904c and transfers the license information to a watching confirmation section 904d (steps S623 to S625). The watching confirmation data sent from the watching confirmation data extraction section 903 is input to a watching confirmation data input section 904e and transferred to the watching confirmation section 904d (step S626). The watching confirmation section 904d collates the watching confirmation data as the accounting object information reproduction condition contained in the license condition of the license information with the watching confirmation data sent from the watching confirmation data extraction section 903 (step S627). If the two watching confirmation data match, the license information is sent to a decision section 904f (steps S628 and S629). The decision section 904f decides on the basis of the license condition in the license information whether the accounting object information can be used (i.e., whether the decoding key kd(1) is to be output to the reproduction section 905), and in accordance with the decision result, outputs the decoding key to the reproduction section 905 (steps S630 to S632).

In the above-described information recording apparatus of the present invention, one accounting object information is recorded on a recording medium or the like in correspondence with one license information. However, one accounting object information may be recorded on a recording medium or the like in correspondence with a plurality of pieces of license information.

In the information reproducing apparatus of the present invention, when it is decided whether accounting object information can be used, the license condition contained in one license information corresponding to the accounting object information is referred to. However, the present invention is not limited to this. When a plurality of pieces of license information are recorded on the recording medium in correspondence with one accounting object information, license conditions contained in all the license information may be sequentially referred to to determine whether the accounting object information can be used. That is, if one of license conditions contained in the plurality of pieces of license information is satisfied, it is decided that the accounting object information can be used.

In the information reproducing apparatus and accounting apparatus of the present invention, when license information is to be updated, the license information which has already been recorded on a recording medium is rewritten. However, license information may be additionally recorded on the recording medium. Therefore, in the description of updating the license information recorded on the recording medium in the above embodiment, "update" means not only "overwrite recording" but also "additional recording".

In addition, the number of decoder unit IDs or media IDs contained in the license condition is not always one.

(Second Embodiment)

(1) Decoder Unit A

Figure 54:
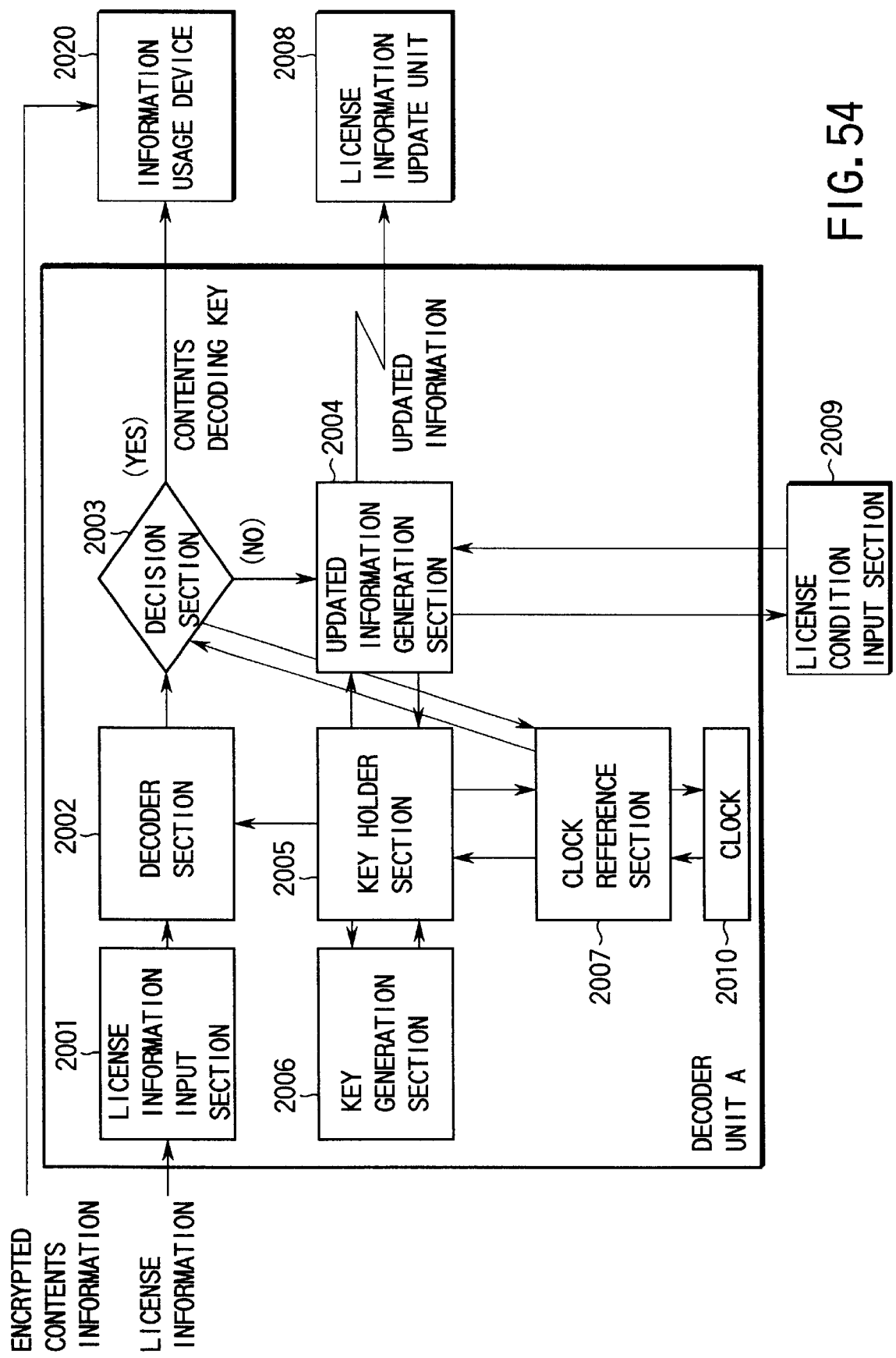
FIG. 54 is a block diagram showing an arrangement of a decoder unit A according to the second embodiment of the present invention.

FIG. 54 shows an arrangement of a decoding decision device, i.e., a decoder unit A according to the second embodiment.

The decoder unit A checks on the basis of license information belonging to chargeable data as digital contents whether the use of the contents is enabled (i.e., whether the license for the use of the contents information based on the license condition defined by contract is valid). If the license condition is valid, a contents decoding key required to use the contents information is output to an information usage device such as a video reproducing device for reproducing the contents information or the like.

In this case, the contents information is encrypted in advance. The decoding key (to be referred to as a contents decoding key hereinafter) is added to the license information together with the contents license condition such as an expiration date or contents information identification information (ID). All the license information is encrypted and provided to the subscriber together with the encrypted contents information (for example, the license information is distributed through a recording medium storing the license information or broadcast distribution).

Figure 55:
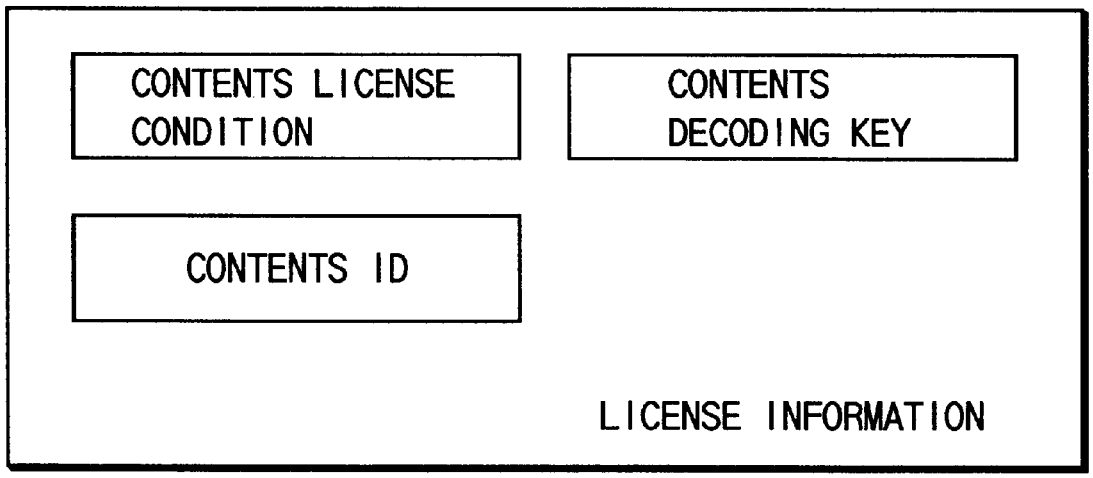
FIG. 55 is a view showing an example of license information input to the decoder unit A.

The license information is decoded using a secret key present in the decoder unit A. FIG. 55 shows an example of license information. As shown in FIG. 55, the license information contains at least the contents decoding key, the contents license condition such as the expiration date for the contents information, and the ID of the contents information.

If the secret key for decoding the license information is common to all decoder units, it is convenient for the operation, though leakage of the secret key allows to read all contents decoding keys contained in license information to be decoded using this decoder unit in principle. This is a serious problem for the decoder unit A with a purpose of protecting the license, and the present invention has as its object to solve this problem.

To solve this problem, the decoder unit A of this embodiment generates a secret key for decoding license information and uses the secret key only in a predetermined period.

Figure 57:
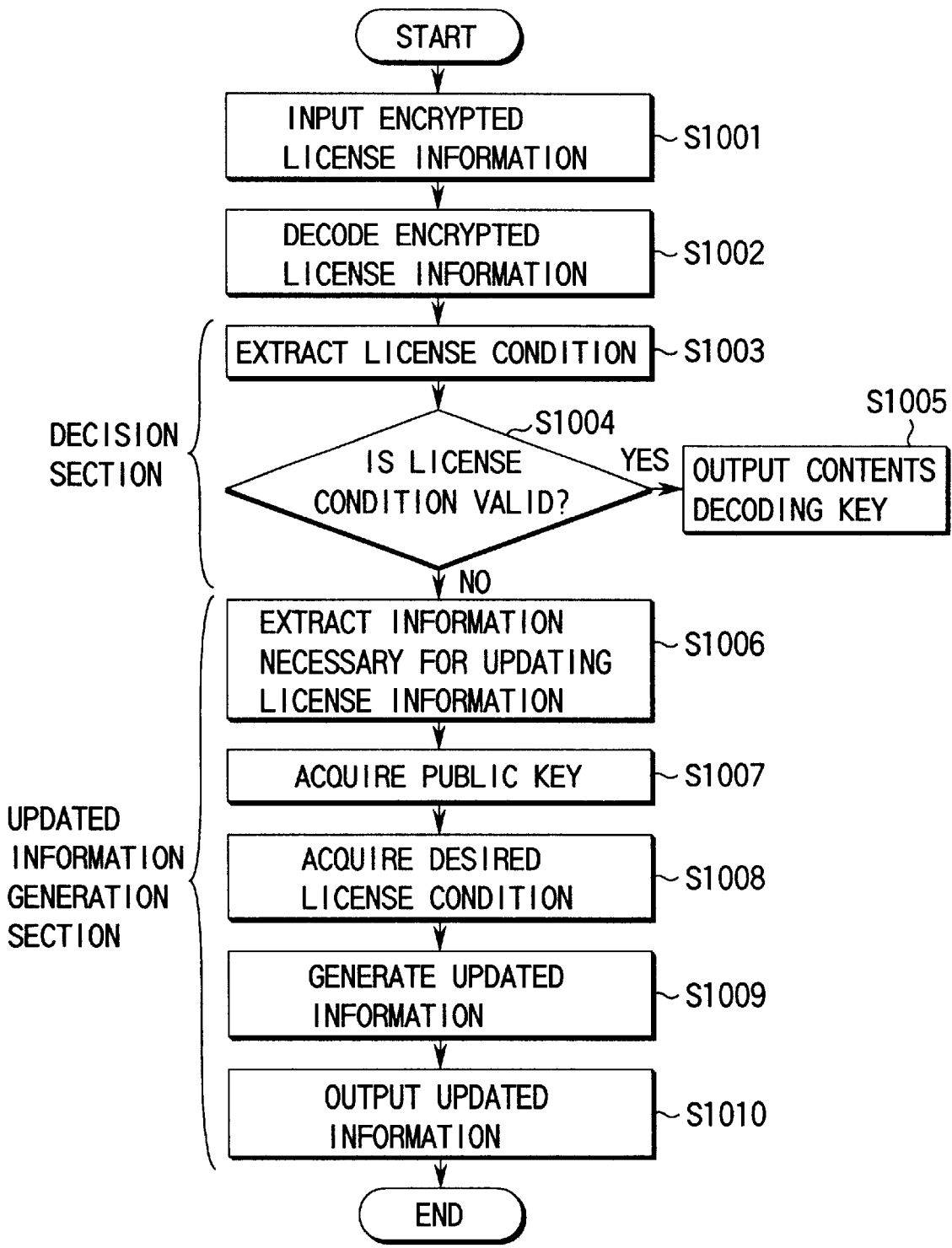
FIG. 57 is a flow chart for explaining the processing operation of the decoder unit A.

The operations of the various portions of the decoder unit A shown in FIG. 54 will be described next with reference to the flow chart shown in FIG. 57.

Encrypted license information is input to the decoder unit A through a license information input section 2001 (step S1001), decoded by a decoder section 2002 (step S1002), and sent to a decision section 2003 to check the license condition, thereby deciding whether the license is valid (steps S1003 and S1004). Decision whether the license is valid is made by deciding whether the license condition is satisfied, i.e., whether the license for the contents has not expired.

If the decision section 2003 decides that the license is valid (the contents can be used), the contents decoding key contained in the license information is output to an information usage device (e.g., a set top box) 2020 (step S1005).

If it is decided that the license is invalid (the contents cannot be used), the license information is sent to an updated information generation section 2004 to arrange information necessary for updating the license (i.e., updating the license information) and generate updated information for updating the license information. The updated information is output to a license information update device 2008 through a predetermined communication line (e.g., a leased line or the Internet) (steps S1006 to S1010).

The updated information generation section 2004 generates updated information (FIG. 56) containing at least the ID of the contents and a public key of the decoder unit A, which is generated by a key generation section 2006, on the basis of the desired license condition of a user's choice (later expiration date) input through a license condition input section 2009 and the license information sent from the decision section 2003.

As described above, the decoder unit A has the key generation section 2006 for generating a secret key for decoding encrypted license information. The key generation section 2006 generates a key for encrypting/decoding license information. As a key generation method, a key generation algorithm for a public key cipher may be used. For an RSA cipher, a random number and prime number decision algorithm is used to generate two prime numbers p and q each having an appropriate length (e.g., about 512 bits).

Even in a random number algorithm common to all decoder units A, when the seed of a random number is set in units of, e.g., microseconds, the same prime number is less likely to be generated.

Next, N is obtained from N=p·q. At the same time, M=(p−1)(q−1) is calculated, and integers $\underline{e}$ and $\underline{d}$ for satisfying $$ed = 1 \pmod{M}$$

are obtained (0<e, and d<M). The integers $\underline{e}$ and $\underline{d}$ can be relatively easily obtained by obtaining $\underline{d}$ first and then obtaining $\underline{e}$ corresponding to $\underline{d}$ using an Euclidean algorithm. One (e.g., $\underline{e}$) of the integers is used as a secret key, and the other (e.g., $\underline{d}$) as a public key. A public key cipher is realized on the basis of the known RSA cipher algorithm using these keys.

These keys are unique to the decoder unit A. Even when the keys are read out from the decoder unit by some device, the keys cannot be used in other units. When a key holder section 2005 sets the expiration date for the keys, the keys cannot be used even in the same unit after a predetermined period. The key generation section 2006 is driven by the key holder section 2005.

The key holder section 2005 sends a key generation instruction to the key generation section 2006 at a predetermined timing. This timing is generally set on the basis of time referred to by, e.g., a clock reference section 2007 in FIG. 54.

Figure 58:
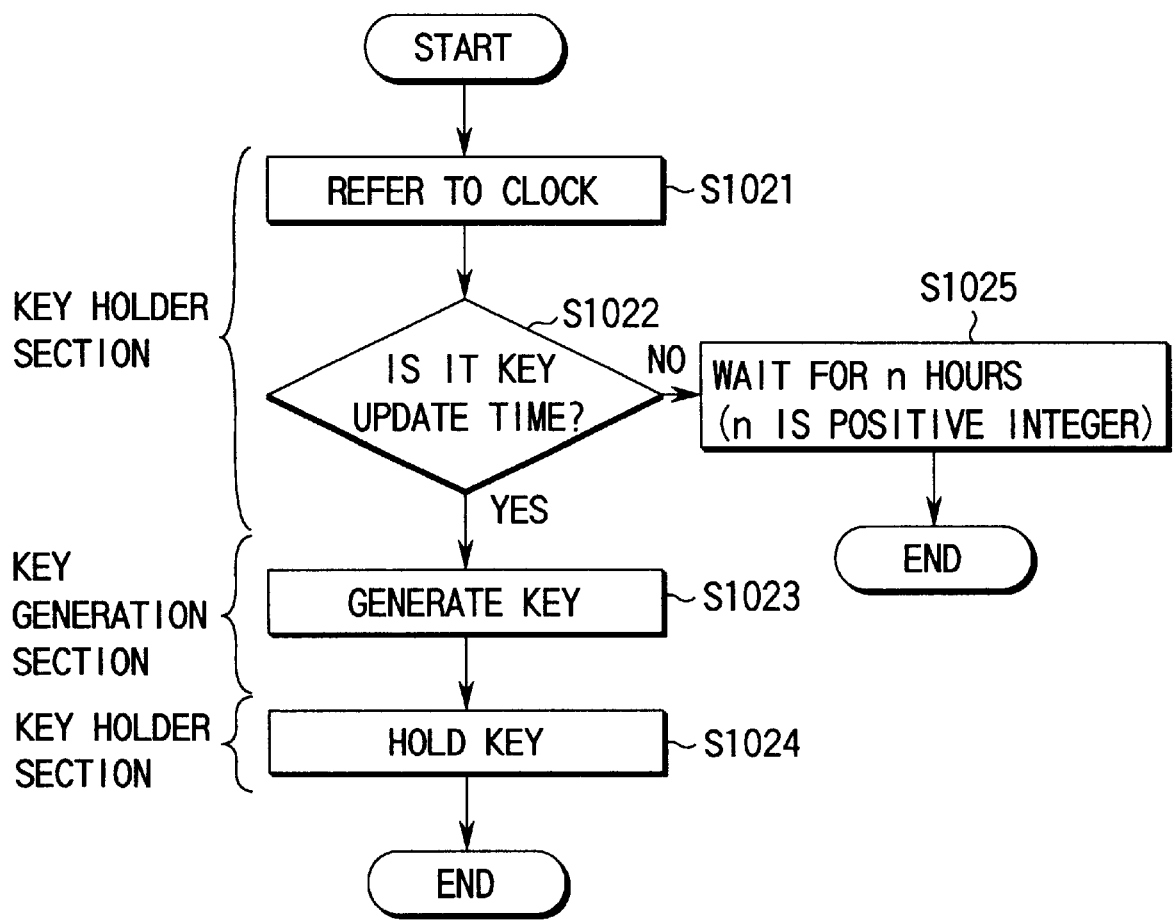
FIG. 58 is a flow chart for explaining the schematic procedure of key generation processing in a key holder section and key generation section of the decoder unit A.

FIG. 58 is a flow chart for explaining the procedure of key generation processing by the key holder section 2005 and the key generation section 2006. The key holder section 2005 refers to the time through the clock reference section 2007 at a predetermined timing (step S1021). If it is predetermined key update time, a key generation instruction is sent to the key generation section 2006. The key generation section 2006 generates the above-described public key and secret key (steps S1022 and S1023). If the current time is not the key update time, processing waits for a predetermined period (step S1025). The public key and secret key generated by the key generation section 2006 are held in the key holder section 2005 (step S1024).

As described above, once keys are generated as the initialization operation for the first use of the decoder unit A, different decoder units A can effectively obtain different keys without generating keys by the key generation section 2006 many times. Alternatively, different keys may be set in the key holder section 2005 in shipment from the factory, as a matter of course. In this case, the key generation section 2006 can be omitted.

As the characteristic feature of the decoder unit A of the present invention, to update the license information, the public key held in the key holder section 2005 must be transmitted to the license information update device 2008 together with other information necessary for updating the license information (the public key is used to encrypt the updated license information generated by the license information update device 2008). This procedure is performed by the updated information generation section 2004.

The updated information generation section 2004 is started when the decision section 2003 decides on the basis of the license information that the contents cannot be used, so that the updated information generation section 2004 starts the license condition input section 2009 and prompts the user to input a desired license condition (e.g., a later expiration date). Simultaneously, the updated information generation section 2004 prompts the key holder section 2005 to output the public key, describes the obtained public key and desired license condition in a predetermined format together with information necessary for accounting, e.g., a contents ID sent from the decision section 2003, and sends them to the license information update device 2008 as updated information (FIG. 56) for updating the license information.

The clock reference section 2007 which refers to an internal clock 201 (external clock, as needed) is used to set the key generation timing of the key holder section 2005 or check the expiration date in the license condition.

(2) Decoder Unit B

Figure 59:
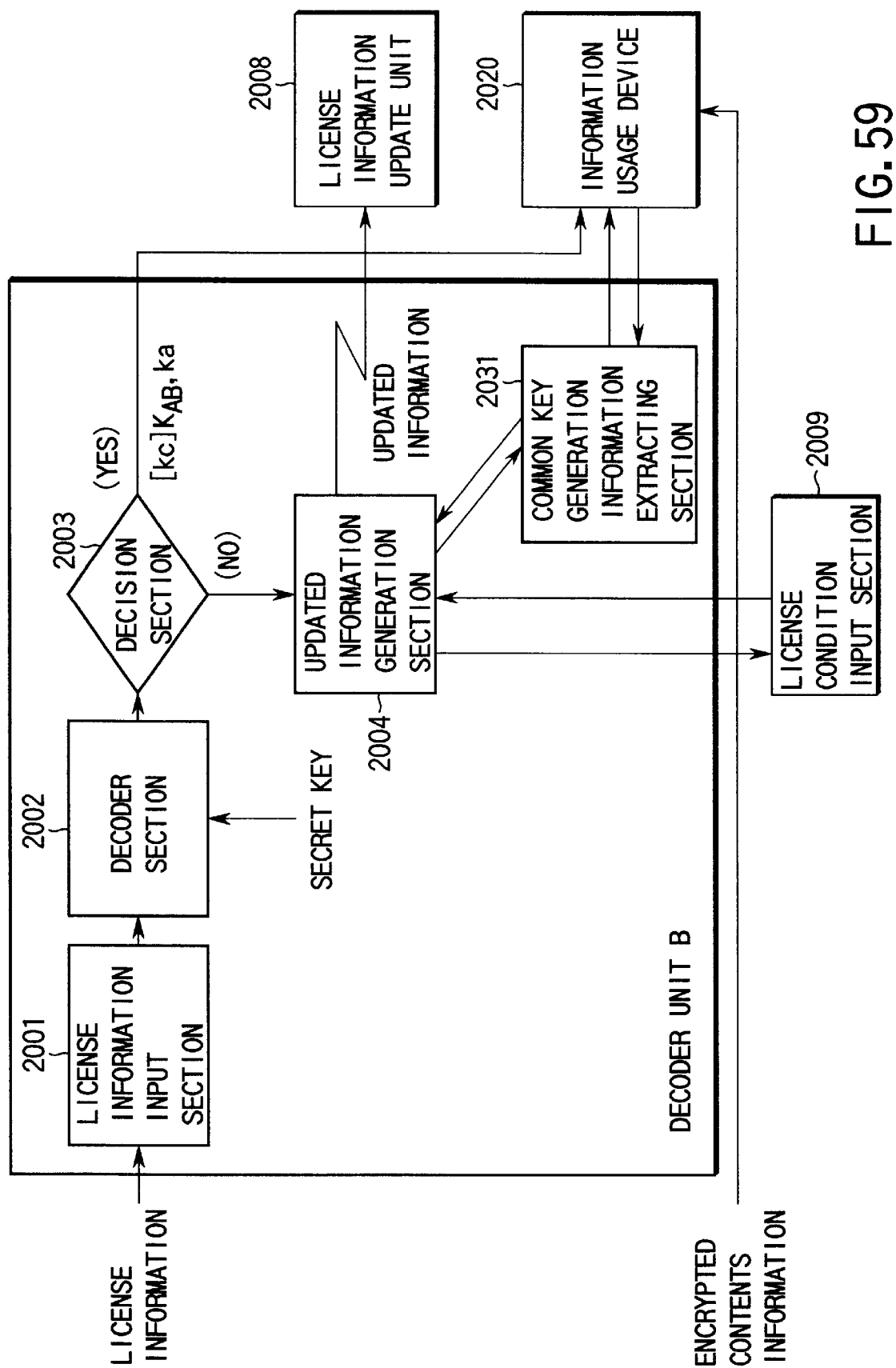
FIG. 59 is a block diagram showing an arrangement of a decoder unit B.

FIG. 59 shows an arrangement of another decoding decision device, i.e., a decoder unit B. The decoder unit B can prevent a contents decoding key from existing in the decoder unit (even temporarily) as unencrypted data.

If analysis of the unit reveals that a contents decoding key is present in the unit as unencrypted data, the contents decoding key may be read. If the contents decoding key can be constantly read, any contents decoding key can be acquired using this method (without knowing the secret key of the decoder unit), resulting in a serious problem in security of license protection. This problem cannot be solved by the above-described decoder unit A which generates a new secret key at a predetermined period and replaces it with an old key, because of its nature.

In the decoder unit B, the contents decoding key is kept encrypted, so the encrypted contents decoding key cannot be decoded using only information in the decoder unit.

Figure 61:
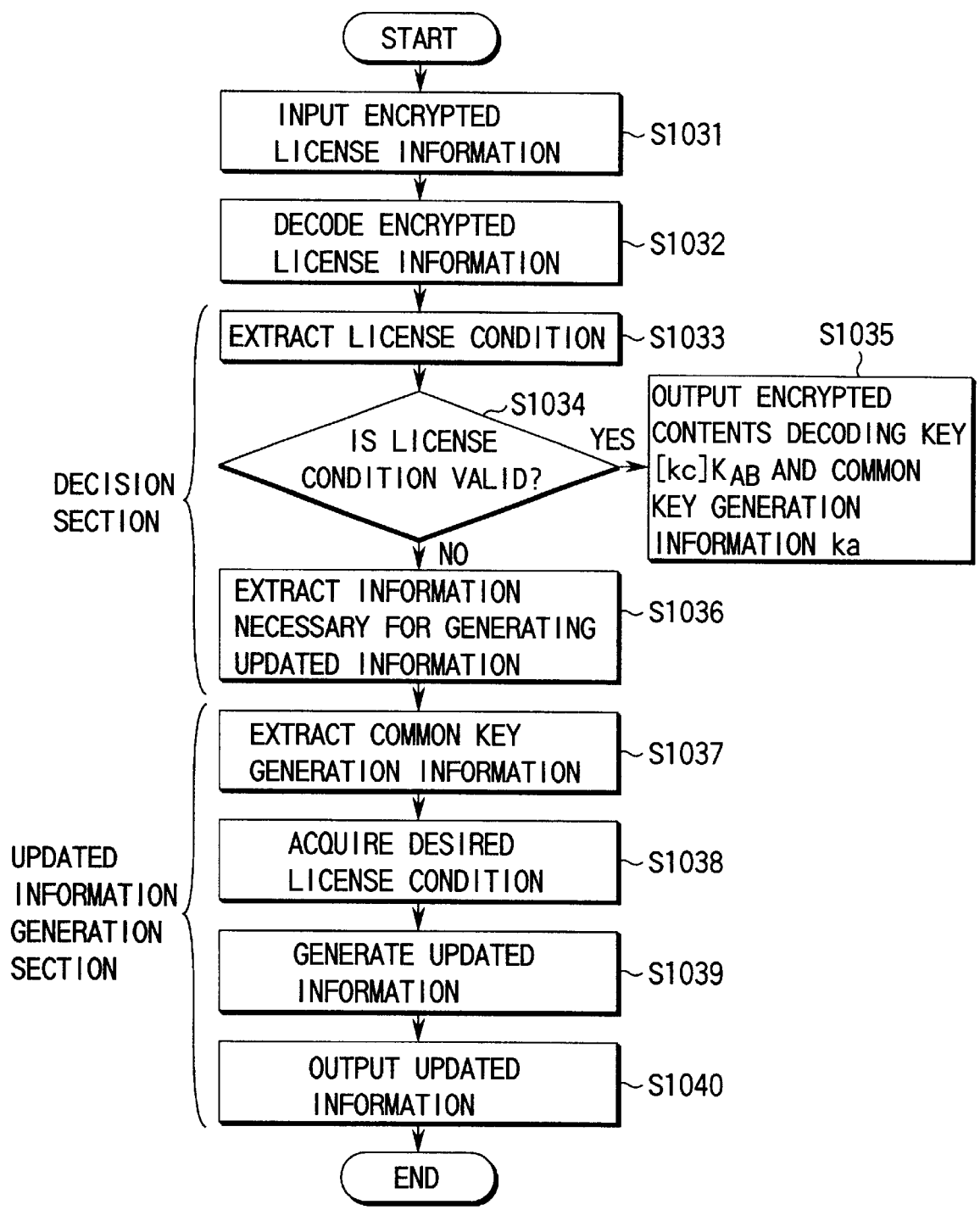
FIG. 61 is a flow chart for explaining the processing operation of the decoder unit B.

The operations of various portions of the decoder unit B shown in FIG. 59 will be described with reference to the flow chart shown in FIG. 61.

Encrypted license information is input to the decoder unit B through the license information input section 2001 and decoded by the decoder section 2002 using a secret key held in the decoder unit B in advance (steps S1031 and S1032).

Figure 60:
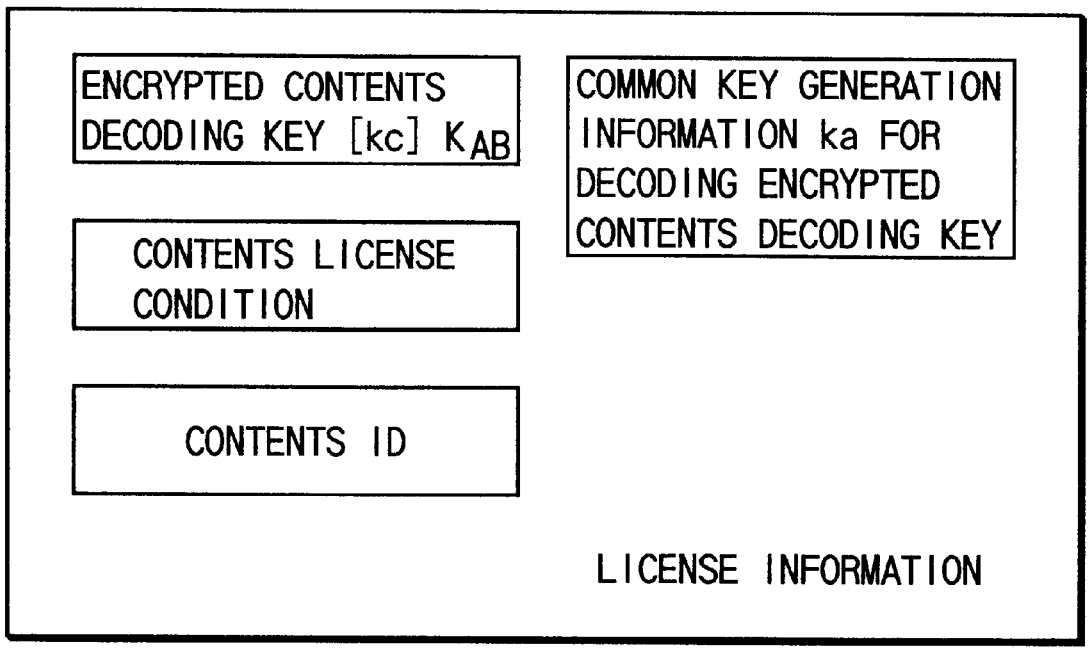
FIG. 60 is a view showing an example of license information input to the decoder unit B.

FIG. 60 shows an example of license information to be input to the decoder unit B. As shown in FIG. 60, the license information contains at least a contents ID, the license condition for the contents, an encrypted contents decoding key [kc] $K_{AB}$, and common key generation information ka for decoding the encrypted contents decoding key. The contents decoding key kc is encrypted using the common key $K_{AB}$.

The license information decoded by the decoder section 2002 is sent to the decision section 2003 to decide the license condition (step S1033). If the license condition is satisfied, the encrypted contents decoding key [kc] $K_{AB}$ and the common key generation information ka are sent to the information usage device 2020 (steps S1034 and S1035).

If the decision section 2003 decides that the contents cannot be used, a contents ID and the like necessary for updating the license are sent to the updated information generation section 2004 (steps S1034 and S1036).

The updated information generation section 2004 prompts, through a common key generation information extracting section 2031, the information usage device 2020 which uses the contents to output common key generation information kb necessary for encrypting the contents decoding key in the license information update device 2008.

The pieces of common key generation information ka and kb for encrypting the contents decoding key will be described. For a public key cipher (e.g., an ellipse curve cipher) with security based on the discrete logarithmic problem, the following common key generation protocol can be considered. An element x common to the information usage device 2020 and the license information update device 2008 is defined in advance. In addition, an integer b (defined at the time of, e.g., shipment) and an element $X^b$ calculated from x and b are obtained and stored in the information usage device 2020 in advance. If license update is requested, $x^b$ is sent to the decoder unit B as the common key generation information kb.

The decoder unit B generates updated information (FIG. 62) containing not only the desired license condition input by the user from the license condition input section 2009 but also the common key generation information kb and contents ID and send the updated information to the license information update device 2008.

$$(kb)^a = x^{ab}$$

is calculated by the license information update device 2008 in correspondence with the common key generation information kb=$x^b$ from the decoder unit B using an integer a defined by itself using a random number or the like, and set as the common key $K_{AB}$ for the information usage device 2020 for decoding the contents decoding key.

The license information update device 2008 adds the common key generation information ka generated by the license information update device 2008 itself, i.e., $x^a$ to the updated license information, as shown in FIG. 60. This updated license information is sent to the information usage device 2020 through the decoder section 2002 and the decision section 2003.

The information usage device 2020 calculates $$(ka)^b = (xa)^b = x^{ab} = K_{AB}$$

from the integer b unique to each information usage device, which is held in advance in the device, and the common key generation information ka sent from the decoder unit B, thereby obtaining the common key $K_{AB}$.

With this arrangement, even when the secret key of the decoder unit B is read, the contents decoding key cannot be obtained only from the information in the decoder unit B.

This is because it is difficult in terms of calculation amount to generate $K_{AB} = x^{ab}$ from $ka = x^a$ and $kb = x^b$ as common key generation information. For this purpose, the integers a and b must be obtained. A problem for obtaining a from $x^a$ and the public information x is called a discrete logarithmic problem. For the public key cipher (e.g., the ellipse curve cipher) with security based on the discrete logarithmic problem, the calculation is difficult in terms of calculation amount. For this reason, the contents decoding key can be prevented from existing in the decoder unit B as unencrypted data, so a system for preventing the contents decoding key kc from being extracted even when the secret key for decoding license information in the decoder unit B is read out.

Referring back to FIG. 61, the information usage device 2020 which uses the contents to update the license outputs the key generation information kb in response to the request from the common key generation information extracting section 2031. Upon receiving the key generation information kb, the common key generation information extracting section 2031 sends the key generation information kb to the updated information generation section 2004 (step S1037). Simultaneously, the common key generation information extracting section 2031 starts the license condition input section 2009 to prompt the user to input a desired license condition. The updated information generation section 2004 generates updated license information (FIG. 62) from the input desired license condition and the contents ID and common key generation information kb which have been separately obtained, and transmits the license information to the license information update device 2008 through a predetermined communication line (or the Internet) (steps S1038 to S1040).

As is apparent, a decoder unit C having both the function of the decoder unit A which individually holds or generates the public key and the secret key and the function of the decoder unit B which encrypts the contents decoding key using the common key between the license information update device 2008 and the information usage device 2020 can be constituted.

Figure 63:
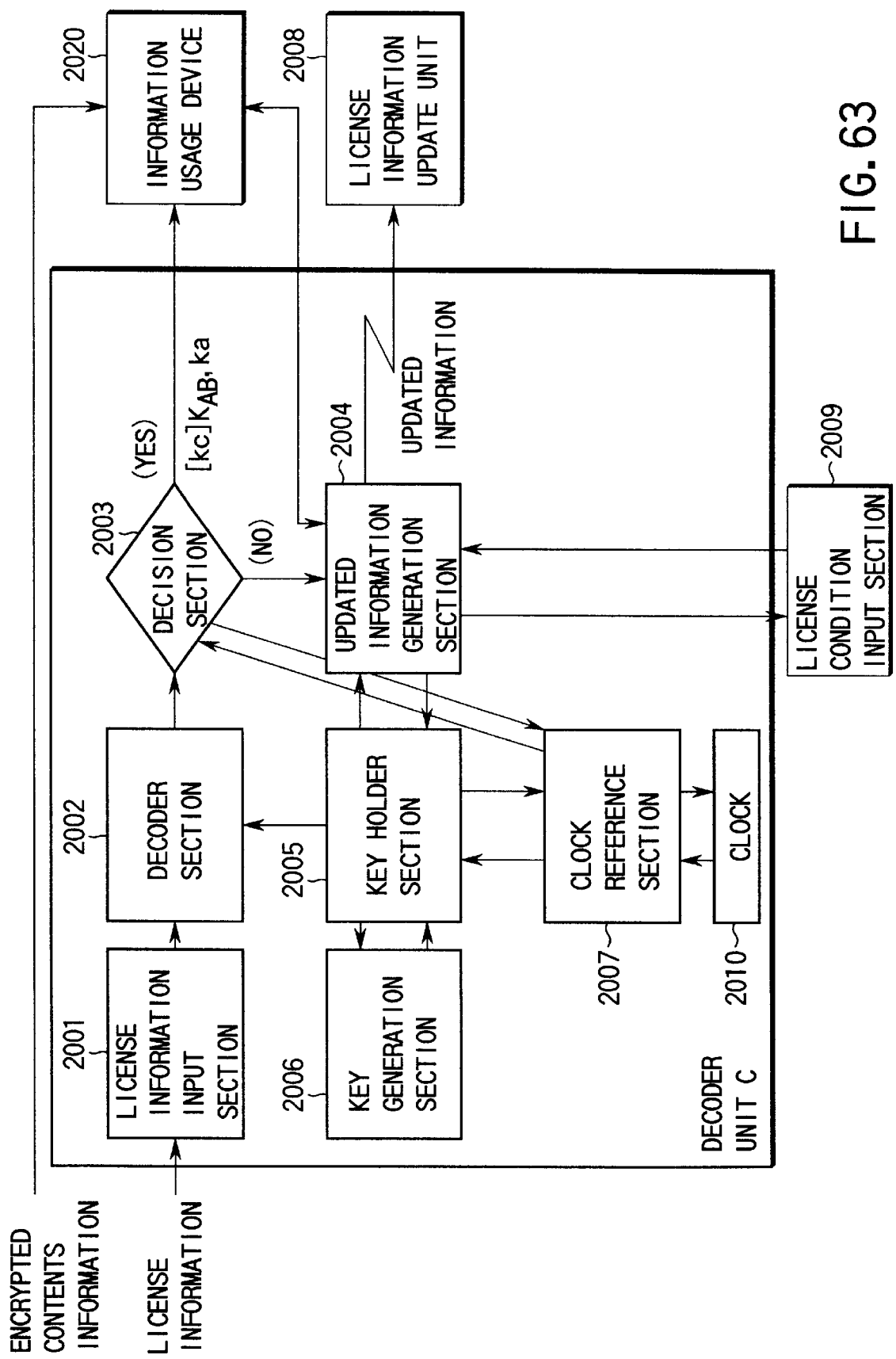
FIG. 63 is a block diagram showing an arrangement of a decoder unit C.
Figure 64:
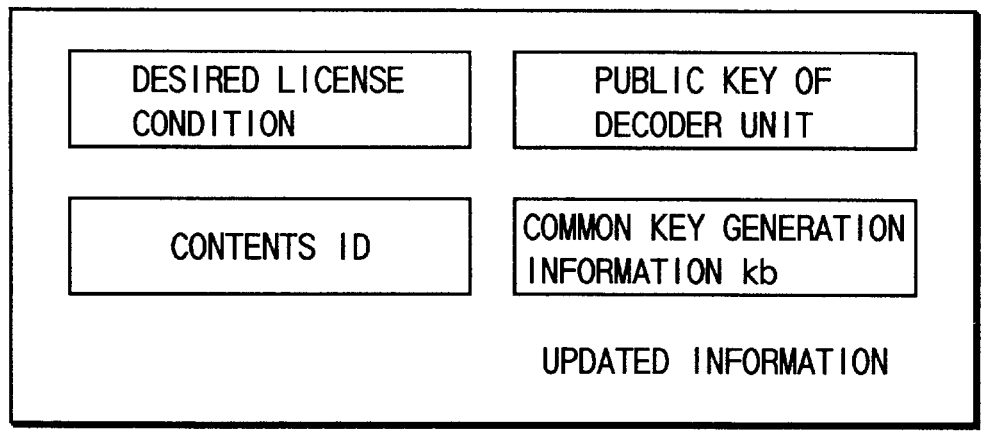
FIG. 64 is a view showing an example of updated information output from the decoder unit C.

In this case, license information as shown in FIG. 60 is encrypted using a public key supplied from the decoder unit C and input to the decoder unit C as shown in FIG. 63. The same reference numerals as in the decoder unit A in FIG. 54 denote the same parts in FIG. 63. The decoder unit C is different from the decoder unit A in that the updated information generation section 2004 accesses the information usage device 2020 to acquire the key generation information kb held in the information usage device 2020 in updating the license, generates updated license information as shown in FIG. 64, which contains at least the acquired key generation information kb, the public key generated by the key generation section 2006, and the input desired license condition and contents ID, and transmits the license information to the license information update device 2008.

(3) Decoder Unit D

In a decoder unit D, the decoding key is a common key used for the license information update device 2008 only once, unlike the decoder unit A or B. More specifically, the decoding key is generated every time decoding is performed, and no decoding key need be held in the decoder unit D. This means that the decoding key which must be kept secret is temporarily generated and can be erased from the memory immediately after use, so the security of the decoder unit can be effectively improved.

Figure 66:
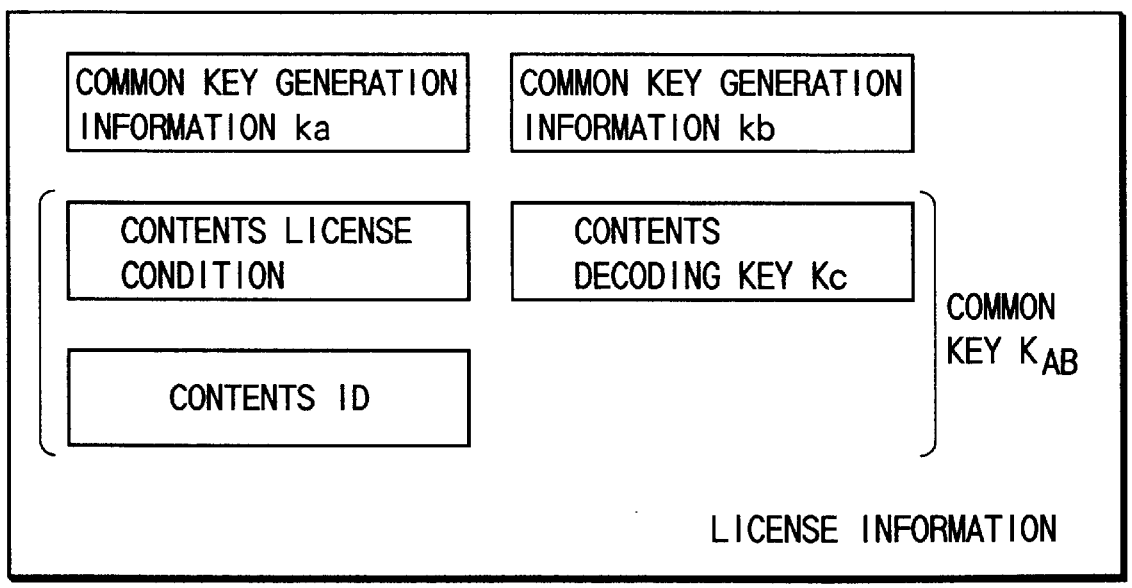
FIG. 66 is a view showing an example of license information input to the decoder unit D.

FIG. 66 shows an example of license information input to the decoder unit D. The license information has an encrypted portion and an unencrypted portion, as shown in FIG. 66. The encrypted portion contains at least the contents license condition, the contents decoding key kc, and the contents ID, and the entire portion is encrypted using the common key $K_{AB}$ between the decoder unit D and the license information update device 2008. The unencrypted portion is constituted by at least the common key generation information ka generated by the license information update device 2008 to generate the common key $K_{AB}$, and the common key generation information kb generated by the decoder unit D by the method to be described below. The method of generating the common key $K_{AB}$ is the same as that in the decoder unit B.

Figure 65:
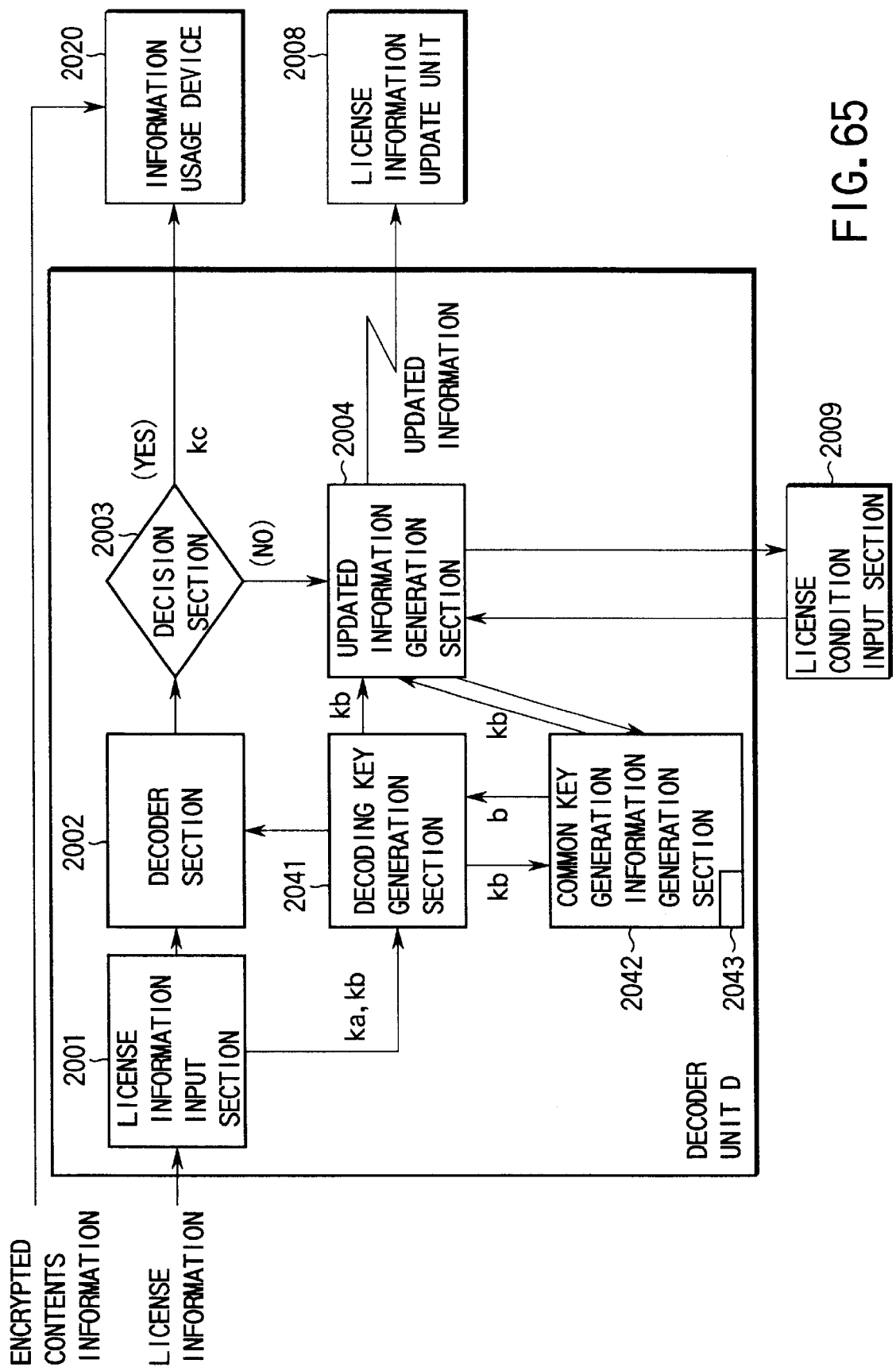
FIG. 65 is a block diagram showing an arrangement of a decoder unit D.

FIG. 65 shows an arrangement of the decoder unit D. The operations of various portions of the decoder unit D shown in FIG. 65 will be described below with reference to the flow chart shown in FIG. 67.

License information is input through the license information input section 2001 (step S1051). The input license information is divided into the encrypted portion and the unencrypted portion by the license information input section 2001. The encrypted portion is sent to the decoder section 2002, and the pieces of common key generation information ka and kb in the unencrypted portion are sent to a decoding key generation section 2041 (step S1052).

The decoding key generation section 2041 sends the common key generation information kb to a common key generation information generation section 2042 and acquires common key information b corresponding to the common key generation information kb by looking up a table 2043 stored in the common key generation information generation section 2042 (steps S1053 and S1054). In response to this, the decoding key generation section 2041 generates the common key $K_{AB}$ from the pieces of common key generation information ka and b (step S1055).

The common key $K_{AB}$ is sent to the decoder section 2002 and used to decode the encrypted portion of the license information (step S1056).

The decoded license information is sent to the decision section 2003 to check the license condition (step S1057). If it is decided that the contents can be used, the contents decoding key kc is output to the information usage device 2020 (steps S1058 and S1059). If it is decided that the contents cannot be used, the updated information generation section 2004 is notified of it and instructs the common key generation information generation section 2042 to generate common key generation information.

The common key generation information generation section 2042 generates a pair of the common key information b and common key generation information kb in accordance with this instruction, and registers them in the table 2043 incorporated in the common key generation information generation section 2042 (step S1060). The generated common key generation information kb is sent to the updated information generation section 2004.

The updated information generation section 2004 prompts the license condition input section 2009 to input a desired license condition. The license condition input section 2009 receives input of the desired license condition from the user through an appropriate human interface and sends it to the updated information generation section 2004.

Figure 69:
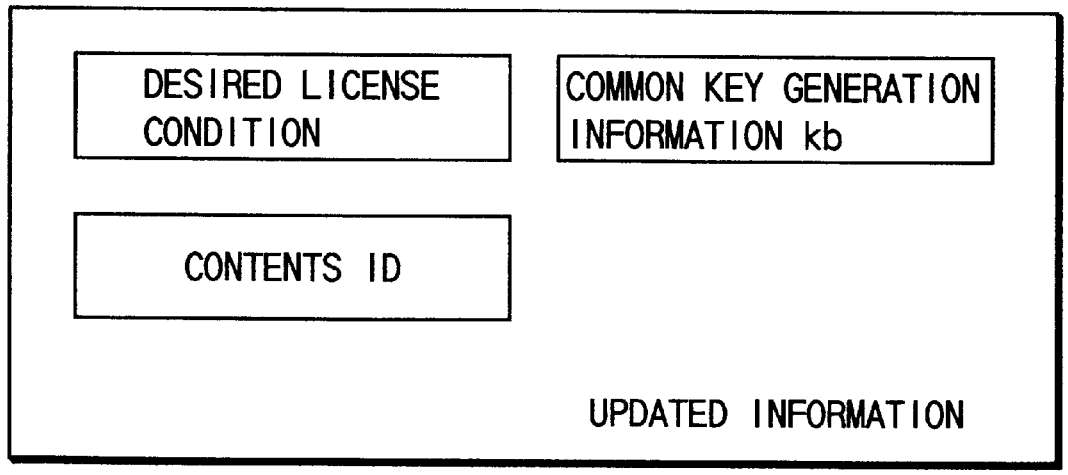
FIG. 69 is a view showing an example of updated information output from the decoder unit D.

The updated information generation section 2004 generates updated information as shown in FIG. 69 on the basis of information obtained by the above process, transmits the updated information to the license information update device 2008 through a predetermined communication line, and receives the updated license information (steps S1061 to S1063).

The license information update device 2008 generates the common key generation information ka and the common key $K_{AB}$, updates the common key generation information ka shown in FIG. 66 to the generated common key generation information ka, and the common key generation information kb to the common key generation information kb contained in the updated information, and encrypts the license condition and the like which are updated on the basis of the desired license condition contained in the updated information, using the generated common key $K_{AB}$, thereby updating the license information.

When the decoder unit D is to reproduce and use the contents for the first time, the common key generation information kb has not been generated. For this reason, the decoding key generation section 2041 cannot generate the common key $K_{AB}$, so the license information cannot be decoded (step S1053).

Processing in this case will be described with reference to the flow chart shown in FIG. 68. In this case, the unencrypted portion of the license information does not have the common key generation information kb (alternatively, invalid information such as a NULL code is contained). Under this situation, the decoding key generation section 2041 detects that this reproduction is to be done for the first use and instructs the common key generation information generation section 2042 to generate common key generation information. In response to this instruction, the common key generation information generation section 2042 generates the pair of the common key information b and common key generation information kb and sends an instruction for updating the common key generation information kb and license (step S1071).

In this case, the encrypted portion of the license information has been encrypted using a secret key ks (the secret key ks is commonly used for all decoder units D). The decoder section 2002 receives the secret key ks from the decoding key generation section 2041 and decodes the encrypted portion (step S1072). The contents ID is extracted from the decoded portion of the license information (step S1073).

In response to this, the updated information generation section 2004 prompts the license condition input section 2009 to input the desired license condition and receives input of the desired license condition from the user through the license condition input section 2009 (step S1074). The contents ID, the desired license condition, and the common key generation information kb, which are obtained by the above process, are described in a format shown in FIG. 69 and transmitted to the license information update device 2008 (step S1075). With this processing, the updated license information is issued.

In reproduction for the first use, when no effective contents decoding key is inserted into the encrypted portion of the license information, the security is further improved. More specifically, if no contents decoding key is contained in the original license information, no contents decoding key can be extracted even when the common secret key ks leaks. In this case, encryption is made to prevent the contents ID from being changed.

In the above arrangement, the decoding key $K_{AB}$ must be generated every time decoding is performed, and a new decoding key $K_{AB}$ must be used for decoding every time the license information is updated (a new decoding key is generated from the common key information b retrieved from the table 2043 in correspondence with the common key generation information kb contained in the license information). For this reason, the influence of leakage of the decoding key $K_{AB}$ is minimized. In addition, since the common key cipher at a much higher speed than the public key cipher can be used, even license information with a large data size can be decoded in real time, and the contents use enable/disable state based on the license condition contained in the license information can be reflected.

Variations of the decoder unit D will be described next.

First, the common key generation information kb to be generated by the decoder unit D may be fixed. In this case, the security lowers to some degree. However, the common key $K_{AB}$ is changed every time the common key generation information ka generated by the license information update device 2008 changes, so the validity of the decoder unit D is maintained. The common key generation information generation section 2042 shown in FIG. 65 can be omitted. Predetermined common key generation information kb and common key information b can be held in the decoding key generation section 2041.

Figure 68:
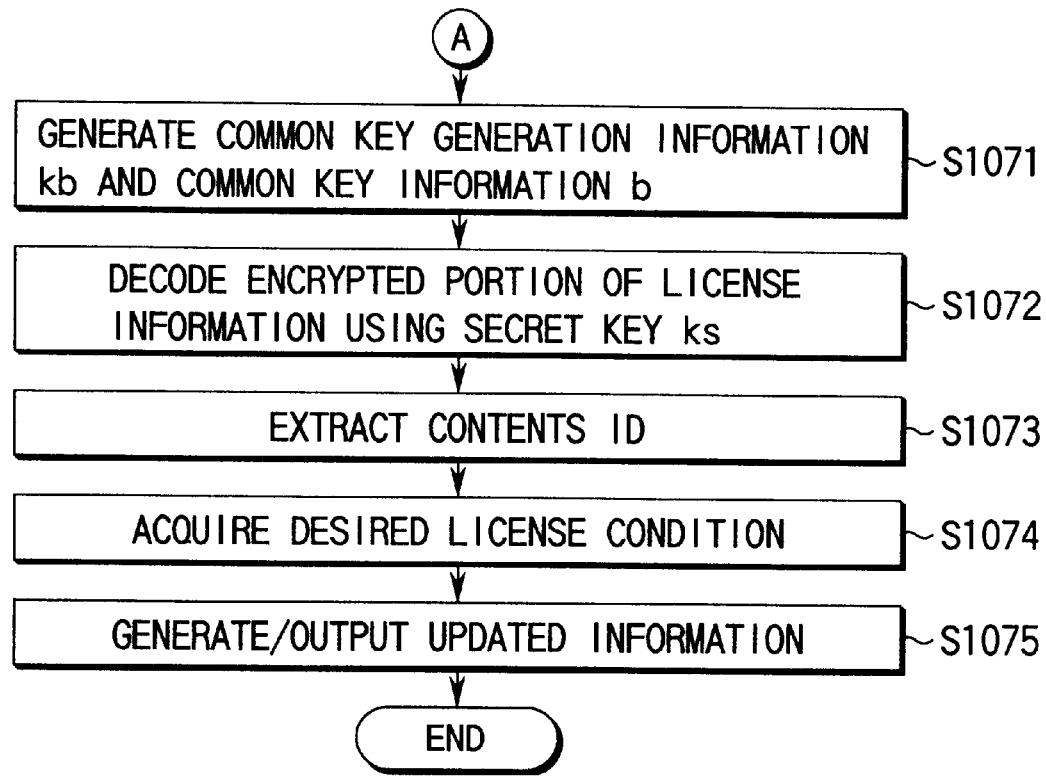
FIG. 68 is a flow chart for explaining the processing operation of the decoder unit D.

When the decoder unit D is to reproduce and use the contents information for the first time, the license must always be updated in accordance with acquisition of the common key generation information kb, as shown in FIG. 68. To solve this problem, the license information is encrypted using a predetermined common key $K_{com}$ or public key $K_p$ only for the first time. In this case, the secret key $K_p$ corresponding to the common key $K_{com}$ or public key $K_p$ must be held in the decoder unit D and used only for the first time. In this arrangement, the contents decoding key must always be contained, though it need not be contained in processing for the first use shown in FIG. 68.

Figure 67:
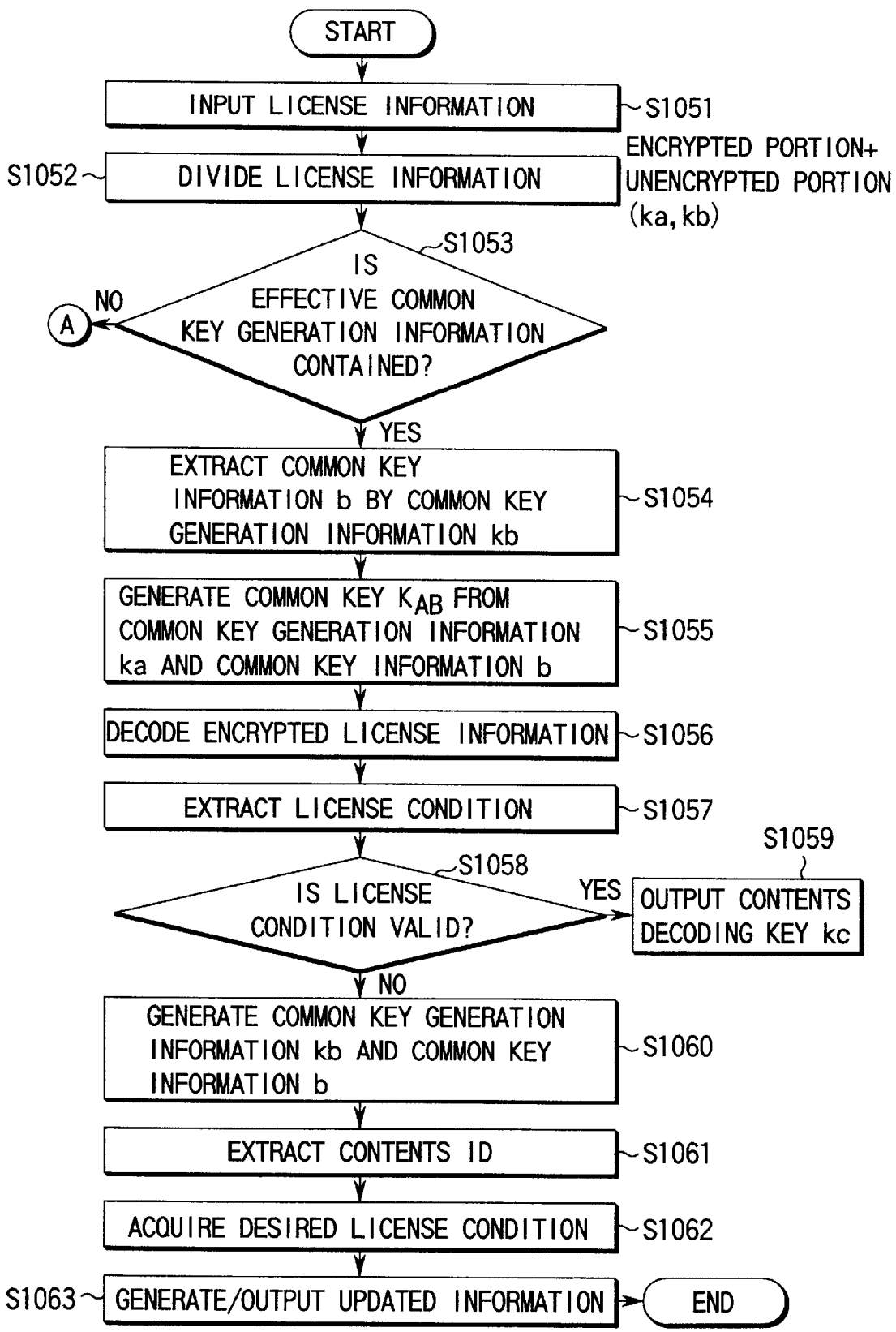
FIG. 67 is a flow chart for explaining the processing operation of the decoder unit D.

More specifically, in step S1053 in FIG. 67, the updated information generation section 2004 decides that the reproduction is to be performed for the first time because the pieces of common key generation information ka and kb are not present, and the decoder section 2002 decodes the license information using the common key $K_{com}$ or public key $K_p$ held in the decoding key generation section 2041 or decoder section 2002. Subsequent processing is the same as that from step S1054 in FIG. 67.

Figure 70:
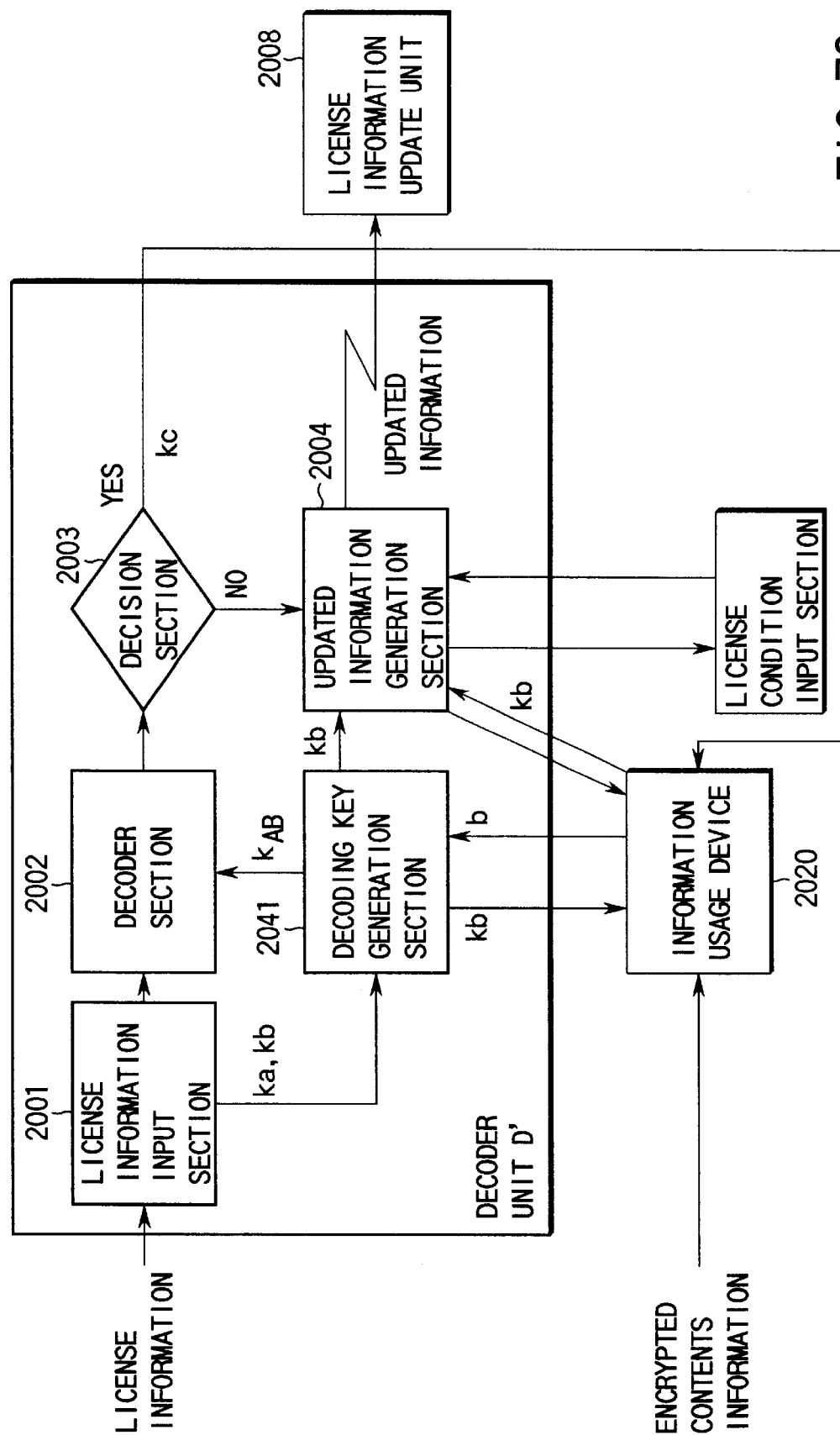
FIG. 70 is a block diagram showing an arrangement of a decoder unit D'.

Alternatively, the common key generation information kb to be generated by the decoder unit D may be generated by the information usage device 2020. FIG. 70 shows the arrangement of a decoder unit D' for this purpose. As shown in FIG. 70, the common key generation information generation section 2042 in FIG. 65 is replaced with the information usage device 2020. Since the information usage device 2020 is set outside the decoder unit D', the common key information b must be kept secret. However, this problem can be solved by performing encryption using a temporarily key between the decoding key generation section 2041 and the information usage device 2020. In this case, even the common key information b need not be held in the decoder unit D', so the security is further improved as compared to the decoder unit D. The information usage device 2020 is also attacked, and an individual measure must be taken because information usage devices are mounted in different manners. The security level can be changed for each information usage device 2020. The processing operation of the decoder unit D' is the same as that in the flow charts shown in FIGS. 67 and 68.

(4) License Information Update Device Corresponding to Decoder Unit A

Figure 71:
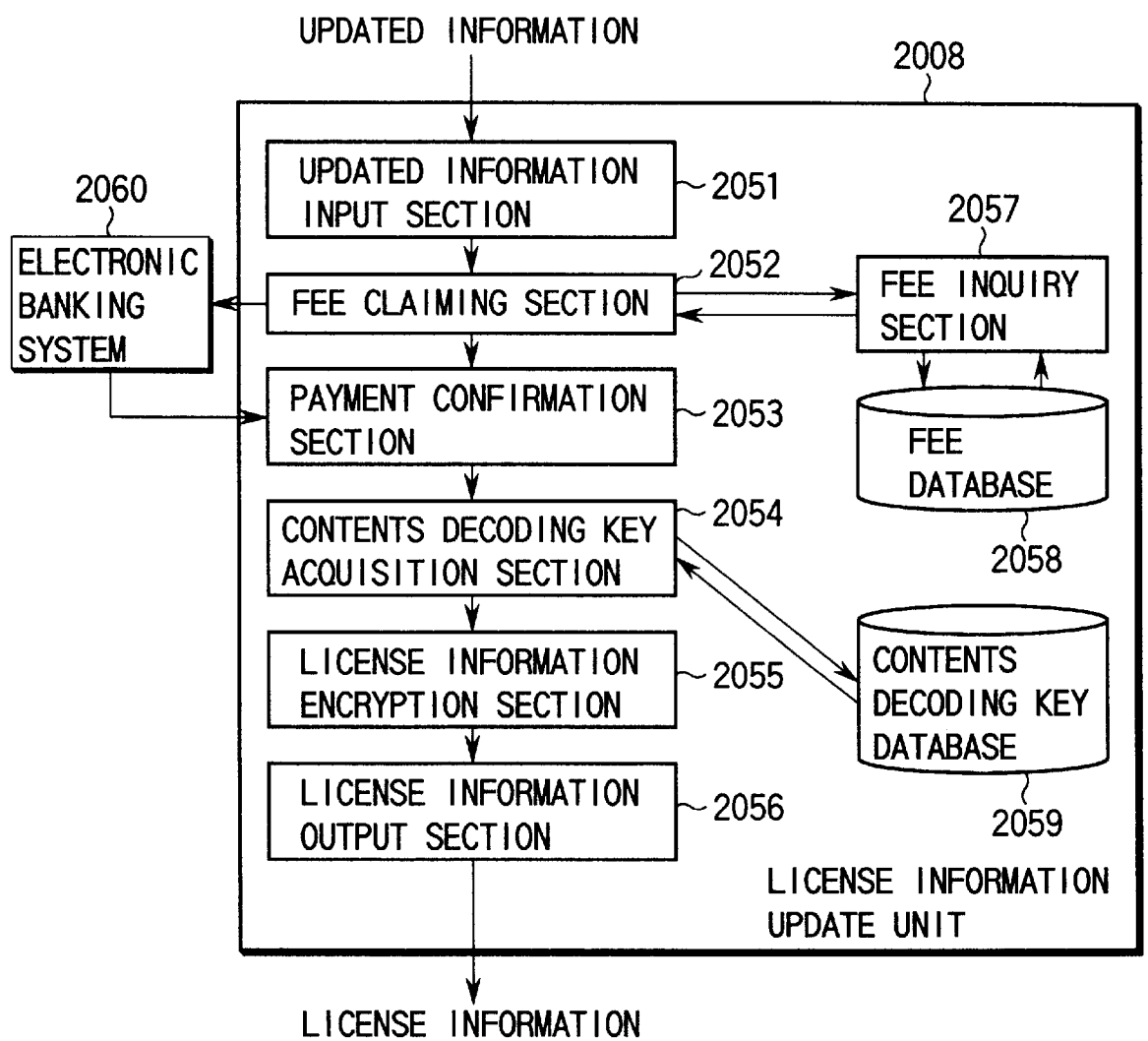
FIG. 71 is a block diagram showing an arrangement of a license information update apparatus corresponding to the decoder unit A.
Figure 72:
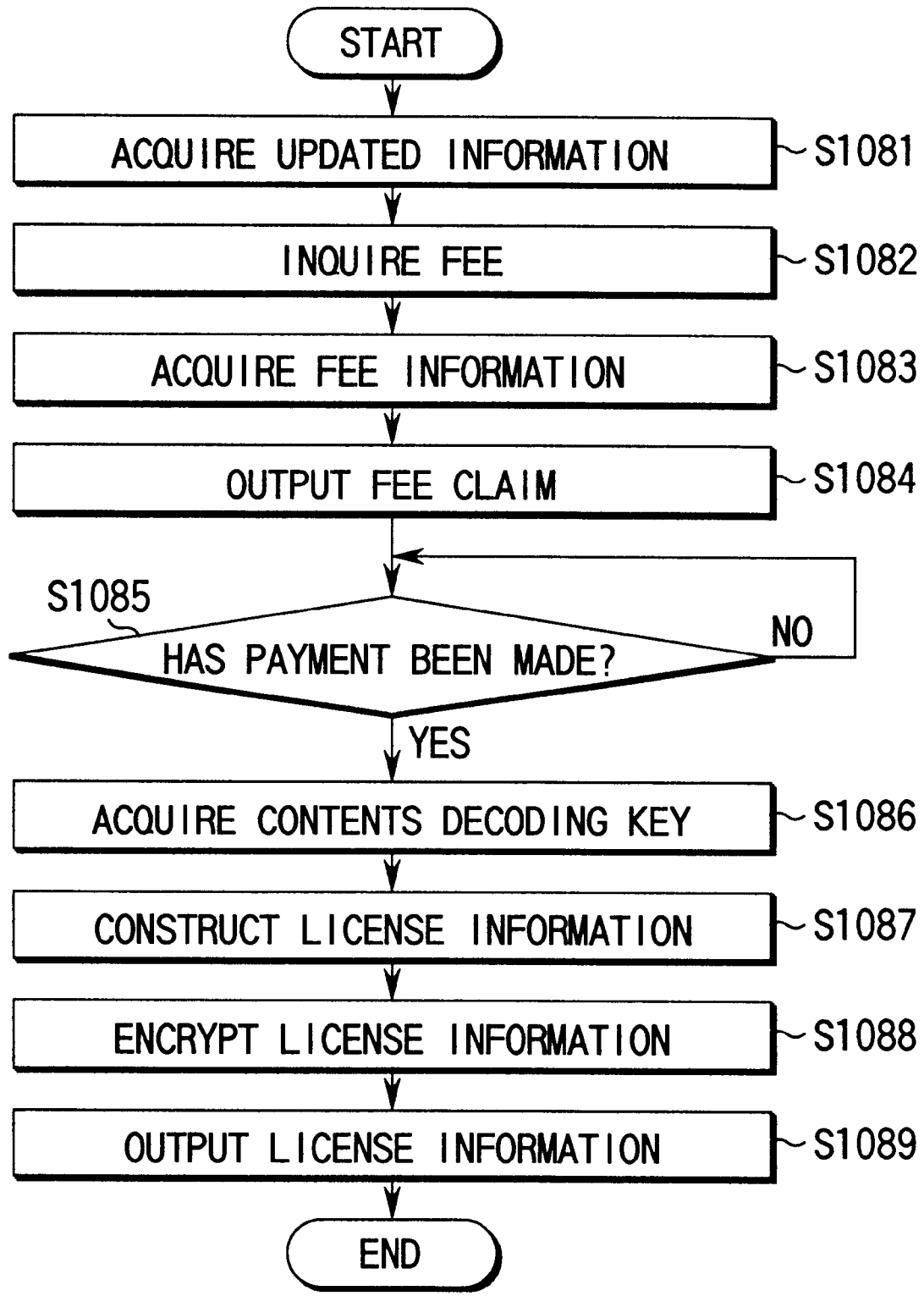
FIG. 72 is a flow chart for explaining the processing operation of the license information update apparatus shown in FIG. 71.

FIG. 71 shows an arrangement of the license information update device 2008 corresponding to the above-described decoder unit A. The processing operations of various portions of the license information update device 2008 in FIG. 71 will be described below with reference to the flow chart shown in FIG. 72.

Updated license information transmitted from the decoder unit A is input to the license information update device 2008 through the updated information input section 2051 (step S1081).

Figure 56:
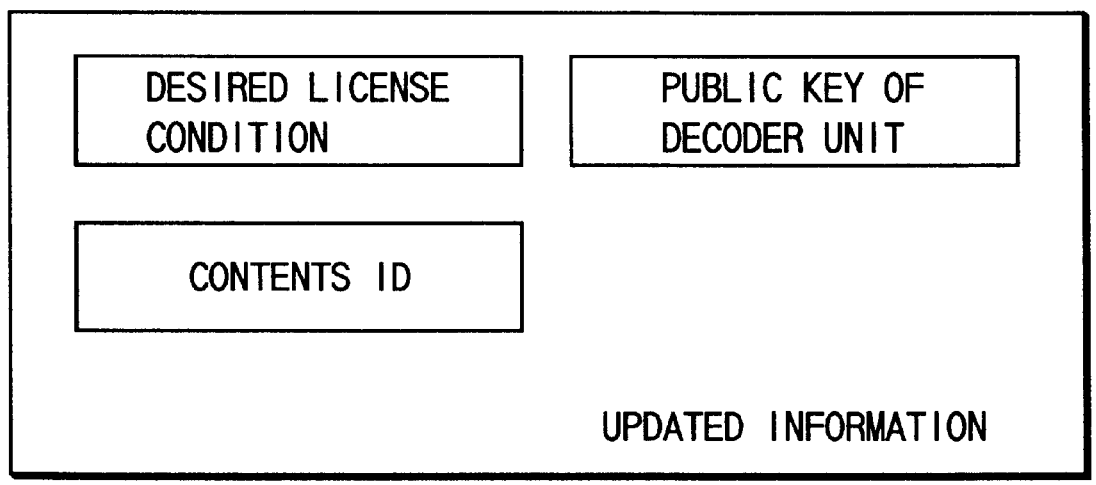
FIG. 56 is a view showing an example of updated information output from the decoder unit A.

The updated information to be used at this time is the updated information shown in FIG. 56, i.e., information containing the desired license condition, the contents ID, the public key generated by the decoder unit A, and the like, which is necessary for updating the license. The contents ID is used to specify the contents for which the license is to be given. On the basis of the contents ID, accounting information corresponding to the desired license condition can be acquired using the database incorporated in the license information update device 2008, and the contents decoding key can also be acquired using the database. For this reason, the contents decoding key need not be input to the license information update device 2008 to update the license information, and the updated information in FIG. 56 need not be encrypted before transmission. This is the characteristic feature of the license information update device 2008 shown in FIG. 72.

The updated information shown in FIG. 56, which is input from an updated information input section 2051, is sent to a fee claiming section 2052. The desired license condition contained in the updated information is sent to a fee inquiry section 2057.

The fee inquiry section 2057 accesses a fee database (DB) 2058 to acquire a fee corresponding to the desired license condition (steps S1082 and S1083). If the valid period of "two months" is designated as desired period, a contents usage fee value corresponding to the period is retrieved and transferred to the fee inquiry section 2057 and the fee claiming section 2052.

The fee claiming section 2052 accesses a predetermined electronic banking system 2060 through a predetermined communication line to send, to the client, a fee claim based on the acquired fee value and client data contained in the updated information. The electronic banking system 2060 executes predetermined electronic payment processing (step S1084).

A payment confirmation section 2053 in the license information update device 2008 communicates with the electronic banking system 2060 through a predetermined communication line to confirm fee payment, and the flow advances to processing in a contents decoding key acquisition section 2054 (step S1085).

The contents decoding key acquisition section 2054 searches a contents decoding key database (DB) 2059 for a contents decoding key using the contents ID as a key (step S1086). Since it is assumed that the license information update device 2008 is managed and operated by a specific reliable agency, the contents decoding key DB 2059 and the obtained contents decoding key need not be encrypted.

A license information encryption section 2055 constructs license information on the basis of the obtained information (step S1087), encrypts the license information using a public key contained in the updated information shown in FIG. 56, which has been received in advance (step S1088), and transmits the license information to the client as a license information update request source, i.e., the decoder unit A through a predetermined communication line (step S1089).

(5) License Information Update Device Corresponding to Decoder Unit B

Figure 73:
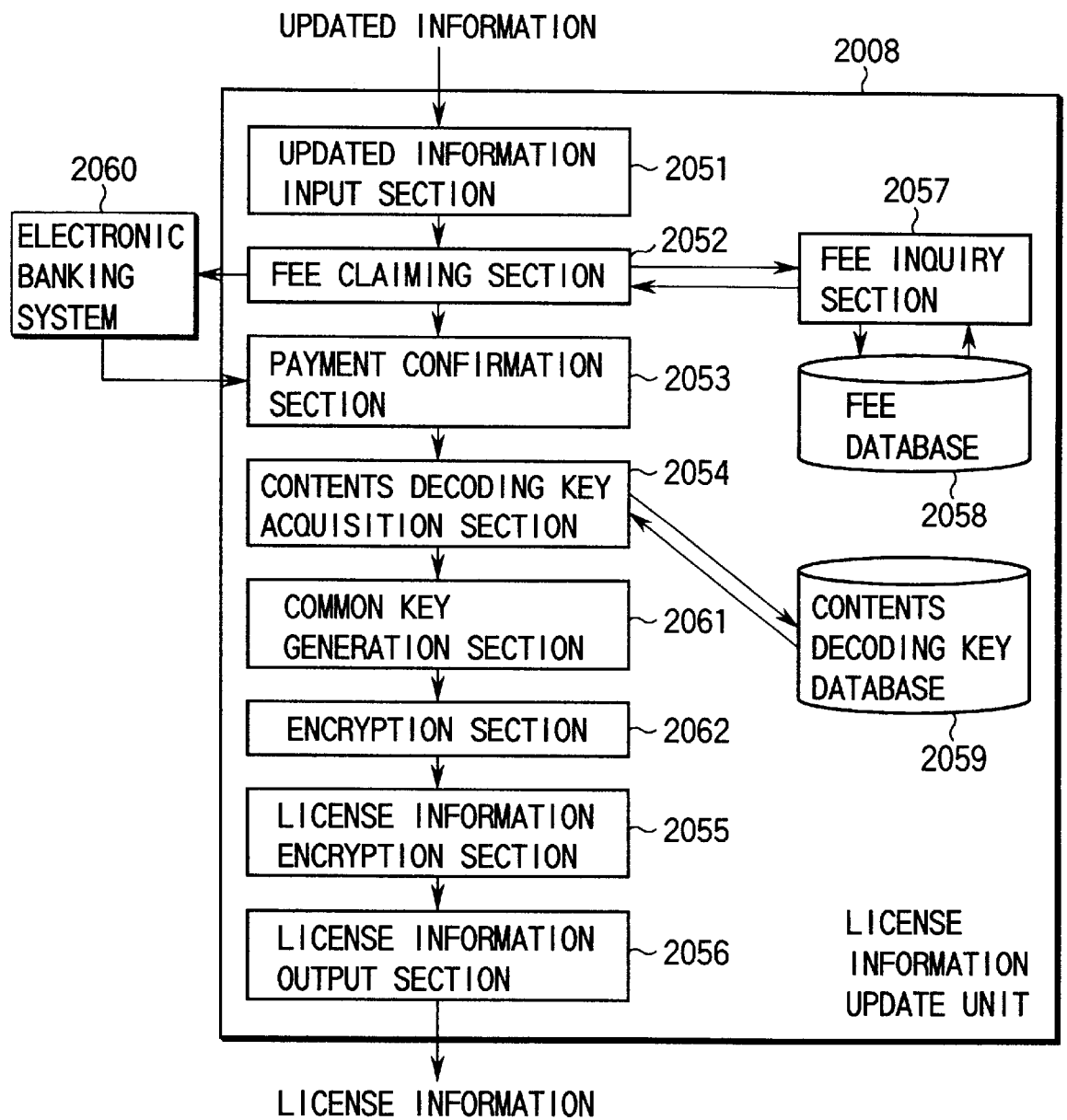
FIG. 73 is a block diagram showing an arrangement of a license information update apparatus corresponding to the decoder unit B.
Figure 74:
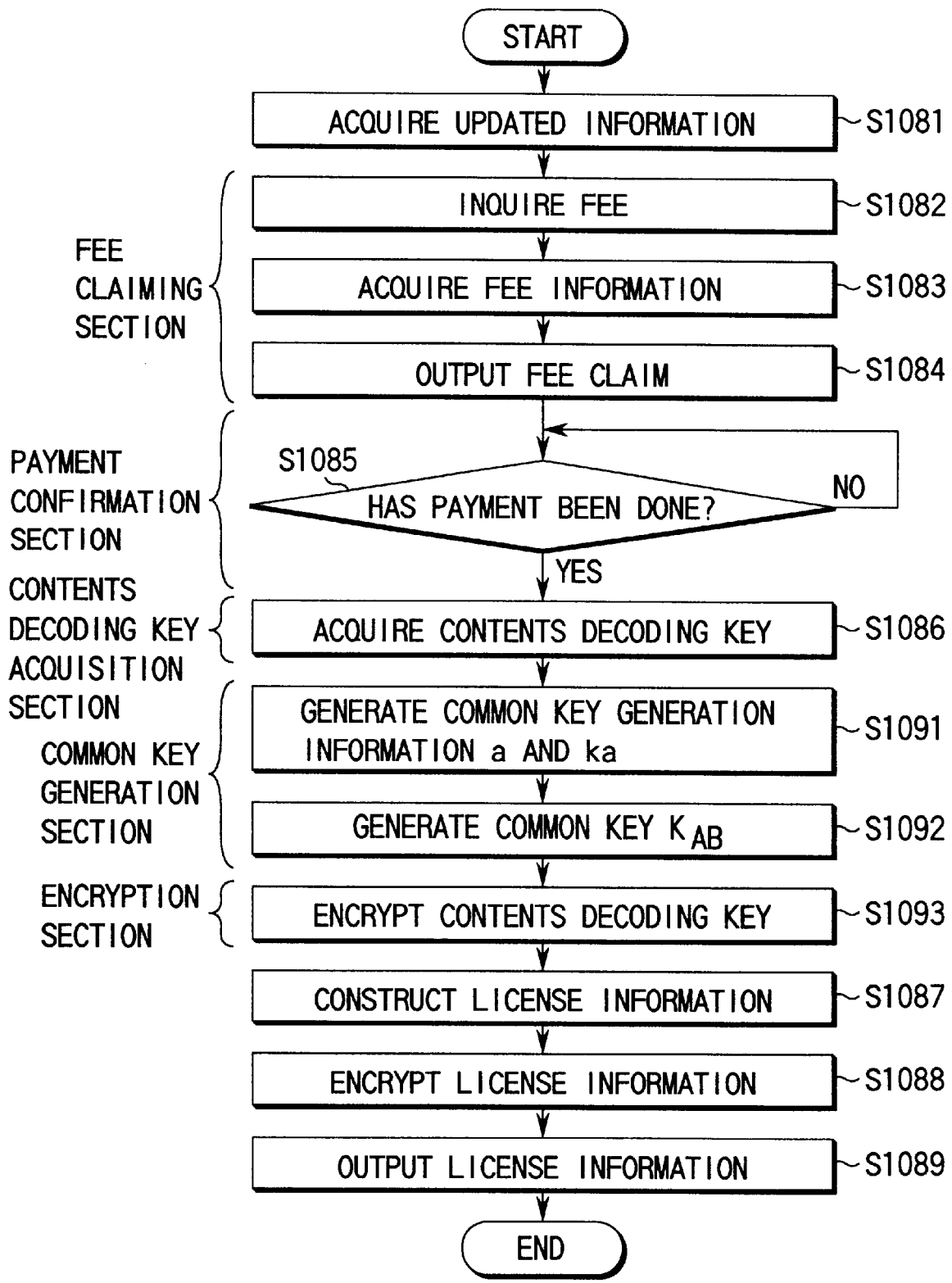
FIG. 74 is a flow chart for explaining the processing operation of the license information update apparatus shown in FIG. 73.

FIG. 73 shows an arrangement of the license information update device 2008 corresponding to the above-described decoder unit B. The processing operations of various portions of the license information update device 2008 in FIG. 73 will be described below with reference to the flow chart shown in FIG. 74.

The same reference numerals as in FIG. 71 denote the same parts in FIG. 73, and only different portions will be described. Referring to FIG. 73, a common key generation section 2061 and a contents decoding key encryption section 2062 are inserted between the contents decoding key acquisition section 2054 and the license information encryption section 2055. The same reference symbols as in the flow chart of FIG. 72 denote the same operations in the flow chart of FIG. 74, and only different portions will be described. Between steps S1086 and S1087, the integer a and the common key generation information ka are generated by the common key generation section 2061. The common key $K_{AB}$ is generated from the integer a and common key generation information ka, and the common key generation information kb unique to the information usage device 2020, which is contained in the updated information (steps S1091 and S1092). The encryption section 2062 encrypts the contents decoding key newly acquired in step S1086 using the newly generated common key $K_{AB}$ (step S1093).

Figure 62:
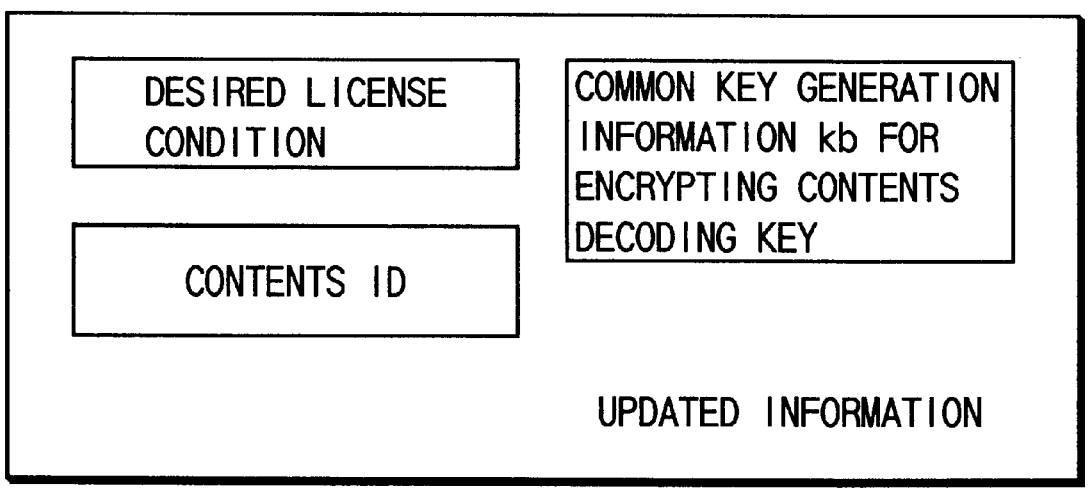
FIG. 62 is a view showing an example of updated information output from the decoder unit B.

In the arrangement shown in FIG. 73, to encrypt the contents decoding key and insert it in the license information, the common key generation section 2061 must generate a common key between the information usage device 2020 and the license information update device 2008 to decode the encrypted contents decoding key. The common key is generated using common key generation information, as described about the decoder unit B. Therefore, the updated information input to the license information update device 2008 in FIG. 73 contains at least the desired license condition, the contents ID, and the common key generation information kb generated by the information usage device 2020 using a random number or the like, as shown in FIG. 62.

In step S1088, the newly generated license information is encrypted by the license information encryption section 2055 using a predetermined public key.

In a license information update device corresponding to the decoder unit C having both the function of the decoder unit A which individually holds or generates the public key and the secret key and the function of the decoder unit B which encrypts the contents decoding key using the common key between the license information update device 2008 and the information usage device 2020, the updated information to be input also contains a public key generated by the decoder unit C. In step S1088 in FIG. 74, the generated license information is encrypted using the public key.

A license information update device corresponding to the decoder unit D or D' has almost the same arrangement as described above. As the different point, the encryption section 2062 shown in FIG. 73 encrypts the license condition, the contents decoding key kc, and the contents ID using the common key $K_{AB}$ to generate license information as shown in FIG. 66, and outputs the generated license information directly through the license information output section 2056.

(Third Embodiment)

Figure 75:
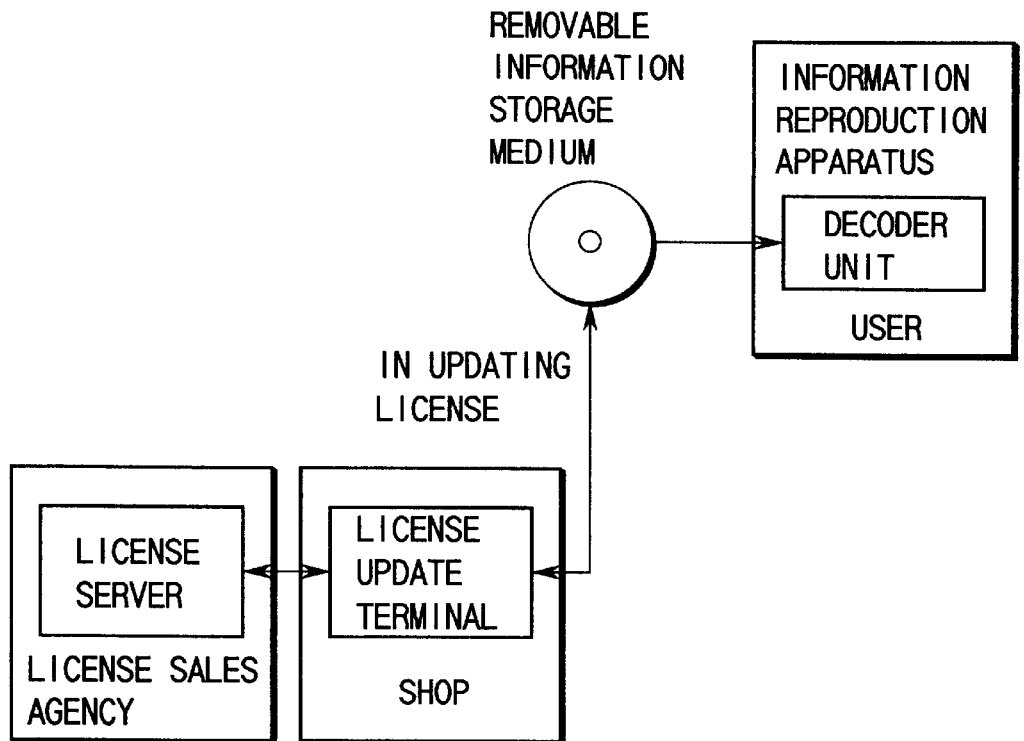
FIG. 75 is a block diagram showing an arrangement of an information distribution system according to the third embodiment.

FIG. 75 shows an arrangement of an information distribution system according to the third embodiment.

In FIG. 75, the user acquires contents information as an accounting object recorded on a removable information storage medium (to be simply referred to as a medium hereinafter) such as a DVD. License information for the contents information is also recorded on the medium. The information reproducing apparatus of the user incorporates a decoder unit, and it is decided on the basis of the license information read from the medium whether the contents can be used.

If the contents cannot be used, the license information must be updated for the user to use the contents. More specifically, the license condition contained in the license information, i.e., the license must be updated. The license condition, i.e., the license information is updated in a shop having a license update terminal for this purpose. The license update terminal is connected to a license server operated by a license sales agency. The user designates a desired license condition (e.g., designation of contents and the expiration date therefor) and pays a corresponding license fee (contents fee corresponding to the license condition) to the shop. The license update terminal communicates with the license server and updates the license information recorded on the medium on the basis of information sent from the license server, thereby updating the license. For example, when the user purchases a license with an expiration date, the contents can be used without updating the license before it expires.

Figure 76:
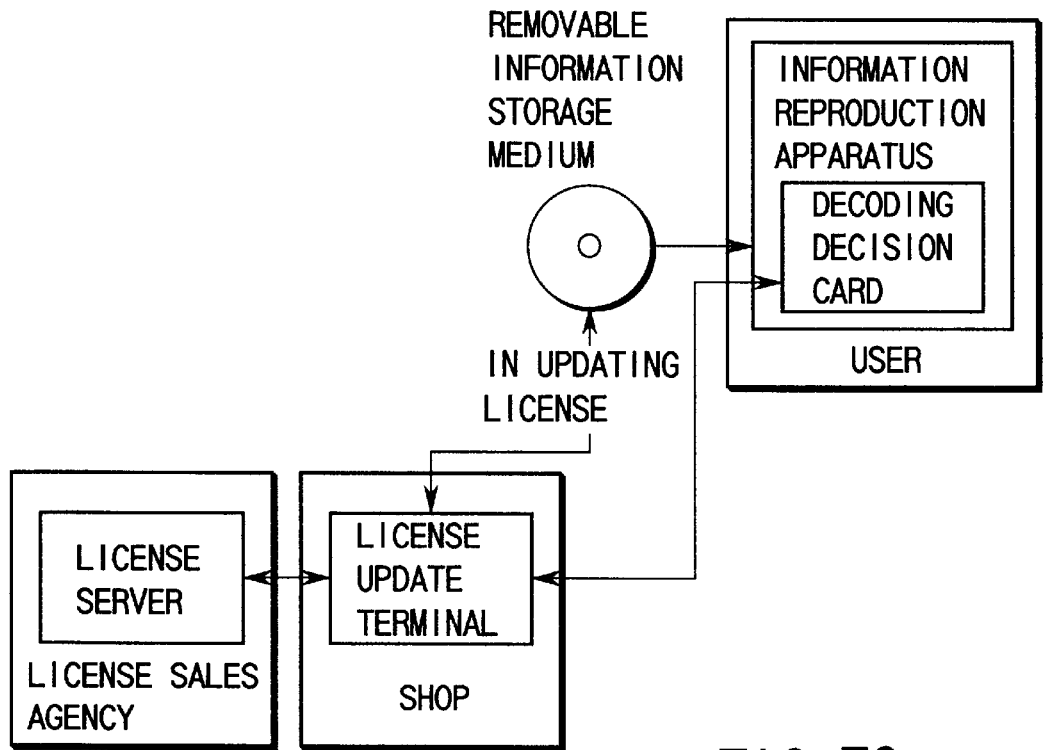
FIG. 76 is a block diagram showing another arrangement of the information distribution system according to the third embodiment.

FIG. 76 shows another arrangement of the information distribution system. As a different point from FIG. 75, at least the function of the decoder unit is incorporated in a card type recording medium such as an IC card. The card type recording medium such as an IC card incorporating a decoder unit will be called a decoding decision card hereinafter. In this case, to update the license, the user goes to the shop having the license update terminal with the decoding decision card. The license update terminal reads a public master key from the decoding decision card and transfers it to the license server. The user designates a desired license condition (e.g., designation of contents and the expiration date therefor) and pays a corresponding license fee (contents fee corresponding to the license condition) to the shop. The license update terminal communicates with the license server and updates the license information recorded on the medium on the basis of information sent from the license server, thereby updating the license.

The public master key will be described later.

In FIG. 75, the decoder unit need not always be incorporated in the information reproducing apparatus and may have the shape of the decoding decision card shown in FIG. 76 and detachably inserted into the information reproducing apparatus. The information distribution systems shown in FIGS. 75 and 76 will be described below while exemplifying the use of the decoding decision card.

(1) Information Distribution System in FIG. 75

(1-1) Information Reproducing Apparatus

Figure 77:
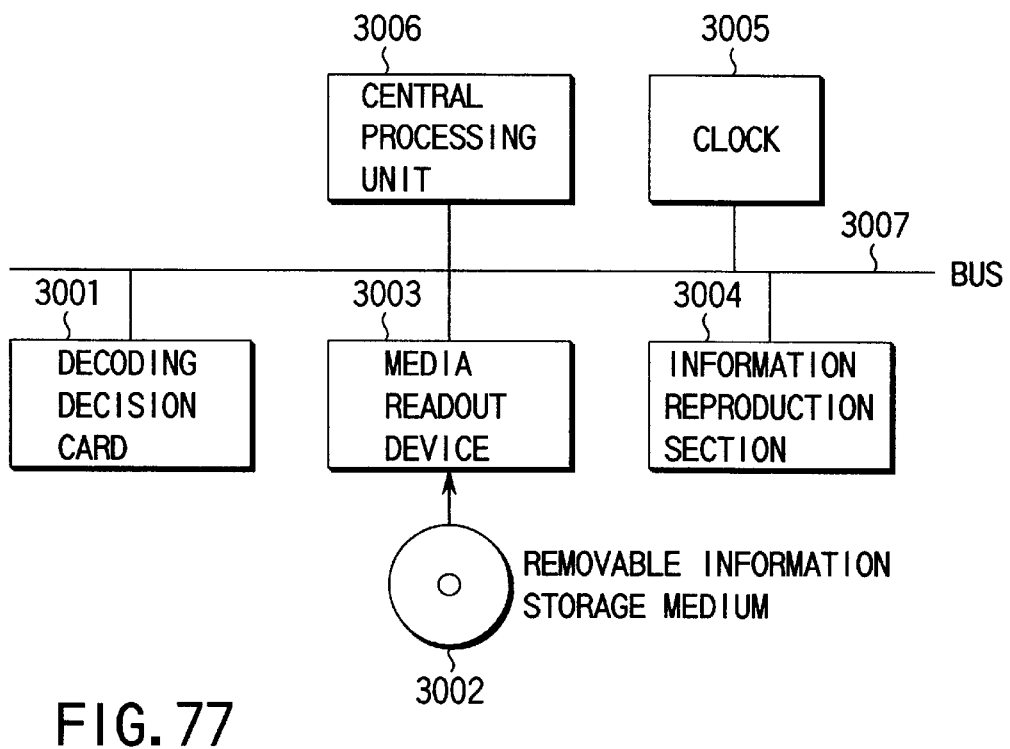
FIG. 77 is a block diagram showing an arrangement of the main part of an information reproducing apparatus in which a decoding decision card is mounted.

FIG. 77 shows an arrangement of an information reproducing apparatus having a decoding decision card. The information reproducing apparatus is constituted by connecting, to a bus 3007, a decoding decision card 3001, a media readout device 3003, an information reproduction device 3004, a clock 3005, and a central processing unit 3006.

The clock 3005 is used to decide whether the expiration date for contents as a license condition is valid/invalid. As described above in the first embodiment, time is set using an encrypted command. In updating the license, a time setting operation is performed to adjust the time of this clock in correspondence with the time of the server. This operation has been described above. With this processing, the clock 3005 can maintain almost correct time.

The media readout device 3003 reads information recorded on a medium 3002 such as a DVD. The decoding decision card 3001 decides on the basis of the readout information whether the contents information recorded on the medium 3002 can be used. If it is decided that the contents information can be used, the information reproduction section 3004 can reproduce the contents information read from the medium 3002 by the media readout device 3003. The central processing unit 3006 controls the operation of each section.

Each of the decoding decision card 3001 and the clock 3005 shown in FIG. 77 holds key generation information Kt. Each of the decoding decision card 3001 and the information reproduction device 3004 holds key generation information K't.

On the basis of random numbers A and B and the key generation information Kt, a transfer key KT which is valid only once to encrypt/decode current time information to be transferred between the clock 3005 and the decoding decision card 3001 is generated. In addition, on the basis of random numbers C and D and the key generation information K't, the transfer key KT which is valid only once to encrypt/decode a contents key Kc for decoding contents information encrypted between the decoding decision card 3001 and the information reproduction section 3004 is generated. With this processing, information transferred through the bus 3007 is protected.

The medium 3002 stores the following information.

License information ([license information] KM) encrypted using a master key KM

Master key ID as an identifier (e.g., a number) for designating the master key KM for decoding the license information Contents information ([contents information] Kc) encrypted using the contents key Kc In the following description, both the encryption and decoding keys to be used to encrypt/decode the license information will be called the master keys KM, and the encryption and decoding keys of the license information are not always identical.

The license information has the following information.

Contents key Kc

Contents ID

Figure 78:
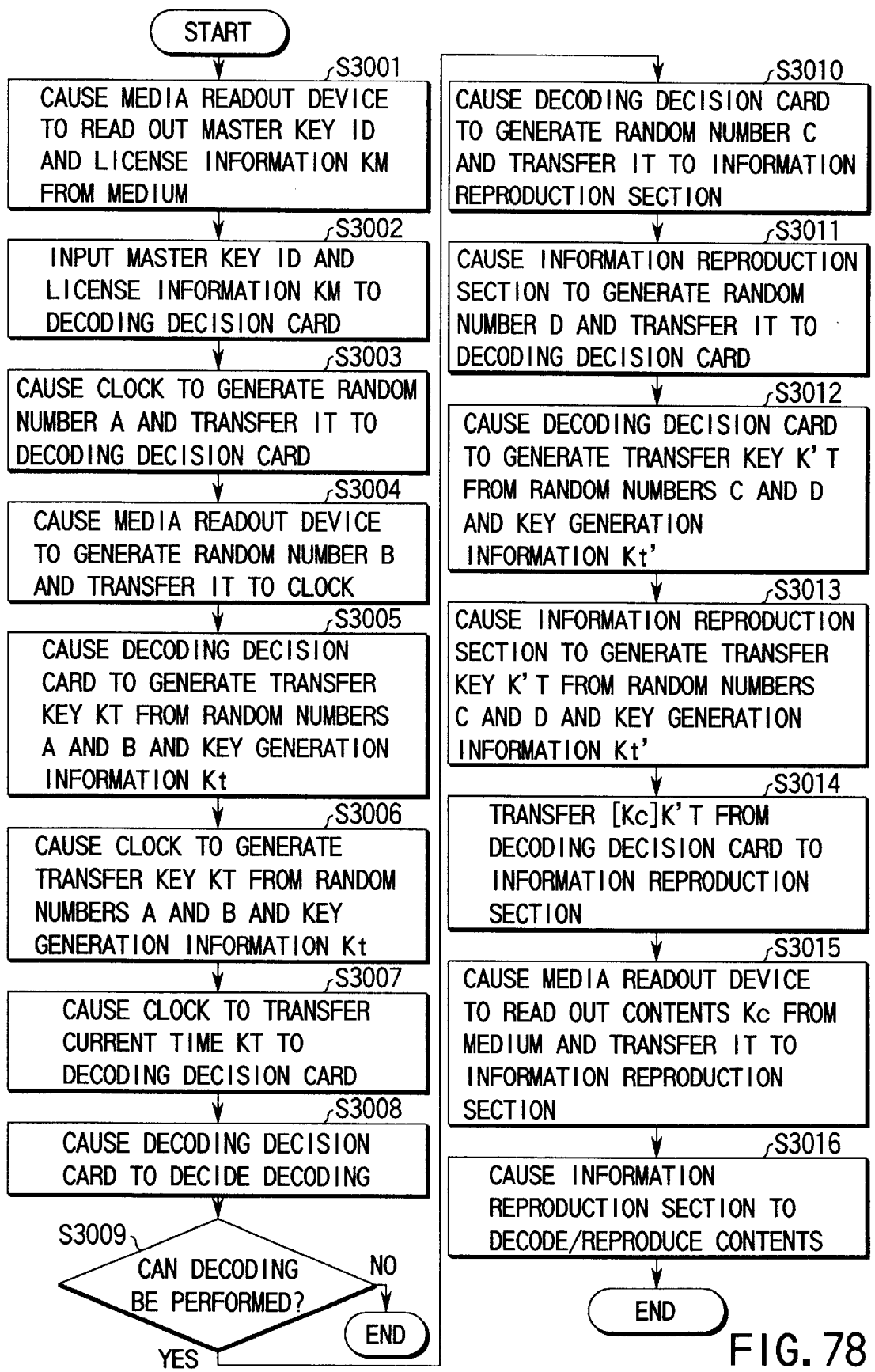
FIG. 78 is a flow chart for explaining the processing operation of the information reproducing apparatus shown in FIG. 77 which is used in the information distribution system shown in FIG. 75.

Contents license condition such as an expiration date, use start time, license information recording time, and the like FIG. 78 is a flow chart showing the processing operation of the information reproducing apparatus shown in FIG. 77, which is used in the information distribution system shown in FIG. 75.

The media readout device 3003 reads out the master key ID and the [license information] KM from the medium 3002 set in the media readout device 3003 and transfers them to the decoding decision card 3001 (steps S3001 and S3002).

The clock 3005 generates the random number A in accordance with a predetermined algorithm and transfers it to the decoding decision card 3001 (step S3003). The decoding decision card 3001 also generates the random number B in accordance with a predetermined algorithm and transfers it to the clock 3005 (step S3004). With this processing, the decoding decision card 3001 and the clock 3005 mutually confirms the random numbers A and B.

The decoding decision card 3001 and the clock 3005 generate the transfer key KT from the random numbers A and B and the key generation information Kt held in them (steps S3005 and S3006). The clock 3005 encrypts current time information using the generated transfer key KT ([current time] KT) and transfers it to the decoding decision card 3001 (step S3007).

The decoding decision card 3001 decodes the license information using the master key KM designated by the master key ID, decodes the [current time] KT transferred from the clock 3005 using the generated transfer key KT, and decides on the basis of the decoded license information and time information whether the contents information designated by the contents ID can be used, i.e., decoded (step S3008). If it is decided that decoding cannot be performed, processing is ended.

If it is decided that decoding can be performed (YES in step S3009), the decoding decision card 3001 generates the random number C on the basis of a predetermined algorithm and transfers it to the information reproduction section 3004 (step S3010). The information reproduction device 3004 also generates the random number D on the basis of a predetermined algorithm (step S3011). With this processing, the decoding decision card 3001 and the information reproduction section 3004 mutually confirm the random numbers C and D.

The decoding decision card 3001 and the information reproduction section 3004 generate a transfer key K'T from the random numbers C and D and the key generation information K't held in them (steps S3012 and S3013). The decoding decision card 3001 encrypts the contents key Kc contained in the license information using the generated transfer key K'T ([Kc] K'T) and transfers it to the information reproduction section 3004 (step S3014).

The media readout device 3003 reads out the [contents] Kc from the medium 3002 and transfers it to the information reproduction section 3004 (step S3015).

The information reproduction section 3004 decodes [Kc] K'T using the generated transfer key K'T and decodes the contents information using the resultant contents key Kc (step S3016).

(1-2) Decoding Decision Card

Figure 79:
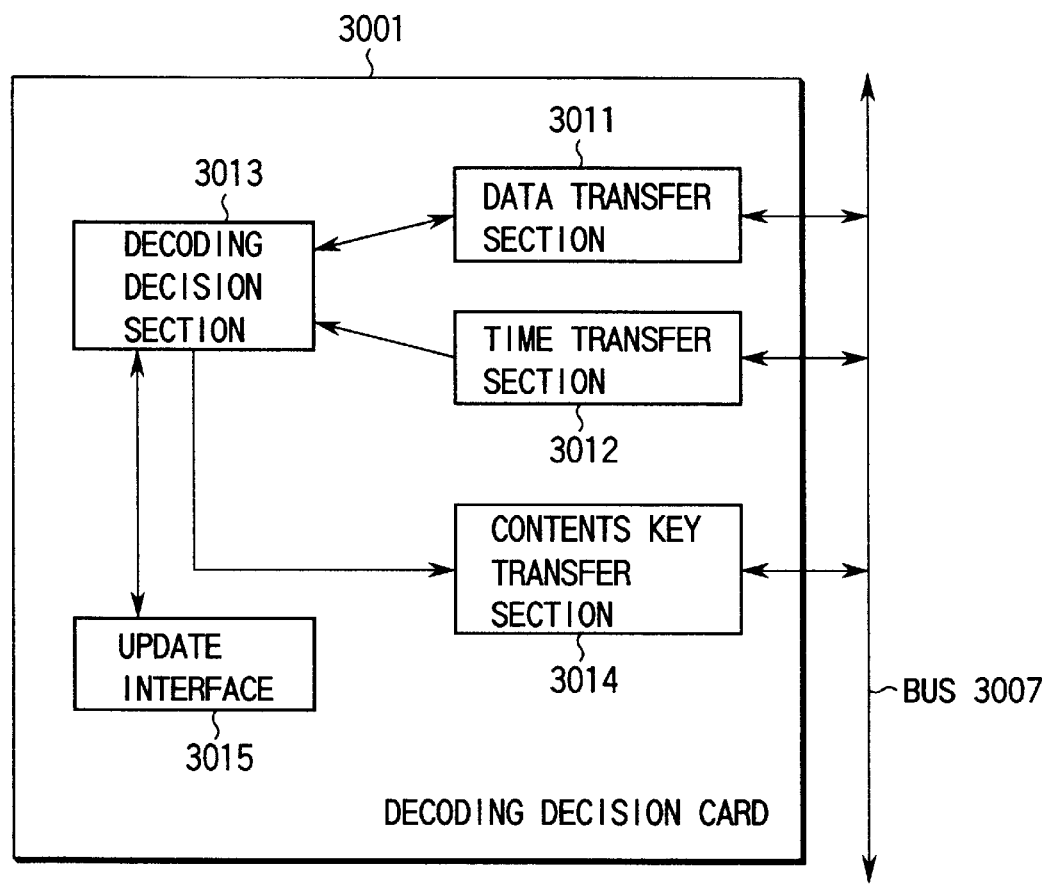
FIG. 79 is a block diagram showing an arrangement of the main part of the decoding decision card.

FIG. 79 shows an arrangement of the decoding decision card 3001.

A time transfer section 3012 receives time information counted by the clock 3005 incorporated in the information reproducing apparatus shown in FIG. 77 and transfers it to a decoding decision section 3013.

A contents key transfer section 3014 performs an operation of transferring the contents key Kc to the information reproduction section 3004 in FIG. 77 while protecting the contents key Kc.

A data transfer section 3011 is used to send/receive information other than the time information to be transferred from the clock 3005 and the contents key to be transferred to the information reproduction section 3004 to/from the media readout device 3003, the information reproduction section 3004, and the decoding decision card 3001.

The time transfer section 3012 and the data transfer section 3011 are separately arranged to perform special processing such as data protection using a temporary key or time-out by the clock in accordance with time transfer.

Figure 80:
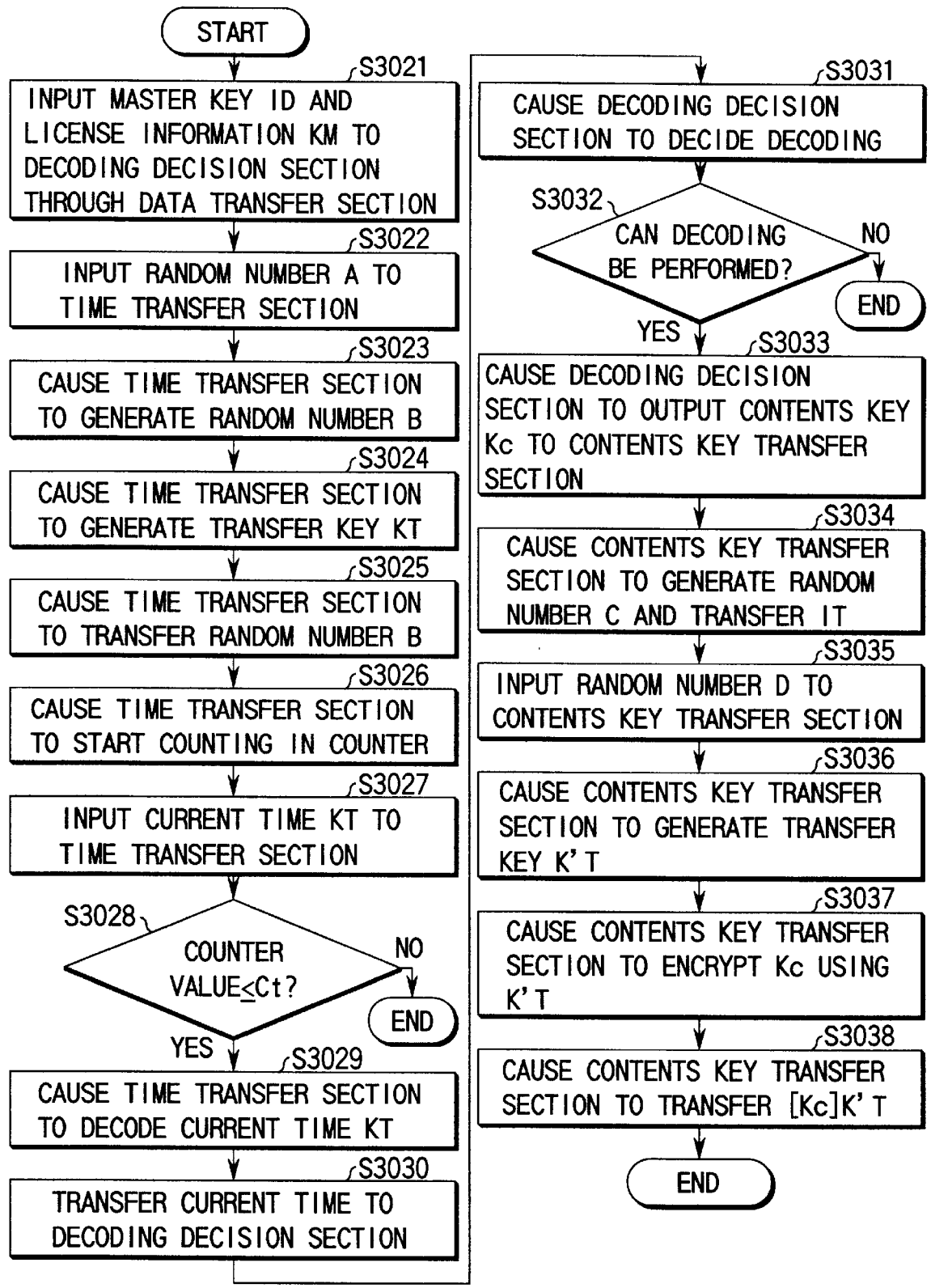
FIG. 80 is a flow chart for explaining the processing operation of the decoding decision card shown in FIG. 79.

FIG. 80 is a flow chart showing details of the processing operation of the decoding decision card 3001 shown in FIG. 79 until output of the contents information use enable/disable decision result.

The master key ID and [license information] KM transferred from the media readout device 3003 in step S3002 in FIG. 78 are input to the decoding decision section 3013 through the data transfer section 3011 (step S3021). The random number A transferred from the clock 3005 in step S3003 in FIG. 78 is input to the time transfer section 3012 (step S3022). Upon receiving the random number A, the time output section 3022 generates the random number B and generates the transfer key KT from the random number B and the random number A which has been received in advance (steps S3023 and S3024). The random number B is transferred to the clock 3005 (step S3025). Simultaneously, the time output section 3022 starts to increment the clock counter (step S3026).

The [current time] KT transferred from the clock 3005 in step S3007 in FIG. 78 is input to the time output section 3022 (step S3027). If the counter value of the time output section 3022 exceeds a predetermined value Ct, processing is ended (step S3028).

The counter value Ct means the time-out time and is a predetermined positive integer. In this embodiment, the decoding decision card acquires the time information outside the decoding decision card 3001. Therefore, it is important that the acquired time information is valid. For this purpose, the random numbers A and B are exchanged between the clock 3005 and the time transfer section 3012 of the decoding decision card 3001, and the time information is encrypted using the key KT which is valid only once, and transferred. However, only with this processing, illicitness such as intended delay of time information transfer cannot be prevented.

To prevent illicitness of this type, the time transfer section 3012 stops processing unless the time information arrival time, i.e., time from output of the random number B from the time transfer section 3012 to arrival of the (encrypted) time information at the time transfer section 3012 is equal to or shorter than the predetermined time Ct.

If the [current time] KT is input within a predetermined period, the [current time] KT is decoded using the transfer key KT generated in advance to obtain time information (step S3029). The time information is transferred to the decoding decision section 3013. The decoding decision section 3013 decides on the basis of the decoded license information and time information whether the contents information designated by the contents ID can be used, i.e., decoded (step S3031). If it is decided that the contents information cannot be decoded, processing is ended.

If it is decided that decoding is enabled (YES in step S3032), the decoding decision section 3013 outputs the contents key kc contained in the license information to the contents key transfer section 3014 (step S3033).

The contents key transfer section 3014 generates the random number C and transfers it to the information reproduction section 3004 (step S3034). When the random number D transferred from the information reproduction section 3004 is input to the contents key transfer section 3014 in step S3011 in FIG. 78, the transfer key K'T is generated from the random numbers D and C (steps S3035 and S3036). The contents key transfer section 3014 encrypts the contents key Kc using the generated transfer key K'T ([Kc] K'T) and transfers it to the information reproduction device 3004 (step S3038).

(1-3) Time Transfer Section of Decoding Decision Card

Figure 81:
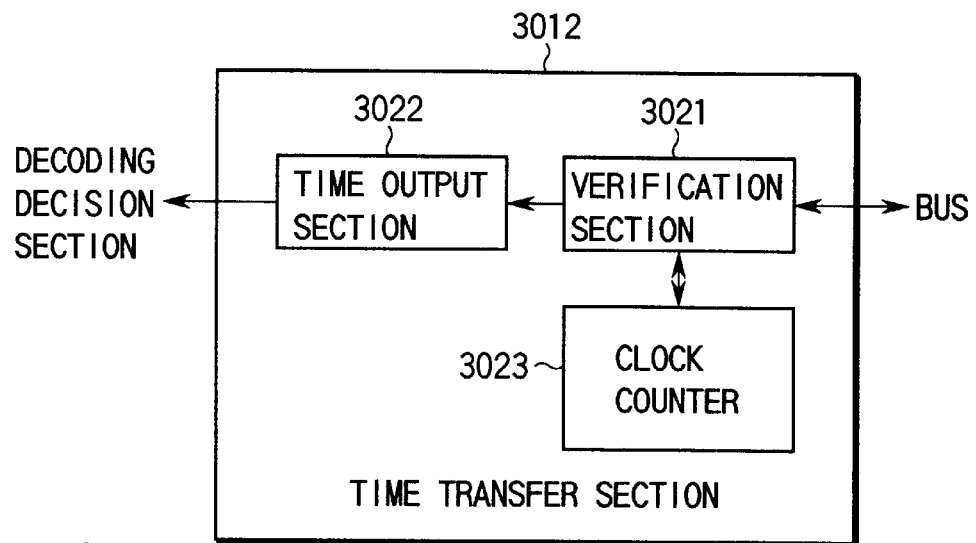
FIG. 81 is a block diagram showing an arrangement of a time transfer section in the decoding decision card shown in FIG. 79.

The time transfer section 3012 shown in FIG. 79 will be described next in more detail. FIG. 81 shows an arrangement of the time transfer section 3012 which has a verification section 3021, a clock counter 3023, and a time output section 3022.

Referring to FIG. 81, the clock counter 3023 counts logic driving clocks.

Figure 82:
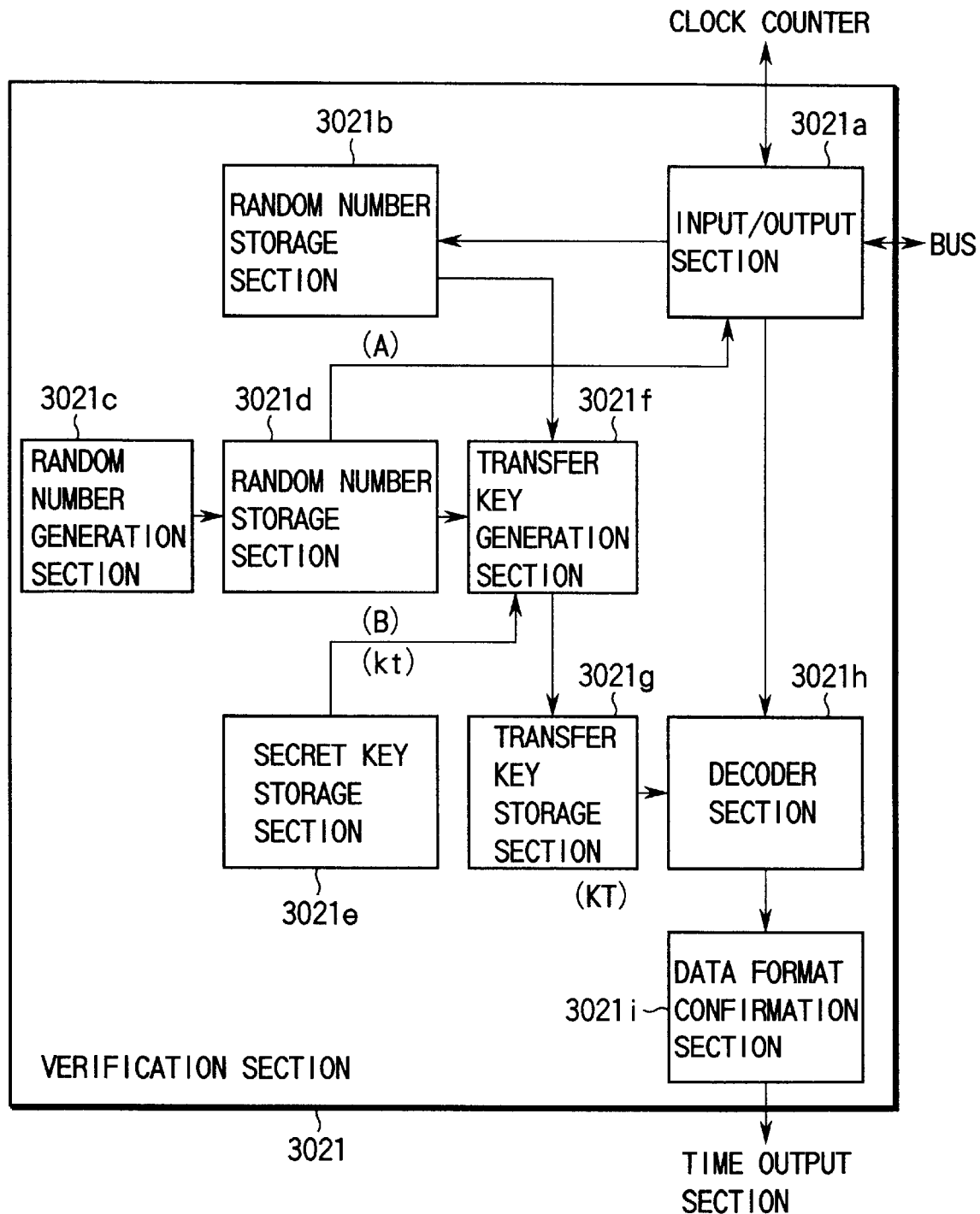
FIG. 82 is a block diagram showing an arrangement of a certification section in the time transfer section shown in FIG. 81.

FIG. 82 shows an arrangement of the verification section 3021.

In FIG. 82, a secret key storage section 3021e holds the key generation information Kt.

A transfer key generation section 3021f generates the transfer key KT as a secret key from the random numbers A and B and the key generation information Kt using an appropriate algorithm. This algorithm is the same as the secret key generation algorithm used in a corresponding verification section of the clock 3005, and therefore, the decoding decision card 3001 and the clock 3005 can share the transfer key KT.

An input/output section 3021a holds the predetermined counter value Ct and decides time-out with reference to the value of the clock counter 3023. As the value Ct, the clock count necessary from reception of the random number B by the clock 3005 to transmission of encrypted time information is set with a certain margin for transfer.

Figure 83:
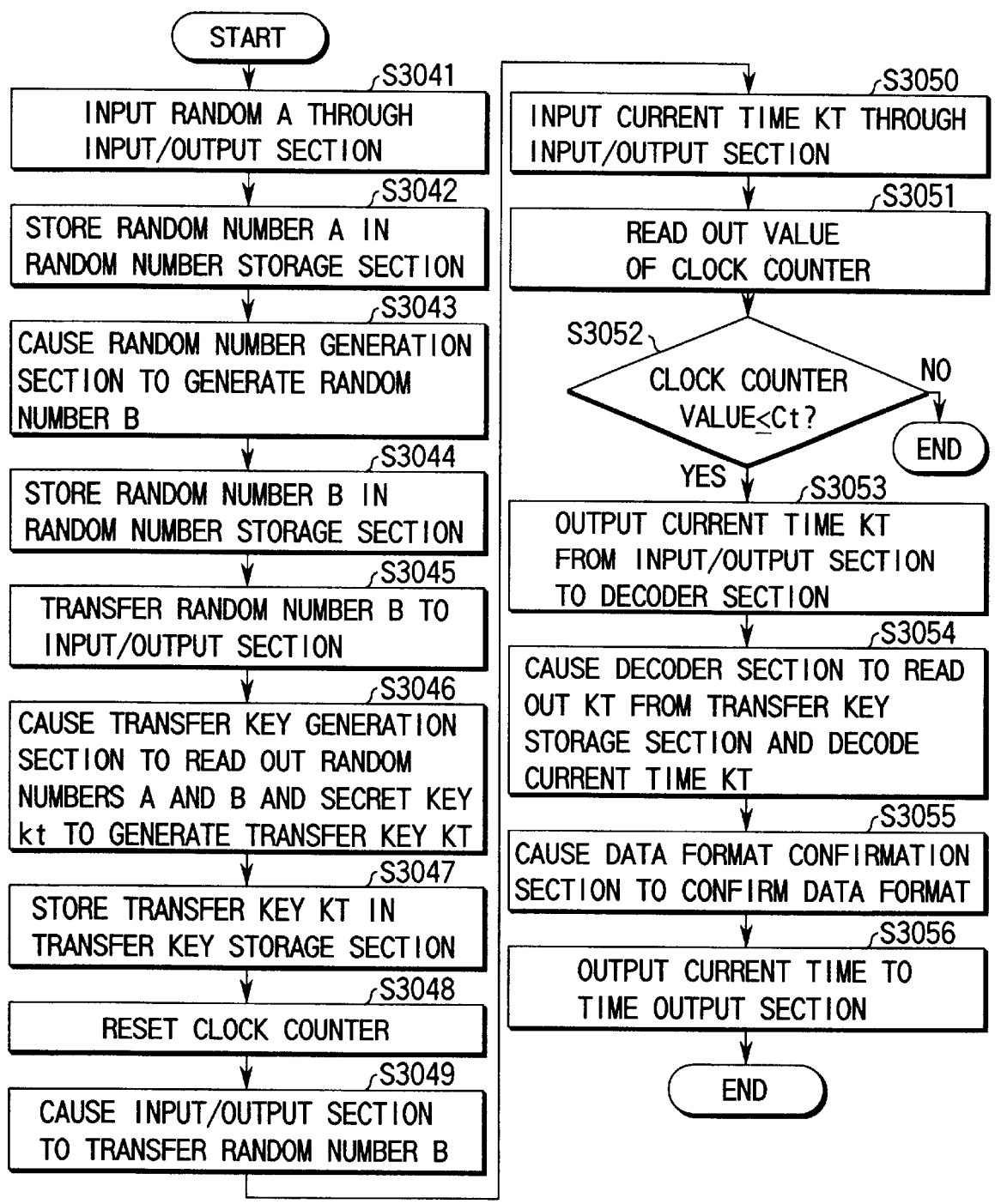
FIG. 83 is a flow chart for explaining the processing operation of the certification section shown in FIG. 82.

FIG. 83 is a flow chart for explaining the processing operation of the verification section shown in FIG. 82.

The random number A input to the time transfer section 3012 in step S3022 in FIG. 80 is input to the input/output section 3021a of the verification section 3021 first (step S3041) and stored in a random number storage section 3021b (step S3042). Next, a random number generation section 3021c generates the random number B in accordance with a predetermined algorithm (step S3043) and stores it in a random number storage section 3021d and simultaneously transfers the random number B to the input/output section 3021a (step S3045).

The transfer key generation section 3021f reads out the random numbers A and B stored in the random number storage sections 3021b and 3021d, respectively, and the key generation information Kt stored in the secret key storage section 3021e to generate the transfer key KT (step S3046) and stores it in a transfer key storage section 3021g (step S3047).

The input/output section 3021a resets the clock counter 3023 and transfers the random number B to the clock 3005 (steps S3048 and S3049).

The [current time] KT input to the time transfer section 3012 in step S3027 in FIG. 80 is input to the input/output section 3021a first (step S3050). The input/output section 3021a reads the counter value of the clock counter 3023 and compares it with the value Ct. If the counter value is equal to or smaller than the value Ct, the flow advances to step S3053. If the counter value exceeds the value Ct (timeout), processing is ended (steps S3051 and S3052).

In step S3053, the [current time] KT is transferred to a decoder section 3021h. The decoder section 3021h reads out the transfer key KT from the transfer key storage section 3021g and decodes the [current time] KT using the transfer key KT, thereby obtaining current time information (steps S3053 and S3054).

A data format confirmation section 3021i confirms the data format of the current time information (step S3055). For example, the current time information has a data format to be described below.

"current time"/current time/"00000000"

The current time expressed by a character string follows the character string "current time". The last one-byte data "0" is a delimiter. The current time is assumed to be elapsed time from 0:00, Jan. 1, 1998 which is represented on the minute order.

The data format confirmation section 3021i outputs the current time information to the time output section 3022 only when the data format of the current time information satisfies the above-described predetermined format (step S3056).

The time output section 3022 outputs the time information to the decoding decision section 3013 (step S3030 in FIG. 80).

To transfer the current time information, an encryption scheme using identical encryption and decoding keys (KT) is employed. However, the present invention is not limited to this, and transfer protection can be realized in the same arrangement and operation as described above even when different keys are used.

(1-4) Contents Key Transfer Section of Decoding Decision Section

Figure 84:
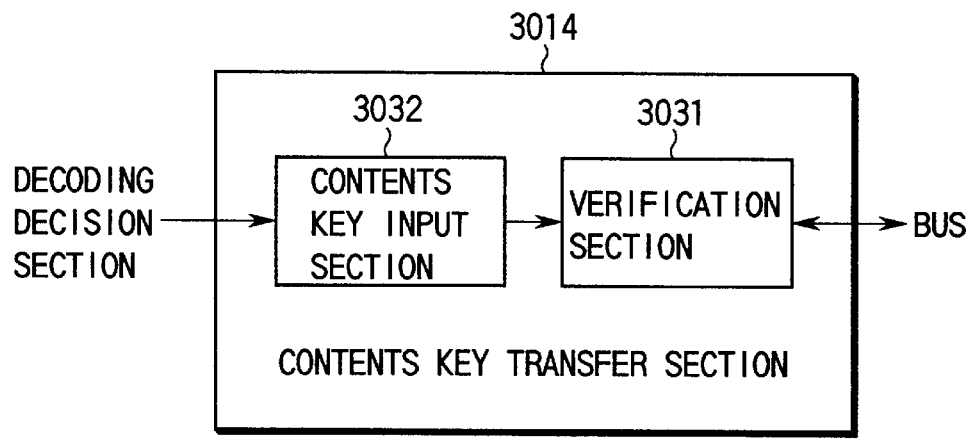
FIG. 84 is a block diagram showing an arrangement of a contents key transfer section in the decoding decision card shown in FIG. 79.

The contents key transfer section 3014 shown in FIG. 79 will be described next in more detail. FIG. 84 shows an arrangement of the contents key transfer section 3014 which has a verification section 3031 and a contents key input section 3032.

Figure 85:
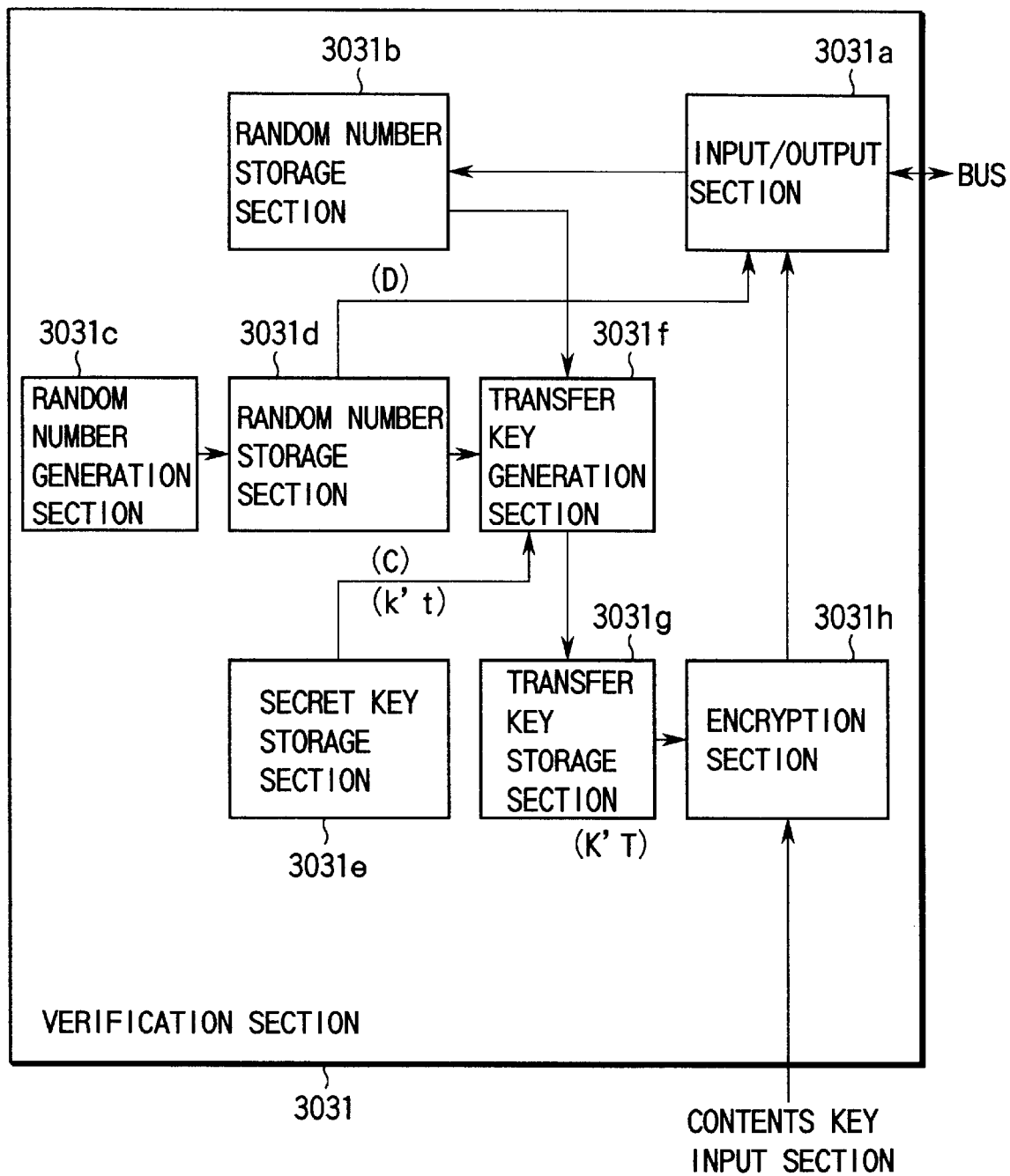
FIG. 85 is a block diagram showing an arrangement of a certification section in the contents key transfer section shown in FIG. 84.
Figure 86:
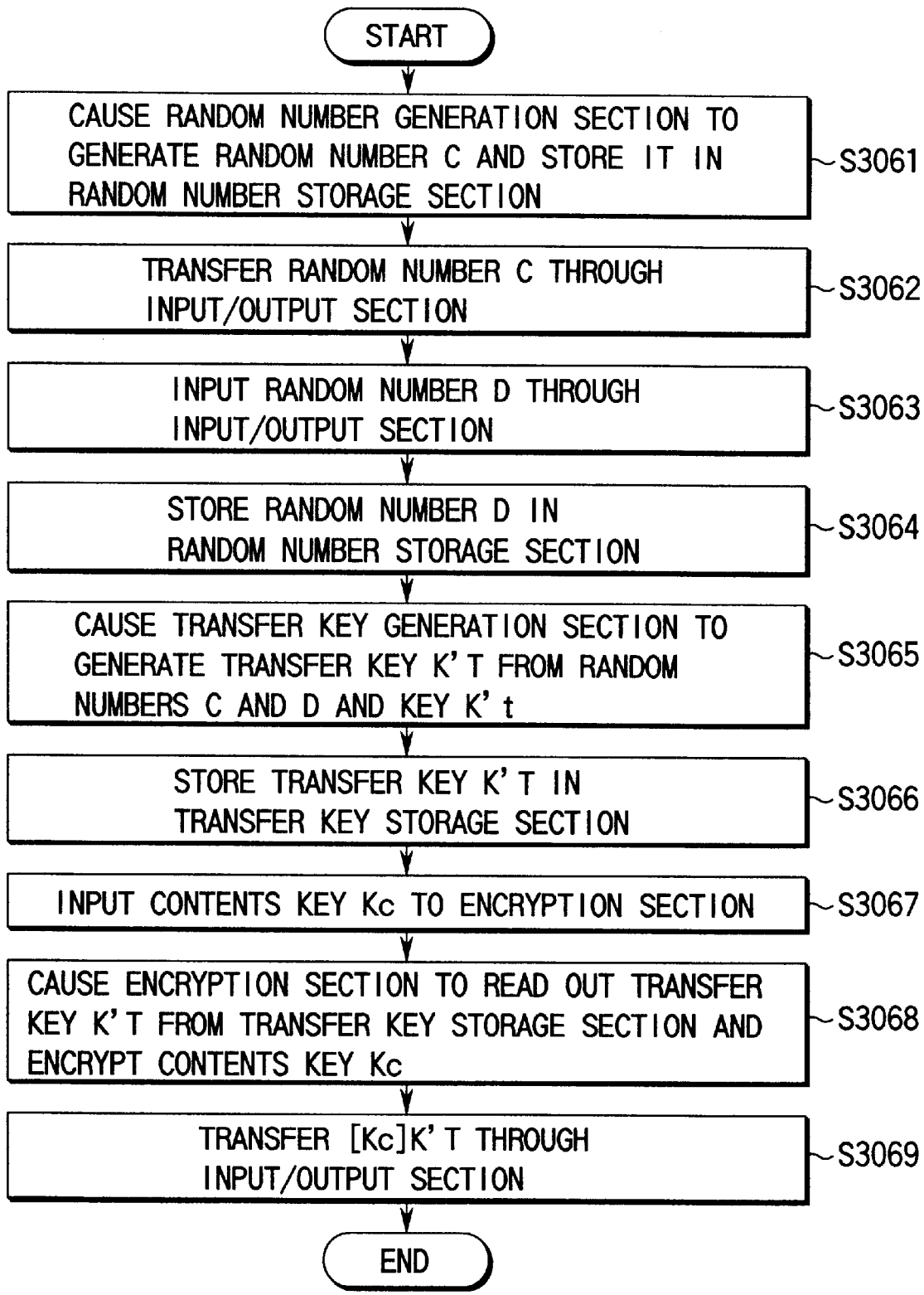
FIG. 86 is a flow chart for explaining the processing operation of the certification section shown in FIG. 85.

FIG. 85 shows an arrangement of the verification section 3031. The processing operation of the verification section 3031 will be described with reference to the flow chart shown in FIG. 86.

A random number generation section 3031c generates the random number C on the basis of a predetermined algorithm and stores it in a random number storage section 3031d (step S3061). At the same time, the random number generation section 3031c transfers the random number C to the information reproduction section 3004 through an input/output section 3031a (step S3062).

The random number D transferred from the information reproduction section 3004 is input through the input/output section 3031a and stored in a random number storage section 3031b (step S3064).

A transfer key generation section 3031f reads out the random numbers C and D which are stored in the random number storage sections 3031b and 3031d, respectively, and the key generation information K't stored in a secret key storage section 3031e to generate the transfer key K'T and stores it in a transfer key storage section 3031g (steps S3065 and S3066).

If the decoding decision section 3013 decides, in step S3032 in FIG. 80, that decoding can be performed, the decoding decision section 3013 transfers the contents key Kc to the contents key transfer section 3014 (step S3033 in FIG. 80). The contents key Kc is input to an encryption section 3031h shown in FIG. 85. The encryption section 3031h reads out the transfer key K'T from the transfer key storage section 3031g, encrypts the contents key Kc using the transfer key K'T ([Kc] K'T), and transfers the contents key Kc to the information reproduction section 3004 through the input/output section 3031a (step S3069).

(1-5) Clock

Figure 87:
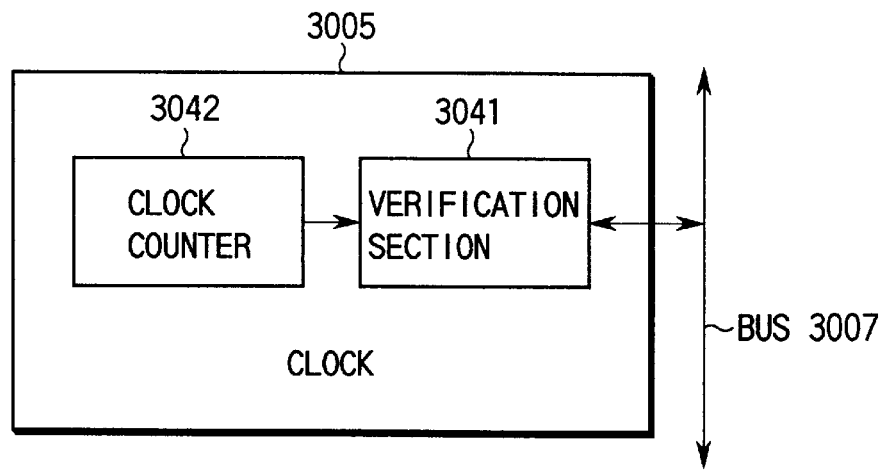
FIG. 87 is a block diagram showing an arrangement of a clock shown in FIG. 77.

FIG. 87 shows an arrangement of the clock 3005 in FIG. 77. The clock 3005 has a verification section 3041 and a clock counter 3042.

The clock counter 3042 counts the time.

Figure 88:
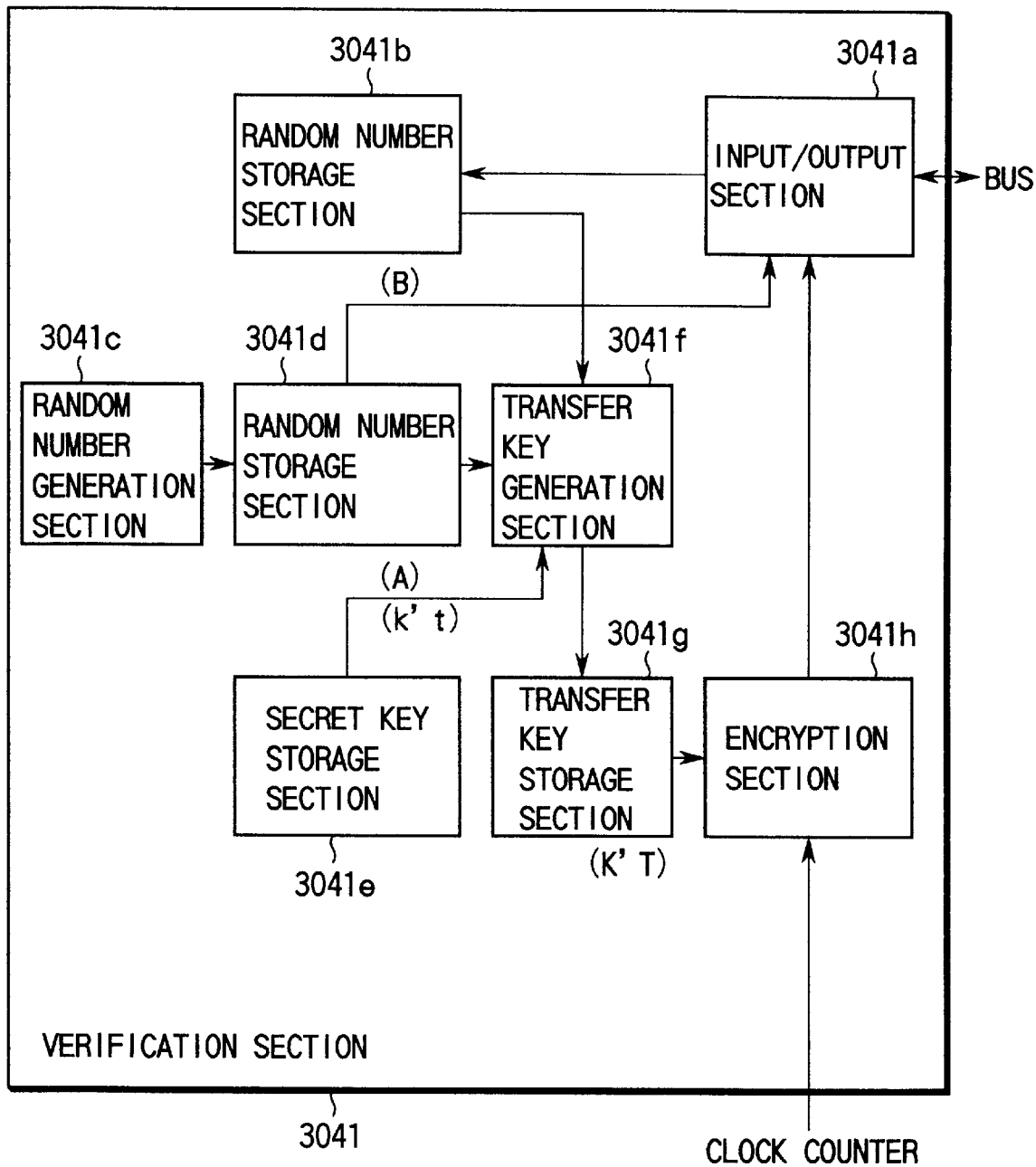
FIG. 88 is a block diagram showing an arrangement of a certification section in the clock shown in FIG. 87.
Figure 89:
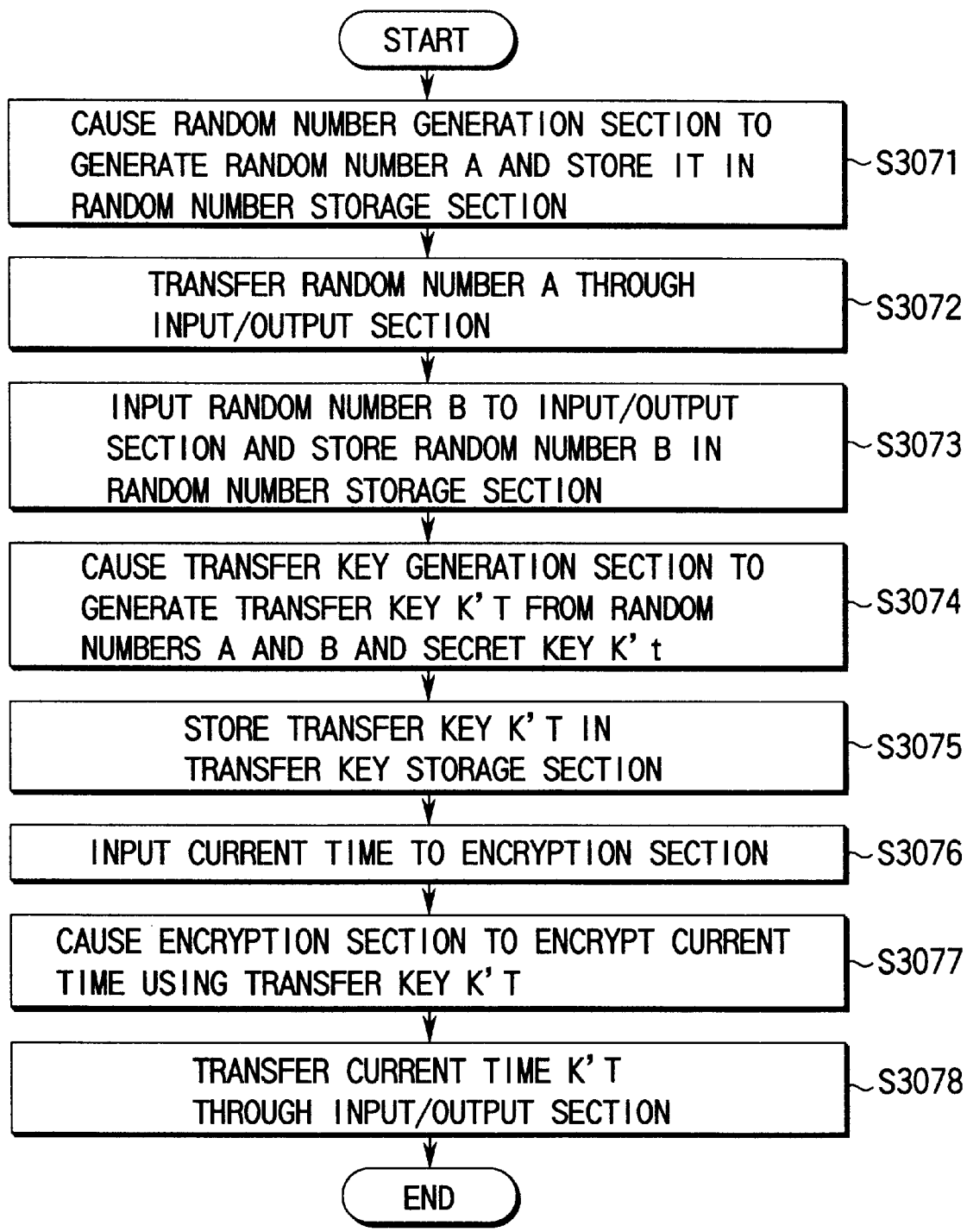
FIG. 89 is a flow chart for explaining the processing operation of the certification section shown in FIG. 88.

FIG. 88 shows an arrangement of the verification section 3041 of the clock 3005. The processing operation of the verification section 3041 will be described next with reference to the flow chart shown in FIG. 89.

A random number generation section 3041c generates the random number A using a predetermined algorithm and stores it in a random number storage section 3041d (step S3071). Simultaneously, the random number generation section 3041c transfers the random number A to the decoding decision card 3001 through an input/output section 3041a (step S3072).

The random number B transferred from the decoding decision card 3001 is input to the input/output section 3041a and stored in a random number storage section 3041b (step S3073).

A transfer key generation section 3041f reads out the random numbers A and B which are stored in the random number storage sections 3041d and 3041b, respectively, and the key generation information K't from a secret key storage section 3041e to generate the transfer key K'T and stores it in a transfer key storage section 3041g (steps S3074 and S3075).

Current time information output from the clock counter 3042 is input to an encryption section 3041h (step S3076).

The encryption section 3041h reads out the transfer key K'T from the transfer key storage section 3041g, encrypts the current time information using the transfer key K'T ([current time] K'T), and transfers it to the decoding decision card 3001 through the input/output section 3041a (steps S3077 and S3078).

(1-6) Decoding Decision Section of Decoding Decision Card

Figure 90:
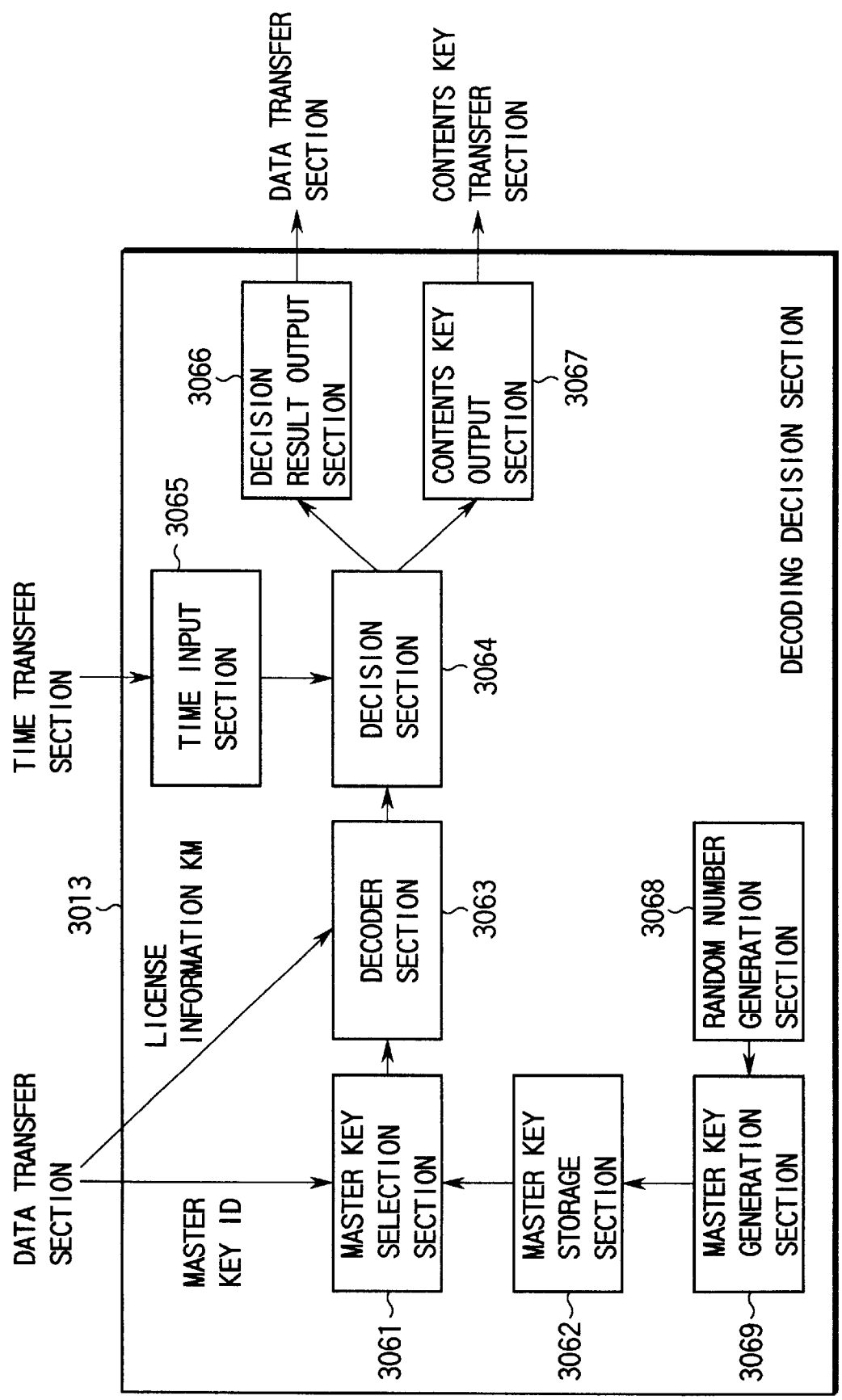
FIG. 90 is a block diagram showing an arrangement of a decoding decision section shown in FIG. 79.

FIG. 90 shows an arrangement of the decoding decision section 3013 of the decoding decision card 3001 shown in FIG. 79.

Figure 91:
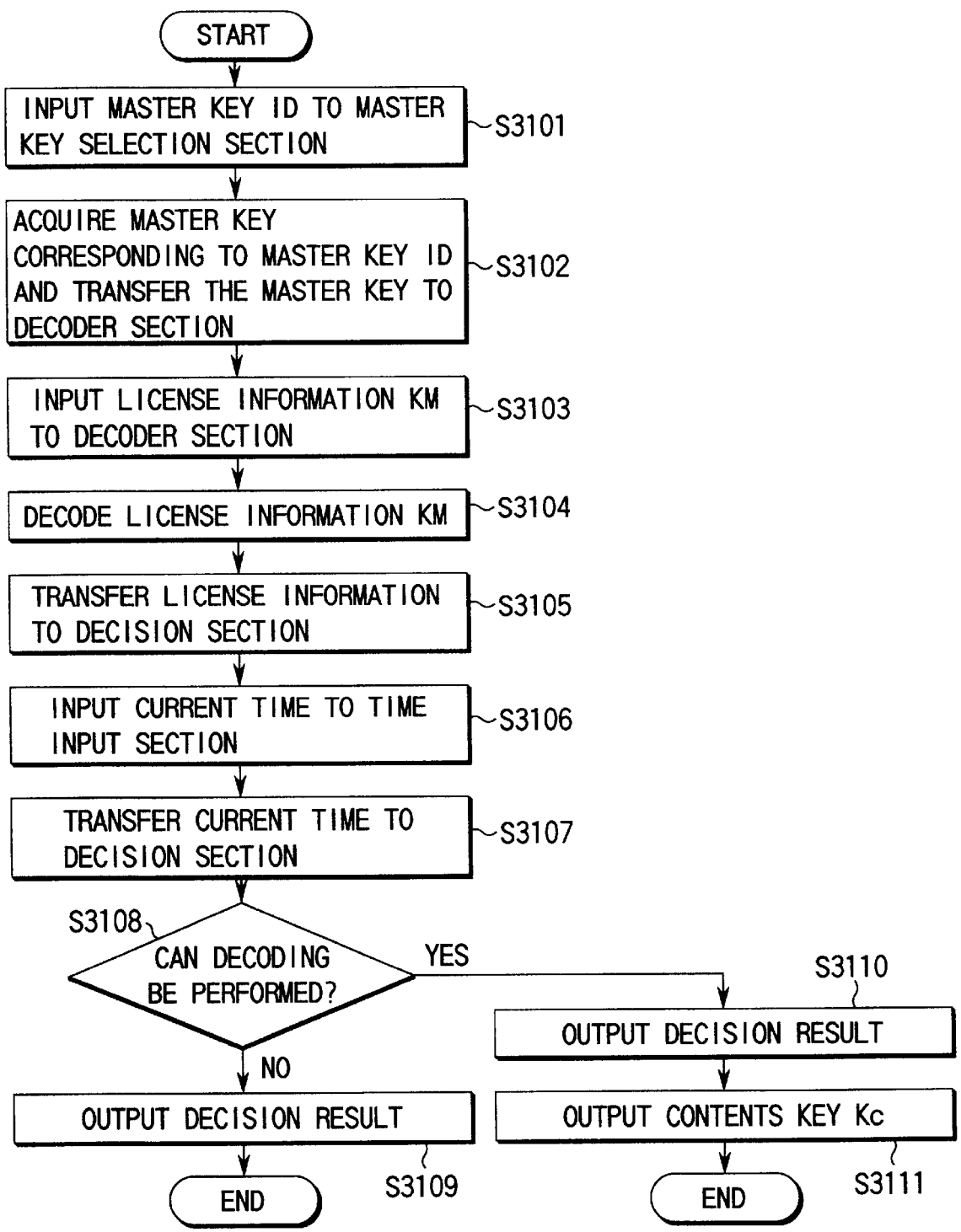
FIG. 91 is a flow chart for explaining the processing operation of the decoding decision section shown in FIG. 90.

The processing operation of the decoding decision section 3013 shown in FIG. 90 will be described with reference to the flow chart shown in FIG. 91.

The master key ID and [license information] KM transferred from the media readout device 3003 to the decoding decision card 3001 are input to a master key selection section 3061 and a decoder section 3063, respectively (steps S3101 and S3103).

The master key selection section 3061 searches a master key storage section 3062 for a decoding key corresponding to the master key ID and transfers it to the decoder section 3063 (step S3102).

The master key ID input to the master key selection section 3061 is used to designate a decoding key corresponding to the key for encrypting the [license information] KM. Unless a correct master key ID is obtained, the decoding key for decoding the license information cannot be selected.

The decoder section 3063 decodes the [license information] KM using the decoding key designated by the master key ID and transfers the resultant license information to a decision section 3064 (step S3105).

Current time information transferred from the clock 3005 to the time transfer section 3012 of the decoding decision card 3001 and decoded is input to the decision section 3064 through a time input section 3065 (steps S3106 and S3107).

The decision section 3064 decides on the basis of the license information and current time information whether the contents information can be used, i.e., decoded and outputs the decision result to the data transfer section 3011 through a decision result output section 3066 (steps S3108 to S3110). If it is decided that decoding is enabled, the contents key Kc contained in the license information is output to the contents key transfer section 3014 through a contents key output section 3067 (step S3111).

Decision processing of the decision section 3064 will be described. If the current time sent from the clock 3005 is earlier than the time when the license information has been recorded on the medium 3002, this indicates that the current time delays from correct time. The license information recording time is recorded by the license server and can be substantially regarded as correct time. In this case, the decision flag of the decision section 3064 is cleared, and hereafter, all the decision results are "use is disabled". To set the decision flag again to make the decision valid, a command from the clock 3005 is required. This command is sent to the decoding decision section 3013 through the time transfer section 3012 of the decoding decision card 3001. Only a command from the authentic (verifiable) clock 3005 can set the decision flag again. The clock 3005 sets the decision flag again only when the time in the clock 3005 is set.

(1-7) Master Key

The mater key used to encrypt or decode license information will be described. In this case, both the encryption and decoding keys to be used to encrypt/decode the license information will be called master keys, and the encryption and decoding keys of the license information are not always identical.

The master key in the master key storage section 3062 shown in FIG. 90 is stored in the following format together with the master key ID.

Km(0), . . . , Km(999), (KP(1000), Ks(1000)), . . . , (KP(1499), Ks(1499)), (KP(1500), Ks(1500)), . . . , (KP(1599), Ks(1599))

Thousand keys from Km(0) to Km(999) are predetermined secret keys for decoding. Keys from KP(1000) to KP(1599) are public keys for encrypting license information. Six hundred keys from Ks(1000) to Ks(1599) are secret keys for decoding license information in correspondence with KP(1000) to KP(1599), respectively. Keys KP(n) (1000 £ n<1600) will be called public master keys.

For the arbitrary integer n from 1000 to 1600 exclusive, the keys KP(n) and Ks(n) (1000 £ n<1600) are paired. That is, license information encrypted by KP(n) can be decoded by Ks(n). For each integer n from 1000 to 1600 exclusive, the pair (KP(n), Ks(n)) is occasionally generated by a master key generation section 3069 shown in FIG. 90 on the basis of a random number generated by a random number generation section 3068. This pair of keys changes depending on the decoding decision card, and even in the same decoding decision card, changes depending on the time period.

The public master key is used in the information distribution system shown in FIG. 76, as will be described later.

Keys (KP(n), Ks(n)) (1500 £ n<1600) may be used when the valid period when the contents information can be used is shorter than, e.g., 100 hours. More specifically, the master key generation section 3069 generates a key pair every, e.g., one hour and sequentially records key pairs from n=1500 to n=1599. In accordance with the designated period, e.g., when the valid period is shorter than the longest period of 100 hours, (KP(1599), Ks(1599)) is recorded, and then (KP(1500), Ks(1500)) is overwritten, and this processing is repeated.

When such a master key (KP(n), Ks(n)) (1500 £ n<1600) is to be used, the latest key KP(n) is always used to encrypt license information. After the license information is recorded, the license information encrypted by the key KP(n) is decoded by the corresponding key Ks(n) within the longest period of 99 hours. However, when the time of 100 hours or more has elapsed, the key Ks(n) is lost (changed by overwrite), so this license information cannot be decoded anymore. With this arrangement, high security can be ensured. Even when a person reads the master key Ks(n) by some technique, this key is valid only for license information generated within a specific period of one hour.

As described above, the master key storage section 3062 holds three master keys with different natures (i.e., a secret key common to all decoding decision cards, a secret key unique to each decoding decision card, and a secret key to be updated every predetermined time for each decoding decision card), so the security and convenience can be customized.

License information encrypted using the encryption keys KM(0) to KM (999) corresponding to Km(0) to Km(999), respectively, can be used by any decoding decision card for decoding decision. However, if the contents of the decoding decision card are illicitly read, protection of the contents fails.

On the other hand, in a method using a public master key, the public master key must be sent to the server to update license information, and this increases the labor for the user. However, even when the contents of the decoding decision card are illicitly read, the failure of security affects only the specific decoding decision card. Especially, when the public master key of time change scheme as described above is used, the failure of security is also limited in terms of time.

(1-8) Information Reproduction Section

Figure 92:
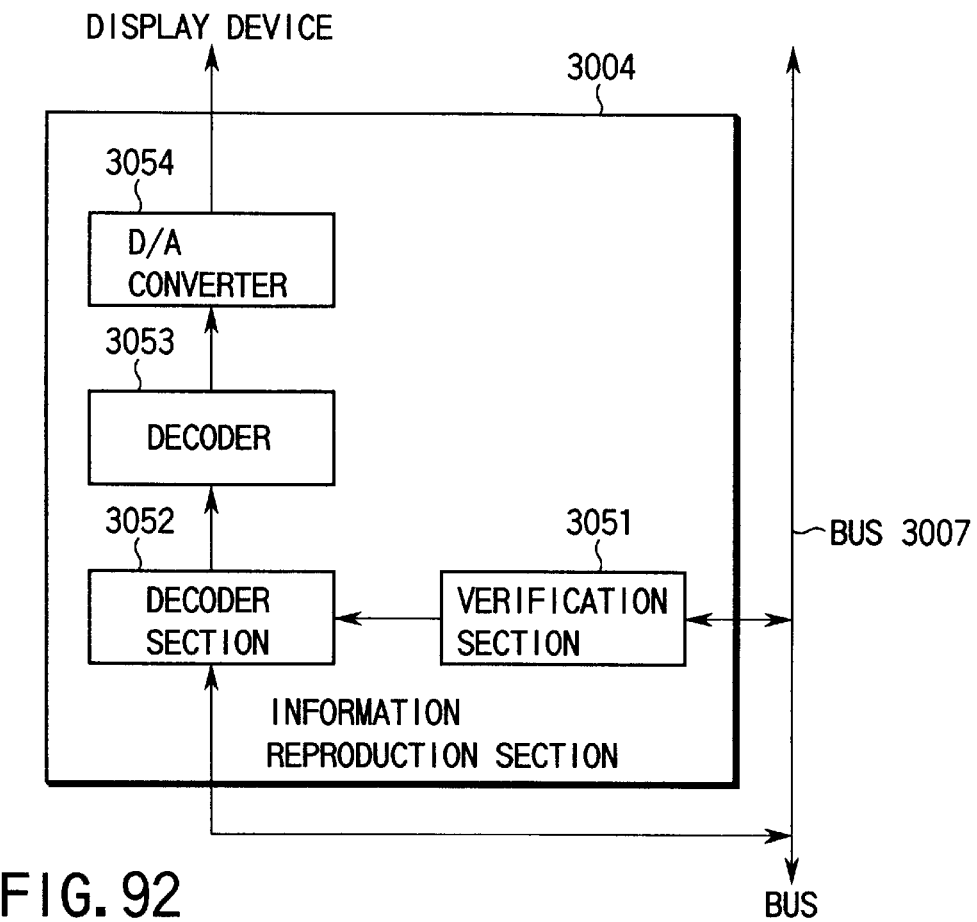
FIG. 92 is a block diagram showing an arrangement of an information reproduction section shown in FIG. 77.

FIG. 92 shows an arrangement of the information reproduction section 3004 shown in FIG. 77. The information reproduction section 3004 comprises a verification section 3051, a decoder section 3052, a decoder 3053, and a D/A converter 3054.

Figure 93:
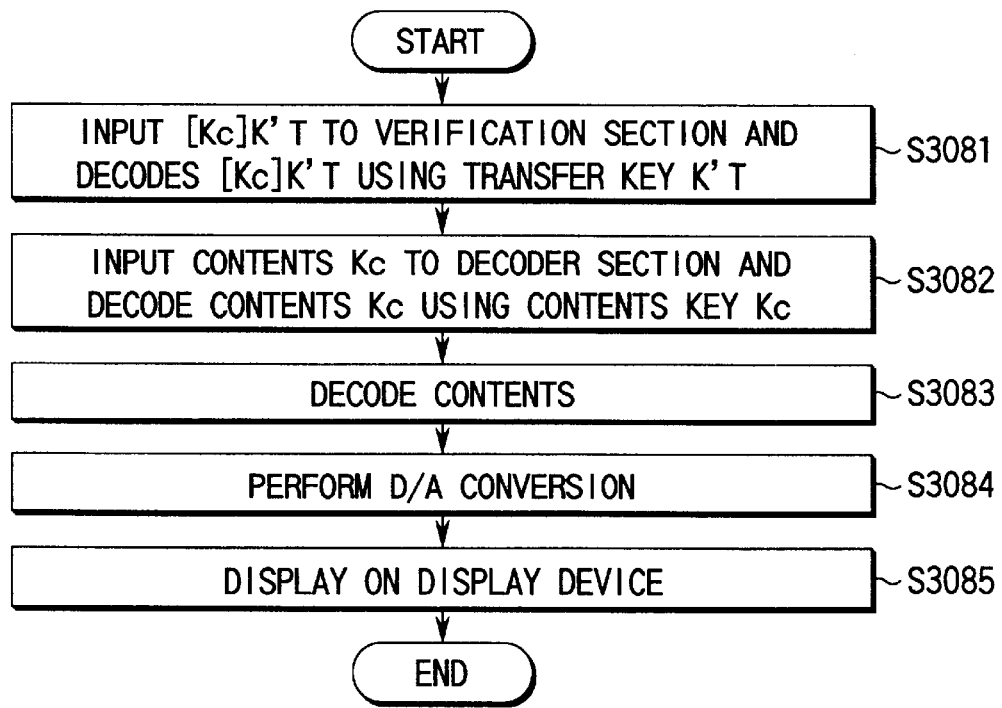
FIG. 93 is a flow chart for explaining the processing operation of the information reproduction section shown in FIG. 92.

The processing operation of the information reproduction section 3004 shown in FIG. 92 will be described with reference to the flow chart shown in FIG. 93. The information reproduction section 3004 reproduces, e.g., a MPEG2 motion picture.

The encrypted contents key [Kc] K'T transferred from the decoding decision card 3001 is input to the verification section 3051 of the information reproduction section 3004. The verification section 3051 decodes [Kc] k'T using the transfer key K'T generated by the verification section 3051 itself to obtain the contents key Kc (step S3081).

On the other hand, contents information encrypted using the contents key Kc read from the medium 3002 by the media readout device 3003 is input to the decoder section 3052. The decoder section 3052 decodes the contents information using the contents key Kc and outputs it to the decoder 3053 (step S3082).

The decoder 3053 reconstructs coding which has been done for compression, and sends the resultant image data to the D/A converter 3054 (step S3083).

The D/A converter 3054 converts the data into an analog signal and outputs the signal to a predetermined display device (step S3085).

Figure 94:
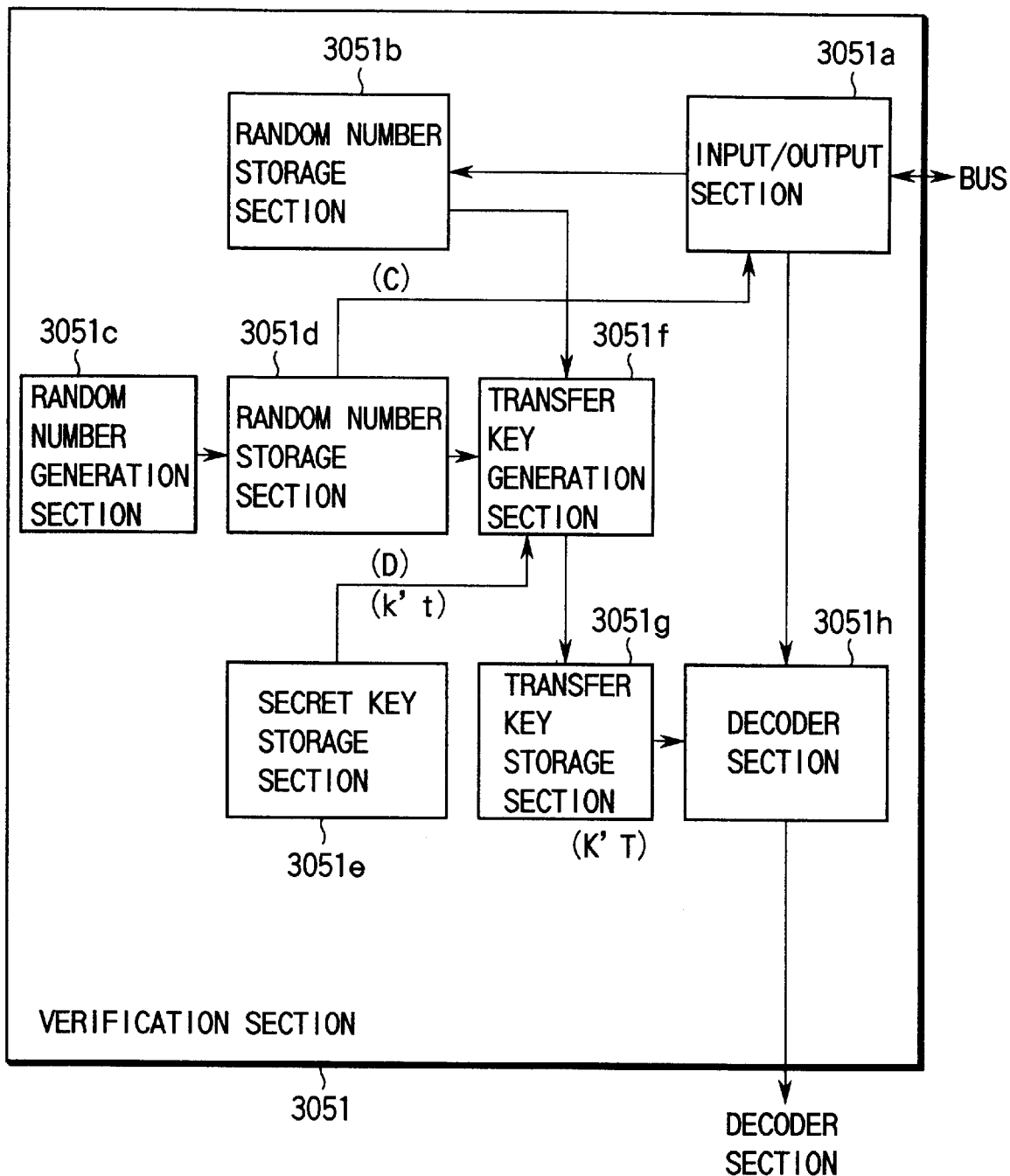
FIG. 94 is a block diagram showing an arrangement of a certification section in the information reproduction section shown in FIG. 92.
Figure 95:
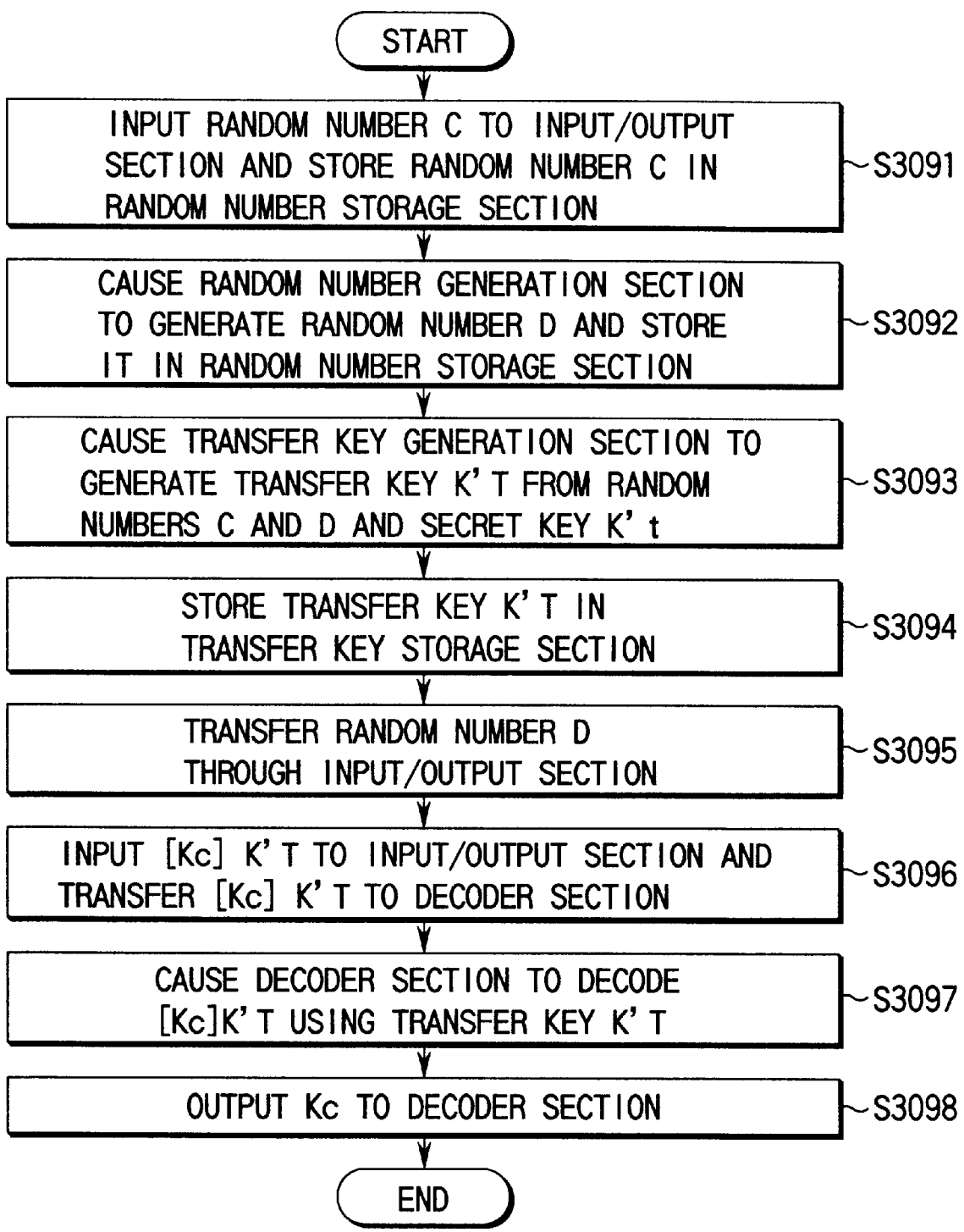
FIG. 95 is a flow chart for explaining the processing operation of the certification section shown in FIG. 94.

FIG. 94 shows an arrangement of the verification section 3051 of the information reproduction section 3004 shown in FIG. 92. The processing operation of the verification section 3051 will be described with reference to the flow chart shown in FIG. 95.

A random number C transferred from the decoding decision card 3001 to the information reproduction section 3004 is input to an input/output section 3051a of the verification section 3051 and stored in a random number storage section 3051b (step S3091).

A random number generation section 3051c generates the random number D and stores it in a random number storage section 3051d (step S3092).

A transfer key generation section 3051f reads out the random numbers C and D from the random number storage sections 3051b and 3051d, respectively, and also reads out the key generation information K't from a secret key storage section 3051e to generate the transfer key K'T (step S3093). The generated transfer key K'T is stored in a transfer key storage section 3051g (step S3094).

The random number D stored in the random number storage section 3051d is transferred to the decoding decision card 3001 through the input/output section 3051a (step S3095).

The encrypted contents key [Kc] K'T transferred from the decoding decision card 3001 to the information reproduction section 3004 is input to the input/output section 3051a of the verification section 3051. The contents key [Kc] K'T is output to a decoder section 3051h (step S3096).

The decoder section 3051h reads out the transfer key K'T from the transfer key storage section 3051g to decode [Kc] K'T, thereby obtaining the contents key Kc (step S3097). The contents key Kc is output to the decoder section 3052 in the information reproduction section 3004 (step S3098).

(1-9) Another Information Reproduction Section

Figure 96:
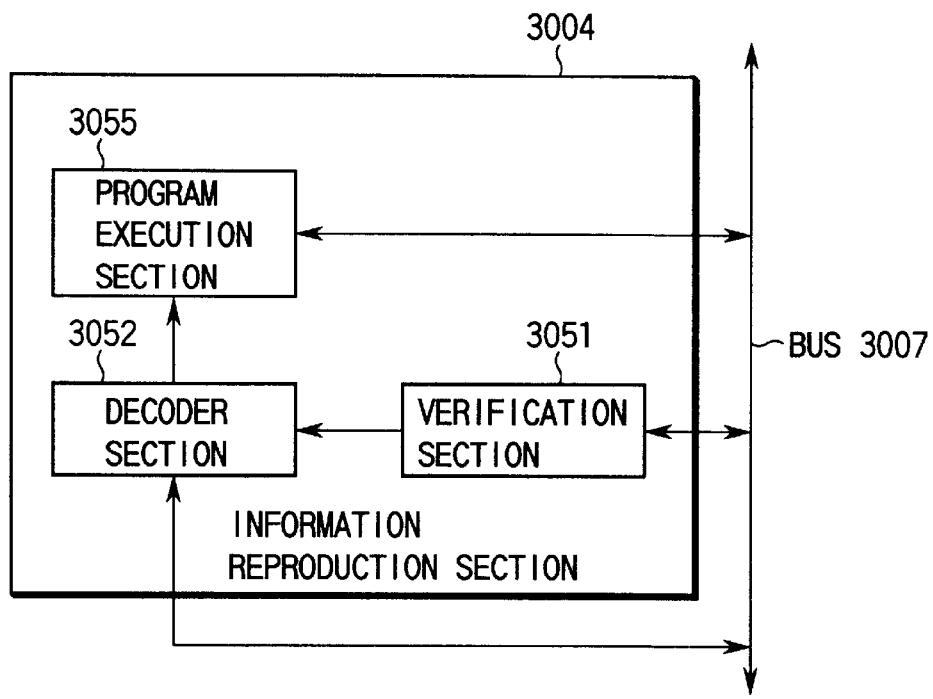
FIG. 96 is a block diagram showing another arrangement of the information reproduction section shown in FIG. 77.

FIG. 96 shows another arrangement of the information reproduction section 3004 shown in FIG. 77. In this case, the contents information of an accounting object is a program. The contents information of the accounting object is at least partially encrypted using the contents key Kc, and the contents key Kc is contained in license information.

The same reference numerals as in FIG. 92 denote the same parts in FIG. 96, and only different portions will be described. In FIG. 96, the decoder 3053 and the D/A converter 3054 in FIG. 92 are replaced with a program execution section 3055, so that the program as the contents information is executed by the program execution section 3055.

The operation until the contents key Kc and the encrypted contents information are sent to the information reproduction section 3004 is the same as described above.

In this case, the information reproduction section 3004 may be a central processing unit constituted by a CPU, a memory, and the like.

(1-10)

In (1-1) to (1-9), the information reproducing apparatus has the clock 3005, as shown in FIG. 77. The decoding decision card 3001 itself may incorporate a clock, as a matter of course. In this case, the decoding decision card 3001 incorporates a battery for driving the clock. When the clock is incorporated in the decoding decision card 3001, the time transfer section 3012 shown in FIG. 79 and verification processing for the clock can be omitted.

(2) Information Distribution System in FIG. 76

The arrangement and processing operation of an information reproducing apparatus for this information distribution system are almost the same as those in FIG. 75.

In the information distribution system shown in FIG. 76, not license information but a contents ID and encrypted contents information are recorded on the removable information storage medium in the initial state. When the license is to be updated, the medium and the decoding decision card are set in the license update terminal. The update terminal reads the contents ID from the medium and one of the public master keys from the decoding decision card and transfers them to the license server. The license server having a database of contents to be handled searches the database for a contents key using the contents ID as a key.

Subsequently, the license server prepares normal license information containing the contents key, encrypts the license information using the public master key, and transfers it to the update terminal. The update terminal records the received encrypted license information on the medium. Reproduction for the medium after the license information is recorded is the same as that in the information distribution system shown in FIG. 75.

The license update terminal and license server in the information distribution system shown in FIG. 76 will be described next in more detail.

(2-1) License Update Terminal

Figure 97:
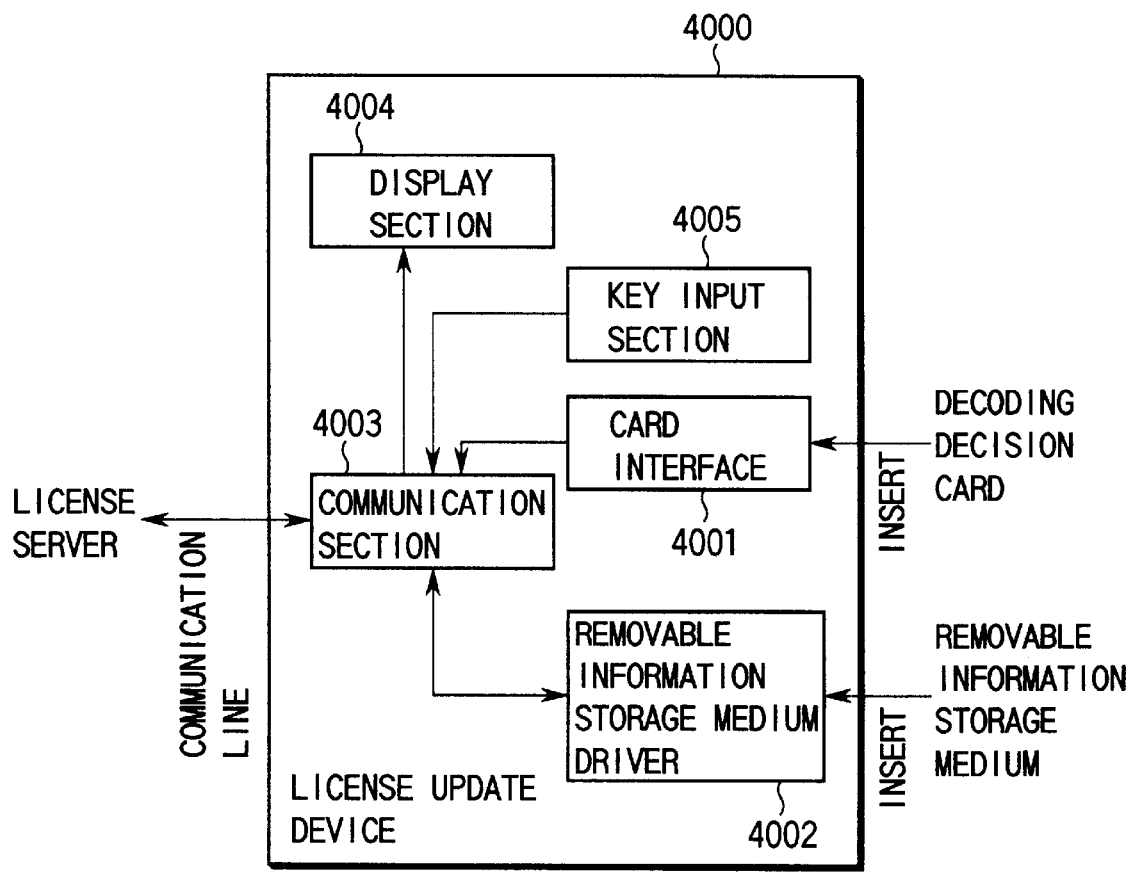
FIG. 97 is a block diagram showing an arrangement of a license update apparatus.

FIG. 97 shows an arrangement of the license update terminal.

A license update terminal 4000 comprises a card interface (IF) 4001 for reading predetermined information from an inserted decoding decision card, a removable information storage medium drive 4002 for reading out predetermined information from an inserted removable information storage medium, a communication section 4003 for performing communication with the license server through a predetermined communication line (e.g., a public line or a leased line), a display section 4004 constituted by, e.g., a liquid crystal display panel, and a key input section 4005 constituted by a keyboard or touch panel for inputting an instruction from the user.

Figure 98:
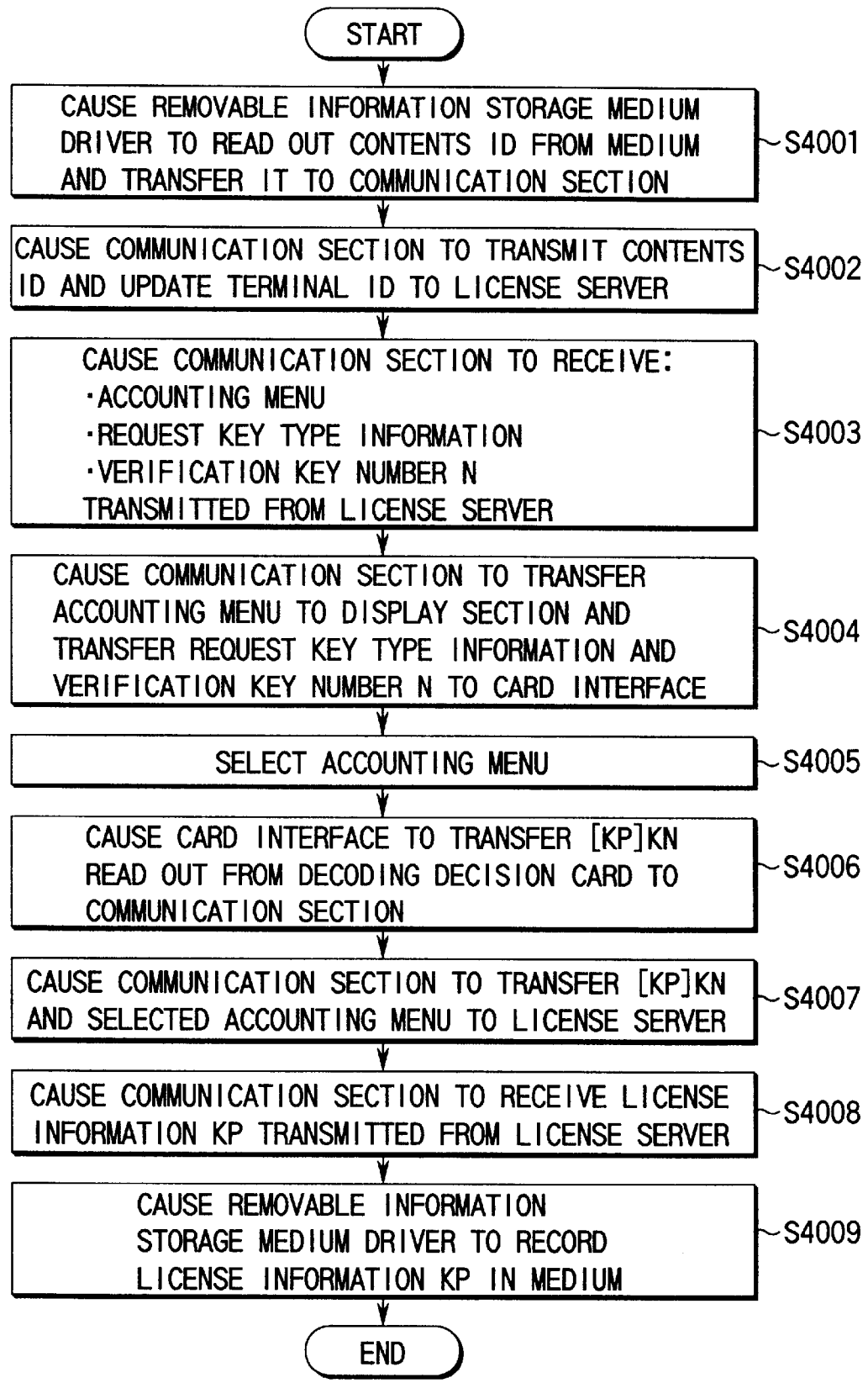
FIG. 98 is a flow chart for explaining the processing operation of the license update apparatus.

FIG. 98 is a flow chart showing the processing operation of the license update terminal 4000 shown in FIG. 97. The processing operation of the license update terminal will be described below with reference to FIG. 98.

When the removable information storage medium is set in the removable information storage medium drive 4002, the identification information, i.e., the contents ID of the contents information recorded on the medium is read from the medium (step S4001), and the read contents ID and the identification information (update terminal ID) of the license update terminal are transmitted to the license server through the communication section 4003 (step S4002).

The update terminal ID transmitted from the license update terminal to the license server is stored by the license server together with updated information as an update log. The contents fee may be collected on the basis of the update log.

Upon receiving the contents ID and update terminal ID, the license server transmits an accounting menu, request key type information, and a verification key number N to the update terminal (step S4003).

The request key type information sent from the license server to the update terminal is used to designate the master keys of three types. As described above, the request key types are as follows.

When the request key type information is "0", a predetermined master key for decoding, i.e., one of Km(0) to Km(999) is designated.

When the request key type information is "1", a master key unique to each decoding decision card for decoding license information, i.e., one of KP(1000) to KP(1499) is designated.

When the request key type information is "2", a secret key to be updated every predetermined time for each decoding decision card, i.e., one of KP(1500) to KP(1599) is designated.

The verification key number N sent from the license server to the license update terminal is a number for designating a key KN which is held in the decoding decision card for verification in transfer. The master key KP encrypted by the key KN is decoded by a decoding key K'N held in the license server and corresponding to the key KN. The license server encrypts the license information using the key KP obtained in this manner and transmits the license information to the license update terminal. If the decoding decision card does not hold the correct verification key KN (e.g., when an improper device is to operate as the decoding decision card), the license information recorded on the removable information storage medium cannot be decoded using the decoding key Ks corresponding to the key KP. For this reason, the unauthentic decoding decision card is eliminated.

The accounting menu is a fee table corresponding to the valid period of the contents information. A desired period is selected from this accounting menu, and the fee is paid. The accounting menu has, e.g., a fee corresponding to a valid period, and an identification number for selecting the valid period. More specifically, when the valid period is seven days, the fee is 200 yen, and the identification number is "1". For 30 days, the fee is 500 yen, and the identification number is "2". For an indefinite period (conveyance), the fee is 3,000 yen, and the identification number is "3".

When the request key type information is "0", the license update terminal need not send the master key KP to the license server. This is because the license information is encrypted by a key common to all decoding decision cards and sent to the license server. In this case, the license information sent from the server contains designation of the number of Km. This number need not be encrypted.

If the communication line between the update terminal and the license server is not a leased line, as a measure for information security, a procedure of mutual verification is preferably performed before communication between a communication section 4021 of the license server and the communication section 4003 of the update terminal. In this case, charging for license update is performed in a shop having the license update terminal. Unless unauthentic license update terminals are eliminated, illicit charging may take place. In addition, connection to a license server which is not authentic for the organizer of the license update terminal may cause charging for illicit license information for the user.

If the communication line is a leased line, and the communication partner is reliable, mutual verification is not required. The communication section 4003 of a license update terminal which uses a public line such as the Internet for connection from the license update terminal to the license server may store the record of communication with the license server. The fee is collected on the basis of the record of the license server, so it is preferable that the record be stored on the license update terminal side as well for confirmation.

The communication section 4003 of the license update terminal transfers, of pieces of information transmitted from the license server, the accounting menu to the display section 4004 and the request key identification information and verification key number N to the card IF 4001 (step S4004).

The display section 4004 presents the accounting menu to prompt the user to select the identification number of period. The card IF 4001 transfers the request key identification information and verification key number to the decoding decision card. Upon receiving these pieces of information, the decoding decision card transfers one of the master keys KP (an appropriate one of the plurality of keys KP) corresponding to the request key identification information, which is encrypted using the verification key KN designated by the verification key number, i.e., [KP] KN to the card IF 4001. At this time, the master key identification information may be simultaneously transferred.

The communication section 4003 transmits [KP] KN transferred from the card IF and the identification number of the valid period in the accounting menu, which is designated by the user through the display section 4004, to the license server (steps S4005 to S4007).

Accordingly, the license server transmits license information which is encrypted using the master key KP supplied from the update terminal, i.e., [license information] KP to the communication section 4003 of the update terminal (step S4008).

The [license information] KP is recorded on the medium set in the removable information storage medium drive 4002 (step S4009). Note that the [license information] KP sent from the license server and the master key identification information may be recorded on the medium.

(2-2) Decoding Decision Card

Figure 99:
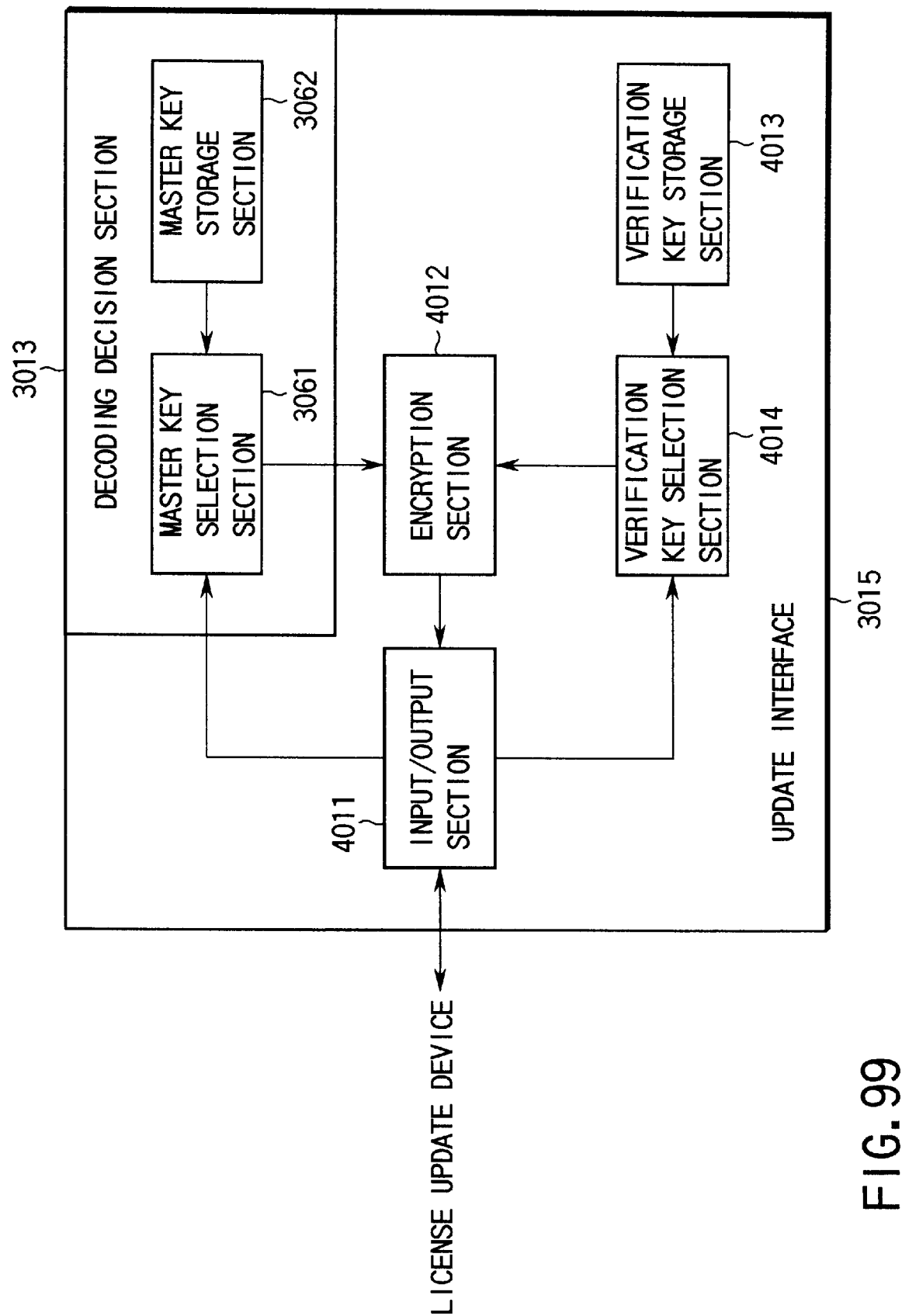
FIG. 99 is a block diagram showing an arrangement of the main part of a decoding decision card as an interface with the update IF of the license update apparatus.

FIG. 99 shows an arrangement of the main part of the decoding decision card 3001, i.e., an update interface (IF) 3015.

Figure 100:
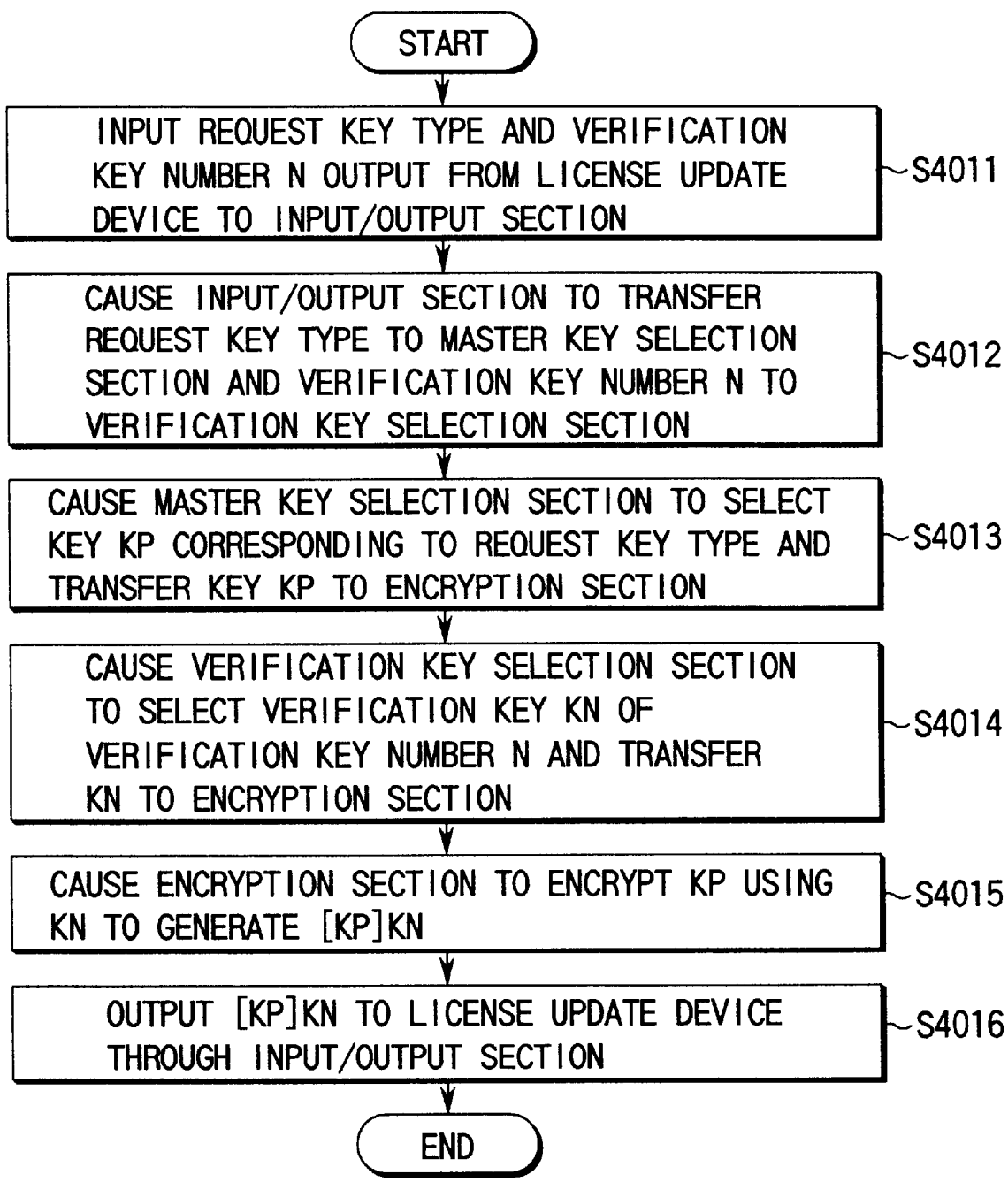
FIG. 100 is a flow chart for explaining the processing operation of the decoding decision card in updating the license.

The processing operations of various portions shown in FIG. 99 will be described below with reference to the flow chart shown in FIG. 100.

The request key identification information and verification key number N transferred from the card IF 4001 of the update terminal to the decoding decision card 3001 in step S4004 in FIG. 98 are input to an input/output section 4011 (step S4011).

The input/output section 4011 transfers the request key identification information to the master key selection section 3061 and the verification key number N to a verification key selection section 4014 (step S4012).

The master key selection section 3061 searches the master key storage section 3062 to select the master key KP corresponding to the request key identification information and transfers it to an encryption section 4012 (step S4013).

The verification key selection section 4014 searches a verification key storage section 4013 to select the verification key KN having the verification key number N and transfers it to the encryption section 4012 (step S4014).

The encryption section 4012 encrypts the master key KP using the verification key KN to generate [KP] KN (step S4015). The [KP] KN is output to the license update device through the input/output section 4011 (step S4016).

(2-3) License Server

Figure 101:
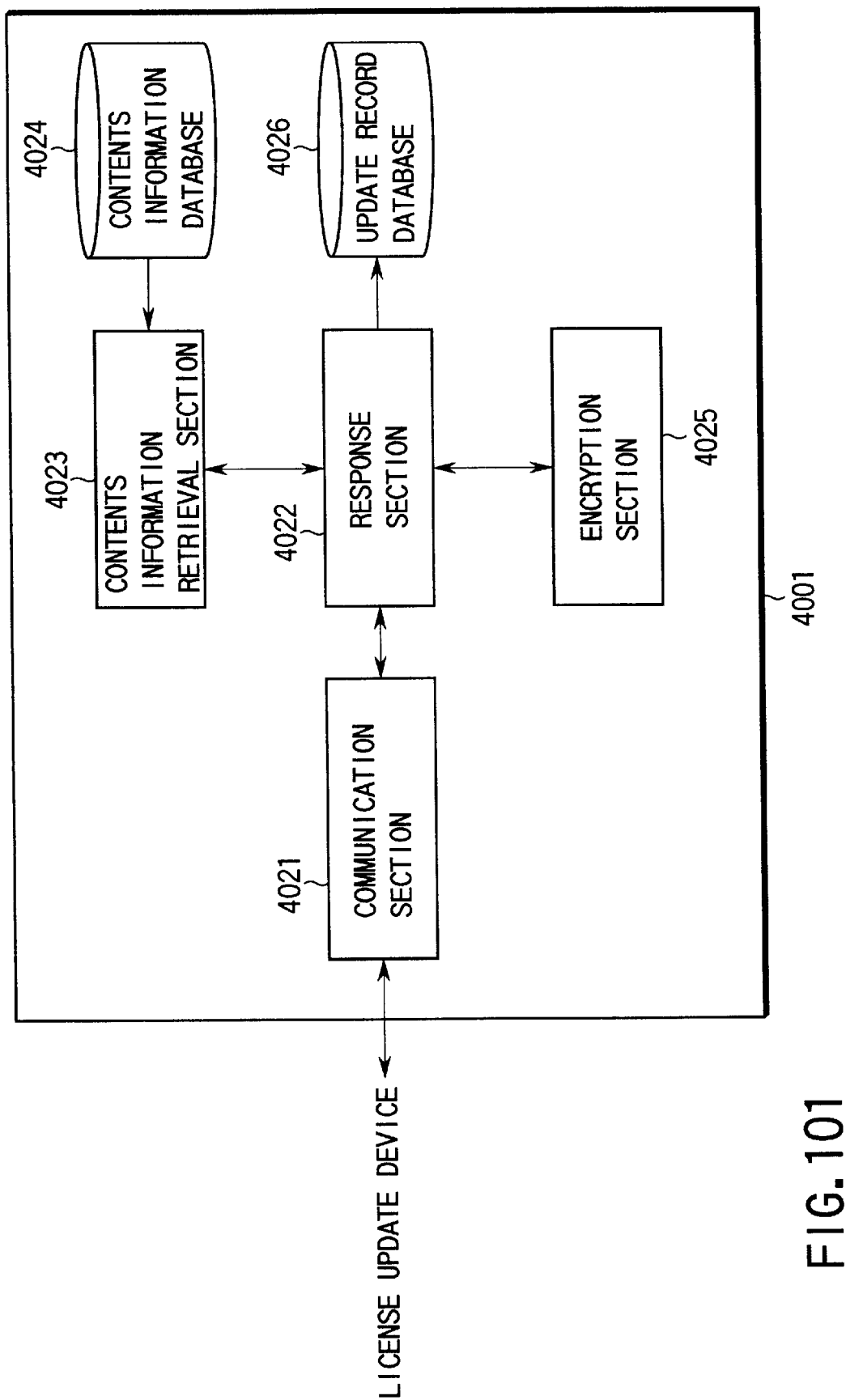
FIG. 101 is a block diagram showing an arrangement of a license server.

FIG. 101 shows an arrangement of the license server. A contents information database (DB) 4024 stores the following information in correspondence with a contents ID.

Contents key

Accounting menu

Request key type

Figure 102:
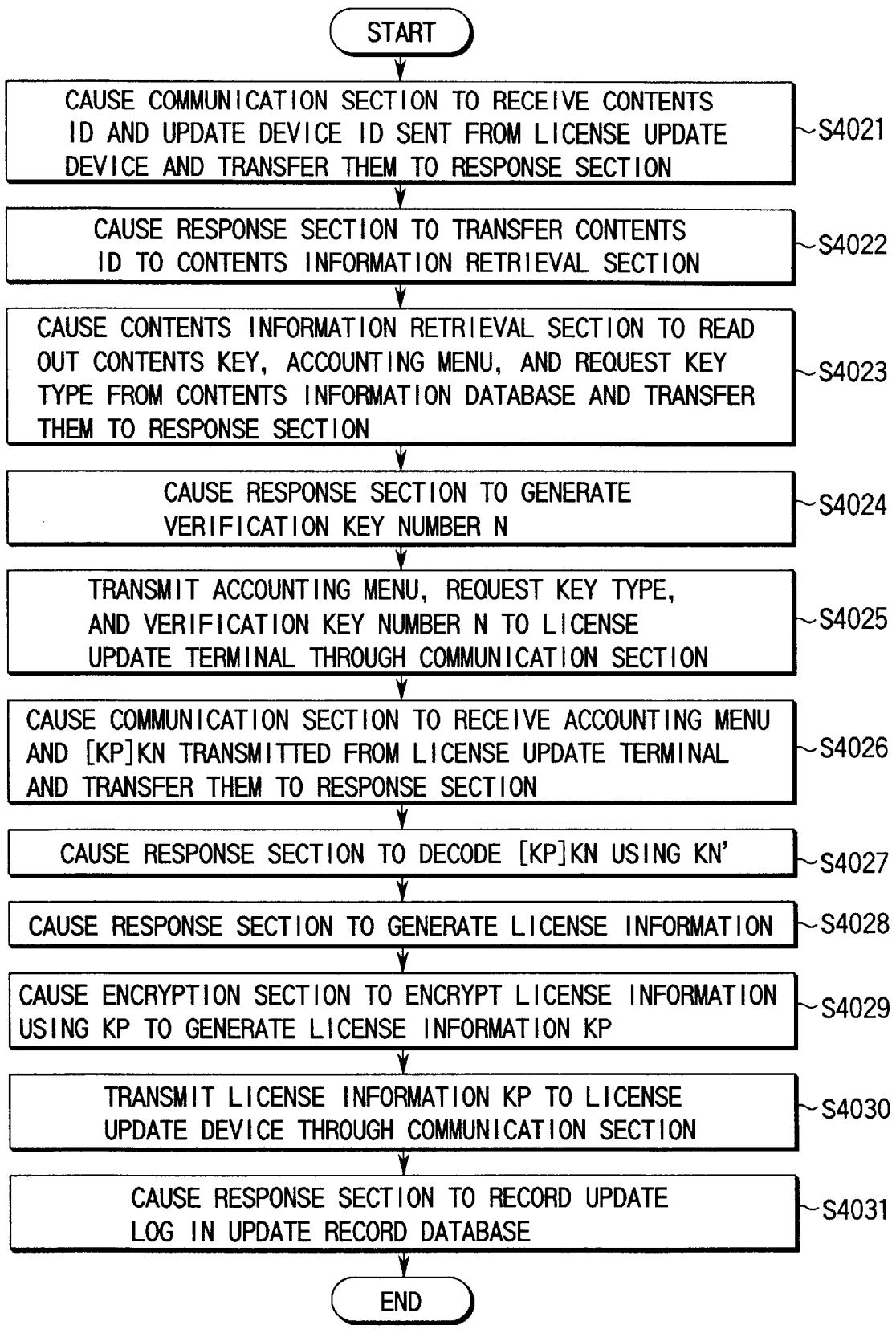
FIG. 102 is a flow chart for explaining the processing operation of the license server.

The processing operations of various portions of the license server 4001 shown in FIG. 101 will be described below with reference to the flow chart shown in FIG. 102.

The contents ID and update terminal ID transmitted from the license update terminal in step S4002 in FIG. 98 are received by the communication section 4021 and transferred to a response section 4022 (step S4021).

The response section 4022 transfers the contents ID to a contents information retrieval section 4023 (step S4022). The contents information retrieval section 4023 reads out a contents key, an accounting menu, and a request key type corresponding to the contents ID and transfers them to the response section 4022 (step S4023).

The response section 4022 generates the verification key number N (step S4024). For example, one of a plurality of predetermined verification key numbers may be selected. Information other than the contents key, i.e., the accounting menu, the request key type information, and the verification key number N are transmitted to the license update terminal through the communication section 4021 (step S4025).

The [KP] KN and the identification number of the desired valid period in the accounting menu, which are transmitted from the update terminal in step S4007 in FIG. 98, are received by the communication section 4021 and transferred to the response section 4022 (step S4026).

The response section 4022 decodes the [KP] KN using a decoding key KN' corresponding to the verification key number N, which has been previously generated, to obtain the master key KP (step S4027).

The license information generated by the response section 4022 is encrypted by an encryption section 4025 using the master key KP ([license information] KP is generated). The [license information] KP is transmitted to the license update device through the communication section 4021 (steps S4028 and S4029).

The response section 4022 records, in an update record database (DB) 4026, the license update history information in correspondence with the update terminal ID received in step S4021 (step S4030).

Figure 103:
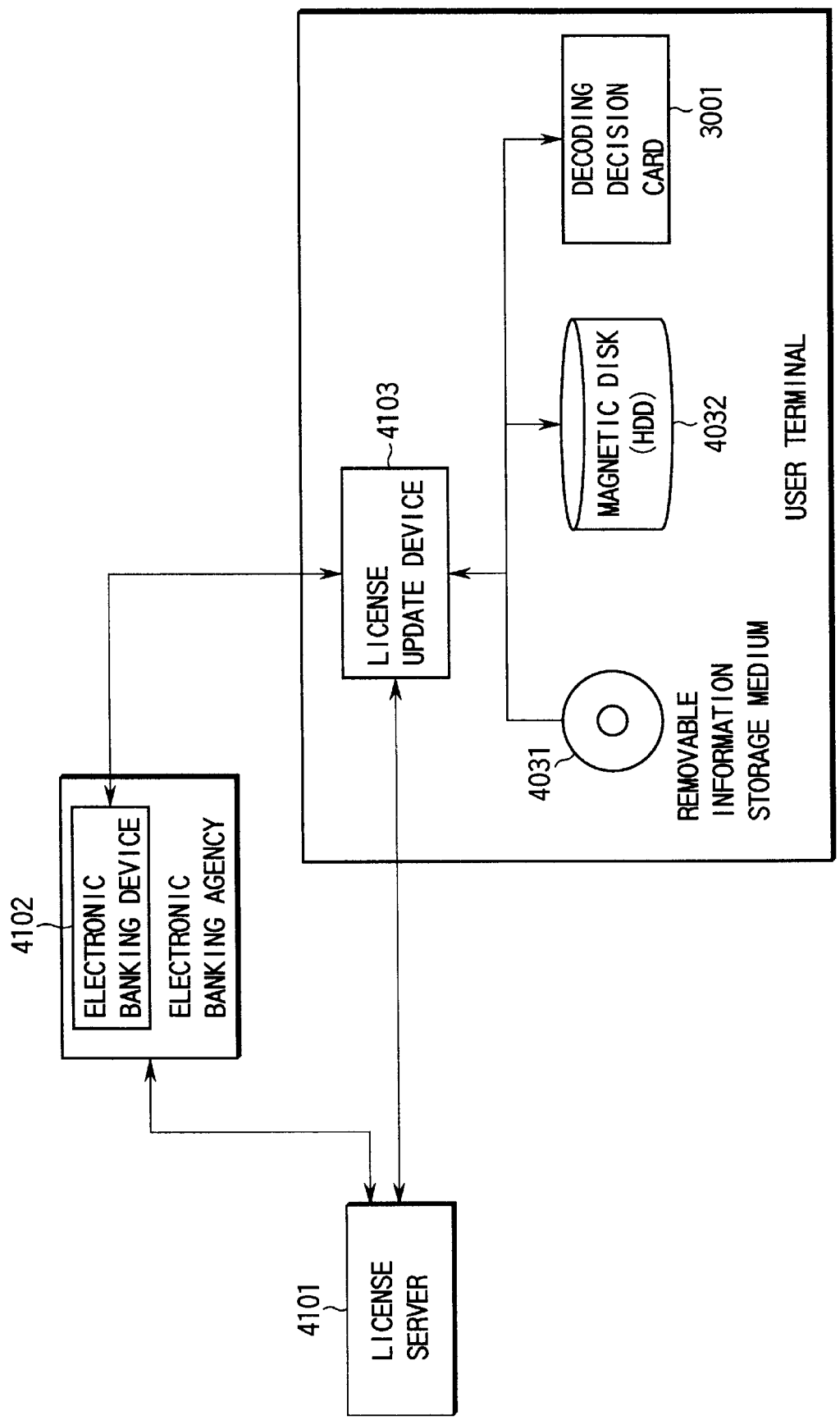
FIG. 103 is a block diagram showing a system configuration constituted by a user terminal, a license server, and an electronic banking apparatus in updating the license using electronic banking.

(3) Information Distribution System in which License is Updated Using Electronic Banking from User Terminal FIG. 103 shows an example of a system configuration comprising a user terminal, a license server 4101, and an electronic banking device 4102, which is used to update the license using electronic banking. The user terminal performs accounting processing using electronic banking through a network.

The user terminal has at least a license update device 4103 and may be constituted by, e.g., a personal computer in which the decoding decision card 3001 and a removable information storage medium 4031 are inserted.

Figure 104:
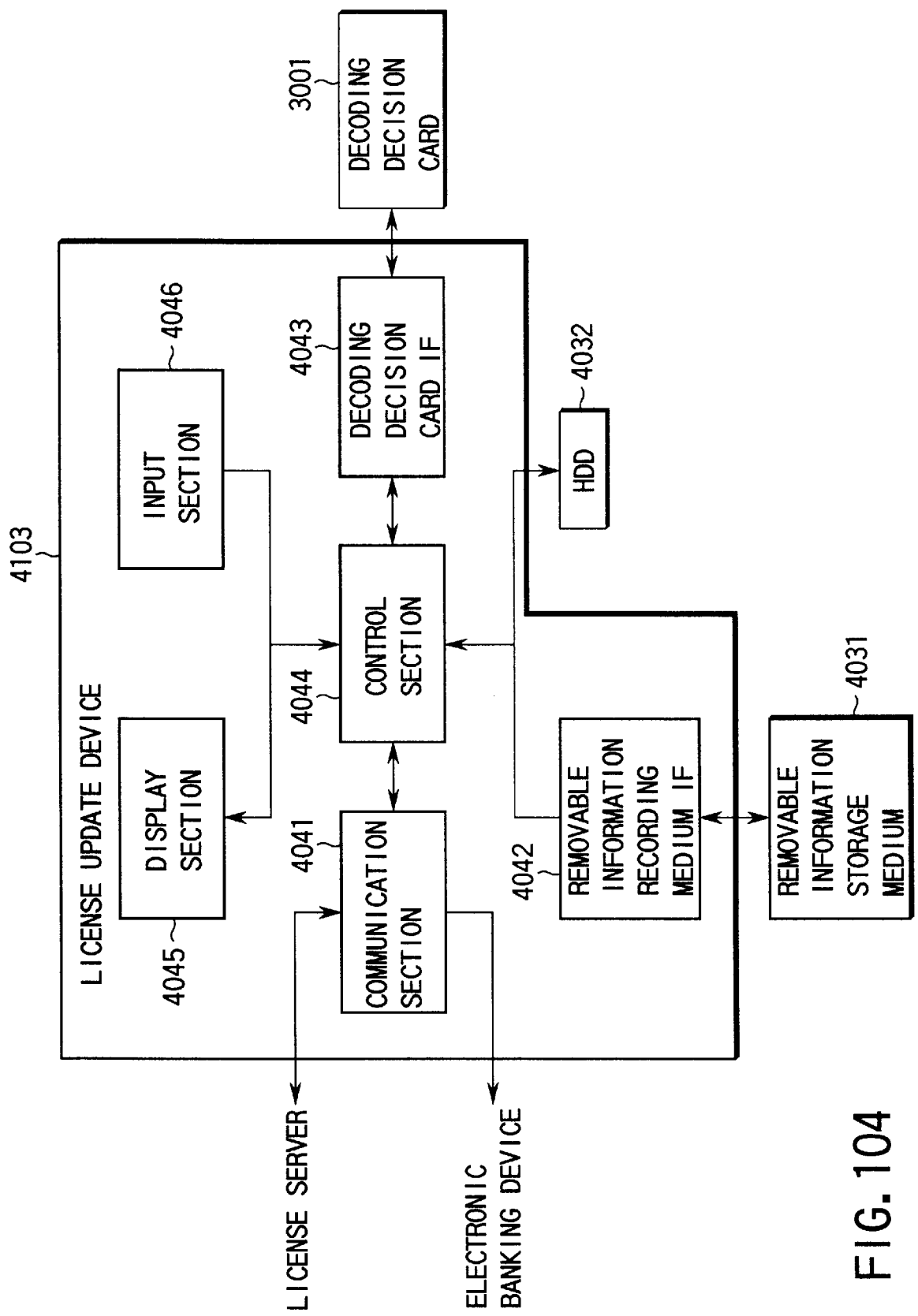
FIG. 104 is a block diagram showing an arrangement of a license update apparatus in the system configuration shown in FIG. 103.

FIG. 104 shows an arrangement of the license update device 4103 incorporated in the user terminal. A control section 4044 constituted by, e.g., a CPU controls a communication section 4041, a removable information recording medium IF 4042, a decoding decision card IF 4043, a display section 4045, and an input section 4046 to execute processing of updating the license.

Figure 105:
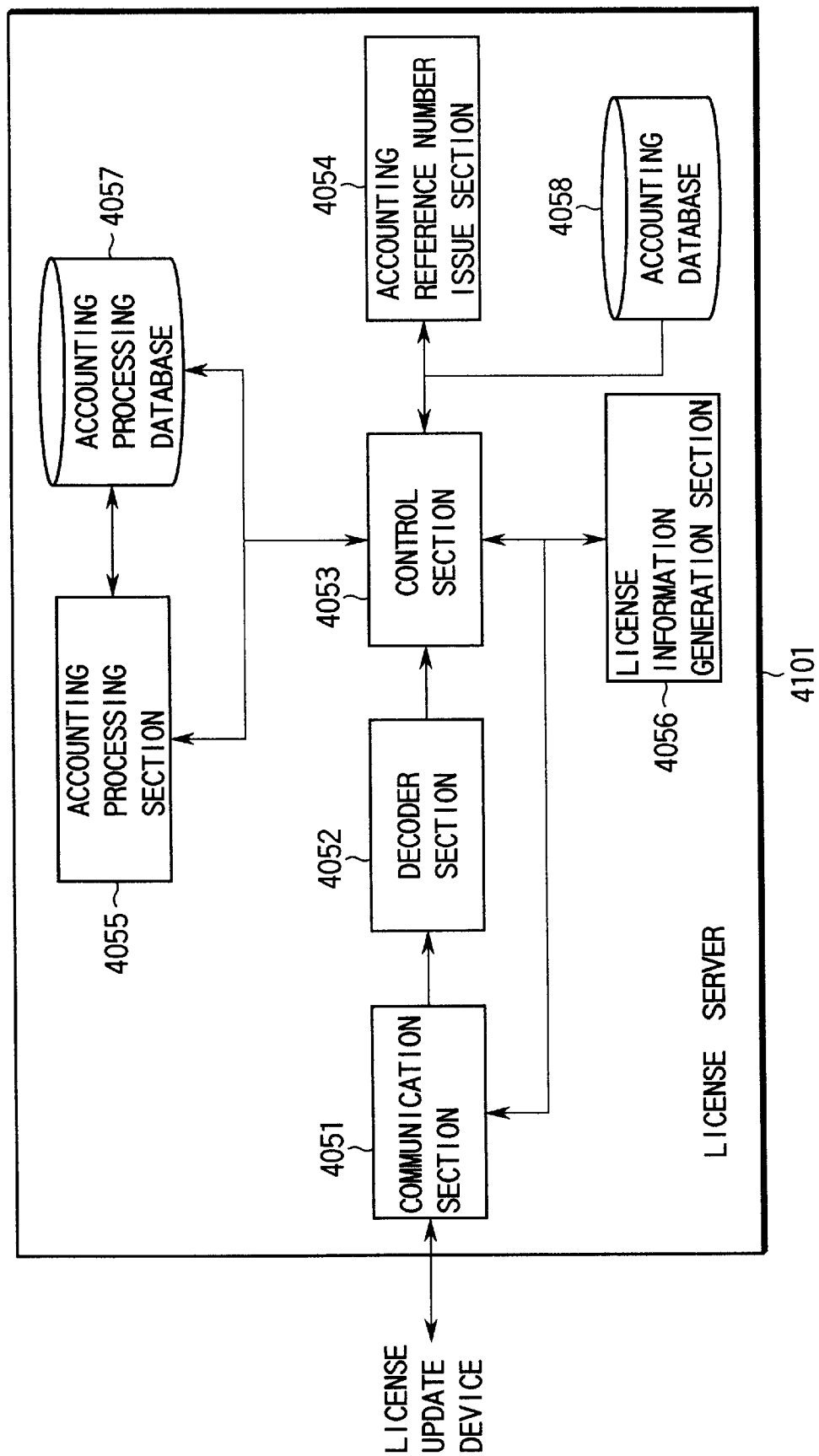
FIG. 105 is a block diagram showing an arrangement of the license server in the system configuration shown in FIG. 103.

FIG. 105 shows an arrangement of the license server 4101 in which a control section 4053 controls a communication section 4051, a decoder section 4052, an accounting reference number issue section 4054, an accounting processing section 4055, and a license information generation section 4056 to execute processing of updating the license.

Figure 106:
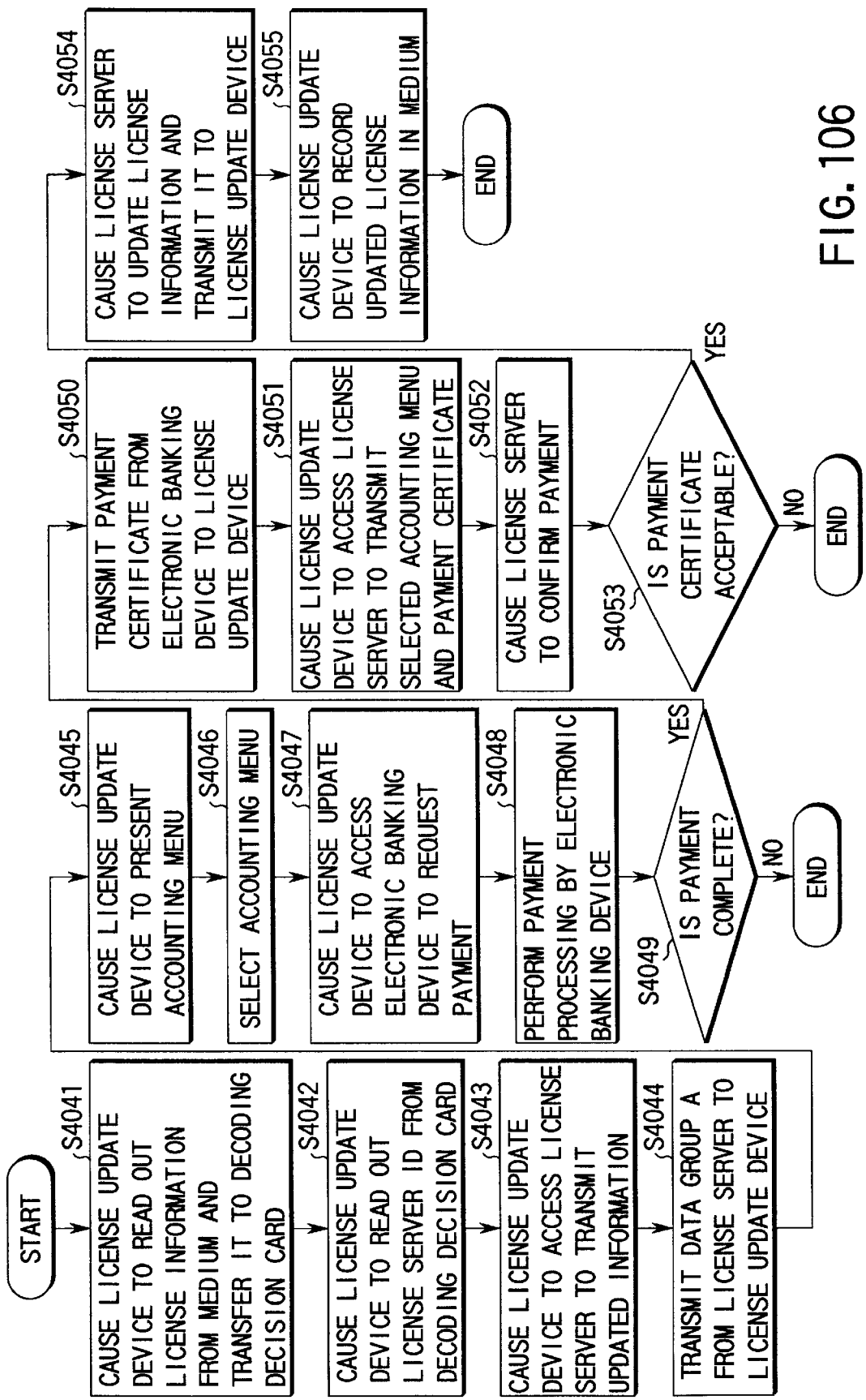
FIG. 106 is a flow chart for explaining the processing operation of the entire system in updating the license in the system configuration shown in FIG. 103.

FIG. 106 is a flow chart showing the processing operation of the entire system shown in FIG. 103 when license information is encrypted using a master key (e.g., one of Km(0) to Km(999)) common to all license decision cards (i.e., all user terminals).

The processing operations of various portions of the license update device 4103 and the license server 4101 will be described with reference to the flow chart shown in FIG. 106.

Note that contents information and license information are recorded on the medium 4031, and the license information contains a license condition for deciding the use enable/disable of the contents information, a contents ID, and other information.

The removable information recording medium interface (IF) 4042 of the license update device 4103 reads license information from the medium set in the user terminal and outputs it to the decoding decision card 3001 through the decoding decision card interface (IF) 4043 (step S4041).

The decoding decision card 3001 performs predetermined processing (e.g., the processing operation of the decoder unit A described in the second embodiment) on the basis of the input license information. As a result, when the license is to be updated, the decoding decision card 3001 outputs license update information (e.g., for the decoder unit A, the updated information as shown in FIG. 56).

The decoding decision card IF 4043 reads the license server ID from the decoding decision card 3001 (step S4042). The license server ID may be contained in the updated information.

The license server ID is identification information for specifying the license server.

The license update device 4103 accesses the license server specified by the license server ID through the communication section 4041 and transmits the updated information for updating the license information (step S4043).

Upon receiving the updated information transmitted from the license update device 4103, the communication section 4051 of the license server 4101 searches an accounting database (DB) 4058 on the basis of the contents ID contained in the updated information to read out at least the accounting menu (the request key type information, the verification key number N, and the like, as needed). The accounting reference number issue section 4054 issues an accounting reference number. At least the accounting menu and the accounting reference number (to be referred to as a data group A hereinafter, as needed) are transmitted to the license update device 4103 through the communication section 4051 (step S4044).

The accounting reference number issued from the license server is a number appropriately assigned to each transaction by the license server. The accounting reference number is used to confirm accounting, as will be described later.

The license server normally processes license update requests from a plurality of users, i.e., license update devices. Therefore, the line connection time is preferably made as short as possible. For this purpose, the license update device appropriately disconnects the line to the license server. For example, for the communication section 4041 of the license update device, a response wait time Tw from the license server is set in advance. If no response comes from the license server within this wait time, the line may be disconnected. To discriminate license update requests from the plurality of license update devices, the license server must manage license information on the basis of accounting reference numbers.

Upon receiving the data group A, the license update device 4103 presents the accounting menu on the display section 4045 (step S4045). When the user selects the identification number of a desired valid period (step S4046), the communication section 4041 of the license update device 4103 accesses the electronic banking device 4102 to send at least the accounting reference number, the license server ID, the identification number of the selected valid period, and a fee claim corresponding to the valid period (step S4047).

The electronic banking device 4102 performs predetermined payment processing in accordance with the request from the user. If processing is successful, the identification number of the valid period, the settlement amount, and the accounting reference number are transmitted, as a payment certificate, to the license server 4101 designated by the license server ID, so the license server is notified of the success of payment processing. The identification number of the valid period, the settlement amount, and the accounting reference number are also transmitted to the license update device 4103 of the fee claiming source as a payment certificate (steps S4048 to S4050). Upon receiving the settlement amount and accounting reference number, the license update device 4103 accesses the license server specified by the license server ID and transmits at least the identification number of the valid period selected in step S4046, the settlement amount, and the accounting reference number as a payment certificate (step S4051).

The payment certificate transmitted from the electronic banking device 4102 and the payment certificate transmitted from the license update device 4103, which are received by the communication section 4051 of the license server 4101, are recorded in an accounting processing database (DB) 4057 in correspondence with the accounting reference number.

The accounting processing DB 4057 stores the following information in correspondence with each accounting reference number.

ID of the license update terminal

Contents key

Payment certificate from the electronic banking device (the identification number of the valid period, the settlement amount, and the accounting reference number)

Payment certificate from the license update device (the identification number of the valid period, the settlement amount, and the accounting reference number)

Upon receiving the payment certificates from the electronic banking device 4102 and the license update device 4103, the license server 4101 records them in the accounting processing DB 4057. The accounting processing section 4055 confirms whether the settlement amounts and identification numbers in the two payment certificates match (step S4052). Only if YES in step S4052, it can be decided that appropriate payment has been performed. Simultaneously with this payment certificate confirmation processing, the license information generation section 4056 of the license server 4101 changes at least the license condition and the contents ID in the license information (updates the license information) on the basis of the license updated information transmitted from the license update device 4103 in step S4043 and the contents key corresponding to the contents ID retrieved from the contents information DB 4024.

For example, the license information contains the following information.

Contents ID

Contents key for decoding encrypted contents information

License information generation time

Update server ID

Accounting reference number

The update server ID is identification information for specifying the license server which has updated the license. With the update server ID, the server which has performed update can be specified from the license information, as needed.

When it is confirmed in step S4053 that appropriate payment has been performed, the license server 4101 transmits the updated license information to the license update device 4103 as the license update source through the communication section 4051 (step S4054).

Upon receiving the updated license information, the license update device 4103 records the updated license information on the medium 4031 through the removable information recording medium IF 4042 (step S4055).

As has been described above, according to the information recording apparatus, the information reproducing apparatus, and the accounting apparatus of the present invention, quick and easy distribution of a digitized work distributed through a network or recording medium is allowed and, a fair digital information usage environment assuming protection by copyright based on charging for the use of digital information can be easily constructed.

(Fourth Embodiment)

Figure 107:
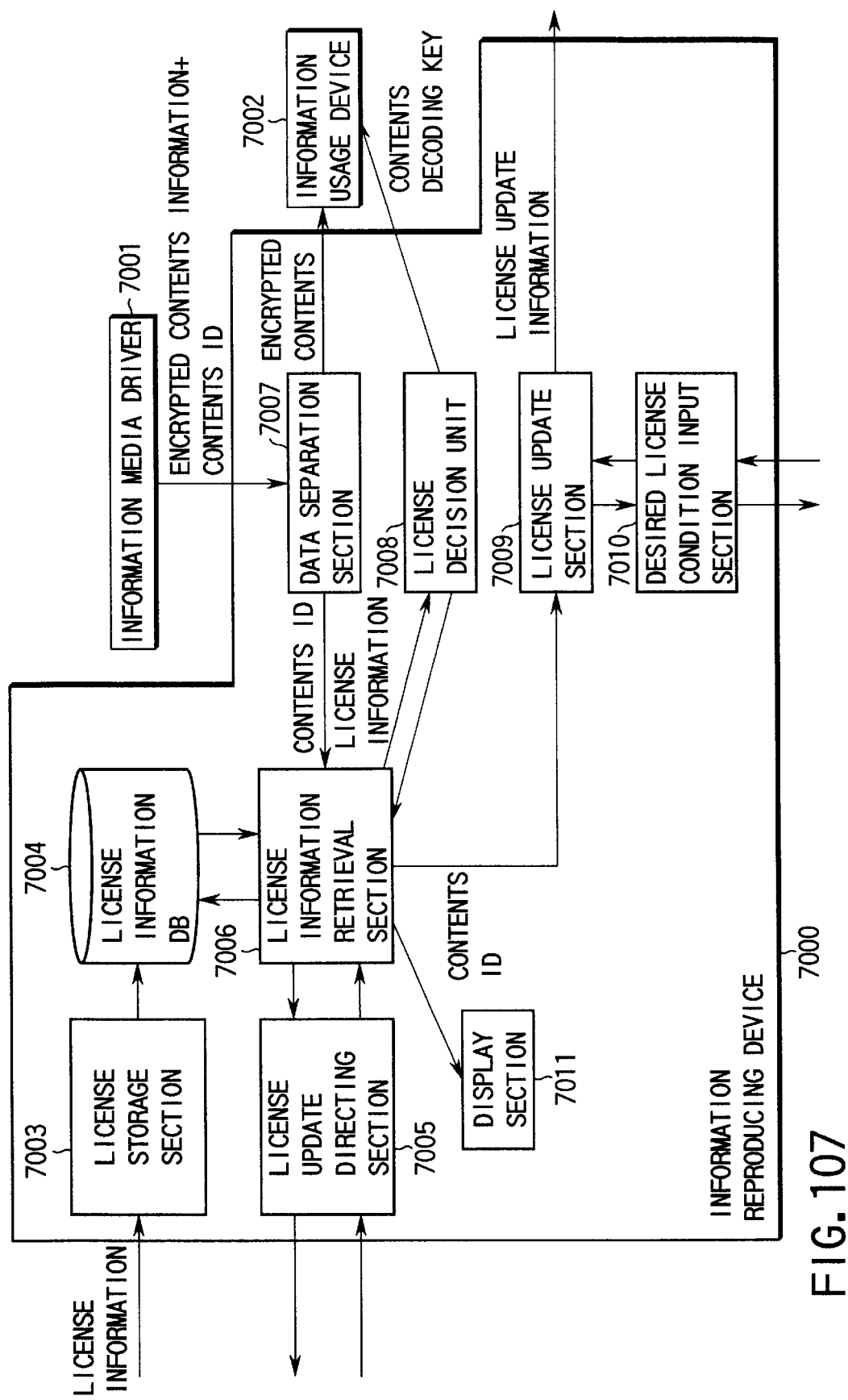
FIG. 107 is a block diagram showing an entire arrangement of an information reproduction system according to the fourth embodiment of the present invention.

FIG. 107 shows an entire arrangement of an information reproduction system according to the fourth embodiment. This system is used by the user in the information distribution system as shown in FIG. 53, 75, or 76 or FIG. 122 to be described later. Contents information is recorded on a recording medium (information medium) such as a DVD-RAM or DVD-ROM. A right for using (reproducing and watching) the contents information under a predetermined condition is called a license. The user obtains license information by purchasing the license. The license information for allowing reproduction of the contents information may be recorded on the recording medium together with the contents information. Alternatively, the license information may be separately recorded on another recording medium or, e.g., an IC card having a memory and an arithmetic function, read out independently of the contents information, and input to the information reproducing apparatus shown in FIG. 107. This license information may be distributed through broadcasting or the Internet.

Referring to FIG. 107, the information reproduction system comprises an information media driver 7001 for reading encrypted contents information, i.e., mainly digital contents from an information medium such as a DVD-ROM or DVD-RAM, an information reproduction device 7000 for checking on the basis of license information corresponding to the encrypted contents whether the license is valid, and if the license is valid, outputting a contents decoding key for the use of the contents information, and an information usage device 7002 such as a DVD player or a video reproduction device for decoding the encrypted contents using the decoding key output from the information media driver 7001 and reproducing the contents information.

Figure 113:
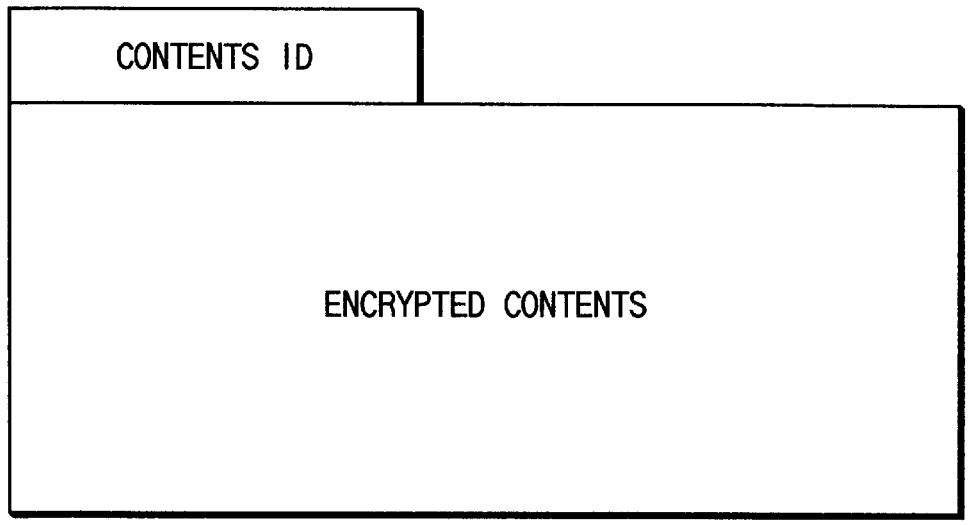
FIG. 113 is a view showing a structure of contents information.

Assume that the digital contents are encrypted in advance in order to properly collect the license fee. FIG. 113 shows a structure of contents information to be used in this embodiment. The contents information is constituted by an encrypted portion and an unencrypted portion. Encrypted contents are recorded in the encrypted portion, and a contents ID is recorded in the unencrypted portion. The contents ID is used to link the contents with the license information.

Figure 114:
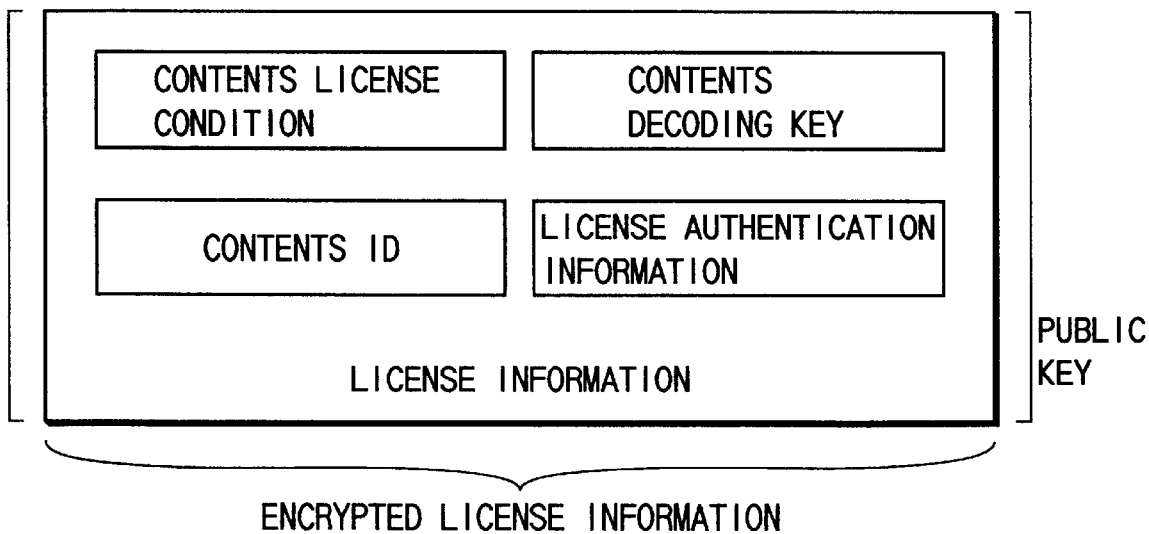
FIG. 114 is a view showing a structure of license information.

FIG. 114 shows a structure of license information. The license information contains a decoding key (to be referred to as a contents decoding key hereinafter) for decoding the encrypted contents, a license condition such as an expiration date, the ID of the contents, and license authentication information.

The license authentication information is a code which is defined in advance to check whether the encrypted license information has been properly decoded. For example, a 4-byte code is represented by a hexadecimal number such as "a5fe478e160e325f". This information must be defined among a license generation device, a license update device, and a license decision unit in advance.

The entire license information is encrypted using a predetermined decoding key. The license information is decoded using a secret key held in a license decision unit 7008 in the information reproduction device 7000, and the license condition is checked on the basis of the decoded license information. The license condition is, e.g., an expiration date and a use count. When the expiration date is employed as the license condition, watching is disabled after the expiration date. Even when both contents and license information required to decode the contents are illicitly copied, the contents information cannot be used after the expiration date, so distribution of pirated editions substantially becomes meaningless.

However, when the expiration date is determined, the clock for counting the current time (time will mean the date and time hereinafter) to check the expiration date must be strictly managed, and otherwise, the expiration date itself also becomes meaningless. For example, assume that license information with an expiration date on December 22. is acquired on December 15. as a license for one week. In this case, if the clock to be referred to by the license decision unit 7008 indicates June 10, the license is valid for a half year. Especially, when the clock can be adjusted by the user, the clock may be adjusted to the user's advantage, and the above situation is likely to occur.

In this embodiment, an information reproducing apparatus capable of solving the above problem and providing a framework for causing the user to keep the expiration date even when the clock is adjusted to the user's advantage will be described. The decoding key of license information is generated using a predetermined algorithm at a predetermined period and replaced with the old decoding key. In the license generation device or license update device as well, a corresponding encryption key of license information is generated at the same timing. If the clock time is largely shifted from that in the license generation device or license update device, newly acquired license information cannot be decoded. At least to watch new contents, the clock time must be correctly adjusted. As described above, this embodiment has as its gist to change the decoding key of license information to indirectly adjust the clock to the correct state. In FIG. 107, a clock 7008h (FIG. 108) for counting the current time is incorporated in the license decision unit 7008 (in this case, when the license decision unit 7008 is constituted by, e.g., one IC chip, protection can be easily realized on the hardware side to prevent the user from adjusting the time). However, the count time of the clock 7008h may be adjusted by the user.

The processing operation of the information reproducing apparatus shown in FIG. 107 and that of the license decision unit 7008 having an arrangement shown in FIG. 108 will be described next with reference to the flow charts shown in FIGS. 109 and 110.

Contents information as in FIG. 113, which is read from the information media driver 7001, is separated into a contents ID and encrypted contents by a data separation section 7007 (steps S7001 and S7002). The encrypted contents are sent to the information usage device 7002 (step S7003), so the contents decoding key to be output from the license decision unit 7008 is waited for.

On the other hand, the contents ID is sent to a license information retrieval section 7006. The license information retrieval section 7006 searches a license information database (DB) 7004 for license information having the contents ID (step S7004).

Figure 115:
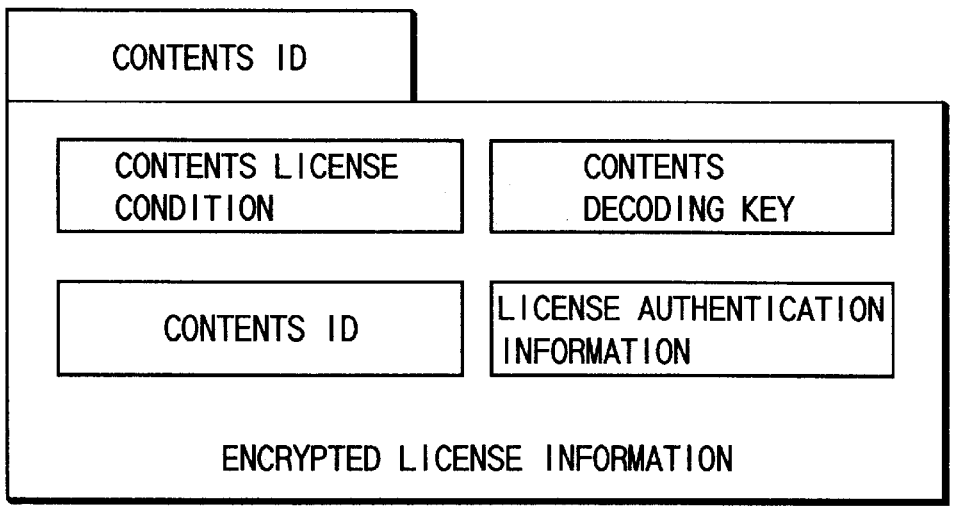
FIG. 115 is a view showing an example of storage of license information in a license information database.

In license information stored in the license information DB 7004, an unencrypted portion containing at least a contents ID is added to encrypted license information, as shown in FIG. 115, so license information corresponding to the contents can be retrieved on the basis of the contents ID. The retrieved license information is sent to the license decision unit 7008 (steps S7005 and S7006).

Figure 108:
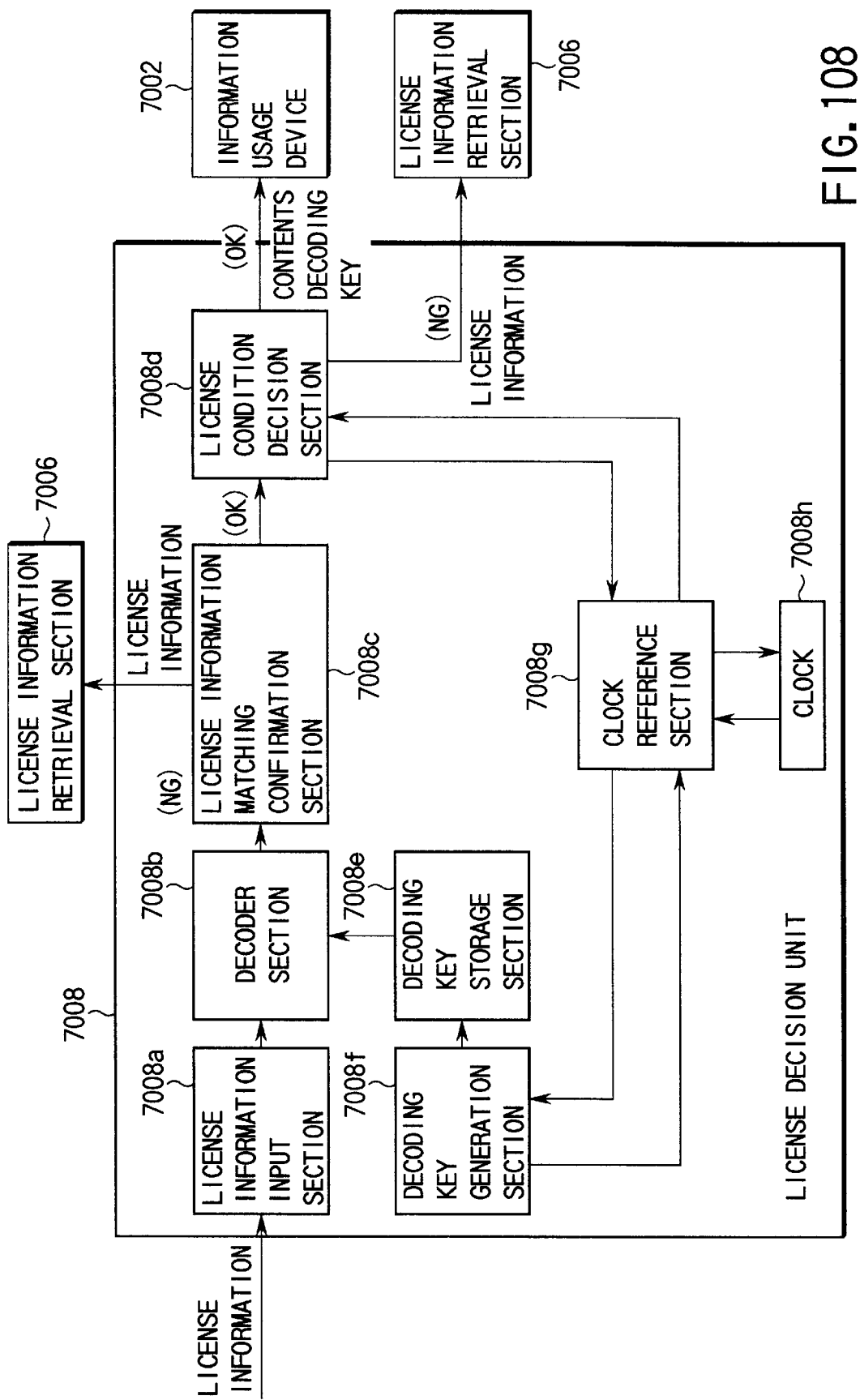
FIG. 108 is a block diagram showing an arrangement of a license decision unit shown in FIG. 107.

FIG. 108 shows an arrangement of the license decision unit 7008. The license information retrieved by the license information retrieval section 7006 is input to a license information input section 7008a and transferred to a decoder section 7008b.

The decoder section 7008b decodes the license information using the license information decoding key stored in a decoding key storage section 7008e (steps S7007 and S7008).

The decoded license information is sent to a license information matching confirmation section 7008c so it is confirmed using license authentication information whether the license information has been correctly decoded (step S7009). After the license information is decoded, it is checked whether the license authentication information is present at a predetermined position in the license information. If the license authentication information is at a predetermined position, it is decided that the license information has been correctly decoded. If decoding has been made using an appropriate decoding key, this code normally becomes random. If it is decided that the license information has not been correctly decoded, the license information retrieval section 7006 is requested to retrieve the next candidate of license information. The license information retrieval section 7006 searches the license information DB 7004, extracts the next license information having the contents ID, and sends it to the license decision unit 7008. If the license information retrieval section 7006 cannot retrieve the next candidate of license information, the flow advances to step S7021 in FIG. 110 to request to display, on a display section 7011, a message, e.g., "license information is invalid, or time of the reference clock is wrong. Current time of the reference clock is YYYY, HH:MM. Please confirm time and update the license" (step S7021 in FIG. 110). The user confirms the current time, and if the time is largely shifted, corrects the time.

A decoding key generation section 7008f generates a new key at a predetermined period together with the license update device and license generation device and stores the key in the decoding key storage section 7008e. If the clock 7008h in the license decision unit 7008 indicates time largely shifted from the actual time, the decoding key generated by the license decision unit 7008 does not match the encryption key generated by the license update device or license generation device, so even license information with a valid license condition cannot be decoded. For this reason, the message as described above need be displayed to prompt the user to confirm the time of the clock 7008h. After this, the license may be updated in response to the request from the user.

Figure 109:
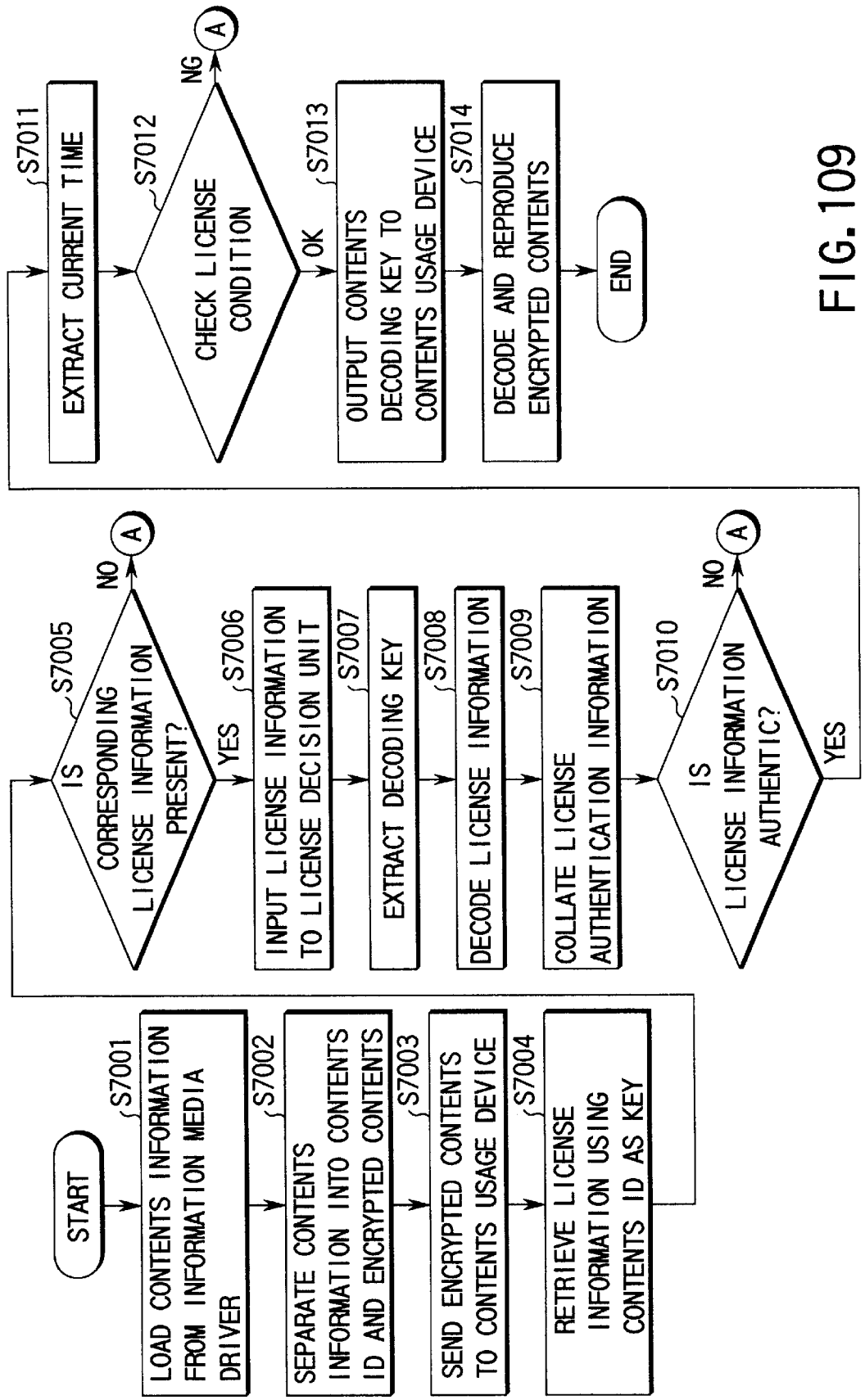
FIG. 109 is a flow chart for explaining the processing operation of the information reproducing apparatus shown in FIG. 107.

In step S7010 in FIG. 109, if the license information matching confirmation section 7008c decides that the license information has been correctly decoded, the license information is sent to a license condition decision section 7008d to decide the license condition. The expiration date is used as the license condition. To decide the license condition, the time of the clock 7008h in or, as needed, outside the license decision unit 7008 is referred to through a clock reference section 7008g to decide whether the time is before the expiration date (step S7011). If it is decided that the license condition is satisfied (step S7012), the contents decoding key is output to the information usage device 7002 (step S7013). The information usage device 7002 decodes encrypted contents, which have been separately sent, using the decoding key, and reproduces and uses the contents information (step S7014).

In step S7012, if the license condition is not satisfied, its message and at least the license information are transferred to the license information retrieval section 7006. The flow advances to step S7021 in FIG. 10, and the license may be updated in response to a request from the user.

Figure 116:
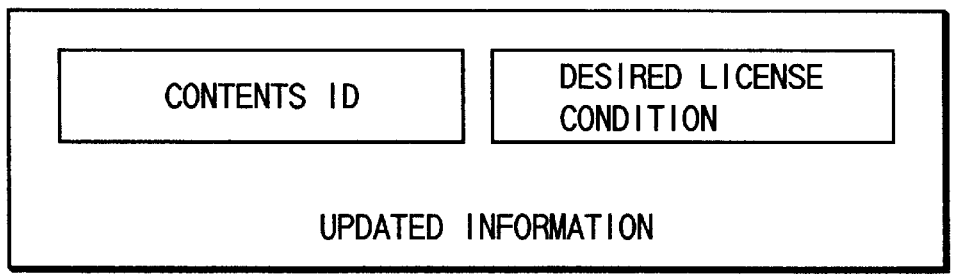
FIG. 116 is a view showing a structure of license update information.

The license is updated following a procedure to be described later in detail. License update information containing at least a contents ID and a desired license condition, as shown in FIG. 116, is generated through a license update directing section 7005, a desired license condition input section 7010, and the display section 7011 shown in FIG. 107. The generated license update information is sent to the license update device through a predetermined network such as the Internet to update the license.

Figure 110:
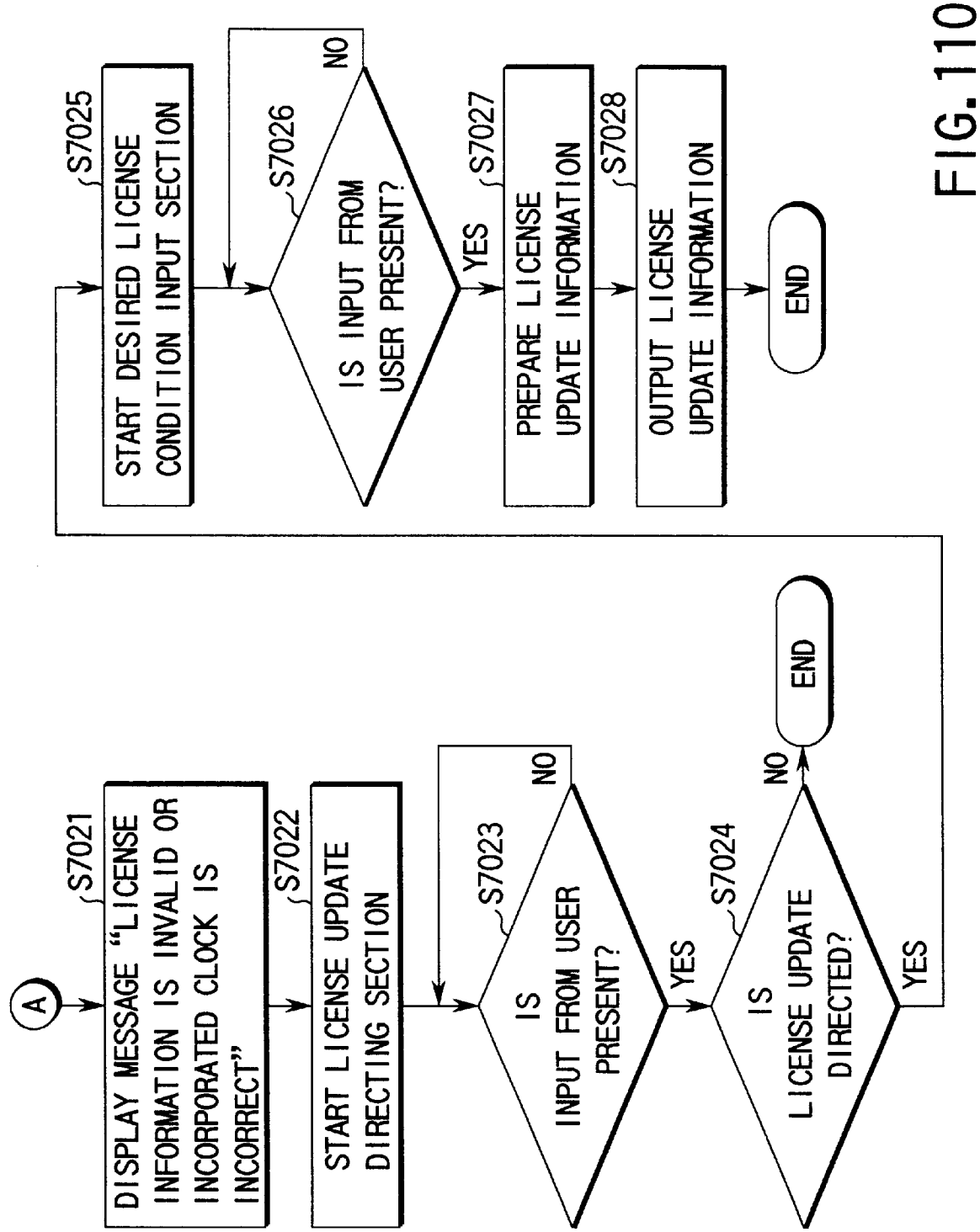
FIG. 110 is a flow chart for explaining the processing operation of the information reproducing apparatus shown in FIG. 107.

FIG. 110 is a flow chart of license information update processing. In FIG. 110, after a message "license information is invalid, or time of the reference clock is wrong. Current time of the reference clock is YYYY, HH:MM. Please confirm time and update the license" is displayed on the display section 7011 (step S7021), the license update directing section 7005 having an appropriate interface with which the user inputs at least an instruction whether the license is to be updated is started. Assume that (after the time of the clock 7008h is confirmed), the user has input an instruction through the interface to update the license. The license update directing section 7005 sends the instruction to the license information retrieval section 7006. The license information retrieval section 7006 sends the contents ID to a license update section 7009 (steps S7022 to S7024).

The license update section 7009 starts the desired license condition input section 7010, generates license update information as shown in FIG. 116 using the desired license condition input through the appropriate interface of the desired license condition input section 7010 and the contents ID sent from the license information retrieval section 7006 (steps S7025 to S7027), and sends the license update information to the license information update device through a predetermined network.

In step S7024, if the user does not want to update the license (i.e., the user inputs an instruction through the license update directing section 7005 not to update the license), the license information retrieval section 7006 erases the contents ID, and processing is ended.

Figure 111:
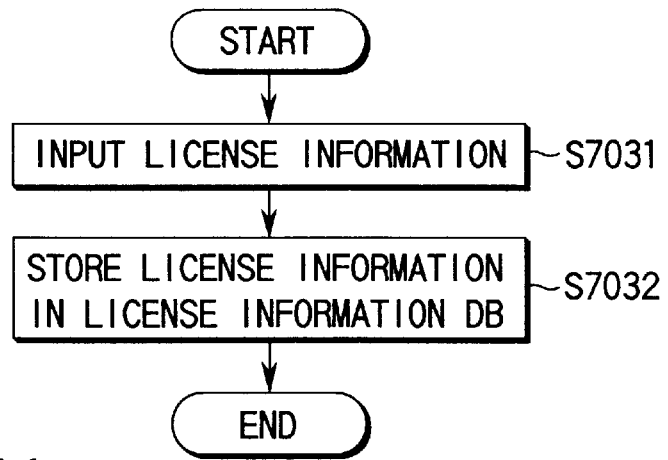
FIG. 111 is a flow chart for explaining the processing operation of the information reproducing apparatus shown in FIG. 107 until license information is stored in a license database.

The updated license information is input to a license storage section 7003 through an IC card or a predetermined network such as the Internet, converted into a data format shown in FIG. 115, and stored in the license information DB (database) 7004, as shown in FIG. 111.

If the license decision unit 7008 decides that the license is invalid (step S7005, S7010, or S7012 in FIG. 109), processing may be immediately ended (reproduction may be stopped). In this case, the license update directing section 7005, the display section 7011, the license update section 7009, and the desired license condition input section 7010 can be omitted. The function of communicating with the license update device can also be omitted, and the arrangement is simplified. To update the license, the user with, e.g., an IC card goes to an agency which updates the license and pays a predetermined fee to cause the agency to write new license information with an updated license condition and the like in the IC card. The user brings the IC card back and inserts it into the information reproducing apparatus shown in FIG. 107 to load the updated license information and store it in the license information DB 7004 through the license storage section 7003.

Figure 112:
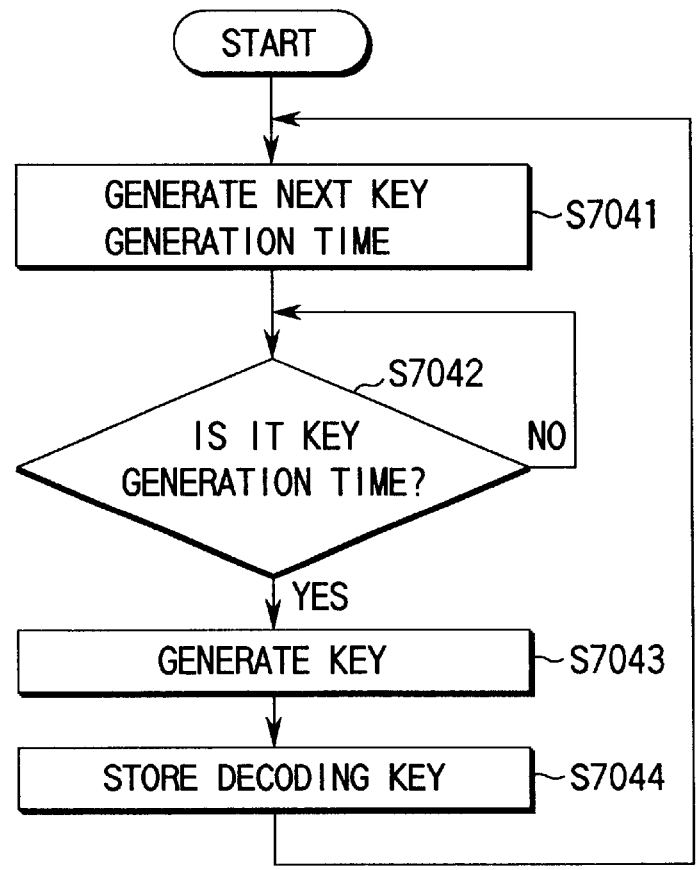
FIG. 112 is a flow chart for explaining the license information decoding key generation processing of the information reproducing apparatus shown in FIG. 107.

License information decoding key generation processing will be described next with reference to the flow chart shown in FIG. 112.

The decoding key generation section 7008f in the license decision unit 7008 refers to the clock 7008h through the clock reference section 7008g and starts to generate a decoding key at predetermined time (steps S7041 and S7042). The generated decoding key is stored in the decoding key storage section 7008e (steps S7043 and S7044). The decoding key must be generated in synchronism with the license generation device and license update device. For example, the decoding key is updated, e.g., once a week at predetermined time such as 15:00 on Monday. As is apparent from the gist of this embodiment, the same key as that in the license generation device or license update device must be generated. For this purpose, the key can be generated using a random number generator using time as a seed. When the key is to be updated on Dec. 15, 1997, the number "19971215" is used as a seed, and the output from the random number generator incorporated in, e.g., the decoding key generation section 7008*f* may be used as the decoding key. The license generation device and license update device also generate the license information encryption key by the same scheme, as a matter of course.

A method of generating a common key in the common key scheme has been described above. The license decision unit 7008 sometimes employs a public key cipher. In this case, as in the key generation section 2006 of the above-described decoder unit A, a key generation algorithm of, e.g., RSA cipher can be used to generate the decoding key (secret key).

With this arrangement, a mechanism for changing the decoding key on both the license generation device or license update device side and the license decision unit 7008 side at a predetermined period can be realized. Even when the user illicitly alters the clock 7008*h* in the information reproducing apparatus including the license decision unit 7008, newly acquired license information cannot be decoded, so illicit alteration of the clock can be prevented in many cases.

Whether the clock 7008*h* can be altered by the user is not a serious problem because of this characteristic feature. In the key generation process, the key generation start instruction need not always be issued from the decoding key generation section 7008*f* itself. The clock reference section 7008*g* or clock 7008*h* may issue the instruction. In this case, key generation can be performed at more accurate time than that in key generation directed by the decoding key generation section 7008*f*.

In this embodiment, a license corresponding to a piece of contents information is retrieved, and then the validity is decided (the expiration date is checked). If the expiration date is valid, the decoding key is output. However, if the expiration date is invalid, a message representing that the license has expired or the reference clock is wrong is displayed without retrieving another license information. This is because it is tacitly assumed that only a piece of license information corresponds to the contents. However, if a license for two weeks is to be purchased/sold, the license information may be separated in units of weeks. In some cases, licenses with not a period limitation but a count limitation are sold, and these licenses may be present with respect to the same contents. In such a case, all existing license information can be retrieved, and the most advantageous license for the user may be used.

Figure 117:
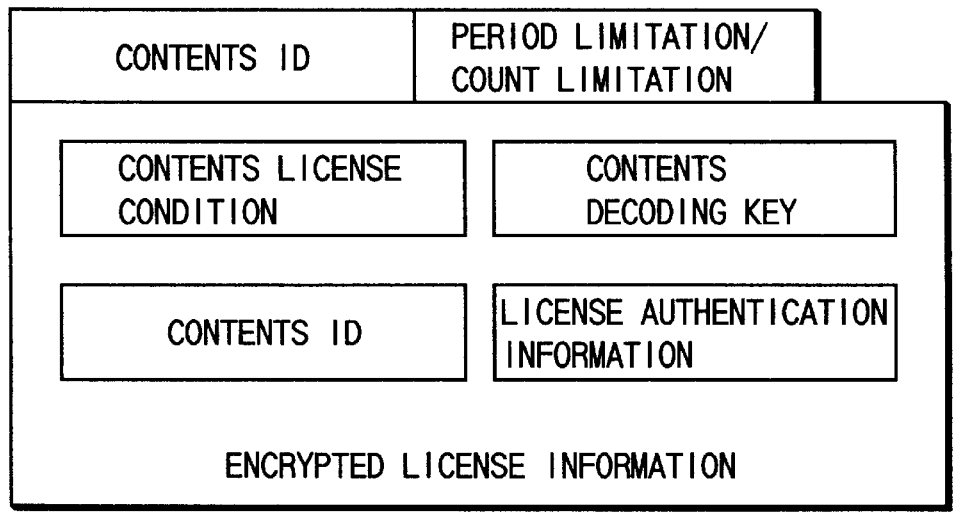
FIG. 117 is a view showing another example of storage of license information in the license information database.

For example, the license with a period limitation is preferred over the license with a count limitation. While the license with the period limitation is valid, the user need not use the license with the count limitation. In this case, the license information stored in the license information DB 7004 preferably contains, in the unencrypted portion, not only the contents ID but also information for identifying the license with a period limitation or the license with a count limitation, as shown in FIG. 117.

The priority order in selecting the license may be designated by the user himself/herself. For example, the license information retrieval section 7006 may displays, on the display section 7011, a menu window to cause the user to select the license with a period limitation or the license with a count limitation.

Once the license information with priority has been retrieved, the license information retrieval section 7006 may end retrieval at that time point without retrieving all license information.

Figure 118:
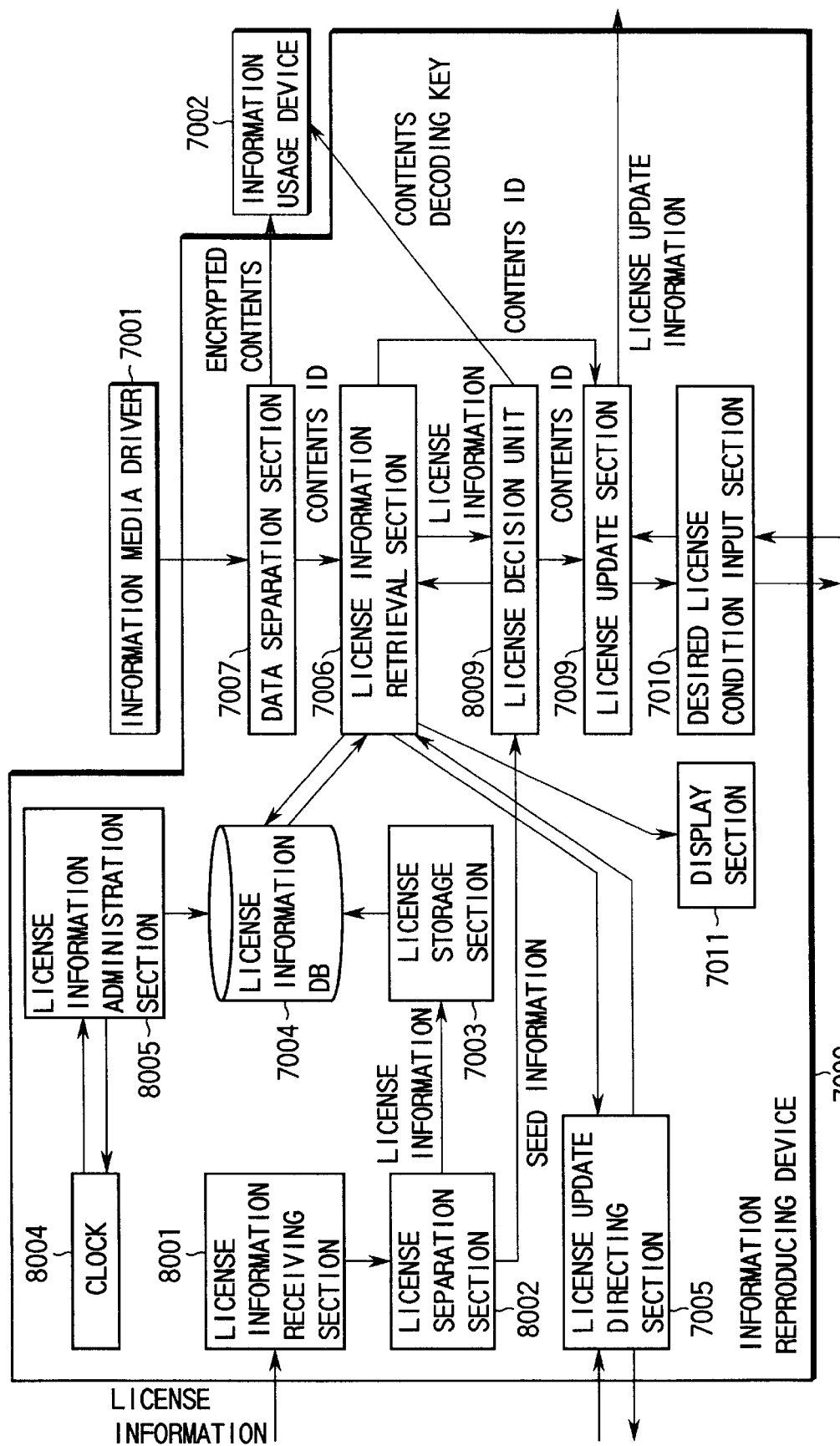
FIG. 118 is a block diagram showing another arrangement of the information reproducing apparatus shown in FIG. 107.

FIG. 118 shows another arrangement of the information reproduction device 7000 shown in FIG. 107. Contents information is recorded on a recording medium (information medium) such as a DVD-ROM or DVD-RAM, and license information is distributed through broadcasting.

As the characteristic feature of the information reproducing apparatus shown in FIG. 118, the decoding key of encrypted license information to be distributed by broadcasting is generated on the basis of a seed contained in the broadcasting wave. As a result, the decoding key can be generated without using the clock 7008*h*.

The same reference numerals as in FIG. 107 denote the same parts in FIG. 118, and only different portions will be described. In the arrangement shown in FIG. 118, encrypted license information is sent by a broadcasting wave, and the broadcasting wave includes seed information for generating the decoding key of the encrypted license information. Therefore, the information reproducing apparatus has a license information receiving section 8001 for receiving the broadcasting wave and converting it into a digital signal, and a license separation section 8002 for separating the encrypted license information and seed information from the received broadcasting wave. A license decision unit 8009 generates the decoding key on the basis of the seed information sent together with the broadcasting wave.

Figure 121:
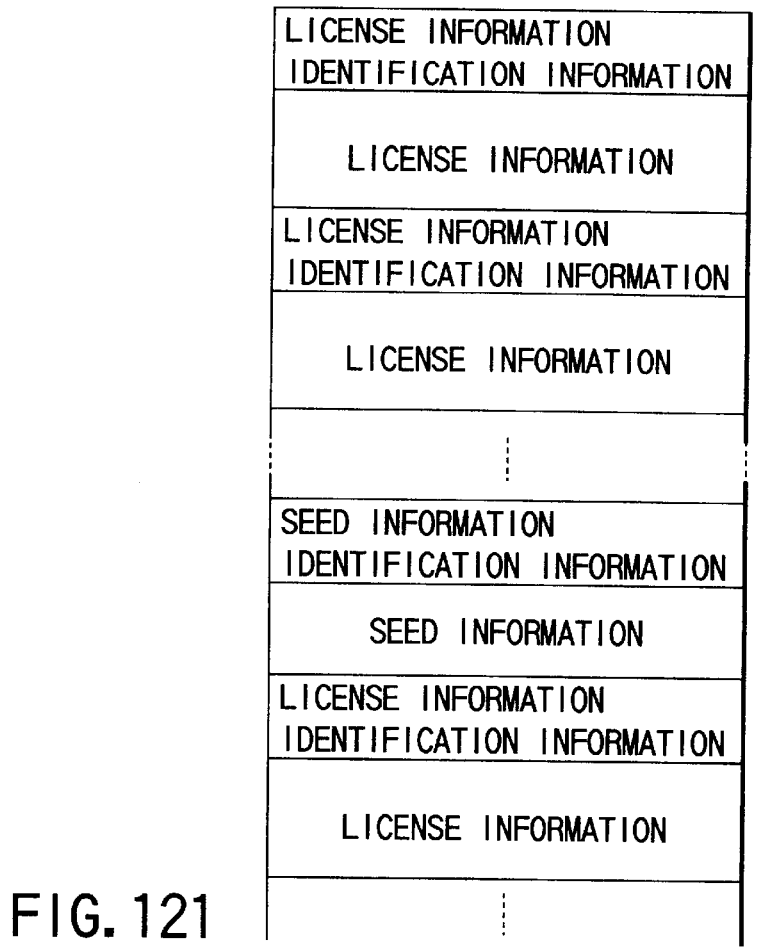

FIG. 121 shows an example of the data structure of the broadcasting wave received by the license information receiving section 8001. Identification information with a fixed length is added to the start of each of the license information and seed information to discriminate the license information from the seed information.

Figure 119:
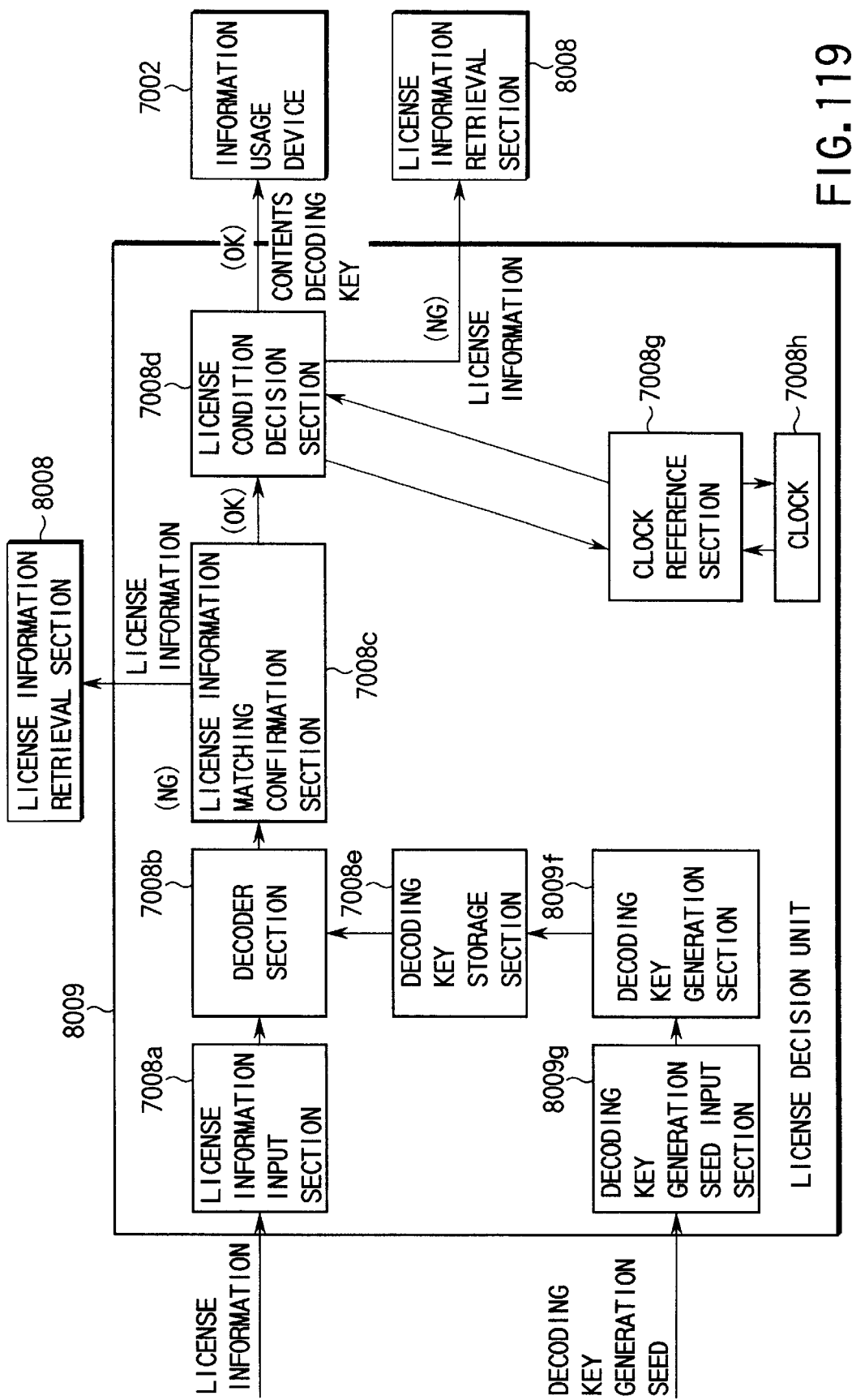

FIG. 119 shows an arrangement of the license decision unit 8009. The same reference numerals as in FIG. 108 denote the same parts in FIG. 119, and only different portions will be described. The license decision unit 8009 further comprises a decoding key generation seed input section 8009*g* to which seed information output from the license separation section 8002 is input. A decoding key generation section 8009*f* generates a decoding key from the seed information.

Figure 120:
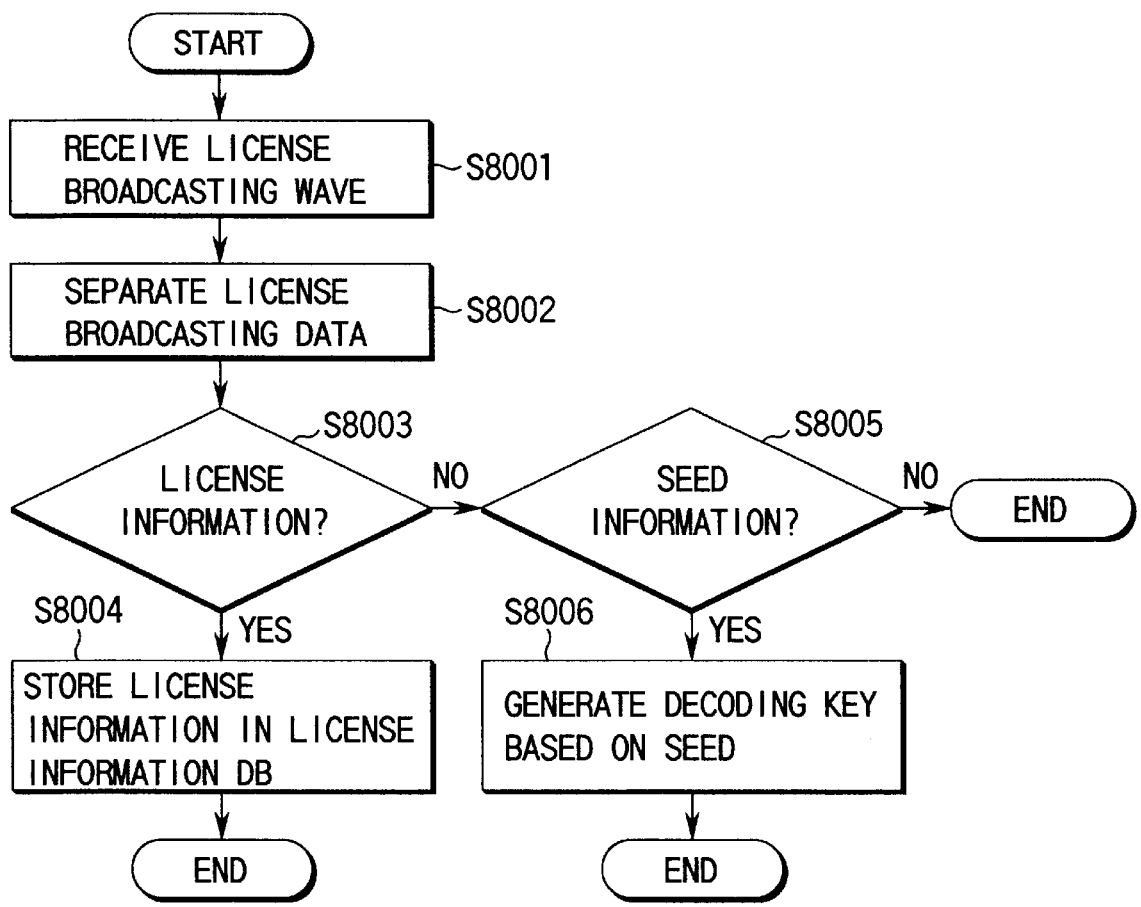

An operation from separation of encrypted license information and seed information from a received broadcasting wave to decoding key generation will be described next with reference to the flow chart shown in FIG. 120.

Upon receiving a broadcasting wave and obtaining received data as shown in FIG. 121, the license information receiving section 8001 temporarily sends the received data to the license separation section 8002 to separate it into license information and seed information using identification information (steps S8001 and S8002).

If the received data is license information, the license information is sent to the license storage section 7003 (steps S8003 and S8004). The license storage section 7003 adds a contents ID to the license information, as shown in FIG. 115, and stores it in the license information DB 7004. If the received data is seed information, the seed information is sent to the license decision unit (step S8005). The license decision unit receives the seed information by the decoding key generation seed input section 8009*g* and sends it to the decoding key generation section 8009*f* to generate a new decoding key (step S8006). The decoding key generation section 8009*f* may generate the decoding key from the seed information using the common key scheme or public key scheme, as in the fourth embodiment. The generated decoding key is stored in a decoding key storage section 8009e.

License decision or license update processing is the same as in FIGS. 109 and 110.

When license information is distributed by broadcasting, and the license is sent to all information reproducing apparatuses (reception terminals), watching is allowed to all people having reception terminals in the same specifications, and the license is managed in no way. The license information need be supplied in units of reception terminals. A reception terminal ID is inserted into the license information, and reception terminals except a reception terminal having the reception terminal ID must be prevented from receiving the license information. For this purpose, the reception terminal preferably has identification information (reception terminal ID) for identifying the reception terminal in the license information identification information distributed by broadcasting such that only license information addressed to the reception terminal can be selectively received. The reception terminal ID in the license information identification information is called an effective terminal ID.

Each reception terminal, i.e., the license separation section 8002 of the information reproducing apparatus as shown in FIG. 118 has a unique reception terminal ID in advance. Before license information is separated from the received data as shown in FIG. 121, the effective terminal ID contained in the license information identification information is compared with the self reception terminal ID. Only when the IDs match, the license information is received. Alternatively, all license information may be temporarily stored in a predetermined memory, the effective terminal ID in the license information identification information stored in the memory may be compared with the reception terminal ID, and unnecessary license information may be erased from the memory.

The information reproduction device 7000 shown in FIG. 107 or 118 can be constituted using a hardware resource as standard equipment of a general-purpose computer.

License information decoding key generation processing described in this embodiment can also be applied to the key generation section 2006 of the decoder unit A or C described in the second embodiment.

When the license information contains license authentication information as described in this embodiment, processing of the license information matching confirmation section 7008c, i.e., processing of confirming using the license authentication information whether the license information has been correctly decoded can also be performed in the decision section 2003 of each of the decoder units A to D described in the second embodiment. The decision section 2003 of each of the decoder units A to D can collate the license authentication information, and after it is decided that the license information has been correctly decoded, predetermined license decision can be made.

As described above, according to the fourth embodiment, key information for decoding license information is generated at a predetermined period in the license decision unit 7008. With this arrangement, the information security for license information containing the contents information license condition or contents information decoding key can be improved.

The decoded license information contains license authentication information for deciding the decoding result. Therefore, even when many decoding keys of license information are generated along with the elapse of time, it can be easily decided whether the license information has been correctly decoded using a proper one of the decoding keys.

Since the decoding key of license information is generated in the license decision unit 8009 on the basis of seed information distributed to the information reproducing apparatus by broadcasting, the decoding key can be easily updated.

(Fifth Embodiment)

FIG. 122 shows an arrangement of an information distribution system according to the fifth embodiment. Encrypted contents information as an accounting object is recorded on a removable information storage medium (to be simply referred to as a disk hereinafter) D such as a DVD in advance. This embodiment provides a rental service in which a license for allowing reproduction of the contents information recorded on the disk D is sold, and the disk D is rented. In this case, the license means the right of using (reproducing and watching) contents information to be rented under a predetermined condition. More specifically, license information for allowing the user to reproduce contents information only within a limited period a limited number of times is sold to the user, thereby granting the user the license.

License information for enabling reproduction of contents information is recorded on a card type recording medium (to be simply referred to as a card hereinafter) P such as an IC card having a calculation function and supplied to the user.

Each shop for providing the rental disk D has a license issuing device 5003. The license issuing device 5003 is connected to a center through a predetermined communication line to form a network. When the user subscribed to the service of the information distribution system as shown in FIG. 122 goes to an arbitrary shop on the network to rent the disk D having desired contents information, the user undergoes a predetermined procedure such as fee payment for the contents license condition such as a contents information watching period first. The license issuing device 5003 generates license information on the basis of disk information containing the disk key and license condition of the disk D, which is sent from the center, and records the license information on the card P.

The user takes the disk D and the card P home, inserts the card P into a card adapter 5004 adapted to the information distribution system, and sets the disk D in a player 5005. As far as the license condition contained in the license information is satisfied (e.g., within the watching period), the contents information can be reproduced.

Figures 123, 124:
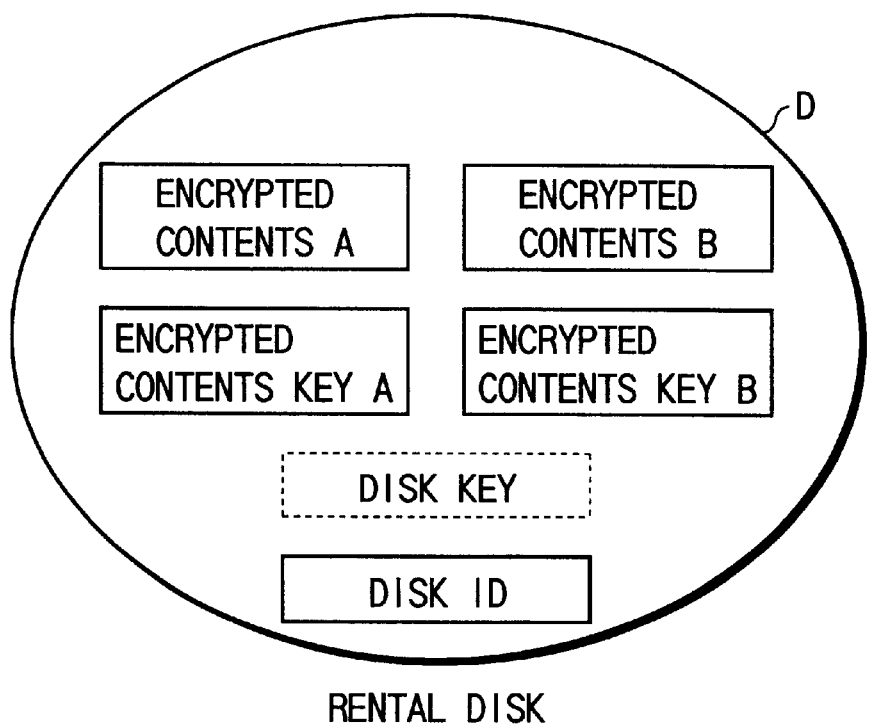

FIG. 123 shows an example of data recorded on the rental disk D in the shop. As shown in FIG. 123, the disk D has a disk ID, one or a plurality of pieces of (e.g., two pieces of) encrypted contents information, and encrypted contents keys corresponding to the pieces of contents information, respectively, which are used to decode the contents information.

The pieces of contents information recorded on one disk are encrypted using contents key corresponding to the pieces of contents information. The contents key is encrypted using a predetermined disk key in the disk ID of the disk. As a characteristic feature, the disk key is not recorded on the disk.

The disk ID is identification information for identifying the disk. The disk ID may be uniquely defined for each disk or common to disks storing contents information of the same title. Alternatively, disks manufactured in a factory in a certain day may have a common disk ID.

A disk key (the disk key is not recorded on the disk) capable of decoding the encrypted contents key recorded on the disk is uniquely determined, but not vice versa. Even when a disk key is available to decode a contents key, the disk IDs are not always identical.

The rental disk D does not have the disk key, as shown in FIG. 123. To rent the disk D, a disk key necessary for decoding the contents stored in the disk D must be distributed to the user.

When the disk D is to be rented, a license creation device 5001 in the center generates disk information containing a disk key corresponding to the disk D. The disk key is stored in a contents DB 5002 in the center in correspondence with the disk ID in advance, as shown in FIG. 124.

The present invention is to provide a safe disk key distribution scheme.

Figure 125:
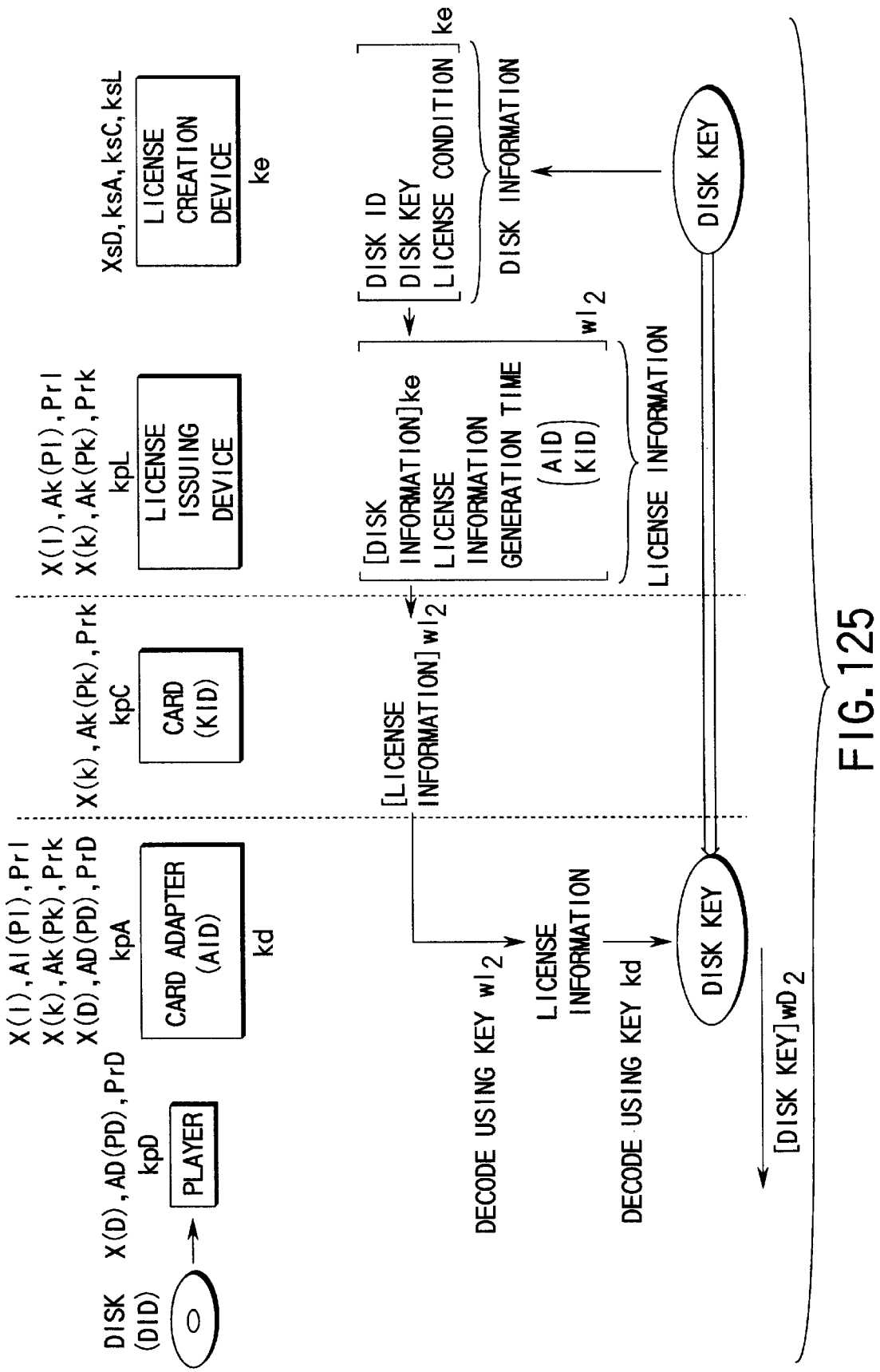

FIG. 125 schematically shows the disk key distribution scheme in the information distribution system shown in FIG. 122. Roughly, a key (disk key) distribution device is constituted by the license creation device 5001 and the license issuing device 5003, and an information usage device for using (e.g., reproducing) the contents information using the key (disk key) distributed from the key distribution device is constituted by the card adapter 5004 and the player 5005.

The disk key is encrypted using an encryption key ke together with the disk ID and contents license condition before the disk key is sent from the license creation device 5001 to the card adapter 5004. More specifically, the license creation device 5001 generates disk information containing the disk key, the disk ID, and the license condition, encrypts the disk information using the encryption key ke, and distributes the disk information. By decoding the disk information by the card adapter 5004 which holds a decoding key kd in advance, the risk of disk key decoding midway along the distribution route by tapping or the like can be lowered.

The license creation device 5001 and the license issuing device 5003 which constitute the key distribution device sometimes independently belong to different parties having interests. In this case, to adjust the interests (to prevent the disk information from being illicitly acquired during the process of distributing it from the license creation device 5001 to the license issuing device 5003), the license creation device 5001 preferably encrypts the disk information and then distributes it to the license issuing device 5003.

The encrypted disk information containing the disk key reaches the card adapter 5004 through the license issuing device 5003 and the card P. To protect the disk information on this distribution route, the encrypted disk information is further encrypted and distributed from the license issuing device 5003 to the card adapter 5004.

For example, as shown in FIG. 125, the license issuing device 5003 adds another information to the disk information encrypted using the encryption key ke and distributed from the license creation device 5001 to generate license information, encrypts the license information using a common key wl2, and writes the license information in the card P.

The common key wl2 is generated on the basis of publishable information (public parameters) which is exchanged between the card adapter 5004 and the license issuing device 5003 through the card P and secret parameters held in the card adapter 5004 and the license issuing device 5003, as in the DH (Diffie-Hellman) key distribution scheme. The public parameters are generated from the secret parameters held in the card adapter 5004 and the license issuing device 5003. A tapper who knows only the public parameters cannot generate the common key wl2.

Only the card adapter 5004 which has exchanged the public parameters with the license issuing device 5003 can decode the disk information encrypted by the common key wl2.

The card adapter 5004 generates the common key wl2 from the public parameters distributed from the license issuing device 5003 through the card P and the secret parameters held in the card adapter 5004 itself and decodes the encrypted license information distributed from the license issuing device 5003 through the card P using the common key, thereby obtaining the encrypted disk information. This encrypted disk information is decoded using the decoding key kd, and the license condition is checked to decide whether reproduction is allowed. If it is decided that reproduction is allowed, the disk key contained in the disk information is transferred to the player 5005.

If the path between the card adapter 5004 and the player 5005 is an unsafe communication path where tapping is likely to occur, the disk key is also preferably encrypted and distributed. As in, e.g., the DH key distribution scheme, the disk key is encrypted by the card adapter 5004 using a common key wd2 generated from public parameters exchanged between the card adapter 5004 and the player 5005 and secret parameters held in the card adapter 5004 and the player 5005 and then distributed to the player 5005.

When the disk key is to be encrypted by the license creation device 5001, the disk ID and contents license condition are added to generate disk information, and then, the disk information is encrypted. When the disk information is to be encrypted by the license issuing device 5003, identification information (KID) of the card P, identification information (AID) of the card adapter 5004, and the like are added to generate license information, and then, the license information is encrypted. The license information may also contain license information generation time.

For the card adapter 5004 and the card P, the respective pieces of identification information are preferably protected to prevent them from being externally read or corrected.

When the identification information (KID) of the card P and the identification information (AID) of the card adapter 5004 are to be inserted into the license information, the license issuing device 5003 must acquire the pieces of identification information KID and AID before generation of the license information.

When the identification information KID of the card P is to be distributed from the card P to the license issuing device 5003, the identification information KID is preferably encrypted and then distributed. For example, as in the DH key distribution scheme, the identification information KID is encrypted in the card P using a common key wk generated from public parameters exchanged between the license issuing device 5003 and the card P and secret parameters held in the license issuing device 5003 and the card P and distributed to the license issuing device 5003.

When the identification information AID of the card adapter 5004 is to be distributed from the card adapter 5004 to the license issuing device 5003 (through the card P), the identification information AID is preferably encrypted and then distributed. For example, as in the DH key distribution scheme, the identification information AID is encrypted in the card adapter 5004 using a common key wl1 generated from public parameters exchanged between the license issuing device 5003 and the card adapter 5004 and secret parameters held in the license issuing device 5003 and the card adapter 5004 and distributed to the license issuing device 5003.

When the license information contains the identification information (KID) of the card P and the identification information (AID) of the card adapter 5004, the card adapter 5004 can collate the identification information AID of the card adapter 5004 itself with the identification information KID of the card P which is being inserted into the card adapter 5004 before it is decided on the basis of the license information whether reproduction is enabled, so the information security can be further improved.

As shown in FIG. 125, to safely distribute the disk key from the license creation device 5001 to the information reproducing apparatus on the user side, the respective devices on the distribution route hold the following secret information.

The license creation device 5001 holds the encryption key ke for encrypting the disk information, and the card adapter 5004 holds the decoding key kd for decoding the disk information.

The card adapter 5004 and the license issuing device 5003 share a number X(l), a key generation algorithm Al(Pl) for generating a given key upon receiving a corresponding seed, and a sufficiently large prime number Prl, which are used for mutual authentication and encryption/decoding of the license information. These pieces of information are used for mutual authentication and encryption/ decoding of the license information. In this case, Pl is a parameter of the algorithm Al, and the card adapter 5004 and the license issuing device 5003 share the algorithm Al and the parameter Pl. X(l), Al, Pl, and Prl are stored in the card adapter 5004 and the license issuing device 5003 while being protected to prevent these pieces of information from externally being read.

The license issuing device 5003 and the card P share a number X(k), a key generation algorithm Ak(Pk) for generating a given key upon receiving a corresponding seed, and a sufficiently large prime number Prk. These pieces of information are used for mutual authentication and encryption/decoding of the identification information KID of the card P. In this case, Pk is a parameter of the algorithm Ak, and the license issuing device 5003 and the card P share the algorithm Ak and the parameter Pk. X(k), Ak, Pk, and Prk are stored in the license issuing device 5003 and the card P while being protected to prevent these pieces of information from externally being read.

The card adapter 5004 and the card P share the number X(k), the key generation algorithm Ak(Pk) for generating a given key upon receiving a corresponding seed, and the sufficiently large prime number Prk. These pieces of information are used for mutual authentication and encryption/decoding of the identification information KID of the card P. In this case, Pk is a parameter of the algorithm Ak, and the card adapter 5004 and the card P share the algorithm Ak and the parameter Pk. X(k), Ak, Pk, and Prk are stored in the card adapter 5004 and the card P while being protected to prevent these pieces of information from externally being read.

The card adapter 5004 and the player 5005 share a number X(D), a key generation algorithm AD(PD) for generating a given key upon receiving a corresponding seed, and a sufficiently large prime number PrD. These pieces of information are used for mutual authentication and encryption/decoding of the disk key. In this case, PD is a parameter of the algorithm AD, and the card adapter 5004 and the player 5005 share the algorithm AD and the parameter PD. X(D), AD, PD, and PrD are stored in the card adapter 5004 and the player 5005 while being protected to prevent these pieces of information from externally being read.

The player 5005 stores a decoding key KpD, the card P stores a decoding key KpC, the card adapter 5004 stores a decoding key KpA, and the license issuing device 5003 stores a decoding key KpL while protecting them to prevent them from externally being read. The decoding keys KpD, KpC, KpA, and KpL are public keys of the public key cipher scheme. The license creation device 5001 holds four secret keys KsD, KsA, KsC, and KsL corresponding to these public keys. The public keys and secret keys are used to update the numbers X(l), X(k), and X(D), the parameters Pl, Pk, and PD, and the prime numbers Prl, Prk, and PrD.

As described above, the disk key is subjected to double protection using a cipher technique and distributed.

Figure 126:
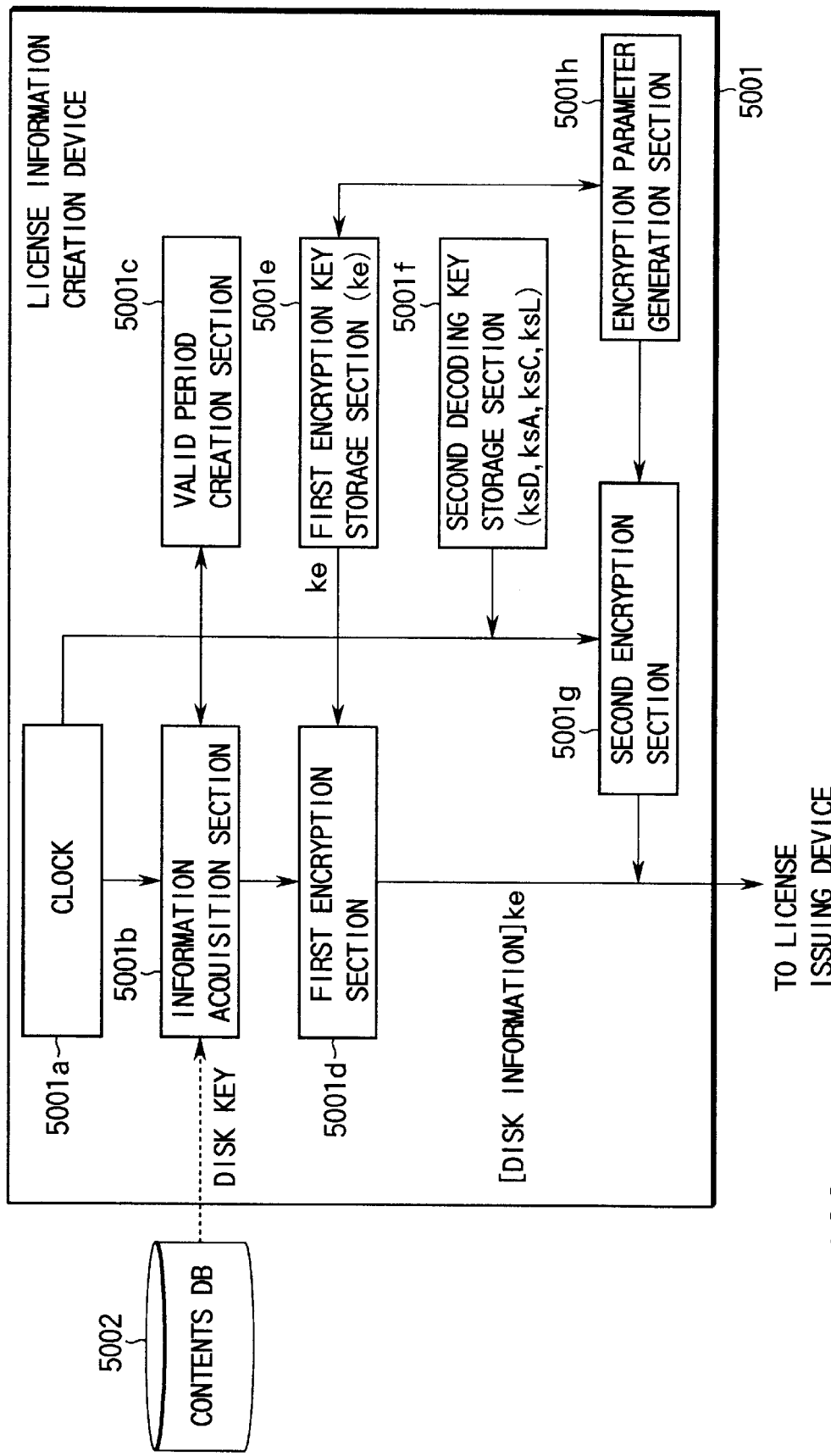

FIG. 126 shows an arrangement of the license creation device 5001. The arrangement and disk information generation processing of the license creation device 5001 will be described below with reference to the flow chart shown in FIG. 131.

Disk information is generated every, e.g., 12 hours. For the descriptive convenience, a watchable period (valid period) is used as the license condition of contents, and disk information which grants a license with a contents watchable period of one week is generated.

Assume that the watchable period starts at 0:00 and 12:00. The license creation device 5001 starts to generate disk information, e.g., three hours before that time. That is, generation of disk information starts at 21:00 and 9:00. Generation of disk information for granting a license whose watchable period starts at 9:00 will be described. At 9:00, a disk information generation instruction is issued from a clock 5001a to an information acquisition section 5001b (steps S5001 and S5002). The information acquisition section 5001b transmits current date information (e.g., 9:00, Apr. 2, 1981) received from the clock 5001a to a valid period generation section 5001c (step S5003).

The valid period generation section 5001c returns, to the information acquisition section 5001b, the expiration date (e.g., 12:00, Apr. 9, 1981) after one week calculated from 12:00 of the day on the basis of the date information (step S5004). The information acquisition section 5001b reads out a pair of information, i.e., the disk ID and the disk key from the contents DB 5002, merges them with the expiration date to generate disk information, and transfers it to a first encryption section 5001d (step S5005). The disk information contains the disk ID, the disk key, and the expiration date.

The first encryption section 5001d reads out the encryption key ke from a first encryption key storage section 5001e and encrypts the disk information (step S5006). The encrypted disk information is added with an unencrypted disk key and distributed to the license issuing device 5003 through a predetermined network (step S5007).

Processing in steps S5005 to S5007 is repeated, hereby generating disk information for all contents IDs registered in the contents DB 5002 (step S5008).

The license issuing device 5003 stores the encrypted disk information received from the license creation device 5001 in an internal license DB 5003f (FIG. 127) in correspondence with the disk ID, as shown in FIG. 132.

It is important to insert the expiration date into the disk information. Although the license issuing device 5003 is set in the shop and can hardly be attacked, robbery may happen. However, since the disk information containing the expiration date does not guarantee a permanent license, the motive for theft of the license issuing device 5003 weakens. In addition, to decode the disk information and steal the permanent license (i.e., acquire the disk key), the decoding key kd stored in the card adapter 5004 and the secret information for encrypting/decoding the disk information must be stolen. However, when both the decoding key kd and the secret information are strictly protected on the hardware side, such theft is very difficult.

Figure 127:
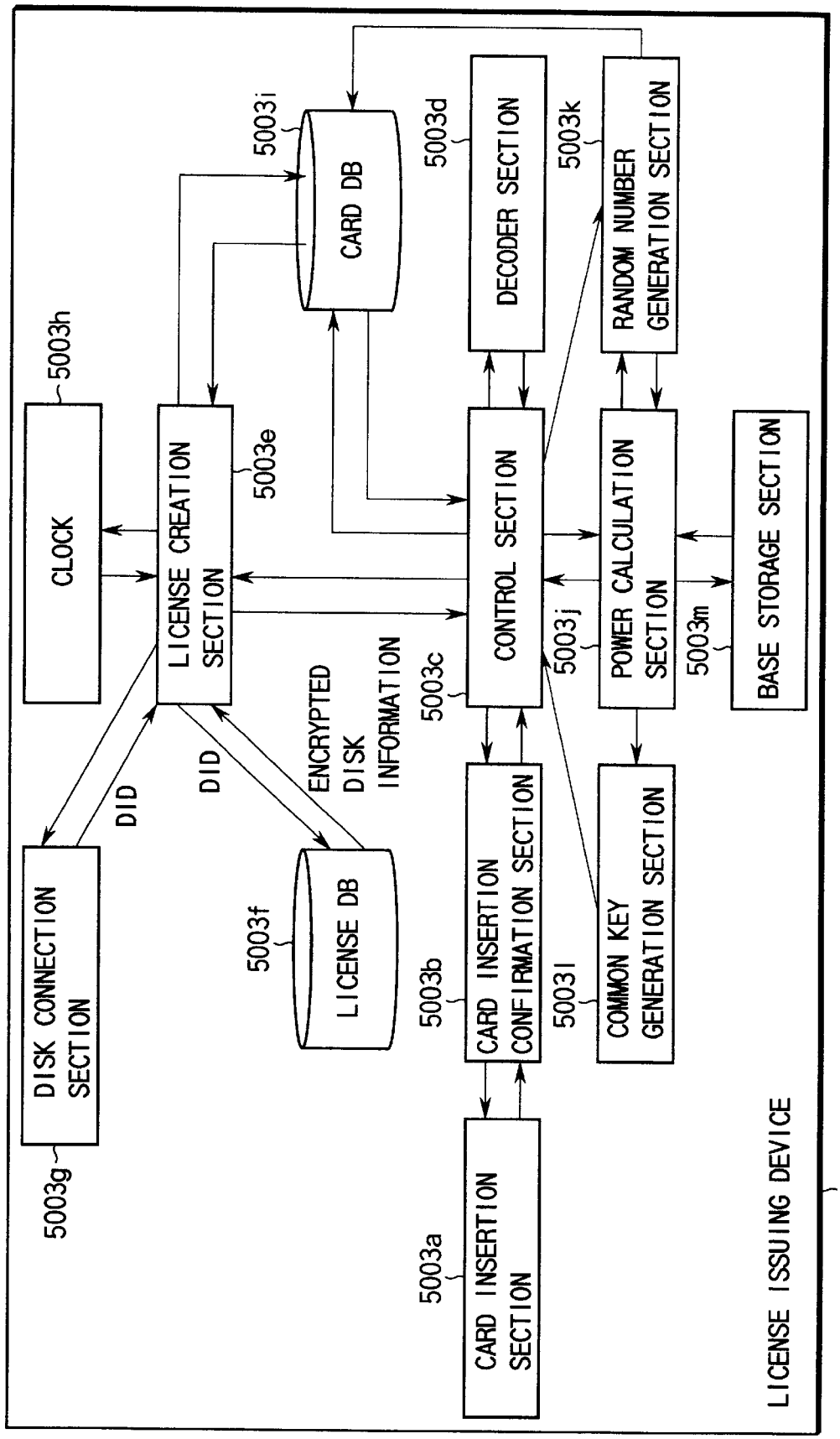

FIG. 127 shows an arrangement of the license issuing device 5003.

The card P is inserted into a card insertion section 5003a. When a card insertion confirmation section 5003b confirms that the card P is normally inserted, the card P and the license issuing device 5003 can communicate through the card insertion section 5003a.

A random number generation section 5003k generates random numbers al, cl, and ak to be used to encrypt/decode the ID of the card P (KID), the ID of the card adapter 5004 (AID), and license information (Lic).

The secret parameters X(l), Prl, X(k), and Prk are stored in a base storage section 5003m in advance.

A power calculation section 5003j calculates public parameters (first seed generation information to third seed generation information) from the random numbers generated by the random number generation section 5003k and the secret parameters stored in the base storage section 5003m. The power calculation section 5003j also generates a first seed from first seed generation information transferred from the card P and the random number ak generated by the random number generation section 5003k. A second seed is also generated from second seed generation information transferred from the card adapter 5004 through the card P and the random number al generated by the random number generation section 5003k. A third seed is also generated from the second seed generation information transferred from the card adapter 5004 through the card P and the random number cl generated by the random number generation section 5003k.

For example, the second seed generation information $X(l)^{al}(\mod Prl)$ is calculated from the random number al and the secret parameters (X(l) and Prl). A power will be represented as "X(l)^al" using "^" hereinafter. In addition, "mod" represents the residue (in this case, the residue obtained by multiplying $X(l)^{al}$ by the prime number Prl). In addition, the first seed generation information X(k)^ak(mod Prk) is calculated from the random number ak and the secret parameters (X(k) and Prk).

A common key generation section 5003l stores the key generation algorithms Al(Pl) and Ak(Pk) in advance. The algorithm Ak(Pk) is applied to the first seed to generate a first common key wl1. The algorithm Al(Pl) is applied to the second seed to generate a second common key wl1. The algorithm Al(Pl) is applied to the third seed to generate the third common key wl2. By applying the algorithms Al(Pl) and Ak(Pk) to the first to third seeds, the data length of each of the first to third seeds can be reduced.

A decoder section 5003d decodes the encrypted card ID ([KID] wk1) and the encrypted card adapter ID ([AID] wl1) using the common keys wk1 and wl1 generated by the common key generation section 5003l.

The disk D for the rental use by the user is inserted into a disk connection section 5003g to read the ID (DID) of the disk D.

A card database (DB) 5003i stores the correspondence between the ID of the card P issued to the user and the ID of the corresponding card adapter 5004.

The license database (DB) 5003f stores the encrypted disk information transferred from the license creation device 5001. As shown in FIG. 132, the encrypted disk information is stored in correspondence with the disk ID (DID).

A license generation section 5003e generates a license for a disk when the user is to rent the disk. More specifically, the encrypted disk information is retrieved from the license DB 5003f using the ID (DID) of the disk D, which is read by the disk connection section 5003g, as a key, the IDs (KID and AID) of the card P and the card adapter 5004 of the user are read out from the card DB 5003i, and the current time is read from a clock 5003h, thereby generating license information containing the encrypted disk information, the license generation time, and the identification information KID and AID.

The generated license information is encrypted using the common key wl2 generated on the basis of the public parameters exchanged with the card adapter 5004 through the card P.

A control section 5003c controls the entire license issuing device 5003.

Figure 128:
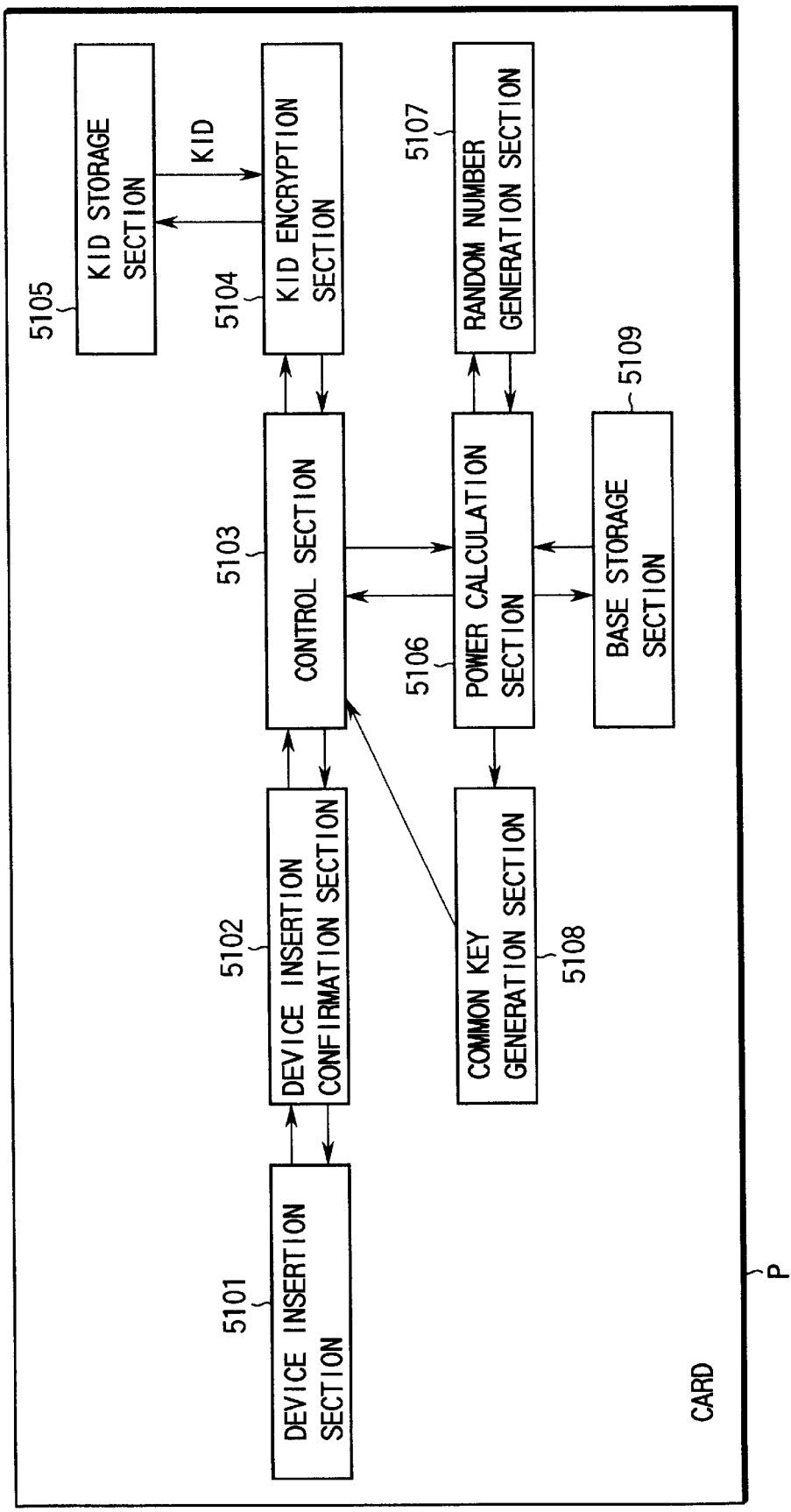
Figure 129:
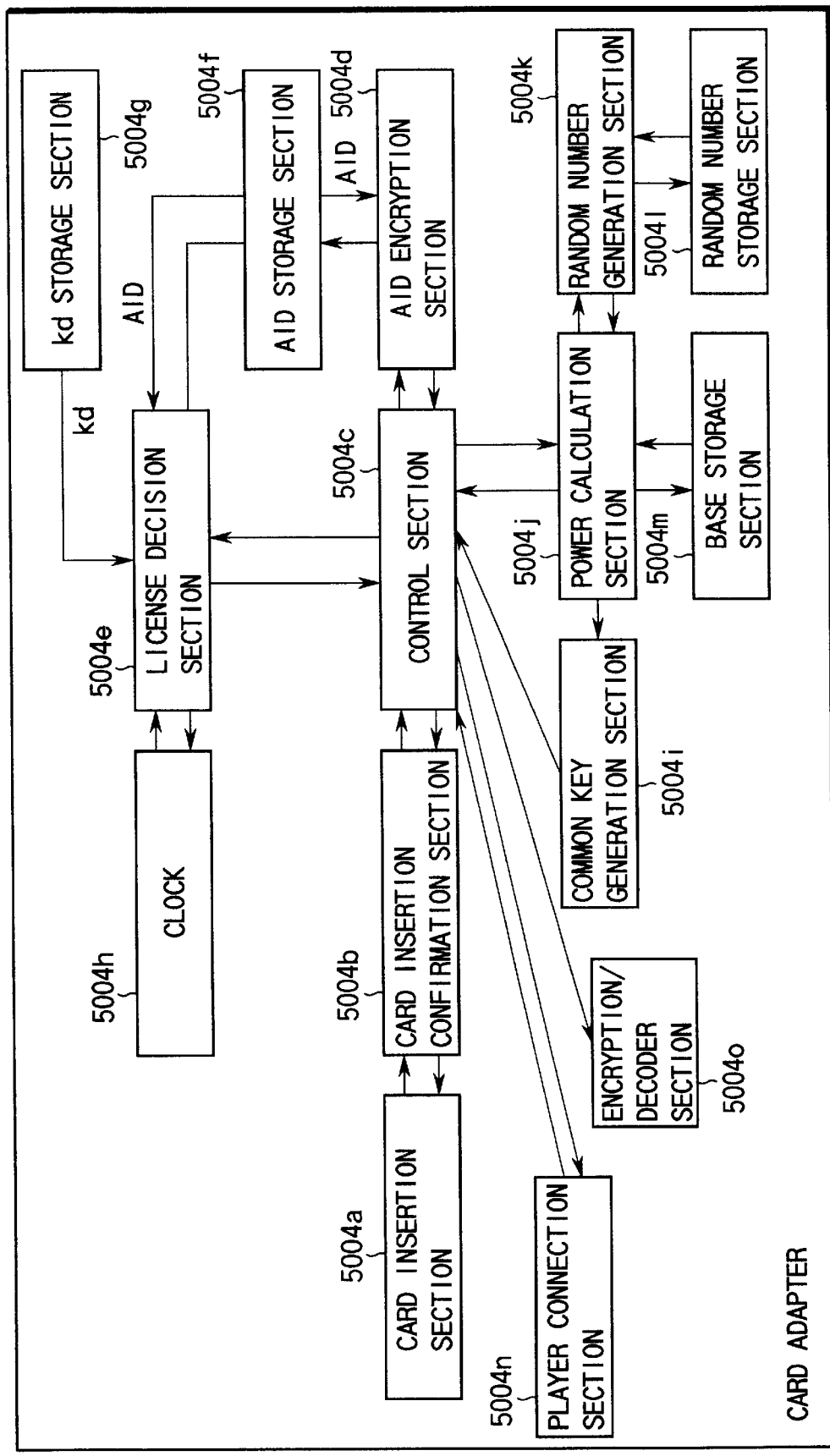
Figure 130:
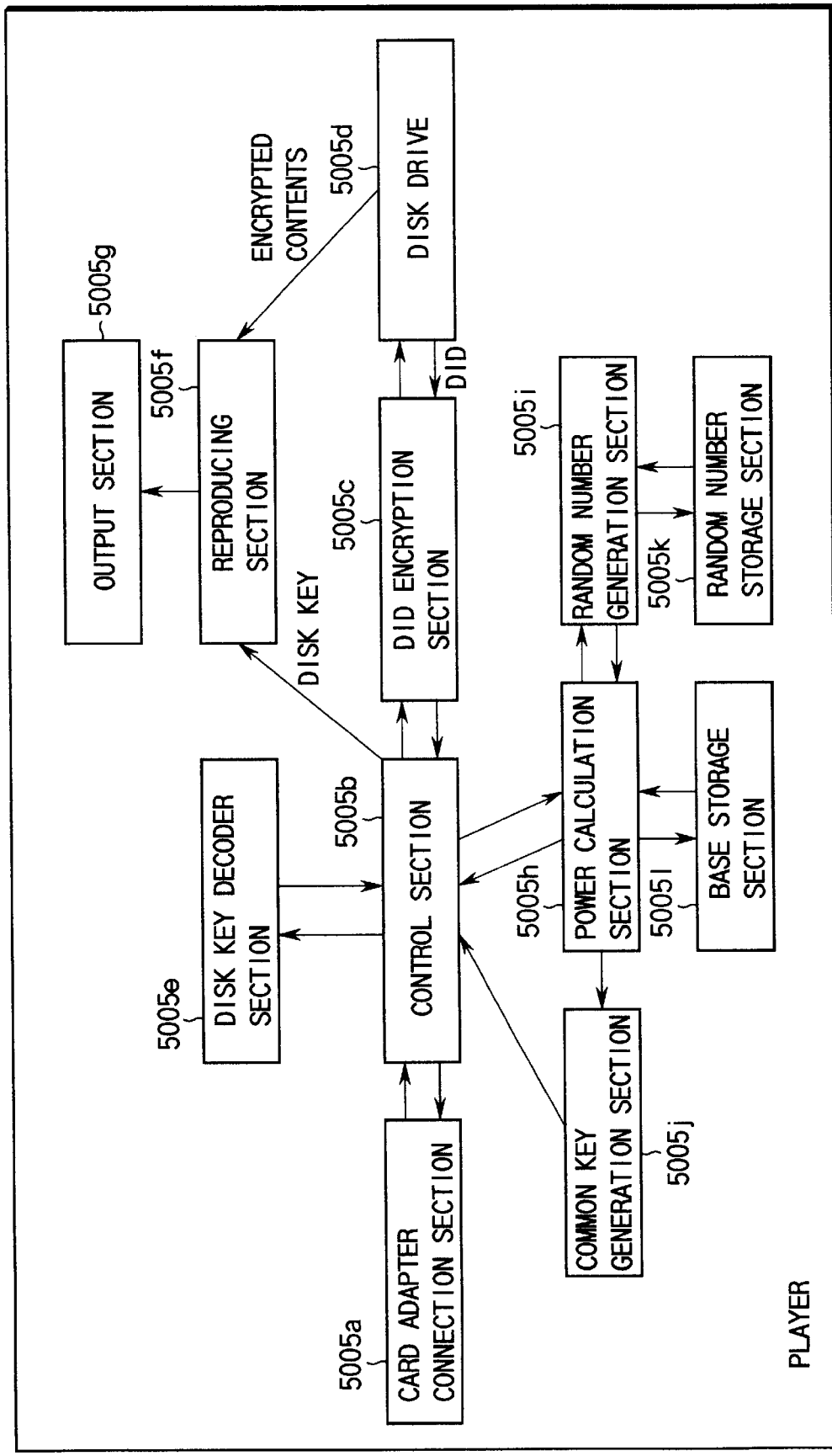

FIG. 128 shows an arrangement of the card P.

The card P is connected to the license issuing device 5003 or card adapter 5004 through a device insertion section 5101. When a device insertion confirmation section 5102 confirms that the card P is normally inserted into the license issuing device 5003 or card adapter 5004, the card P and the card adapter 5003 or card adapter 5004 can communicate through the device insertion section 5101.

A random number generation section 5107 generates random numbers bk and dk to be used to encrypt/decode the card ID (KID) before the ID (KID) of the card P is transferred to the license issuing device 5003 or card adapter 5004.

A base storage section 5109 stores the secret parameters X(k) and Prk in advance.

A power calculation section 5106 calculates public parameters (first seed generation information and fifth seed generation information) from the random numbers generated by the random number generation section 5107 and the secret parameters stored in the base storage section 5109. The power calculation section 5106 also generates the first seed from the first seed generation information transferred from the license issuing device 5003 and the random number bk generated by the random number generation section 5107. A fifth seed is also generated from the fifth seed generation information transferred from the card adapter 5004 and the random number dk generated by the random number generation section 5107.

A common key generation section 5108 stores the key generation algorithm Ak(Pk) in advance. The algorithm Ak(Pk) is applied to the first seed to generate the first common key wl1. The algorithm Ak(Pk) is applied to the fifth seed to generate the fifth common key wl1. By applying the key generation algorithm Ak(Pk) to the first and fifth seeds, the data length of each of the first and fifth seeds can be reduced.

A KID storage section 5105 stores the ID (identification information) for uniquely identifying the card P, i.e., KID in advance.

A KID encryption section 5104 encrypts the KID stored in the KID storage section 5105 using the common keys wk1 and wk2 generated by the common key generation section 5108.

A control section 5103 controls the entire card P.

The card P is inserted into a card insertion section 5004a. When a card insertion confirmation section 5004b confirms that the card P is normally inserted, the card P and the card adapter 5004 can communicate through the card insertion section 5004a.

A random number generation section 5004k generates random numbers bl, aD, ck, and dD to be used to encrypt/decode the ID (AID) of the card adapter 5004 itself, which is stored in an AID storage section 5004f in advance, the license information (Lic), the ID (DID) of the disk D set in the player, the ID (KID) of the card P, and the disk key.

A random number storage section 50041 stores the random numbers bl, aD, and ck generated by the random number generation section 5004k.

A base storage section 5004m stores the secret parameters X(l), Prl, X(k), Prk, X(D), and PrD in advance.

A power calculation section 5004j calculates public parameters (second seed generation information, fourth seed generation information, fifth seed generation information, and sixth seed generation information) from the random numbers generated by the random number generation section 5004k and the secret parameters stored in the base storage section 5004m. The power calculation section 5004j also generates a second seed from the second seed generation information transferred from the license issuing device 5003 through the card P and the random number bl generated by the random number generation section 5004k. A third seed is also generated from the third seed generation information transferred from the license issuing device 5003 through the card P and the random number bl generated by the random number generation section 5004k. A fourth seed is also generated from the fourth seed generation information transferred from the player 5005 and the random number aD generated by the random number generation section 5004k. A fifth seed is also generated from the fifth seed generation information transferred from the card P and the random number ck generated by the random number generation section 5004k. A sixth seed is also generated from the sixth seed generation information transferred from the player 5005 and the random number dD generated by the random number generation section 5004k.

A common key generation section 5004i stores the key generation algorithms Al(Pl), Ak(Pk), and AD(PD) in advance. The algorithm Al(Pl) is applied to the second seed to generate the second common key wl1. The algorithm Al(Pl) is applied to the third seed to generate the third common key wl2. The algorithm AD(PD) is applied to the fourth seed to generate a fourth common key wD1. The algorithm Ak(Pk) is applied to the fifth seed to generate the fifth common key wk2. The algorithm AD(PD) is applied to the sixth seed to generate a sixth common key wD2. By applying the key generation algorithms Al(Pl), Ak(Pk), and AD(PD) to the second to sixth seeds, the data length of each of the second to sixth seeds can be reduced.

An encryption/decoder section 5004o encrypts the disk key using the common key wD2 generated by the common key generation section 5004i. The encryption/decoder section 5004o also decodes the encrypted license information [Lic] wl2, the encrypted disk ID [DID] wD1, and the encrypted card ID [KID] wk2 using the common keys wl2, wD1, and wk2 generated by the common key generation section 5004i.

The AID storage section 5004f stores the ID (identification information), i.e., AID for uniquely identifying the card adapter 5004 in advance.

An AID encryption section 5004d encrypts the AID stored in the AID storage section 5004f using the common key wl1 generated by the common key generation section 5004i.

A kd storage section 5004g stores the decoding key kd for decoding the disk information encrypted using the encryption key ke.

The player 5005 is connected to a player connection section 5004n to communicate with the card adapter 5004.

A license decision section 5004e decodes the encrypted disk information contained in the license information transferred from the license issuing device 5003 through the card P using the decoding key kd. In license decision processing (FIGS. 139 and 140), the following conditions are checked.

Whether the card ID (KID) and card adapter ID (AID) contained in the license information match the card ID (KID) of the card P inserted into the license decision section 5004e and the card adapter ID (AID) stored in the AID storage section 5004f, respectively.

Whether the license information generation time is earlier than the current time indicated by a clock 5004h.

Whether the disk ID (DID) contained in the disk information matches the ID of the disk D which is currently being set in the player 5005.

Whether the current time indicated by the clock 5004h satisfies the expiration date contained in the disk information.

When the above conditions are satisfied, the license decision section 5004e outputs the disk key contained in the disk information to the player 5005. At this time, the disk key is encrypted using the common key wD2 generated on the basis of the sixth seed generation information exchanged with the player 5005 through the player connection section 5004n.

The card adapter 5004 is connected to a card adapter connection section 5005a to communicate with the player 5005.

A random number generation section 5005i generates random numbers bD and cD to be used to encrypt/decode the disk key and the ID (DID) of the disk D, which is read from the disk D set in a disk drive 5005d.

A random number storage section 5005k stores the random number cD generated by the random number generation section 5005i.

A base storage section 5005l stores the secret parameters X(D) and PrD in advance.

A power calculation section 5005h calculates public parameters (fourth seed generation information and sixth seed generation information) from the random numbers generated by the random number generation section 5005i and the secret parameters stored in the base storage section 5005l. The power calculation section 5005h also generates a fourth seed from the fourth seed generation information transferred from the card adapter 5004 and the random number bD generated by the random number generation section 5005i. A sixth seed is also generated from the sixth seed generation information transferred from the card adapter 5004 and the random number cD generated by the random number generation section 5005i.

A common key generation section 5005j stores the key generation algorithm AD (PD) in advance. The algorithm AD(PD) is applied to the fourth seed to generate the common key wD1. The algorithm AD(PD) is applied to the sixth seed to generate the common key wD2. By applying the key generation algorithm AD(PD) to the fourth and sixth seeds, the data length of each of the fourth and sixth seeds can be reduced.

The disk D is set in the disk drive 5005d, and the disk ID (DID), the encrypted contents information, and the encrypted contents key stored in the disk D are read. The disk ID (DID) is transferred to a DID encryption section 5005c, and the encrypted contents information and the encrypted contents key are transferred to a reproduction section 5005f.

The DID encryption section 5005c encrypts the disk ID (DID) using the common key wD1 generated by the common key generation section 5005j.

A disk key decoder section 5005e decodes the encrypted disk key [disk key] wD2 using the common key wD2 generated by the common key generation section 5005j. The decoded disk key is transferred to the reproduction section 5005f.

The reproduction section 5005*f* decodes the encrypted contents key using the disk key, decodes the encrypted contents information using the decoded contents key, reproduces the contents information, and outputs it to an output section 5005*g*.

The disk key distribution procedure in the information distribution system shown in FIG. 122 will be sequentially described next with reference to the view shown in FIG. 133 and the flow charts shown in FIGS. 134 to 140 about the subscription to a disk rental service, rental of a disk, and reproduction of contents.

The subscription to a disk rental service will be described first.

Step x1: The card P issued to the user is inserted into the license issuing device 5003. The license issuing device 5003 generates the random number al. To acquire the ID (AID) of the card adapter 5004, a public parameter necessary for encrypting the AID, i.e., the second seed generation information $X(l)^{al}(\mod Prl)$ is calculated from the random number al and the secret parameters ($X(l)$ and Prl) and transferred to the card P (steps S6001 to S6003 in FIG. 134).

Step x2: The license issuing device 5003 also generates the random number ak. To acquire the ID (KID) of the card P, the first seed generation information $X(k)^{ak}(\mod Prk)$ is calculated from the random number ak and the secret parameters ($X(k)$ and Prk) and transferred to the card P (steps S6010 and S6011 in FIG. 135).

Step x3: Upon receiving the first seed generation information, the card P generates the random number bk. The first seed $(X(k)^{ak})^{bk} = X(k)^{(ak \cdot bk)}(\mod Prk)$ is calculated from the random number bk and the first seed generation information. The algorithm Ak(Pk) stored in advance is applied to the first seed to generate the common key wk1. The ID (KID) of the card P is encrypted using the common key wk1. The KID encrypted using the common key wk1 will be represented as [KID] wk1 hereinafter. The first seed generation information $X(k)^{bk}(\mod Prk)$ necessary for decoding [KID] wk1 is calculated from the random number bk and the secret parameters ($X(k)$ and Prk). The [KID] wk1 and the first seed generation information are transferred to the license issuing device 5003 (steps S6012 to S6016 in FIG. 135).

The license issuing device 5003 generate the first seed from the first seed generation information transferred from the card P and the previously generated random number ak. The algorithm Ak(Pk) is applied to the first seed to generate the common key wk1. The [KID] wk1 is decoded to obtain the ID (KID) of the card P (steps S6017 to S6019).

The ID of the card P acquired in the above manner is stored in the card database (DB) 5003*i* in correspondence with the previously generated random number al (step S6021 in FIG. 135). The information stored in the card DB 5003*i* is used later to decode the ID (AID) of the card adapter, which is acquired through the card P. At this time point, the second seed generation information $X(l)^{al}(\mod Prl)$ received from the license issuing device is stored in the card P.

Step x4: The user takes home the card P which has undergone the above-described processing and inserts the card P into the card adapter 5004 at home. The card adapter 5004 reads the second seed generation information from the card P. The card adapter 5004 generates the random number bl and calculates the second seed $X(l)^{(al \cdot bl)}(\mod Prl)$ from the random number bl and the second seed generation information. The algorithm Al(Pl) stored in advance is applied to the second seed to generate the common key wl1. The identification information AID of the card adapter 5004 is encrypted using the common key wl1. The AID encrypted using the common key wl1 will be represented as [AID] wl1 hereinafter.

Step x5: The second seed generation information $X(l)^{bl}(\mod Prl)$ is calculated from the previously generated random number bl and the secret parameters ($X(l)$ and Prl), and the second seed generation information and the [AID] wl1 are transferred to the card P (steps S6004 to S6009 in FIG. 134).

At this time point, the second seed generation information and the [AID] wl1 are stored in the card P. The second seed generation information $X(l)^{Aal}(\mod Prl)$ stored previously may be erased from the card P. The card adapter 5004 stores the random number bl in the random number storage section 5004*l* to decode the license information later.

To rent a disk, the user goes to, e.g., a member shop of the disk rental service (a shop having where the license issuing device 5003 is set), selects a desired disk, and presents the disk and the card P to a clerk.

Steps x6 and x7: The presented card P and disk D are inserted into the license issuing device 5003. To acquire the ID (KID) of the card P, the license issuing device 5003 obtains the identification information of the card P from the card P, as in steps x2 and x3 (step S6001 in FIG. 134 and steps S6010 to S6019 in FIG. 135). The random numbers ak and bk generated at this time do not always match the random numbers ak and bk in steps x2 and x3, though this poses no problem in acquiring the KID.

Step x8: The card P transfers the second seed generation information and [AID] wl1 to the license issuing device 5003. The license issuing device 5003 retrieves the random number al corresponding to the card ID (KID) acquired in step x7 from the card DB 5003*i*. If the card P has undergone the above-described authentic procedure, the random number al corresponding to the card ID (KID) must be registered in the card DB 5003*i*. The license issuing device 5003 calculates the second seed $X(l)^{(al \cdot bl)}(\mod Prl)$ from the second seed generation information transferred from the card P and the retrieved random number al and applies the algorithm Al(Pl) to the second seed to generate the common key wl1. The [AID] wl1 is decoded using the common key wl1 to obtain the ID (AID) of the card adapter 5004 (steps S6020 and S6021 in FIG. 135 and steps S6022 to S6026 in FIG. 136).

The license issuing device 5003 stores the identification information AID of the card adapter 5004 in the card DB 5003*i* in correspondence with the identification information of the card P (step S6027 in FIG. 136).

With the above procedure, the license issuing device 5003 can grasp the combination of the card ID (KID) and the card adapter ID (AID) which are given to the user. Even when the user uses a plurality of card adapters, the license issuing device 5003 can grasp IDs of all card adapters of the user. In this case, IDs (AIDs) of the plurality of card adapters are stored in the card DB 5003*i* in correspondence with one card ID (KID)

Step x9: On the other hand, the license issuing device 5003 acquires the ID (DID) of the inserted disk D from the disk and encrypted disk information corresponding to the disk ID from the license DB 5003*f*. This encrypted disk information is merged with current time acquired from the clock 5003*h* as license information generation time. Information (user's card ID (KID) or card adapter ID (AID)) stored in the card DB 5003*i* is also merged, as needed, to generate license information (Lic). That is, Lic=encrypted disk information+license information generation time (+AID+KID)

Whether the AID and KID are to be inserted into the license information Lic depends on decision of the shop. Alternatively, the license creation device 5001 may decide necessity of AID/KID and record the decision contents in the license DB 5003f in correspondence with the card ID (as additional information) (in this case, when the additional information is present, the license issuing device 5003 can merge the AID and KID with the license information Lic). Insertion of the AID into the license information Lic section that the license is limited to a specific card adapter. In addition, insertion of the KID into the license information Lic section that the license is limited to a specific card (steps S6028 to S6030 in FIG. 136).

The license issuing device 5003 generates the random number cl. Since the second seed generation information $X(l)^{bl}(\mod Prl)$ has already been read from the card P, the license issuing device 5003 calculates the third seed $X(l)^{(bl \cdot cl)}(\mod Prl)$ from the random number cl and the second seed generation information. The algorithm Al(Pl) is applied to the third seed to generate the key wl2, and the license information Lic is encrypted. The license information Lic encrypted using the common key wl2 will be represented as [Lic] wl2 hereinafter. A public parameter necessary for decoding the [Lic] wl2, i.e., the third seed generation information $X(l)^{cl}(\mod Prl)$ is calculated from the random number cl and the secret parameters (X(l) and Prl). The third seed generation information and the encrypted license information [Lic] wl2 are transferred to the card P (steps S6031 to S6035 in FIG. 136).

At this time point, the encrypted license information [Lic] wl2 and the third seed generation information are stored in the card P. The [AID] wl1 previously stored in the card P may be erased because the information has already been transferred to the license issuing device 5003.

The user takes home the card P which has undergone the above processing and the disk D and can reproduce the contents using the card adapter 5004 and the player 5005 at home.

Step x11: To reproduce the contents, the user inserts the card P into the card adapter 5004 and sets the disk D in the player 5005. The card adapter 5004 reads out the encrypted license information [Lic] wl2 and the third seed generation information from the card P and calculates the third seed $X(l)^{(bl \cdot cl)}(\mod Prl)$ from the third seed generation information and the random number bl temporarily stored in step x5. The algorithm Al(Pl) is applied to the third seed to generate the common key wl2, thereby decoding the encrypted license information [Lic] wl2 (steps S6046 to S6049 in FIG. 138).

Step x12: On the other hand, the player 5005 reads the disk ID (DID) from the set disk D.

Step s13: The card adapter 5004 generates the random number aD. To acquire the disk ID (DID) of the disk D from the player 5005, the card adapter 5004 generates a public parameter necessary for decoding encrypting the disk ID (DID), i.e., the fourth seed generation information. More specifically, the fourth seed generation information $X(D)^{aD}(\mod PrD)$ is calculated from the random number aD and the secret parameters (X(D) and PrD) and transferred to the player 5005 (step S6036 and S6037 in FIG. 137).

Step x14: Upon receiving the fourth seed generation information, the player 5005 generates the random number bD and calculates the fourth seed $X(D)^{(aD \cdot bD)}(\mod PrD)$ from the fourth seed generation information and the random number bD. The algorithm AD(PD) is applied to generate the common key wD1, thereby encrypting the disk ID (DID). The DID encrypted using the common key wD1 will be represented as [DID] wD1 hereinafter. In addition, a public parameter necessary for decoding the [DID] wD1, i.e., the fourth seed generation information $X(D)^{bD}(\mod PrD)$ is calculated from the random number bD and the secret parameters (X(D) and PrD), and [DID] wD1 and the fourth seed generation information are transferred to the card adapter 5004 (steps S6038 to S6042 in FIG. 137).

Upon receiving the fourth seed generation information and [DID] wD1 transferred from the player 5005, the card adapter 5004 calculates the fourth seed $X(D)^{(aD \cdot bD)}(\mod PrD)$ from the fourth seed generation information and the random number aD. The algorithm AD(PD) is applied to the fourth seed to generate the common key wD1. The [DID] wD1 is decoded to acquire the disk ID (DID) (steps S6043 to S6045 in FIG. 137).

The flow advances to step S6050 in FIG. 138 to perform processing of deciding on the basis of the license information whether the contents information can be decoded (license decision processing) (FIGS. 139 and 140).

If the license information contains the card adapter ID, the card adapter 5004 compares the card adapter ID (AID) stored in the AID storage section 5004f with that contained in the license information.

Unless the IDs match, the license information is not adapted to the card adapter 5004, and processing is ended. If the AIDs match, the flow advances to the next processing (steps S6061 and S6062 in FIG. 139).

Step x15: When the card ID is contained in the license information, to acquire the identification information KID from the card P, the card adapter 5004 generates the random number ck first and a public parameter necessary for encrypting the card ID (KID) of the card P, i.e., the fifth seed generation information.

More specifically, the fifth seed generation information $X(k)^{ck}(\mod Prk)$ is calculated from the random number ck and the secret parameters (X(k) and Prk) and transferred to the card P (steps S6063 to S6065 in FIG. 139).

Step x16: Upon receiving the fifth seed generation information, the card P generates the random number dk and calculates the fifth seed $X(k)^{(ck \cdot dk)}(\mod Prk)$ from the fifth seed generation information and the random number dk. The algorithm Ak(Pk) is applied to the fifth seed to generate the key wk2, thereby encrypting the card ID (KID) of the card P. The KID encrypted using the common key wk2 will be represented as [KID] wk2 hereinafter. In addition, a public parameter necessary for decoding the [KID] wk2, i.e., the fifth seed generation information $X(k)^{dk}(\mod Prk)$ is calculated from the random number dk, and the fifth seed generation information and the [KID] wk2 are transferred to the card adapter 5004 (steps S6066 to S6070).

The card adapter 5004 calculates the fifth seed from the fifth seed generation information and the random number dk transferred from the card P. The algorithm Ak(Pk) is applied to the fifth seed to generate the key wk2. The [KID] wk2 is decoded to obtain the KID. When the card ID (KID) sent from the card P matches that contained in the license information, the flow advances to the next processing. Otherwise, it is decided that the license information stored in the card P is not adapted to the card P, processing is ended (steps S6071 to S6074).

Step x17: The card adapter 5004 checks the license information generation time contained in the license information. The license information generation time is represented as T1. The card adapter 5004 acquires current time Tc indicated by the clock 5004h. When Tc £ T1, the current time Tc indicated by the clock 5004h is delayed. Actually, the time T1 when the license information has been generated must be earlier than the current time Tc. Therefore, when Tc £ T1, the card adapter 5004 decides that the clock 5004h is not correct and stops processing. Alternatively, some allowable error range Te (>0) may be set in advance, and when or only when Tc>T1+Te holds, the flow may advance to the next processing (step S6075 in FIG. 140).

The encrypted disk information contained in the license information is decoded using the decoding key kd held in advance (step S6076). The disk information contains the disk ID (DID), the disk key, and the expiration date (TL). First, the expiration date TL is compared with the current time Tc indicated by the clock 5004h. If TL<Tc, the license has expired, so the card adapter 5004 stops processing. Alternatively, some allowable error range Te' (>0) may be set in advance, and when or only when Tc £ TL+Te' holds, the flow may advance to the next processing (step S6077).

Finally, the card adapter 5004 compares the disk ID (DID) contained in the disk information with the disk ID of the disk D, which is acquired in advance. If the disk IDs do not match, the license information is information generated for a disk different from the disk D which is currently being set in the player 5005, so the card adapter 5004 stops processing. When the disk IDs match, it is decided that the contents information recorded on the disk D can be reproduced (step S6078).

If it is decided that reproduction is enabled, the card adapter 5004 instructs the player 5005 to generate a random number to transfer the disk key contained in the disk information to the player 5005.

Step x18: Upon receiving the random number generation instruction, the player 5005 generates the random number cD, calculates the sixth seed generation information $X(D)^{cD}(\mathrm{mod}\ PrD)$ from the random number cD and the secret parameters (X(D) and PrD), and transfers it to the card adapter 5004 (steps S6051 and S6052 in FIG. 138).

Step x19: Upon receiving the sixth seed generation information, the card adapter 5004 generates the random number dD. The sixth seed $X(D)^{(cD \cdot dD)}(\mathrm{mod}\ PrD)$ is calculated from the sixth seed generation information and the random number dD. The algorithm AD(PD) is applied to the sixth seed to generate the common key wD2 for encrypting the disk key. The disk key is encrypted using the common key wD2. The disk key encrypted using the common key wD2 will be represented as [disk key] wD2 hereinafter. In addition, a public parameter necessary for decoding the [disk key] wD2, i.e., the sixth seed generation information $X(D)^d(\mathrm{mod}\ PrD)$ is generated from the random number dD and the secret parameters (X(D) and PrD), and the sixth seed generation information and the [disk key] wD2 are transferred to the player 5005 (steps S6053 to S6056).

The player 5005 calculates the sixth seed $X(D)^{(cD \cdot dD)}(\mathrm{mod}\ PrD)$ from the sixth seed generation information and the random number cD transferred from the card adapter 5004. The algorithm AD(PD) is applied to the sixth seed to generate the common key wD2, thereby decoding the [disk key] wD2 (step S6057 to S6059).

The player 5005 decodes the encrypted contents key stored in the disk D using the disk key, so the encrypted contents information can be decoded/reproduced using the contents key (step S6060).

The decoding key kd of the encrypted disk information may be stored in the player 5005. In this case, the player 5005 decodes the encrypted disk information. Since the clock 5004h which is referred to to decide the validity of the license information generation time or expiration date is incorporated in the card adapter 5004, the expiration date cannot be inserted into the encrypted disk information. Therefore, in this case, the encrypted disk information transferred from the license creation device 5001 to the license issuing device 5003 contains "disk ID+disk key" as constituent elements. The expiration date can be merged with the encrypted disk information in generating the license information in step x9, so license information containing the encrypted disk information, the license information generation time, the expiration date, and, as needed, the card ID (KID) and the card adapter ID (AID), can be generated.

The card adapter 5004 decides the validity of the expiration date without decoding the disk information using the decoding key kd.

Storage of the decoding key kd in the player 5005 yields the following advantage.

Since the encrypted disk information to be stored in the license issuing device 5003 does not contain the expiration date, the disk information need not be updated. That is, the license creation device 5001 can generate only the encrypted disk information of a newly added rental disk and appropriately transfer it to the license issuing device 5003.

Disadvantages are as follows.

Since the encrypted disk information is not updated, the motive for illicit use of the license issuing device 5003 is strengthened.

To protect the decoding key kd in the player 5005, the security of the player 5005 must be increased.

The procedure required to the user in the above disk key distribution will be briefly described.

i) In subscribing to the disk rental service, the user receives issue of the card P in the member shop of the disk rental service. The user purchases or rents the card adapter 5004, as needed.

ii) The user inserts the card P into the card adapter 5004 connected to the player 5005 at home.

iii) To rent a disk, the user goes to the shop with the card P, selects a desired rental disk D, and pays for the issue of the license into the card P.

iv) The user takes the disk D and the card P home, inserts the card P into the card adapter 5004, and reproduces the disk D. The disk D can be reproduced any number of times before the expiration date of the license.

v) To rent another disk, the user repeats the processes iii) and iv).

It is more advantageous for the user to receive issue of the card P and simultaneously rent the disk in subscribing to the disk rental service. The procedure required to the user at this time will be briefly described.

i) In subscribing to the disk rental service, the user receives issue of the card P in the member shop of the disk rental service. The user purchases or rents the card adapter 5004, as needed.

ii') The user selects a desired rental disk D, and pays for the issue of the license into the card P.

iii') The user takes the disk D and the card P home, inserts the card P into the card adapter 5004, and reproduces the disk D. The disk can be reproduced any number of times before the expiration date of the license.

iv') To rent another disk, the user repeats the processes ii') and iii').

A disk key distribution procedure in this case will be described next.

Another disk key distribution procedure in the information distribution system shown in FIG. 122 will be sequentially described next with reference to the view shown in FIG. 141 and the flow charts shown in FIGS. 142 to 146 about the subscription to a disk rental service, rental of a disk, and reproduction of contents.

All the card adapters 5004 and license issuing devices 5003 provided to the subscribers of the disk rental service share a random number b10. The random number b10 is stored in, e.g., a ROM and preferably protected to prevent from being read outside the card adapter.

The random number b10 is stored in the base storage sections 5003m and 5004m of the license issuing device 5003 and the card adapter 5004 in advance.

The subscription to a disk rental service will be described first.

Steps y1 and y2: The card P issued to the user is inserted into the license issuing device 5003. The license issuing device 5003 acquires the card ID (KID) from the card P in the same manner as in steps x2 and x3 and steps x6 and x7 in FIG. 133 (step S6101 to S6110 in FIG. 142).

Step y3: The rental disk D selected by the user is also inserted into the license issuing device 5003. The license issuing device 5003 acquires the disk ID (DID) from the inserted disk D and encrypted disk information corresponding to the disk ID from the license DB 5003f.

The license issuing device 5003 merges current time acquired from the clock 5003h as license information generation time and also merges the card ID (KID) of the user to generate license information (Lic) (steps S6111 to S6114 in FIG. 142). That is, Lic=encrypted disk information+license information generation time+KID Step y4: The license issuing device 5003 generates the random number al. The card ID of the card P and the random number al are stored in the card DB 5003i.

A seventh seed $X(l)^{(al \cdot bl0)}(\text{mod } Prl)$ is calculated from the random number al and, e.g., the secret parameters (X(l) and Prl). The algorithm Al (Pl) is applied to the seventh seed to generate a common key wl3, thereby encrypting the license information Lic. The license information Lic encrypted using the common key wl3 will be represented as [Lic] wl3 hereinafter. A public parameter necessary for decoding the [Lic] wl3, i.e., the seventh seed generation information $X(l)^{al}(\text{mod } Prl)$ is calculated from the random number al and the secret parameters (X(l) and Prl). The seventh seed generation information and the encrypted license information [Lic] wl3 are transferred to the card P (steps S6115 to S6119 in FIG. 142).

At this time point, the encrypted license information [Lic] wl3 and the seventh seed generation information are stored in the card P.

The user takes home the card P which has undergone the above processing and the disk D and can reproduce the contents using the card adapter 5004 and the player 5005 at home.

Step y5: To reproduce the contents, the user inserts the card P into the card adapter 5004 and sets the disk D in the player 5005. The card adapter 5004 reads the encrypted license information [Lic] wl3 and the seventh seed generation information from the card P and calculates the seventh seed $X(l)^{(al \cdot bl0)}(\text{mod } Prl)$ from the seventh seed generation information and the random number bl0 stored in the base storage section 5004m in advance. The algorithm Al(Pl) is applied to the seventh seed to generate the common key wl3, thereby decoding the encrypted license information [Lic] wl3. The card adapter 5004 decodes the encrypted disk information contained in the license information using the decoding key kd (steps S6120 to 6129 in FIG. 143).

Steps y8 and y9: The card adapter 5004 acquires the card ID (KID) as in steps x15 and x16 in FIG. 133 (steps S6130 to S6139 in FIG. 143).

Steps y10 to y12: The card adapter 5004 also acquires the disk ID (DID) of the disk D as in steps x12 to x14 in FIG. 133 (Steps S6140 to S6149 in FIG. 144).

Step y13: The flow advances to step S6150 in FIG. 145 to perform processing of deciding on the basis of the license information whether the contents information can be decoded (license decision processing) (FIG. 146).

In license decision processing (FIG. 146), the following conditions are checked.

Whether the card ID (KID) contained in the license information matches the card ID of the card P inserted into the card adapter 5004.

Whether the disk ID (DID) contained in the disk information matches the disk ID of the disk D which is currently being set in the player 5005.

Whether the license information generation time is earlier than the current time indicated by a clock 5004h.

Whether the current time indicated by the clock 5004h satisfies the expiration date contained in the disk information.

Only when the above conditions are satisfied, the card adapter 5004 decides that the contents information recorded on the disk D can be reproduced and instructs the player 5005 to generate a random number to transfer the disk key contained in the disk information.

Steps y14 and y15: As in steps x18 and x19 in FIG. 133, the disk key is encrypted using the common key wD2 generated on the basis of the sixth seed generation information exchanged with the player 5005, and transferred to the player 5005 (steps S6150 to S6161 in FIG. 145).

Steps y6 and y7: On the other hand, the card adapter 5004 executes processing of transferring the card adapter ID (AID) stored in the AID storage section 5004f in advance to the card P before or after the above license decision processing. At this time, the card adapter ID (AID) is encrypted using the common key wl1 generated on the basis of the seventh seed generation information (the seventh seed generation information is the same as the second seed generation information) transferred from the license issuing device 5003 through the card P and the random number bl generated by the random number generation section 5004k, as in steps x4 and x5 in FIG. 133.

The same processing as in steps x6 to x19 in FIG. 133 is performed from the second disk rental. In the second disk rental, the license issuing device 5003 can acquire the card adapter ID (AID) of the user in step x8 in FIG. 133. That is, the correspondence between the card ID (KID) of the card P and the card adapter ID (AID) is stored in the card DB 5003i.

In distribution of license information containing a disk key in the present invention, partner certification and transfer protection are performed on the basis of the secret parameters of each device on the distribution route and the public parameters (generated from the secret parameters) exchanged between the devices. Therefore, periodically or when attack to the security is suspected, the secret parameters or the decoding key kd of encrypted disk information (the parameters and decoding key will be called encryption parameters hereinafter) are preferably occasionally updated. The update is preferably performed on the basis of directions from the license creation device 5001.

The encryption parameters to be updated by the license creation device 5001 are, e.g., (X(l), Pl, and Prl), (X(k), Pk, and Prk), X(D), PD, and PrD), and (kd, and ke). Encryption parameter update processing will be described with reference to the flow charts shown in FIGS. 147 to 149.

An encryption parameter generation section 5001h of the license creation device 5001 updates the encryption parameters using, e.g., a random number generator and then generates parameter update information for the respective devices (the player 5005, the card adapter 5004, the card P, and the license issuing device 5003) (step S6201 in FIG. 147).

Parameter update information for the player contains X(D), PD, and PrD. Parameter update information for the card adapter contains X(l), Pl, Prl, X(k), Pk, Prk, X(D), PD, PrD, and kd. Parameter update information for the card contains X(k), Pk, and Prk. Parameter update information for the license issuing device contains X(l), Pl, Prl, X(k), Pk, and Prk.

A second encryption section 5001g encrypts the parameter update information for the respective devices using the encryption keys KsD, KsA, KsC, and KsL stored in a second encryption key storage section 5001f in advance (steps S6202 and S6203), respectively. More specifically, the parameter update information for the player is encrypted using the encryption key KsD, the parameter update information for the card adapter is encrypted using the encryption key KsA, the parameter update information for the card is encrypted using the encryption key KsP, and the parameter update information for the license issuing device is encrypted using the encryption key KsL. The parameter update information, i.e., the encryption parameter for, e.g., the player encrypted using the corresponding encryption key will be represented as [parameter update information] KsD.

The encryption parameter update information for the respective devices are as follows.

The encryption parameter update information for the player (UD): [X(D)+PD+PrD] KsD The encryption parameter update information for card adapter (UA): [X(l)+Pl+Prl+X(k)+Pk+Prk+X(D)+PD+PrD+kd] KsA The encryption parameter update information for the card (UC): [X(k)+Pk+Prk] KsC The encryption parameter update information for the license issuing device (UL): [X(l)+Pl+Prl+X(k)+Pk+Prk] KsL The current time (encryption parameter update time) is acquired from the clock 5001a and transferred to the license issuing device 5003 together with the encryption parameter information for the devices (steps S6204 and S6205).

Upon receiving the encryption parameter information for the devices (UD, UA, UC, and UL) and the update time, the license issuing device stores the pieces of encryption parameter information UD, UA, and UC and the update time in the internal memory (step S6206 in FIG. 148).

The license issuing device 5003 stores the decoding key KpL corresponding to the encryption key KsL in the memory in advance. The encryption parameter update information UL is decoded using the decoding key KpL to update the encryption parameters X(l), Pl, Prl, X(k), Pk, and Prk stored in the base storage section 5003m and the common key generation section 50031 (step S6208). Since Pl and Pk are the parameters of the key generation algorithms Al and Ak, respectively, the key generation algorithms are updated.

Processing of updating the encryption parameters of the card P is executed when the card P is inserted into the license issuing device 5003.

When the card P of the user is inserted into the license issuing device 5003, the license issuing device 5003 acquires the latest encryption parameter update time from the card P. When the update time is older than the update time stored in the license issuing device 5003 (update time transferred from the license creation device 5001), the flow advances to step S6210; otherwise, the encryption parameter update operation is ended, and normal processing such as a write of license information is performed (step S6209).

In step S6210, the license issuing device 5003 transfers the pieces of encryption parameter update information UD, UA, and UC and the update time to the card P. The card P stores the pieces of encryption parameter update information UD and UA and the update time in the internal memory.

The card P stores the decoding key KpC corresponding to the encryption key KsC in the memory in advance. The encryption parameter update information UC is decoded using the decoding key KpC to update the encryption parameters X(k), Pk, and Prk stored in the common key generation section 5108 (steps S6211 and S6212).

Processing of updating the encryption parameters of the card adapter 5004 is executed when the user inserts the card P into the card adapter 5004. More specifically, when the card adapter ID (AID) is to be transferred to the card P, or when license information is to be transferred from the card P to the card adapter 5004 to reproduce the disk D, encryption parameter update processing for the card adapter 5004 is executed.

The card P transfers the latest encryption parameter update time of the card P (the update time transferred from the license issuing device 5003) to the card adapter 5004. When the update time is older than the latest encryption parameter update time stored in the card adapter 5004, the flow advances to step S6214; otherwise, the encryption parameter update operation is ended, and normal processing is performed (step S6213).

In step S6214, the card P transfers the pieces of encryption parameter update information UD and UA and the update time to the card adapter 5004. The card adapter 5004 stores the encryption parameter update information UD and the update time in the internal memory.

The card adapter 5004 stores the decoding key KpA corresponding to the encryption key KsA in the memory in advance. The encryption parameter update information UA is decoded using the decoding key KpA to update the encryption parameters X(l), Pl, Prl, X(k), Pk, Prk, X(D), PD, PrD, and kd stored in the base storage section 5109, the common key generation section 5108, and the kd storage section 5004g (steps S6215 and S6216). After this, normal processing is performed.

Processing of updating the encryption parameters of the player 5005 is executed when the card adapter 5004 and the player 5005 are to communicate with each other. More specifically, when the disk ID (DID) is to be transferred from the player 5005 to the card adapter 5004, encryption parameter update processing for the player 5005 is executed.

For example, before the player 5005 transfers the disk ID (DID) to the card adapter 5004, the latest encryption parameter update time of the player 5005 is transferred to the card adapter 5004.

When the update time transferred from the player 5005 is older than the latest encryption parameter update time stored in the card adapter 5004, the flow advances to step S6218; otherwise, the encryption parameter update operation is ended, and normal processing is performed (step S6217).

In step S6218, the card adapter 5004 transfers the encryption parameter update information UD and the update time to the player 5005. The player 5005 stores the update time in the internal memory.

The player 5005 stores the decoding key KpD corresponding to the encryption key KsD in the memory in advance. The encryption parameter update information UD is decoded using the decoding key KpD to update the encryption parameters X(D), PD, and PrD stored in the base storage section 50051 and the common key generation section 5005*j* (steps S6219 and S6220). After this, normal processing is performed.

The encryption parameter update processing is ended. Encryption parameter update is performed for all cards (all cards issued to the user) inserted into the license issuing device 5003. Therefore, encryption parameter update influences all card adapters 5004 to which the card P with updated encryption parameters and all players 5005 connected to the card adapters 5004.

The card adapter 5004 and the player 5005 may be sometimes constituted as a single device (to be referred to as a second player hereinafter). A procedure of distributing license information containing a disk key in this case will be briefly described with reference to FIGS. 133 and 141. In FIG. 133, disk ID transfer processing (steps x13 and x14) and disk key transfer processing (steps x18 and x19) between the card adapter 5004 and the player 5005 can be omitted. The card adapter ID to be transferred to the license issuing device 5003 through the card P in step x5 is the ID (PID) of the second player.

In FIG. 141 as well, disk ID transfer processing (steps y11 and y12) and disk key transfer processing (steps y14 and y15) between the card adapter 5004 and the player 5005 can be omitted. The card adapter ID to be transferred to the license issuing device 5003 through the card P in step y7 is the ID (PID) of the second player.

The remaining processes are the same as described above.

As described above, according to the fifth embodiment, the disk key necessary for decoding contents information can be safely distributed from the distribution source (the license creation device and the license issuing device) to the distribution destination (the card adapter and the player).

As described above, the present invention provides apparatuses and methods relating to recording medium such as DVD as follows:

An information recording apparatus comprises encryption section for encrypting contents information, license information generation section for generating encrypted license information containing at least a license condition for limiting use of the contents information and a decoding key for decoding the contents information, and recording section for recording, on a recording medium, the contents information encrypted by the encryption section and the license information generated by the license information generation section.

An information recording apparatus comprises separation section for separating a part from contents information, license information generation section for generating an encrypted license information containing at least the part of information separated by the separation section and a license condition for limiting use of the contents information, and recording section for recording, on a recording medium, the license information generated by the license information generation section and the remaining part of contents information.

An information recording apparatus comprises recording information generation section for generating encrypted recording information containing contents information and at least a license condition for limiting use of the contents information, and recording section for recording the recording information generated by the recording information generation section on a recording medium.

An information reproducing apparatus comprises section for receiving a recording medium on which encrypted contents information, and license information containing at least a license condition for limiting use of the contents information and first key information for decoding the contents information are recorded, storage section for storing second key information for decoding the license information, first decoding section for decoding the license information recorded on the recording medium using the second key information stored in the storage section, decision section for deciding, on the basis of the license condition contained in the license information decoded by the first decoding section, whether the contents information can be used, and second decoding section for decoding the contents information recorded on the recording medium using the first key information contained in the license information decoded by the first decoding section when the decision section decides that the contents information can be used.

An information reproducing apparatus comprises section for receiving a recording medium on which part of contents information and encrypted license information containing at least a license condition for limiting use of the contents information and the remaining part of the contents information are recorded, storage section for storing key information for decoding the license information, decoding section for decoding the license information recorded on the recording medium using the key information stored in the storage section, decision section for deciding, on the basis of the license condition contained in the license information decoded by the decoding section, whether the contents information can be used, and reproduction section for synthesizing the part of contents information contained in the license information decoded by the decoding section with the part of contents information recorded on the recording medium and reproducing the contents information when the decision section decides that the contents information can be used.

An information reproducing apparatus comprises section for receiving a recording medium on which encrypted recording information containing at least contents information and a license condition for limiting use of the contents information is recorded, storage section for storing key information for decoding the recording information, decoding section for decoding the recording information recorded on the recording medium using the key information stored in the storage section, decision section for deciding, on the basis of the license condition contained in the recording information decoded by the decoding section, whether the contents information can be used, and reproduction section for reproducing the contents information decoded by the decoding section when the decision section decides that the contents information can be used.

The license condition contains at least an expiration date of the contents information, and the decision section has instrument section for measuring a date, and compares the date measured by the instrument section with the expiration date to decide whether the contents information can be used.

The license condition contains at least an expiration date of the contents information, and the decision section has instrument section for measuring a date and update disabling section for disabling update of the date measured by the instrument section, and compares the date measured by the instrument section with the expiration date to decide whether the contents information can be used.

The license condition contains at least an expiration date of the contents information, and the decision section has instrument section for measuring a date, reception section for receiving encrypted update information for updating the date measured by the instrument section, and update section for decoding the encrypted update information received by the reception section and updating the date measured by the instrument section on the basis of the decoded update information, and compares the date measured by the instrument section with the expiration date to decide whether the contents information can be used.

The license condition contains at least an expiration date of the contents information and a recording date when the information has been recorded on the recording medium, and the decision section has instrument section for measuring a date, and compares the date measured by the instrument section, the expiration date, and the recording date with each other to decide whether the contents information can be used.

The license condition contains at least a contents information identifier for identifying the contents information, and the apparatus further comprises request section for requesting fee payment for use of contents information corresponding to the contents information identifier when the decision section decides that the contents information can be used, and update section for updating at least the license condition recorded on the recording medium when fee payment for the request is confirmed.

The license condition contains at least an expiration date of the contents information, the apparatus further comprises license condition update section for adding a decoder unit identifier of a unit capable of decoding the license information to the license condition when the license condition contains no decoder unit identifier for identifying the unit capable of decoding the license information, and the decision section decides, on the basis of the expiration date and the decoder unit identifier, whether the contents information can be used.

The license condition contains at least an expiration date of the contents information, the apparatus further comprises license condition update section for adding a decoder unit identifier of a unit capable of decoding the recording information to the license condition when the license condition contains no decoder unit identifier for identifying the unit capable of decoding the recording information, and the decision section decides, on the basis of the expiration date and the decoder unit identifier, whether the contents information can be used.

The license condition contains at least a medium identifier for identifying a recording medium capable of recording the contents information, and the decision section decides, on the basis of the medium identifier, whether the contents information can be used.

An information reproducing apparatus comprises section for receiving a recording medium on which encrypted contents information and license information containing at least a license condition for limiting use of the contents information and first key information for decoding the contents information are recorded, instrument section for measuring a date, decision section for deciding, on the basis of the date measured by the instrument section and the license information recorded on the recording medium, whether the contents information can be used, and information reproduction section for, when the decision section decides that the contents information can be used, decoding and reproducing the contents information recorded on the recording medium using the first key information output from the decision section, wherein information for notifying the decision section of the date from the instrument section and the first key information output from the decision section to the information reproduction section are encrypted.

The information for notifying the decision section of the date from the instrument section is encrypted using key information common to encryption and decoding.

The information for notifying the decision section of the date from the instrument section is encrypted and decoded using key information generated by the instrument section and the decision section, respectively.

The information for notifying the decision section of the date from the instrument section is encrypted and decoded using key information generated on the basis of first key generation information held in the instrument section and the decision section and random numbers mutually notified between the instrument section and the decision section.

The first key information output from the decision section to the information reproduction section is encrypted using key information common to encryption and decoding.

The first key information output from the decision section to the information reproduction section is encrypted and decoded using key information generated by the decision section and the information reproduction section, respectively.

The first key information output from the decision section to the information reproduction section is encrypted and decoded using key information generated on the basis of second key generation information held in the decision section and the information reproduction section and random numbers mutually notified between the decision section and the information reproduction section.

Only when the information for notifying of the date is decoded to reveal that the information has a predetermined data format, the decision section uses the information to decide whether the contents information can be used.

Only when time until arrival of the information for notifying of the date is measured to reveal that the time falls within a predetermined value, the decision section uses the information to decide whether the contents information can be used.

The decision section comprises storage section for storing a pair of second key information for encrypting the license information and third key information for decoding the license information, the third key information corresponding to the second key information, and decoding section for retrieving the third key information from the storage section on the basis of identification information of the third key information, which is recorded on the recording medium, to decode the license information, and at least part of the pair of the second key information and third key information stored in the storage section is updated.

The decision section comprises storage section for storing a pair of second key information for encrypting the license information and third key information for decoding the license information, the third key information corresponding to the second key information, and decoding section for retrieving the third key information from the storage section on the basis of identification information of the third key information, which is recorded on the recording medium, to decode the license information, and at least part of the pair of the second key information and third key information stored in the storage section is unique to each decision section.

An accounting apparatus for charging for use of contents information recorded on a recording medium, comprises input section for inputting a license condition of the contents information recorded on the recording medium, fee claiming section for claiming a fee for use of the contents information on the basis of the license condition input by the input section, and recording section for, upon confirming fee payment in response to the claim, recording license information containing at least the license condition input by the input section on the recording medium.

An accounting apparatus comprises reproduction section for reproducing encrypted license information from a recording medium on which contents information and the encrypted license information containing at least a license condition for limiting use of the contents information are recorded, decoding section for decoding the encrypted license information reproduced by the reproduction section, license condition input section for inputting a license condition for use of the contents information, fee claiming section for claiming a fee for use of the contents information on the basis of the license condition input by the license condition input section, update section for, upon confirming fee payment in response to the claim, updating the license information decoded by the decoding section, on the basis of the license condition input by the license condition input section, encryption section for encrypting the license information updated by the update section, and output section for outputting the license information encrypted by the encryption section.

A decision apparatus comprises section for receiving license information containing at least a license condition for limiting use of contents information and first key information for decoding the contents information, key generation section for generating, every predetermined time, second key information for decoding the license information, decoding section for decoding the input license information using the second key information generated by the key generation section, decision section for deciding, on the basis of the license condition contained in the license information decoded by the decoding section, whether the contents information can be decoded, and output section for outputting the first key information contained in the license information decoded by the decoding section when the decision section decides that the contents information can be used.

The key generation section generates a public key used to encrypt the license information and a secret key for decoding the license information, the secret key corresponding to the public key, the apparatus further comprises update request section for, when the decision section decides that the contents information cannot be used, supplying at least newly designated license condition and a public key newly generated by the key generation section to request update of the license information, and the license information updated in response to the license information update request from the update request section is encrypted using the public key newly generated by the key generation section and supplied together with the update request.

The key generation section generates the second key information on the basis of time information every predetermined time.

A decision apparatus comprises section for receiving encrypted license information containing at least a license condition for limiting use of contents information, encrypted first key information for decoding the contents information, and first key generation information necessary for generating second key information for decoding the encrypted first key information, decoding section for decoding the license information, decision section for deciding, on the basis of the license condition contained in the license information decoded by the decoding section, whether the contents information can be used, and output section for outputting the encrypted first key information and the first key generation information, which are contained in the license information decoded by the decoding section, when the decision section decides that the contents information can be used.

The decision apparatus comprises update request section for, when the decision section decides that the contents information cannot be used, notifying at least a newly designated license condition and second key generation information necessary for generating the second key information to request update of the license information, the second key generation information being unique to a usage device of the contents information and acquired from the usage device, thereby updating the license condition, the first key generation information, and the second key information upon receiving the license information update request from the update request section.

A decision apparatus comprises section for receiving encrypted license information containing at least a license condition for limiting use of contents information, encrypted first key information for decoding the contents information, and first key generation information necessary for generating second key information for decoding the encrypted first key information, key generation section for generating third key information for decoding the license information every predetermined time, decoding section for decoding the input license information using the third key information generated by the key generation section, decision section for deciding, on the basis of the license condition contained in the license information decoded by the decoding section, whether the contents information can be decoded, and output section for outputting the encrypted first key information and the first key generation information, which are contained in the license information decoded by the decoding section, when the decision section decides that the contents information can be used.

The key generation section generates a public key used to encrypt the license information and a secret key for decoding the license information, the secret key corresponding to the public key, and the apparatus further comprises update request section for, when the decision section decides that the contents information cannot be used, notifying at least a newly designated license condition and second key generation information necessary for generating the second key information and the public key newly generated by the key generation section to request update of the license information, the second key generation information being unique to a usage device of the contents information and acquired from the usage device, thereby updating the license condition, the first key generation information, and the second key information upon receiving the license information update request from the update request section, and encrypting the update license information using the public key newly generated by the key generation section and supplied together with the update request.

The key generation section generates third key information on the basis of time information every predetermined time.

A decision apparatus comprises section for receiving license information containing at least information obtained by encrypting, using second key information, a license condition for limiting use of contents information and first key information for decoding the contents information, and key generation information necessary for generating at least the second key information, key generation section for generating the second key information on the basis of the key generation information contained in the input license information, decoding section for decoding the license condition and the first key information contained in the license information using the second key information generated by the key generation section, decision section for deciding, on the basis of the license condition decoded by the decoding section, whether the contents information can be used, and output section for outputting the first key information decoded by the decoding section when the decision section decides that the contents information can be used.

A decision apparatus comprises section for inputting license information containing at least information obtained by encrypting, using second key information, a license condition for limiting use of contents information and first key information for decoding the contents information, and two pieces of key generation information necessary for generating at least the second key information, key generation section for generating the second key information on the basis of the two pieces of key generation information contained in the input license information, decoding section for decoding the license condition and the first key information contained in the license information using the second key information generated by the key generation section, decision section for deciding, on the basis of the license condition decoded by the decoding section, whether the contents information can be used, output section for outputting the first key information decoded by the decoding section when the decision section decides that the contents information can be used, and update request section for, when the decision section decides that the contents information cannot be used, supplying at least one of the two pieces of key generation information or information obtained by updating the one key generation information and a newly designated license condition to request update of the license information, wherein the license condition, the other key generation information, and the second key information are updated upon receiving the license information update request from the update request section.

The license information decoded by the decoding section contains certification information for deciding whether the decoding result is correct.

A decision apparatus constituted by a portable recording medium having an arithmetic function, comprises section for receiving encrypted license information read from a recording medium on which encrypted contents information and the encrypted license information containing at least a license condition for limiting use of the contents information and first key information for decoding the contents information are recorded, and encrypted date information for notifying a date, first decoding section for decoding the encrypted license information, second decoding section for decoding the encrypted date information, decision section for deciding, on the basis of the information decoded by the first and second decoding section, whether the contents information can be used, and output section for encrypting the first key information and outputting the first key information when the decision section decides that the contents information can be used.

The second decoding section performs decoding using key information generated on the basis of first key generation information and a random number, which are held in advance.

The decision section uses the date information decoded by the second decoding section to decide whether the contents information can be used only when the date information has a predetermined data format.

Only when time until arrival of the encrypted date information is measured to reveal that the time falls within a predetermined value, the decision section uses the date information to decide whether the contents information can be used.

The decision apparatus further comprises storage section for storing a pair of second key information for encrypting the license information and third key information for decoding the license information, the third key information corresponding to the second key information, and wherein the first decoding section retrieves the third key information from the storage section on the basis of identification information for designating the third key information, the identification information being read from the recording medium, to decode the license information, and at least part of the pair of the second and third key information stored in the storage section is updated.

The decision apparatus further comprises storage section for storing a pair of second key information for encrypting the license information and third key information for decoding the license information, the third key information corresponding to the second key information, and wherein the first decoding section retrieves the third key information from the storage section on the basis of identification information of the third key information, which is recorded on the recording medium, to decode the license information, and at least part of the pair of the second and third key information stored in the storage section is updated.

The decision apparatus further comprises storage section for storing a pair of second key information for encrypting the license information and third key information for decoding the license information, the third key information corresponding to the second key information, and wherein the first decoding section retrieves the third key information from the storage section on the basis of identification information of the third key information, which is recorded on the recording medium, to decode the license information, and at least part of the pair of the second and third key information stored in the storage section is unique to each decision section.

A decision apparatus comprises section for receiving encrypted license information containing at least a license condition for limiting use of contents information and first key information for decoding the contents information, key generation section for generating second key information for decoding the license information on the basis of first key generation information distributed by broadcasting, decoding section for decoding the input license information using the second key information generated by the key generation section, decision section for deciding, on the basis of the license condition contained in the license information decoded by the decoding section, whether the contents information can be used, and output section for outputting the first key information contained in the license information decoded by the decoding section when the decision section decides that the contents information can be used.

The decision apparatus further comprises storage section for storing input encrypted license information, and selection section for selecting encrypted license information corresponding to the contents information from the encrypted license information stored in the storage section, and wherein the decoding section decodes the encrypted license information selected by the selection section.

The decision apparatus further comprises storage section for storing input encrypted license information, and selection section for selecting, on the basis of a predetermined priority order of types of license information, encrypted license information corresponding to the contents information from the encrypted license information stored in the storage section, and wherein the decoding section decodes the encrypted license information selected by the selection section.

A decision apparatus comprises section for receiving encrypted license information containing at least a license condition for limiting use of contents information and first key information for decoding the contents information, first storage section for storing a first secret parameter shared with a license information distribution device, first key generation section for generating second key information on the basis of the first secret parameter stored in the first storage section and a first public parameter exchanged with the distribution device, first decoding section for decoding the received encrypted license information using the second key information generated by the first key generation section, decision section for deciding, on the basis of the license condition contained in the license information decoded by the first decoding section, whether the contents information can be used, and output section for outputting the first key information contained in the license information decoded by the decoding section when the decision section decides that the contents information can be used.

The decision apparatus the output section comprises second storage section for storing a second secret parameter shared with an information usage device which uses the contents information, and second key generation section for generating third key information on the basis of the second secret parameter stored in the second storage section and a second public parameter exchanged with the information usage device, and encrypts the first key information using the third key information generated by the second key generation section and outputs the first key information.

The decision apparatus further comprises third storage section for storing a third secret parameter shared with an information usage device which uses the contents information, first reception section for receiving, from the information usage device, encrypted identification information of a first recording medium on which the contents information is recorded, third key generation section for generating fourth key information on the basis of the third secret parameter stored in the third storage section and a third public parameter exchanged with the information usage device, and second decoding section for decoding the encrypted identification information received by the first reception section using the fourth key information generated by the third key generation section, and wherein the decision section decides, on the basis of the identification information decoded by the second decoding section and the decoded license information, whether the contents information can be used.

In the decision apparatus communication with the distribution device is performed through a recording medium having an arithmetic function.

In the decision apparatus, communication with the distribution device is performed through a recording medium having an arithmetic function, the apparatus further comprises fourth storage section for storing a fourth secret parameter shared with the recording medium, second reception section for receiving encrypted identification information of the recording medium from the recording medium, fourth key generation section for generating fifth key information on the basis of the fourth secret parameter stored in the fourth storage section and a fourth public parameter exchanged with the recording medium, and third decoding section for decoding the encrypted identification information received by the second reception section using the fifth key information generated by the fourth key generation section, and the decision section decides, on the basis of the identification information decoded by the third decoding section and the decoded license information, whether the contents information can be used.

An update apparatus comprises a decision device for deciding, on the basis of license information containing at least a license condition for limiting use of contents information and key information for decoding the contents information, whether the contents information can be used, the license information being encrypted using a public key, update section for updating the license information on the basis of a request for updating the license information upon receiving at least a newly designated license condition and an updated public key from the decision device, and encryption section for encrypting the updated license information using the supplied public key.

An update apparatus comprises a decision device for deciding, on the basis of encrypted license information containing at least a license condition for limiting use of contents information, encrypted first key information for decoding the contents information, and first key generation information necessary for generating second key information for decoding the encrypted first key information, whether the contents information can be used, and update section for updating the license information on the basis of a request for updating the license information, upon receiving at least a newly designated license condition and second key generation information necessary for generating the second key information from the decision device, wherein the update section updates the license condition and the first key generation information, updates the second key information on the basis of the updated first key generation information and the second key generation information, encrypts the first key information using the updated second key information to generate encrypted license information containing at least the updated license condition, the first key information encrypted using the updated second key information, and the updated first key generation information.

An update apparatus comprises a decision device for deciding, on the basis of license information encrypted using a public key and containing at least a license condition for limiting use of contents information, encrypted first key information for decoding the contents information, and first key generation information necessary for generating second key information for decoding the encrypted first key information, whether the contents information can be used, and update section for updating the license information on the basis of a request for updating the license information upon receiving at least a newly designated license condition, second key generation information necessary for generating the second key information, and an updated public key from the decision device, wherein the update section updates the license condition and the first key generation information, updates the second key information on the basis of the updated first key generation information and the second key generation information, encrypts the first key information using the updated second key information to generate license information containing at least the updated license condition, the first key information encrypted using the updated second key information, and the updated first key generation information, and encrypts the generated license information using the supplied public key.

An update apparatus comprises decision section for deciding, on the basis of license information containing at least information obtained by encrypting a license condition for limiting use of contents information and first key information for decoding the contents information using second key information, and two pieces of key generation information necessary for generating the second key information, whether the contents information can be used, and update section for updating the license information on the basis of a request for updating the license information upon receiving at least one of the two pieces of key generation information or information obtained by updating the other key generation information and a newly designated license condition from the decision section, wherein the update section updates the license condition and the other key generation information and updates the second key information on the basis of the updated other key generation information and the supplied one key information to generate information obtained by encrypting at least the updated license condition and the first key information using the updated second key information, and license information containing at least the supplied one key generation information and the updated other key generation information.

An information usage apparatus comprises section for receiving encrypted first key information for decoding encrypted contents information and first key generation information necessary for generating second key information for decoding the first key information, and section for holding second key generation information necessary for generating the second key information for decoding the first key information, generating the second key information on the basis of the second key generation information and the input first key generation information, and decoding the encrypted contents information using the generated second key information.

An information usage apparatus comprises section for receiving encrypted license information containing at least a license condition for limiting use of contents information and first key information for decoding the contents information, first storage section for storing a first secret parameter shared with a license information distribution device, first key generation section for generating second key information on the basis of the first secret parameter stored in the first storage section and a first public parameter exchanged with the distribution device, first decoding section for decoding the received encrypted license information using the second key information generated by the first key generation section, decision section for deciding, on the basis of the license condition contained in the license information decoded by the first decoding section, whether the contents information can be used, and second decoding section for decoding the contents information using the first key information contained in the license information decoded by the first decoding section when the decision section decides that the contents information can be used.

The information usage apparatus further comprises second storage section for storing third key information for decoding first encryption information containing at least the first key information and the license condition, the first encryption information being encrypted and contained in the license information, and second decoding section for decoding the first encryption information contained in the license information decoded by the decoding section, using the third key information stored in the second storage section.

In the information usage apparatus, communication with the distribution device is performed through a recording medium having an arithmetic function.

In the information usage apparatus communication with the distribution device is performed through a recording medium having an arithmetic function, the apparatus further comprises third storage section for storing a second secret parameter shared with the recording medium, reception section for receiving encrypted identification information of the recording medium from the recording medium, fourth key generation section for generating fourth key information on the basis of the second secret parameter stored in the third storage section and a second public parameter exchanged with the recording medium, and third decoding section for decoding the encrypted identification information received by the reception section using the fourth key information generated by the fourth key generation section, and the decision section decides, on the basis of the identification information decoded by the third decoding section and the decoded license information, whether the contents information can be used.

A key distribution apparatus comprises first storage section for storing first key information necessary for decoding encrypted contents information recorded on a recording medium and a first secret parameter shared with an information usage device which uses the contents information, first key generation section for generating second key information on the basis of the first secret parameter stored in the first storage section and a first public parameter exchanged with the information usage device, encryption section for encrypting encrypted first encryption information containing at least the first key information using the second key information generated by the first key generation section, and distribution section for distributing second encryption information encrypted by the encryption section and containing at least the first encryption information to the information usage device.

In the information usage apparatus, the first encryption information contains a license condition for limiting use of the contents information.

In the information usage apparatus, the second encryption information contains a license condition for limiting use of the contents information.

The information usage apparatus further comprises second storage section for storing a second secret parameter shared with the information usage device, reception section for receiving encrypted identification information of the information usage device from the information usage device, second key generation section for generating third key information on the basis of the second secret parameter stored in the second storage section and a second public parameter exchanged with the information usage device, and first decoding section for decoding the encrypted identification information of the information usage device, which is received by the reception section, using the third key information generated by the second key generation section, and wherein the encryption section encrypts the identification information of the information usage device, which is decoded by the first decoding section, together with the first encryption information using the second key information to generate the second encryption information.

In the information usage apparatus, communication with the information usage device is performed through a recording medium having an arithmetic function.

In the information usage apparatus, communication with the information usage device is performed through a recording medium having an arithmetic function, the apparatus further comprises third storage section for storing a third secret parameter shared with the recording medium, reception section for receiving encrypted identification information of the recording medium from the recording medium, third key generation section for generating fourth key information on the basis of the third secret parameter stored in the third storage section and a third public parameter exchanged with the recording medium, and second decoding section for decoding the encrypted identification information of the recording medium, which is received by the reception section, using the fourth key information generated by the third key generation section, and the encryption section encrypts the identification information of the recording medium, which is decoded by the second decoding section, together with the first encryption information using the second key information to generate the second encryption information.

A recording medium having an arithmetic function, on which encrypted license information containing at least a license condition for limiting use of contents information and first key information for decoding the contents information is recorded, comprises first storage section for storing a first secret parameter shared with a license information recording device and a second secret parameter shared with a decision device for deciding on the basis of the license information whether the contents information can be used, second storage section for storing identification information given in advance, first key generation section for generating second key information on the basis of the first secret parameter stored in the first storage section and a first public parameter exchanged with the recording device, first encryption section for encrypting the identification information using the second key information generated by the first key generation section, second key generation section for generating third key information on the basis of the second secret parameter stored in the first storage section and a second public parameter exchanged with the decision device, second encryption section for encrypting the identification information using the third key information generated by the second key generation section, and transmission section for transmitting the identification information encrypted by the first and second encryption section to the recording device and the decision device.

A recording medium having an arithmetic function, on which encrypted license information containing at least a license condition for limiting use of contents information and first key information for decoding the contents information is recorded, comprises first storage section for storing a first secret parameter shared with a license information recording device and a second secret parameter shared with an information usage device which uses the contents information on the basis of the license information, second storage section for storing identification information given in advance, first key generation section for generating second key information on the basis of the first secret parameter stored in the first storage section and a first public parameter exchanged with the recording device, first encryption section for encrypting the identification information using the second key information generated by the first key generation section, second key generation section for generating third key information on the basis of the second secret parameter stored in the first storage section and a second public parameter exchanged with the information usage device, second encryption section for encrypting the identification information using the third key information generated by the second key generation section, and transmission section for transmitting the identification information encrypted by the first and second encryption section to the recording device and the information usage device.

Additional advantages and modifications will readily occurs to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A computer-implemented information recording method for encrypting contents information and for storing the contents information on a storage medium, comprising:
   encrypting contents information to generate encrypted contents information;
   merging (a) a first key for decoding the encrypted contents information and (b) use information relevant only to use of the contents information, to produce a merged result;
   encrypting the merged result using a second key to produce a merged and encrypted result including the first key and the use information relevant only to use of the contents information, the first key and the use information being inseparably combined; and
   storing the encrypted contents information together with the merged and encrypted result in the storage medium.

2. A method according to claim 1, wherein the contents information comprises accounting object information.

3. A method according to claim 2, wherein the accounting object information comprises a digitized work.

4. A method according to claim 1, wherein the step of encrypting the contents information comprises encrypting the contents information using a third key corresponding to the first key to generate encrypted contents information.

5. A method according to claim 1, wherein the use information relevant only to use of the contents information comprises a license condition.

6. A method according to claim 5, wherein the license condition comprises an expiration date of the accounting object information.

7. A method according to claim 5, wherein the license condition comprises a license information write time.

8. A method according to claim 5, wherein the license condition comprises a contents ID.

9. A method according to claim 5, wherein the license condition comprises a medium ID.

10. A method according to claim 5, wherein the license condition comprises a decoder unit ID.

11. A computer-implemented information recording system for storing encrypted contents information on a storage medium, comprising:
    a contents information input section configured to input encrypted contents information;
    an encryption section configured to merge (a) a first key for decoding the encrypted contents information and (b) information indicating an ability to use the contents information, to produce a merged result, and configured to encrypt the merged result using a second key to produce a merged and encrypted result including the first key and the use information relevant only to use of the contents information, the first key and the use information being inseparably combined;
    a condition input section configured to input to the encryption section the information indicating an ability to use the contents information;
    a key input section configured to input the first key for decoding the encrypted contents information; and
    a recording section configured to receive the encrypted contents information input by the contents information input section and the merged and encrypted result, and configured to store in the storage medium the encrypted contents information together with the merged and encrypted result.

12. A system according to claim 11, wherein the contents information input section comprises an accounting object information input section, and the contents information comprises accounting object information.

13. A system according to claim 12, wherein the accounting object information comprises a digitized work.

14. A system according to claim 11, wherein the condition input section comprises a license condition input section, and the use information relevant only to use of the contents information comprises a license condition.

15. A system according to claim 14, wherein the license condition comprises an expiration date of the contents information.

16. A system according to claim 14, wherein the license condition comprises a license information write time.

17. A system according to claim 14, wherein the license condition comprises a contents ID.

18. A system according to claim 14, wherein the license condition comprises a medium ID.

19. A system according to claim 14, wherein the license condition comprises a decoder unit ID.

20. A system according to claim 11, wherein the key input section comprises a decoding key input section.

21. A system according to claim 11, wherein the contents information has been encrypted using a third key corresponding to the first key.

22. A system according to claim 11, wherein the recording section is further configured to record on the storage medium the encrypted contents information and the merged and encrypted result.

23. A system according to claim 22, wherein the storage medium is one of a DVD-RAM, a DVD-ROM, and a hard disk.

24. A computer-implemented information recording system for encrypting contents information and for storing the contents information on a storage medium, comprising:

means for encrypting contents information to generate encrypted contents information;

means for merging (a) a first key for decoding the encrypted contents information and (b) use information relevant only to use of the contents information to produce a merged result;

means for encrypting the merged result using a second key to produce a merged and encrypted result including the first key and the use information relevant only to use of the contents information, the first key and the use information being inseparably combined; and means for storing the encrypted contents information together with the merged and encrypted result in the storage medium.

25. A system according to claim 24, wherein the contents information comprises accounting object information.

26. A system according to claim 25, wherein the accounting object information comprises a digitized work.

27. A system according to claim 24, wherein the means for encrypting the contents information comprises means for encrypting the contents information using a third key corresponding to the first key to generate encrypted contents information.

28. A system according to claim 24, wherein the use information relevant only to use of the contents information comprises a license condition.

29. A system according to claim 28, wherein the license condition comprises an expiration date of the accounting object information.

30. A system according to claim 28, wherein the license condition comprises a license information write time.

31. A system according to claim 28, wherein the license condition comprises a contents ID.

32. A system according to claim 28, wherein the license condition comprises a medium ID.

33. A system according to claim 28, wherein the license condition comprises a decoder unit ID.

34. A system according to claim 24, wherein the storage medium is one of a DVD-RAM, a DVD-ROM, and a hard disk.

35. A computer-implemented information system for providing encrypted contents information, comprising:

a contents information input section configured to input encrypted contents information;

an encryption section configured to merge (a) a first key for decoding the encrypted contents information and (b) use information relevant to only use of the contents information, to produce a merged result, and configured to encrypt the merged result using a second key to produce a merged and encrypted result including the first key and the use information relevant only to use of the contents information, the first key and the use information being inseparably combined;

a condition input section configured to input to the encryption section the use information relevant only to use of the contents information;

a key input section configured to input the first key for decoding the encrypted contents information; and a providing section configured to receive the encrypted contents information input by the contents information input section and the merged and encrypted result, and configured to store in the storage medium the encrypted contents information together with the merged and encrypted result.

* * * * *

UNITED STATES PATENT AND TRADEMARK OFFICE
CERTIFICATE OF CORRECTION

PATENT NO.    : 6,477,649 B2                                       Page 1 of 1
DATED         : November 5, 2002
INVENTOR(S)   : Kambayashi et al.

It is certified that error appears in the above-identified patent and that said Letters Patent is hereby corrected as shown below:

Title page,
Item [45] and the [*] Notice, information should read as follows:

-- [45] **Date of Patent:  *Nov. 5, 2002**

[*]  Notice:  This patent issued on a continued prosecution
                application filed under 37 CFR 1.53(d), and is
                subject to the twenty year patent term provisions
                of 35 U.S.C. 154(a)(2)

Subject to any disclaimer, the term of this
                patent is extended or adjusted under 35
                U.S.C. 154(b) by 0 days. --

Signed and Sealed this

Eighth Day of July, 2003

JAMES E. ROGAN
*Director of the United States Patent and Trademark Office*